(12) United States Patent
Giles

(10) Patent No.: US 7,311,004 B2
(45) Date of Patent: Dec. 25, 2007

(54) FLOW CONTROL AND OPERATION MONITORING SYSTEM FOR INDIVIDUAL SPRAY NOZZLES

(75) Inventor: Durham Kenimer Giles, Davis, CA (US)

(73) Assignee: Capstan Ag Systems, Inc., Pasadena, CA (US)

( * ) Notice: Subject to any disclaimer, the term of this patent is extended or adjusted under 35 U.S.C. 154(b) by 631 days.

(21) Appl. No.: 10/786,614

(22) Filed: Feb. 25, 2004

(65) Prior Publication Data

US 2005/0000277 A1    Jan. 6, 2005

Related U.S. Application Data

(60) Provisional application No. 60/453,388, filed on Mar. 10, 2003.

(51) Int. Cl.
*G01H 1/00* (2006.01)
*B05B 7/00* (2006.01)
*B05B 1/02* (2006.01)

(52) U.S. Cl. .................. 73/592; 73/861.18; 73/865.9; 239/61; 239/72; 239/172; 239/176; 239/391

(58) Field of Classification Search .................. None
See application file for complete search history.

(56) References Cited

U.S. PATENT DOCUMENTS

| | | | |
|---|---|---|---|
| 4,328,025 A | | 5/1982 | Whitcomb |
| 4,823,268 A | | 4/1989 | Giles et al. |
| 4,905,897 A | * | 3/1990 | Rogers et al. .................. 239/1 |
| 5,004,152 A | * | 4/1991 | Baker et al. .................... 239/8 |
| 5,042,700 A | * | 8/1991 | Ardell et al. ................ 222/590 |
| 5,134,961 A | | 8/1992 | Giles et al. |
| 5,297,442 A | * | 3/1994 | Wolf et al. ................... 73/861 |
| 5,389,781 A | | 2/1995 | Beck et al. |
| 5,442,552 A | | 8/1995 | Slaughter et al. |
| 5,544,813 A | | 8/1996 | Giles et al. |
| 5,571,974 A | * | 11/1996 | Nauful ..................... 73/861.27 |
| 5,653,389 A | | 8/1997 | Henderson et al. |
| 5,704,546 A | | 1/1998 | Henderson et al. |
| 5,763,873 A | | 6/1998 | Beck et al. |
| 5,809,440 A | | 9/1998 | Beck et al. |
| 5,833,144 A | | 11/1998 | Kinter |
| 5,841,035 A | | 11/1998 | Andoh et al. |
| 5,861,556 A | | 1/1999 | Nukui et al. |

(Continued)

OTHER PUBLICATIONS

Product Data Sheet for AIM Command® Spray System (Case IH), 2 pages.

(Continued)

*Primary Examiner*—Daniel S. Larkin
*Assistant Examiner*—Rose M Miller
(74) *Attorney, Agent, or Firm*—Dority & Manning, P.A.

(57) ABSTRACT

An apparatus and process for monitoring fluid flow through a nozzle is disclosed. A vibration sensor, such as an accelerometer, is mounted to a nozzle. The vibration output received from the sensor is then analyzed to determine whether or not the nozzle is operating properly. Through the present invention, information can be obtained regarding variations in flow rate, and/or variations in spray pattern and droplet size spectra. If the nozzle flow pulsates, the vibration sensor may also provide information regarding whether the nozzle is pulsating according to a desired frequency duty cycle or waveform.

55 Claims, 113 Drawing Sheets

U.S. PATENT DOCUMENTS

| | | |
|---|---|---|
| 5,881,919 A | 3/1999 | Womac et al. |
| 5,908,161 A | 6/1999 | Womac et al. |
| 5,967,066 A | 10/1999 | Giles et al. |
| 6,003,383 A | 12/1999 | Zielinska et al. |
| 6,053,053 A | 4/2000 | Huotari |
| 6,170,338 B1 | 1/2001 | Kleven et al. |
| 6,260,941 B1 | 7/2001 | Su et al. |
| 6,539,805 B2 * | 4/2003 | Heaslip et al. ............ 73/649 |
| 6,596,996 B1 | 7/2003 | Stone et al. |
| 6,689,338 B2 | 2/2004 | Kotov |
| 2002/0073768 A1 * | 6/2002 | Joynes ............ 73/40.5 A |
| 2006/0225489 A1 * | 10/2006 | Giles et al. ............ 73/64.53 |
| 2006/0265106 A1 * | 11/2006 | Giles et al. ............ 700/283 |

OTHER PUBLICATIONS

Piezo Film Sensors Technical Manual from Measurement Specialties, Inc., Appendices A and B, Apr. 1999, pp. 59-82.

* cited by examiner

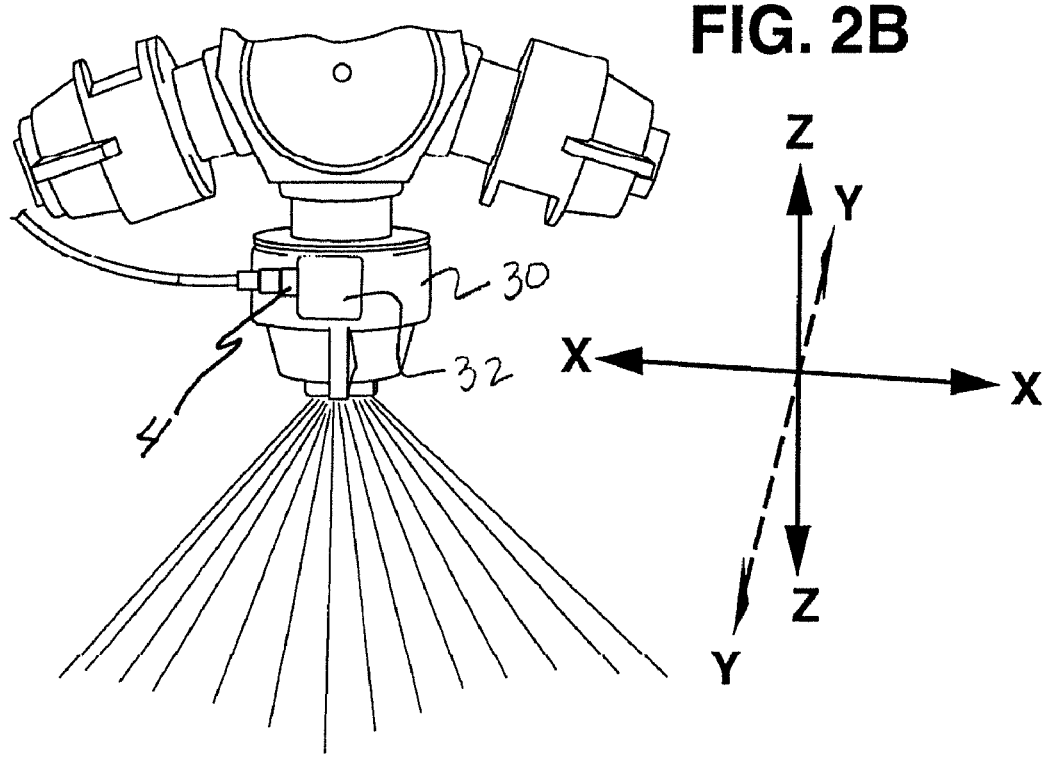
FIG. 2B
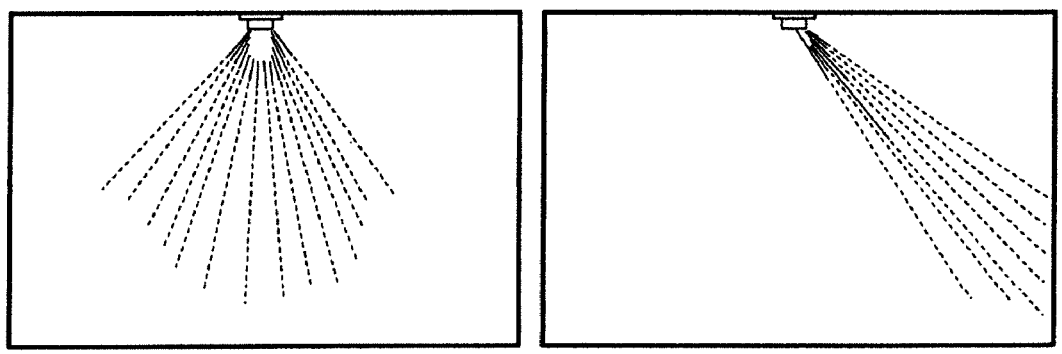
FIG. 3A          FIG. 3B

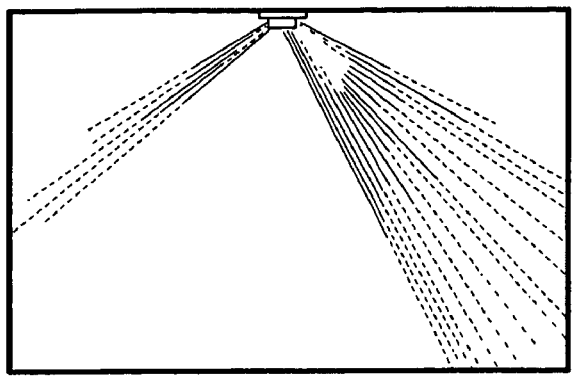 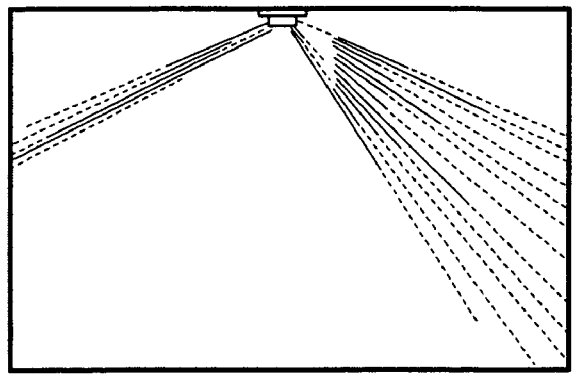
FIG. 3O    FIG. 3P

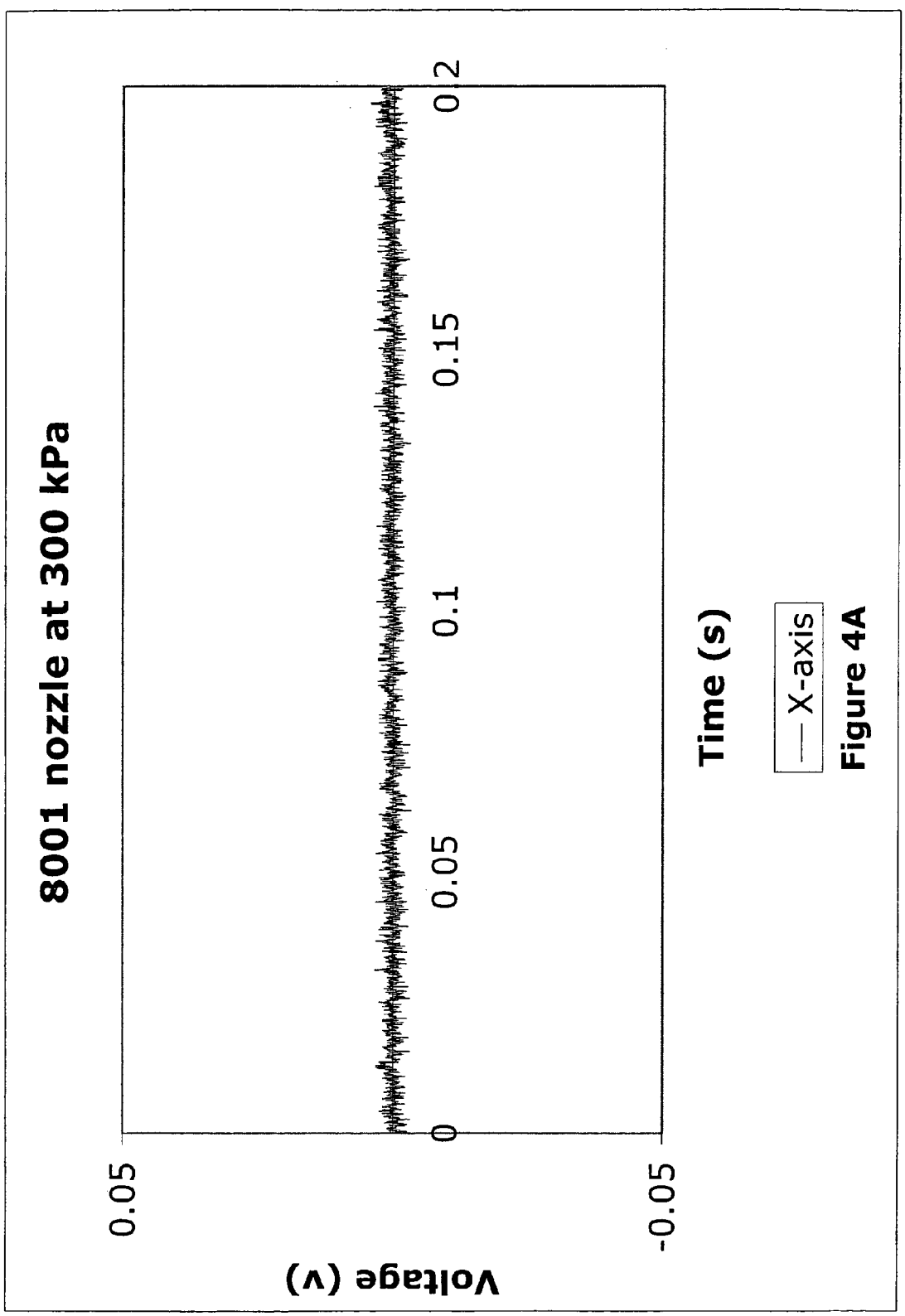

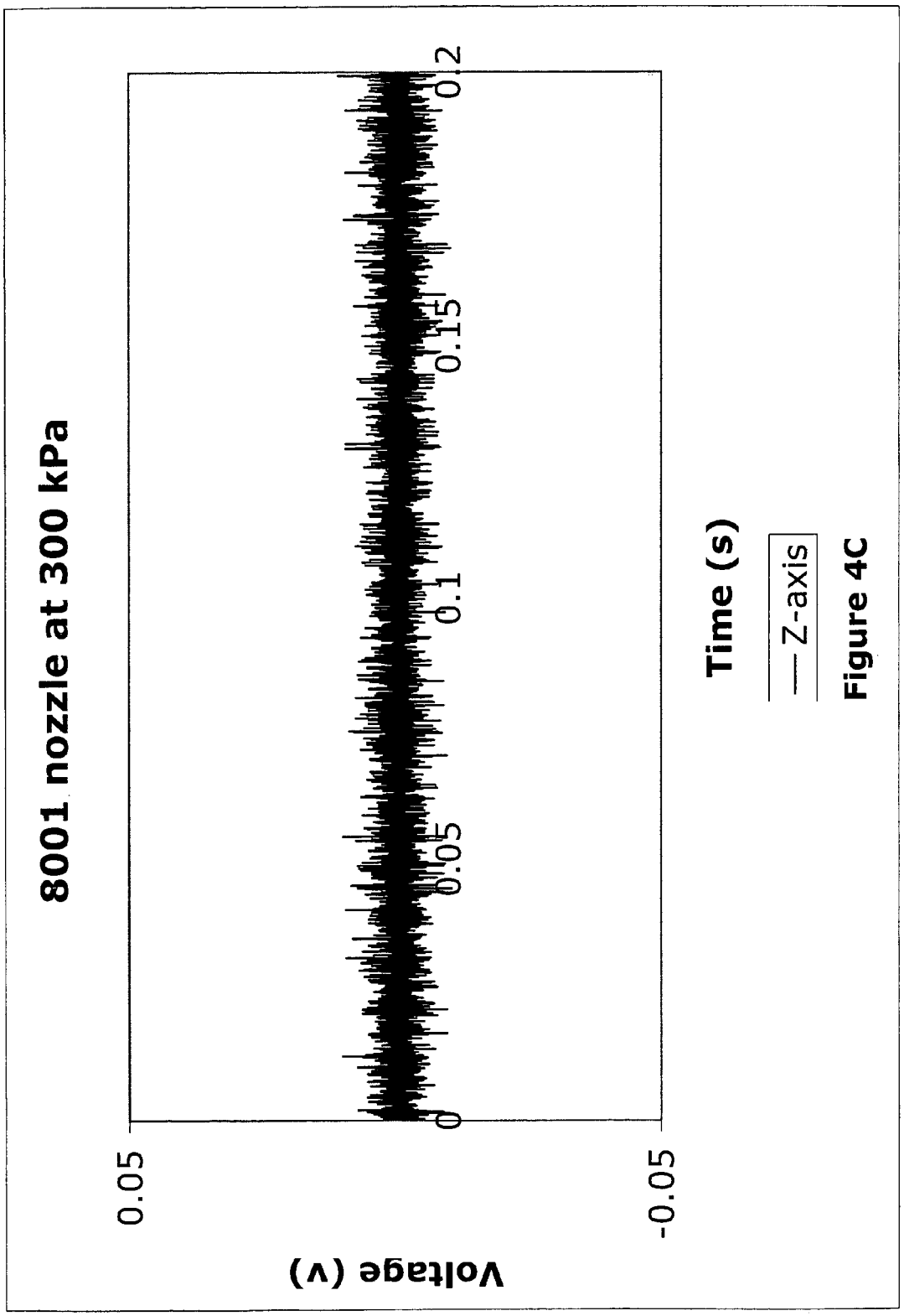

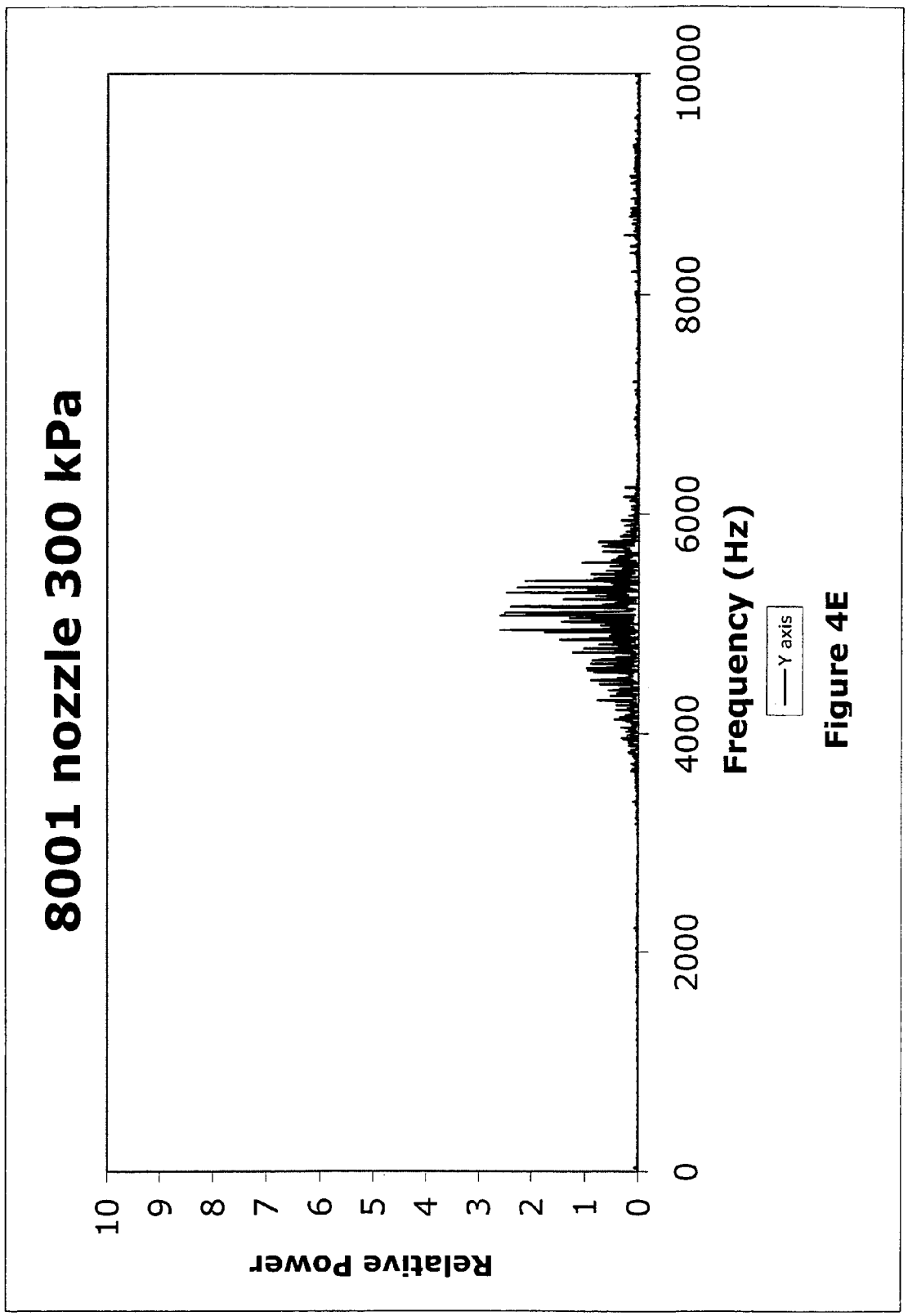

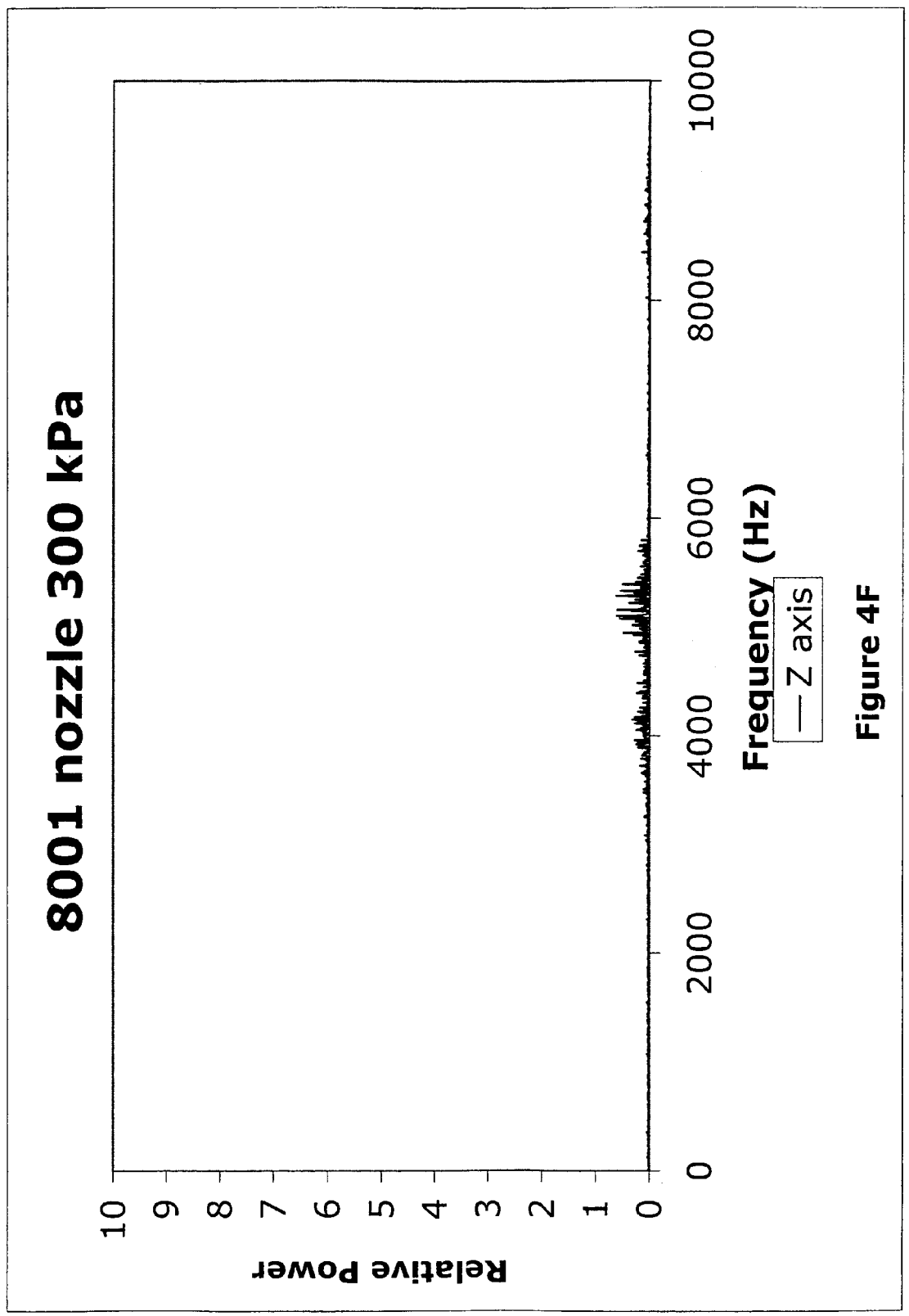

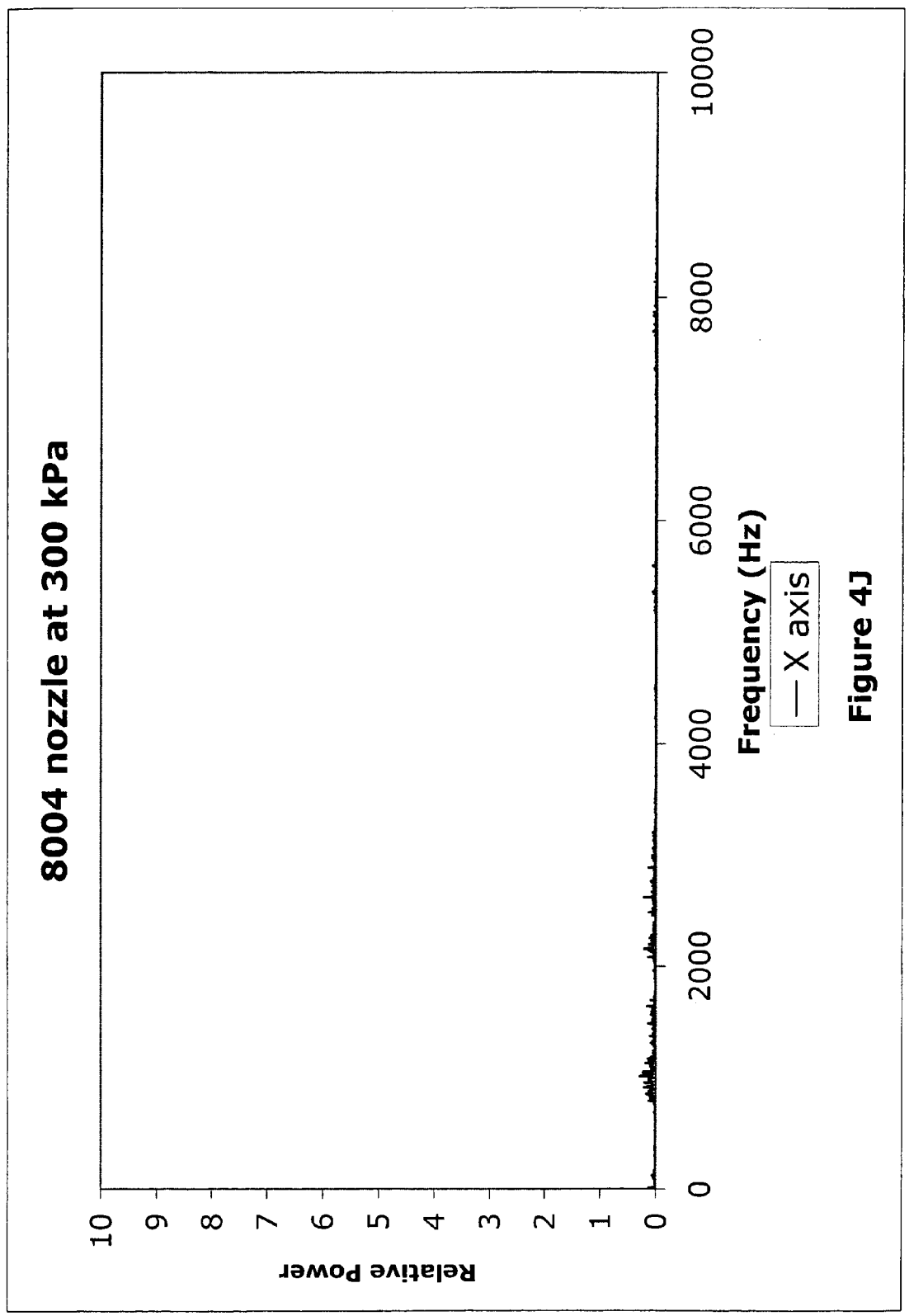

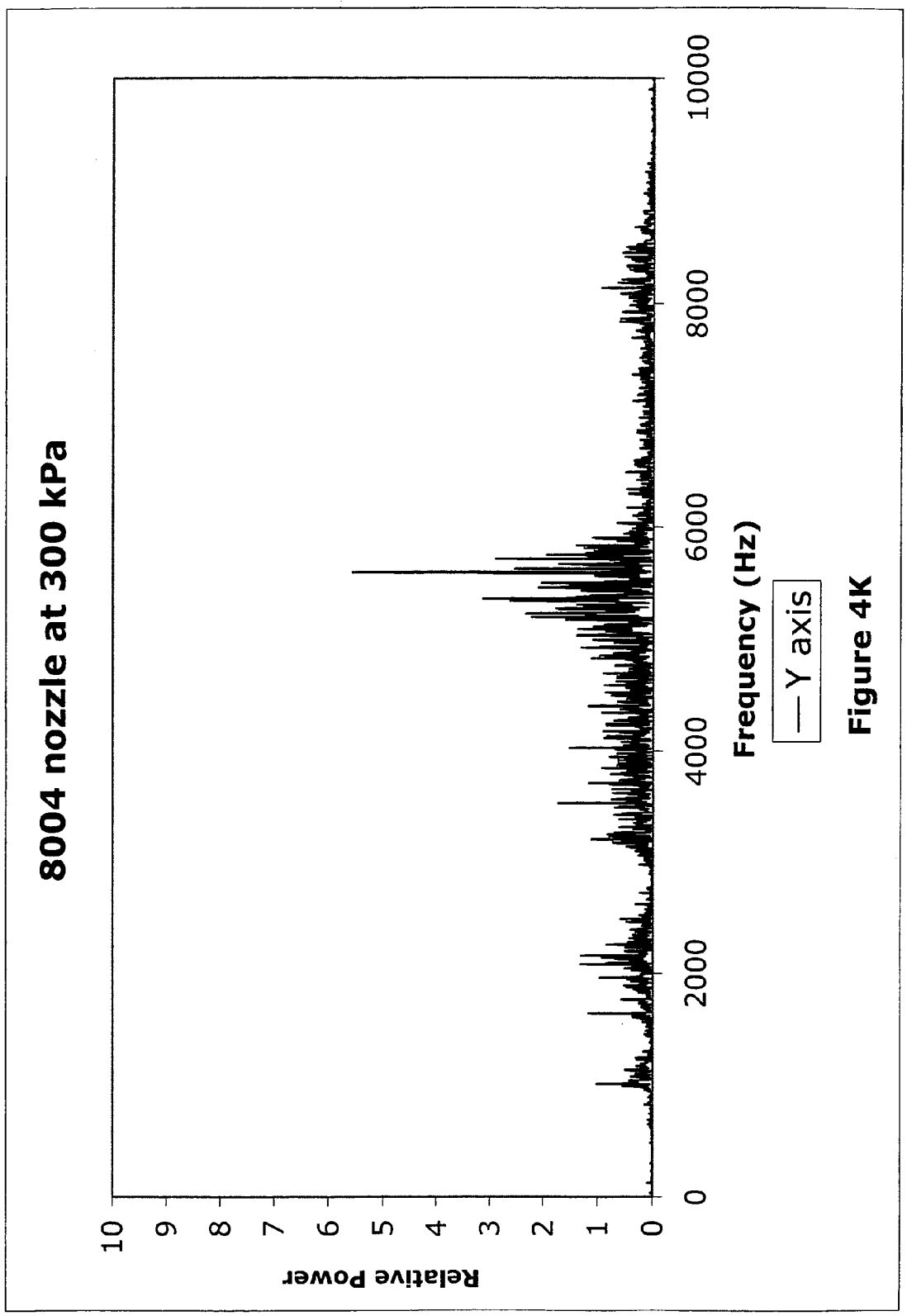

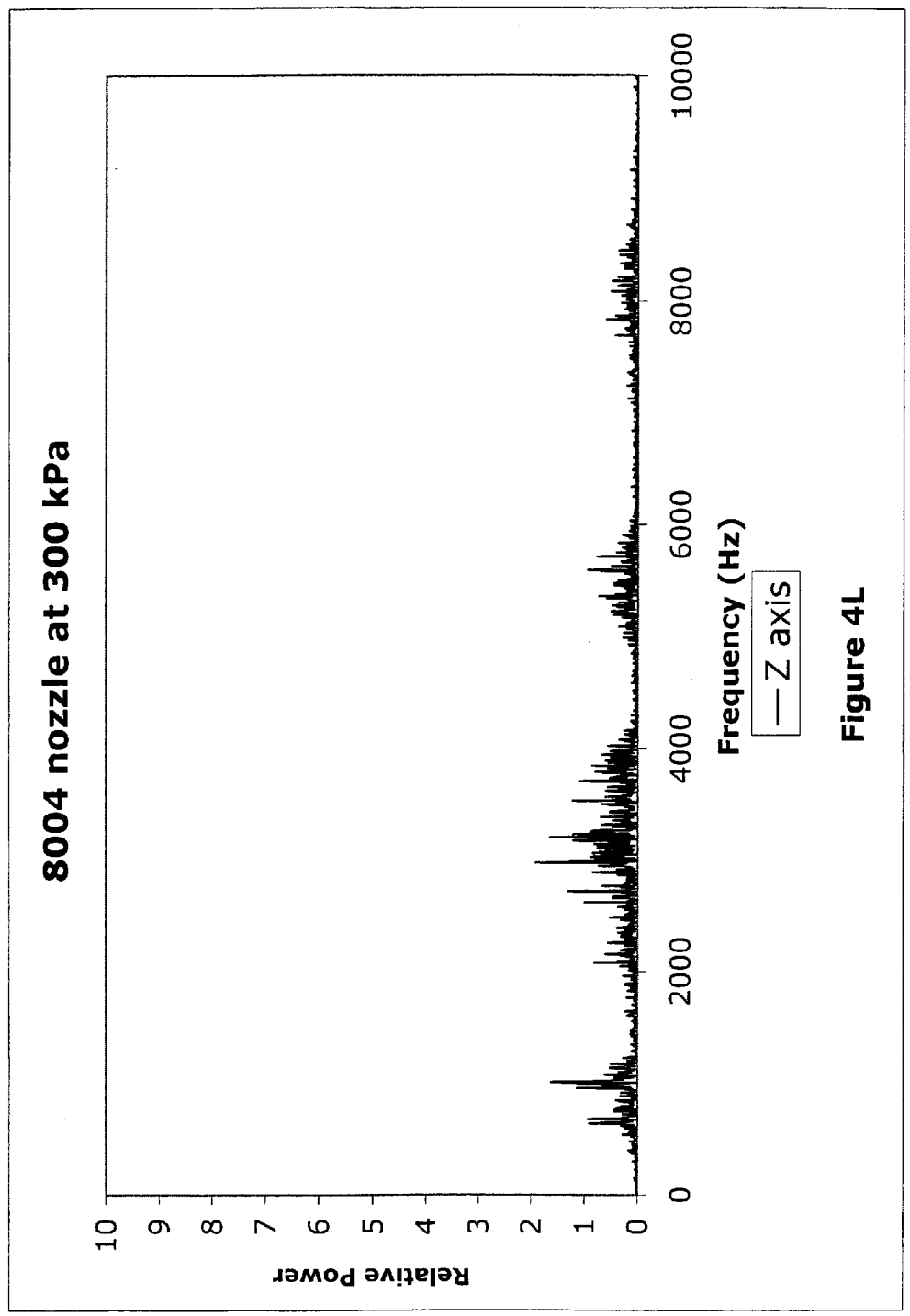

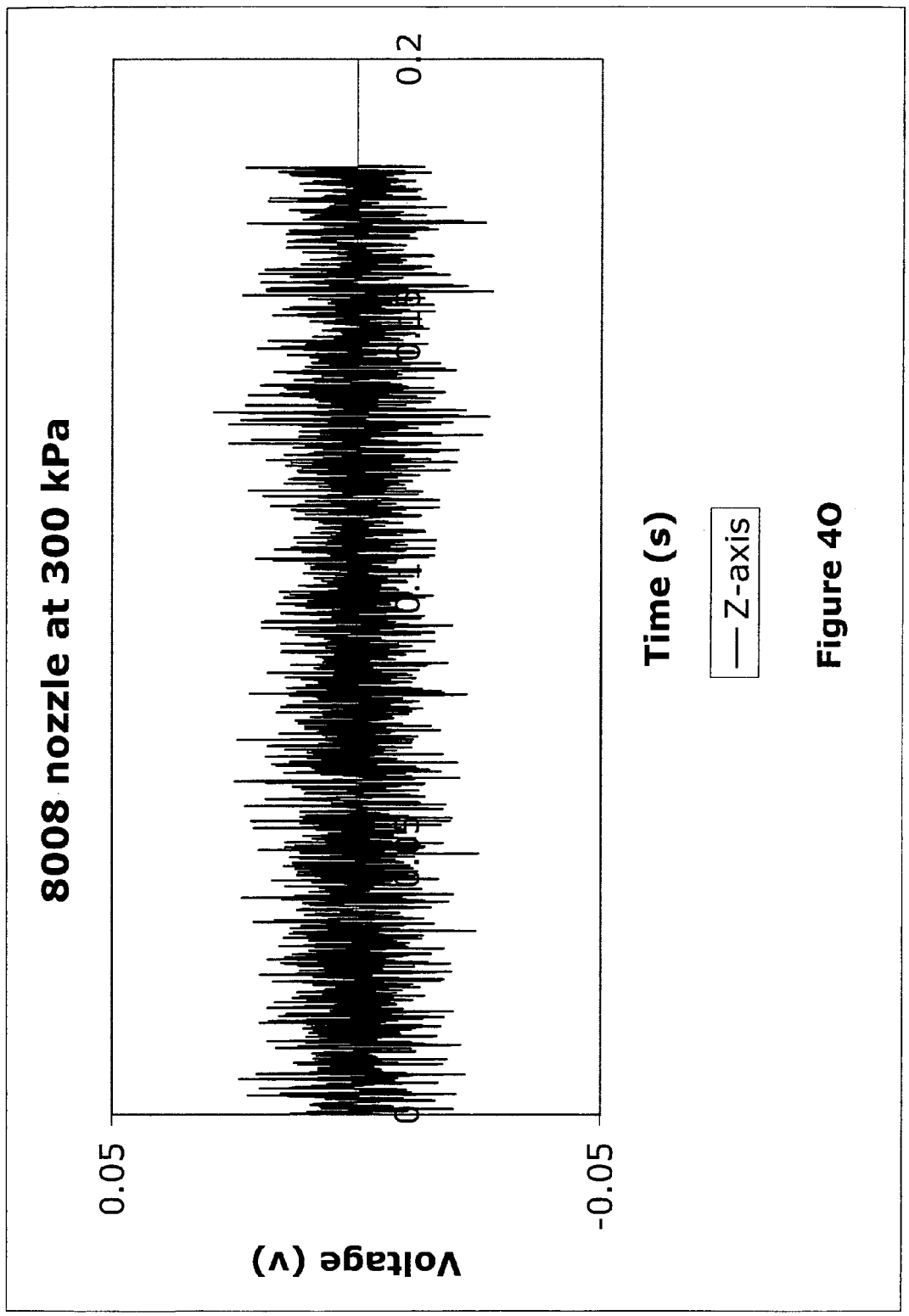

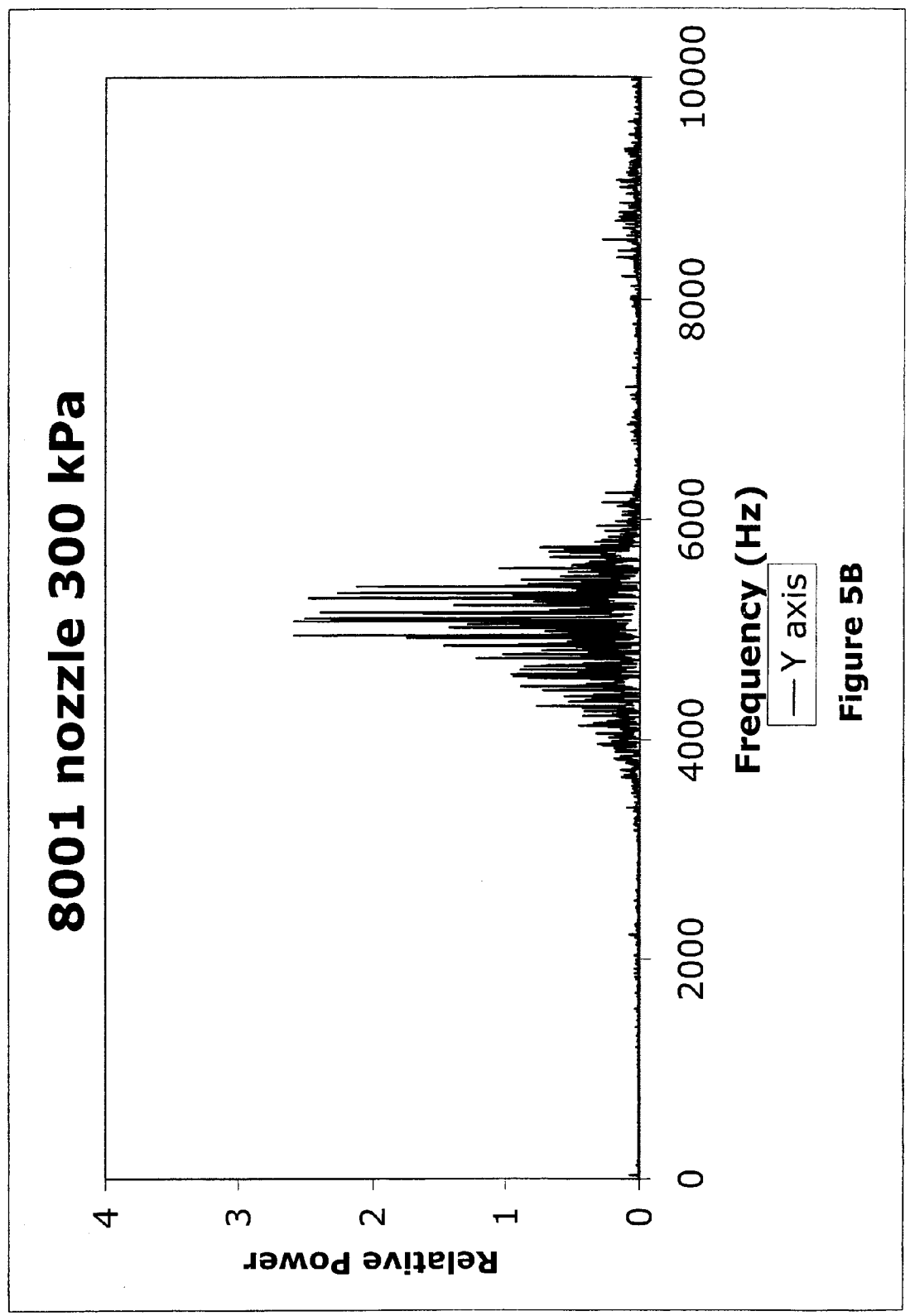

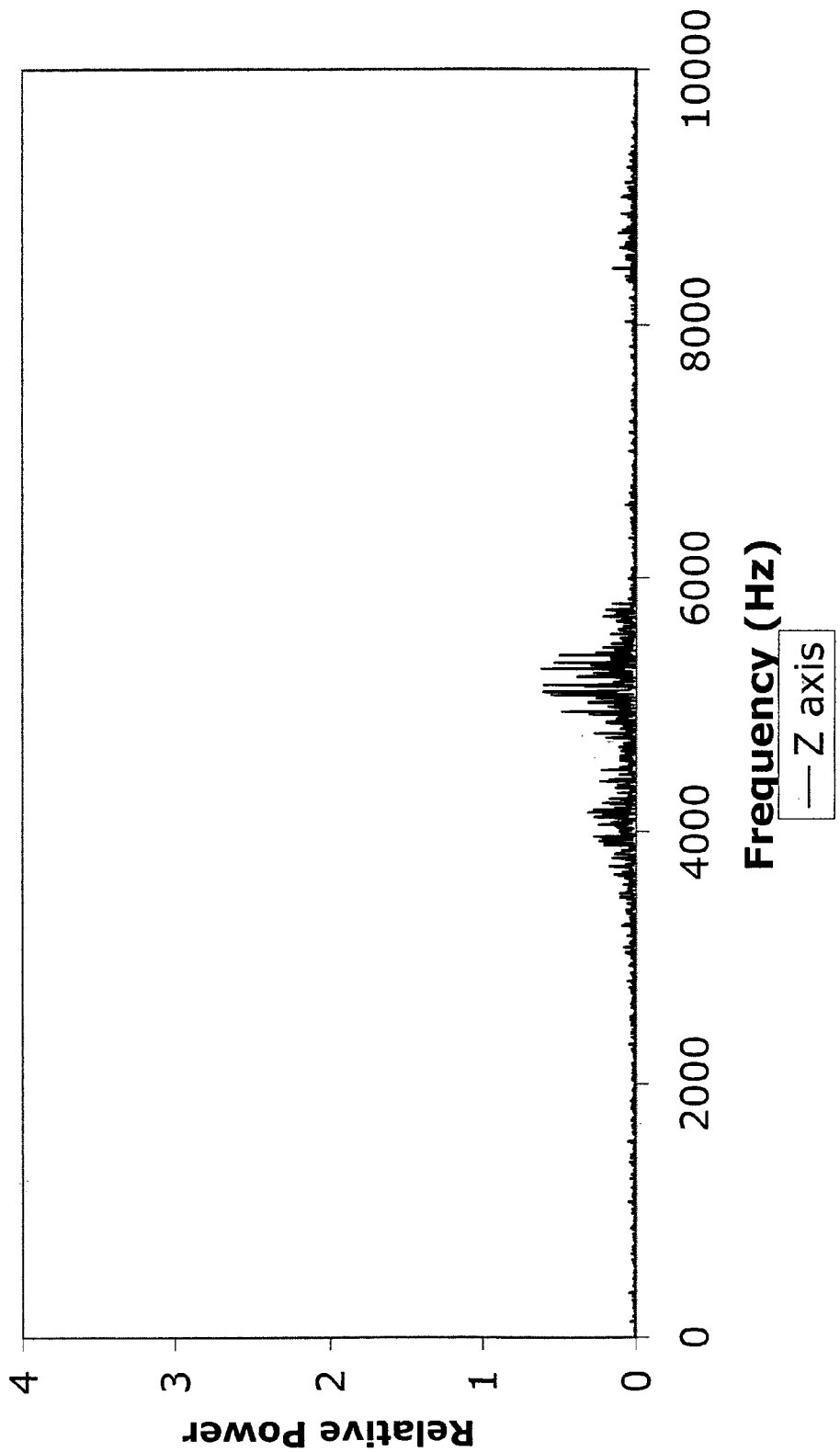

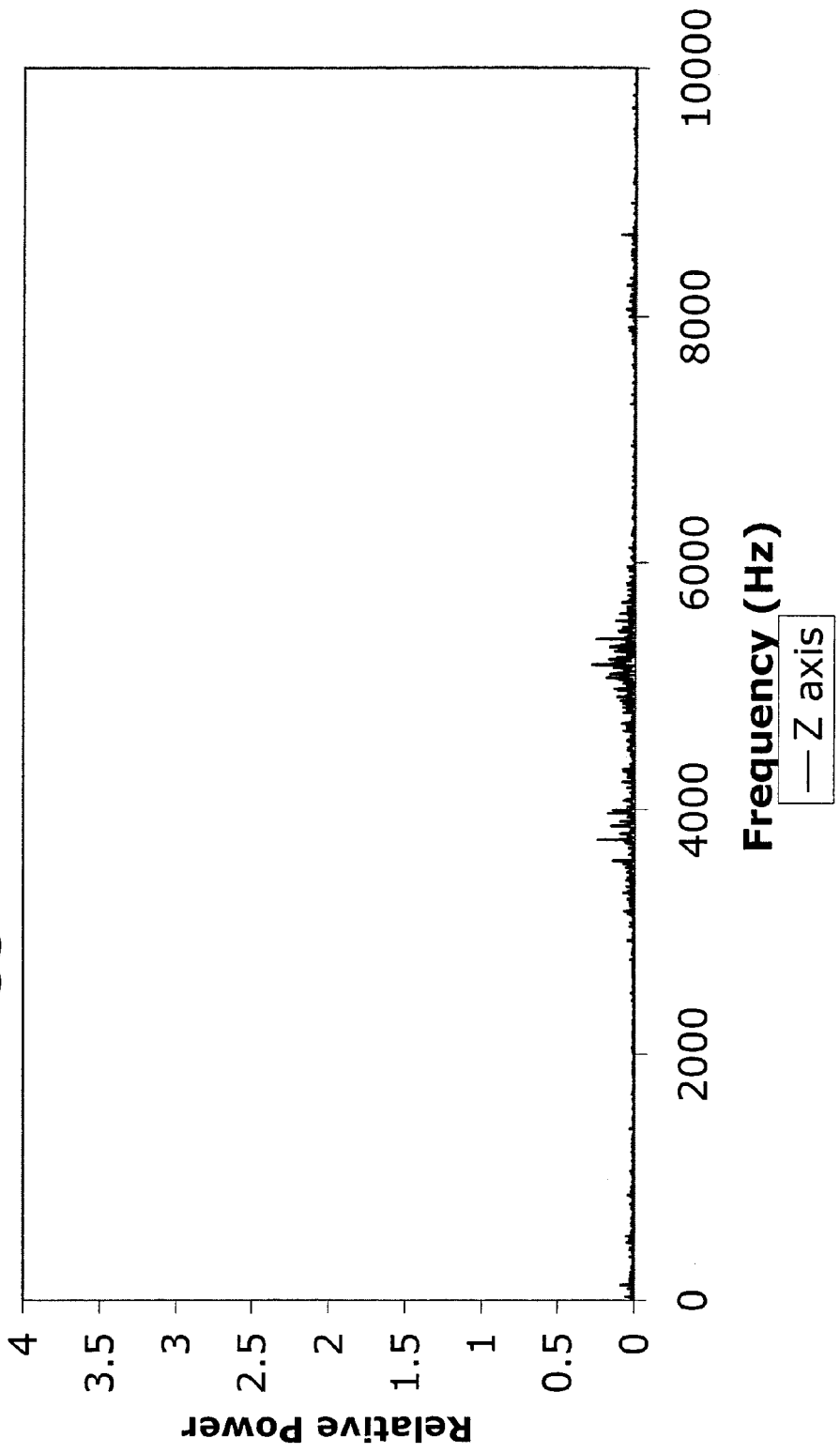

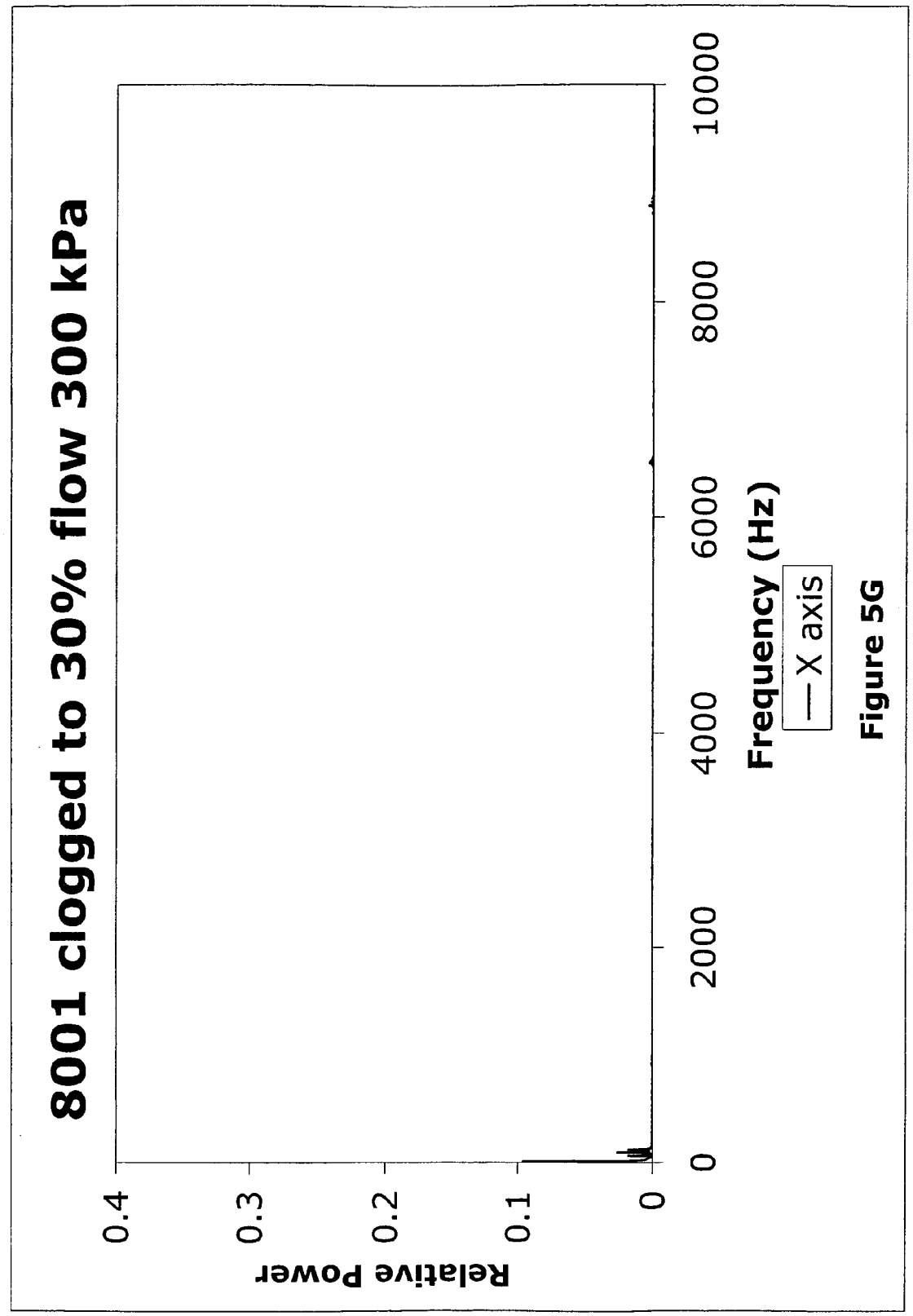

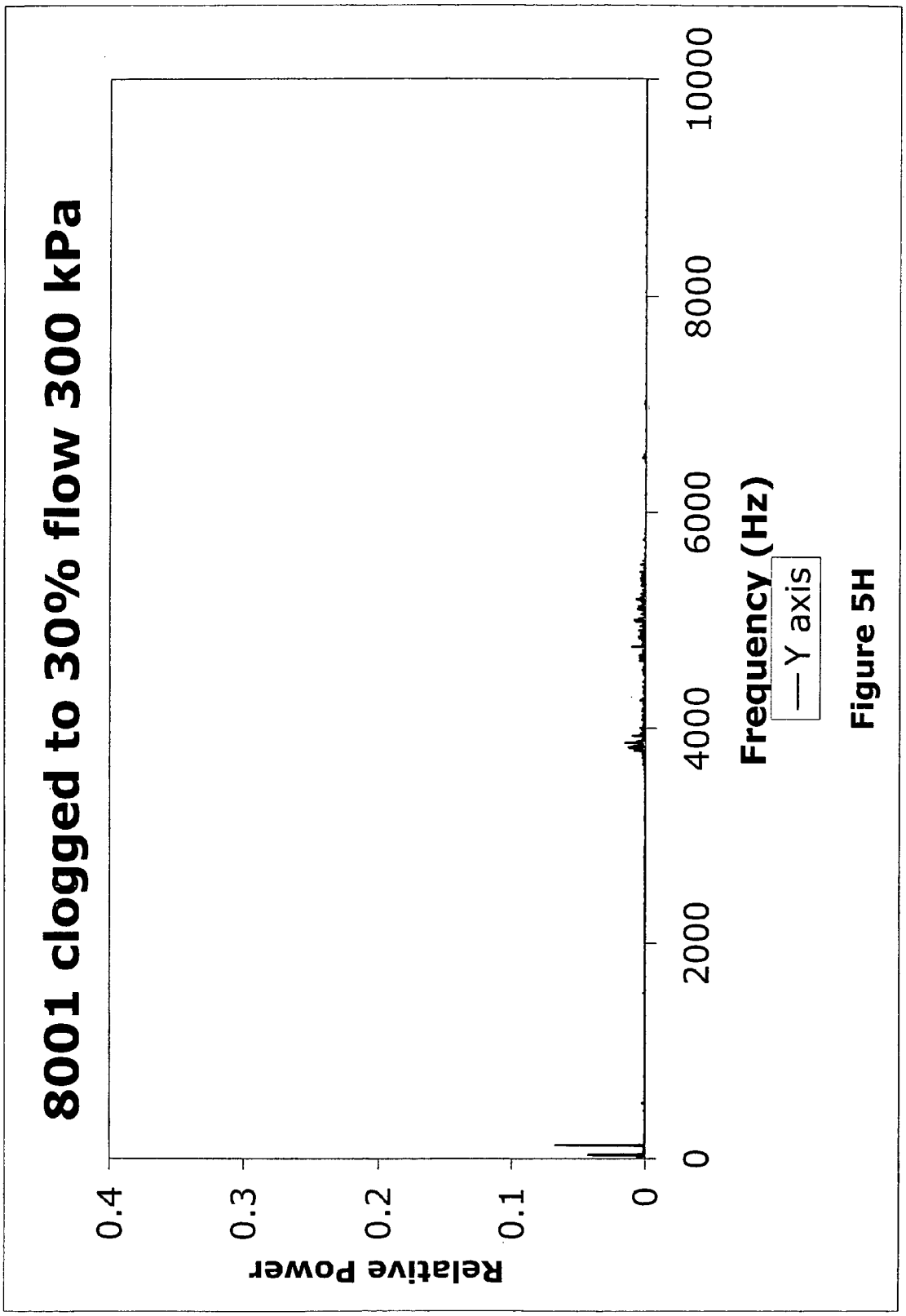

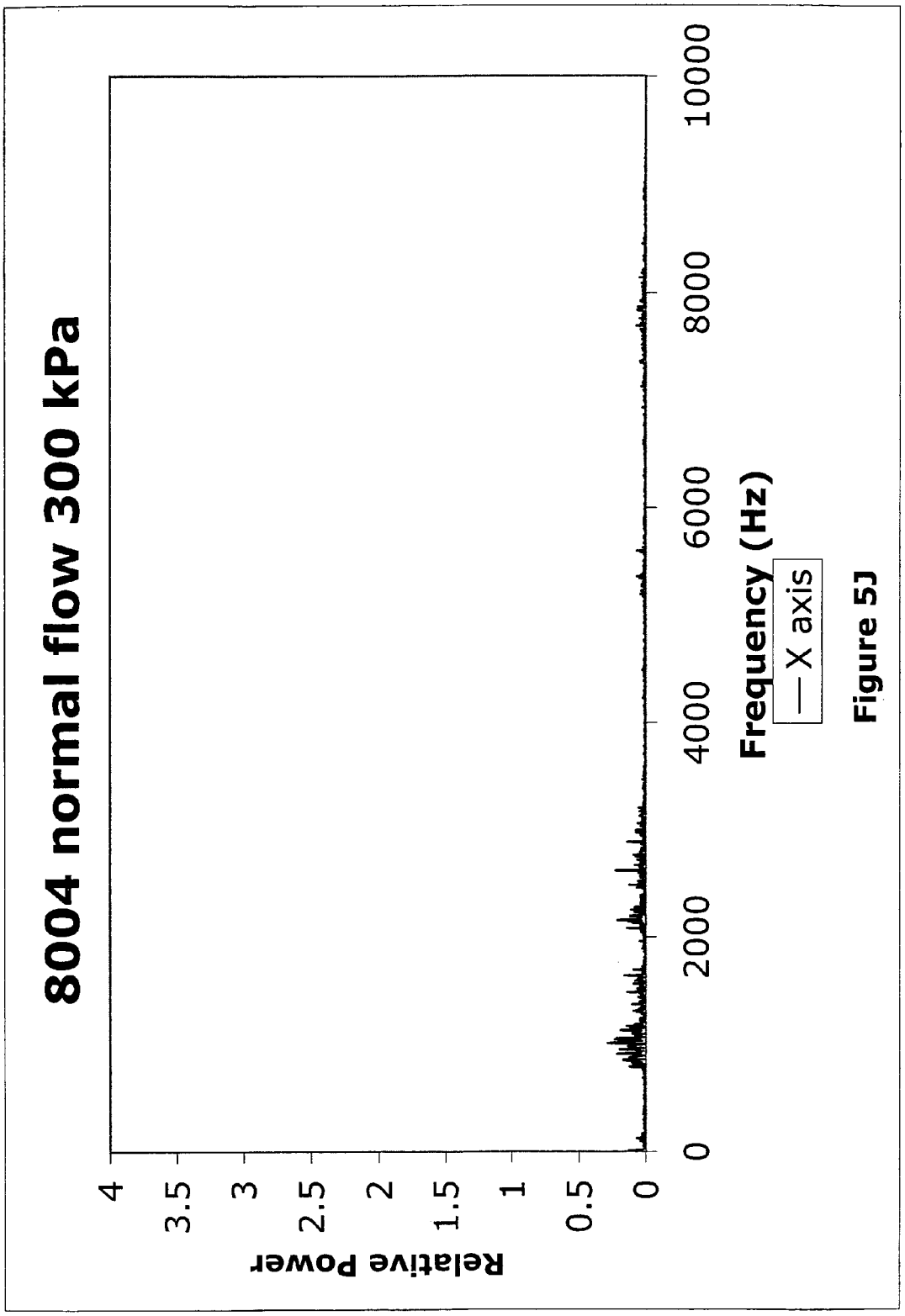

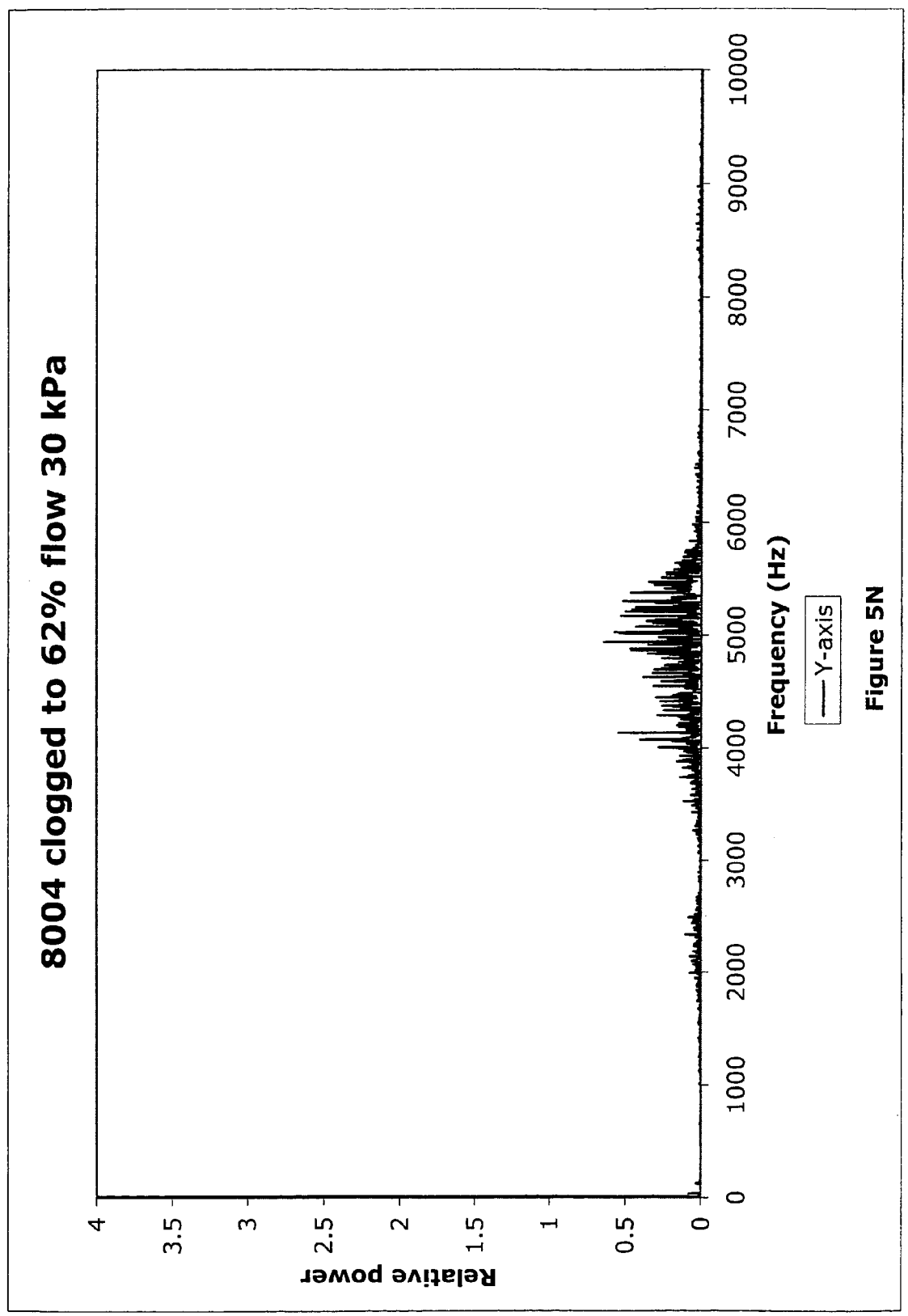

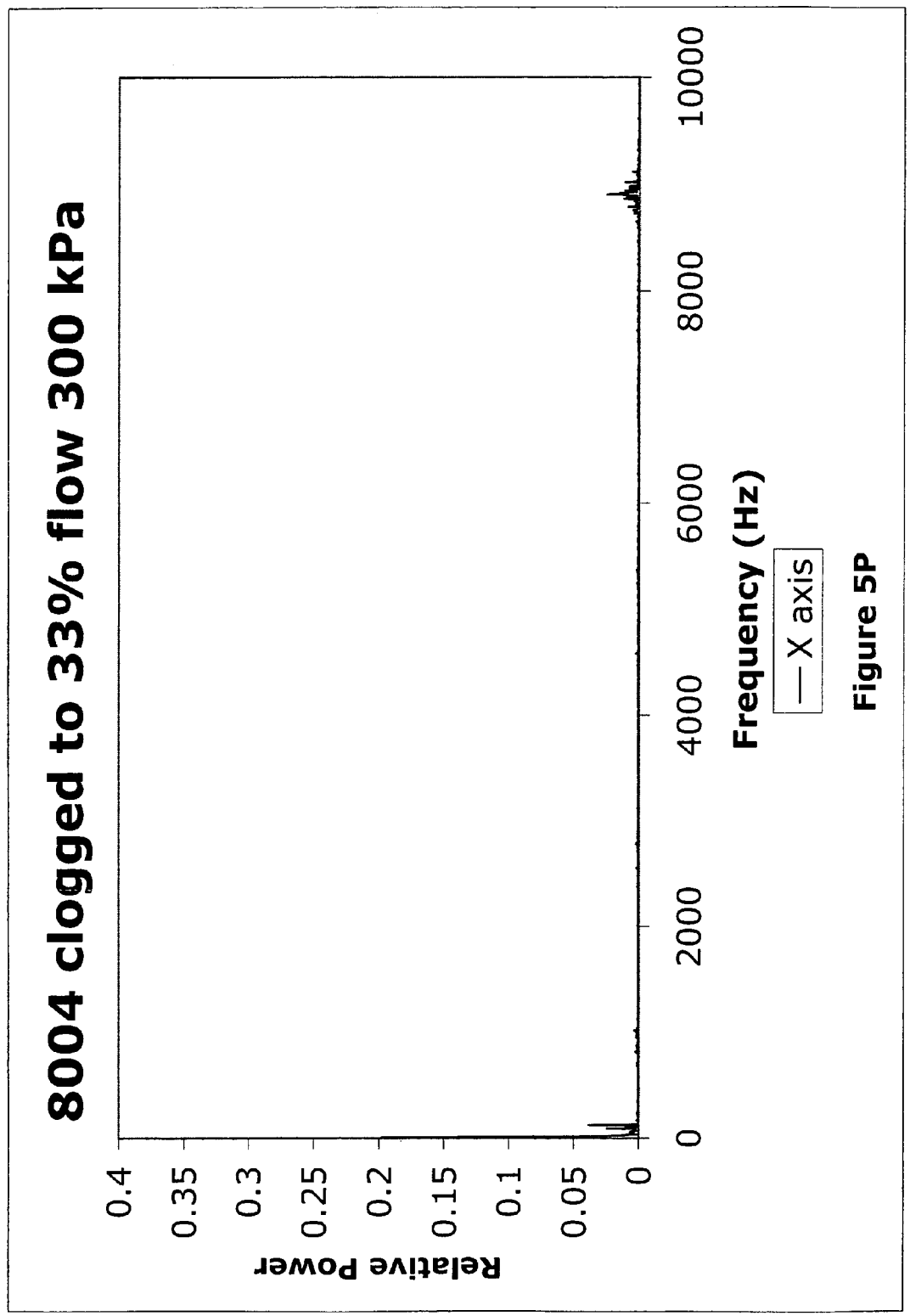

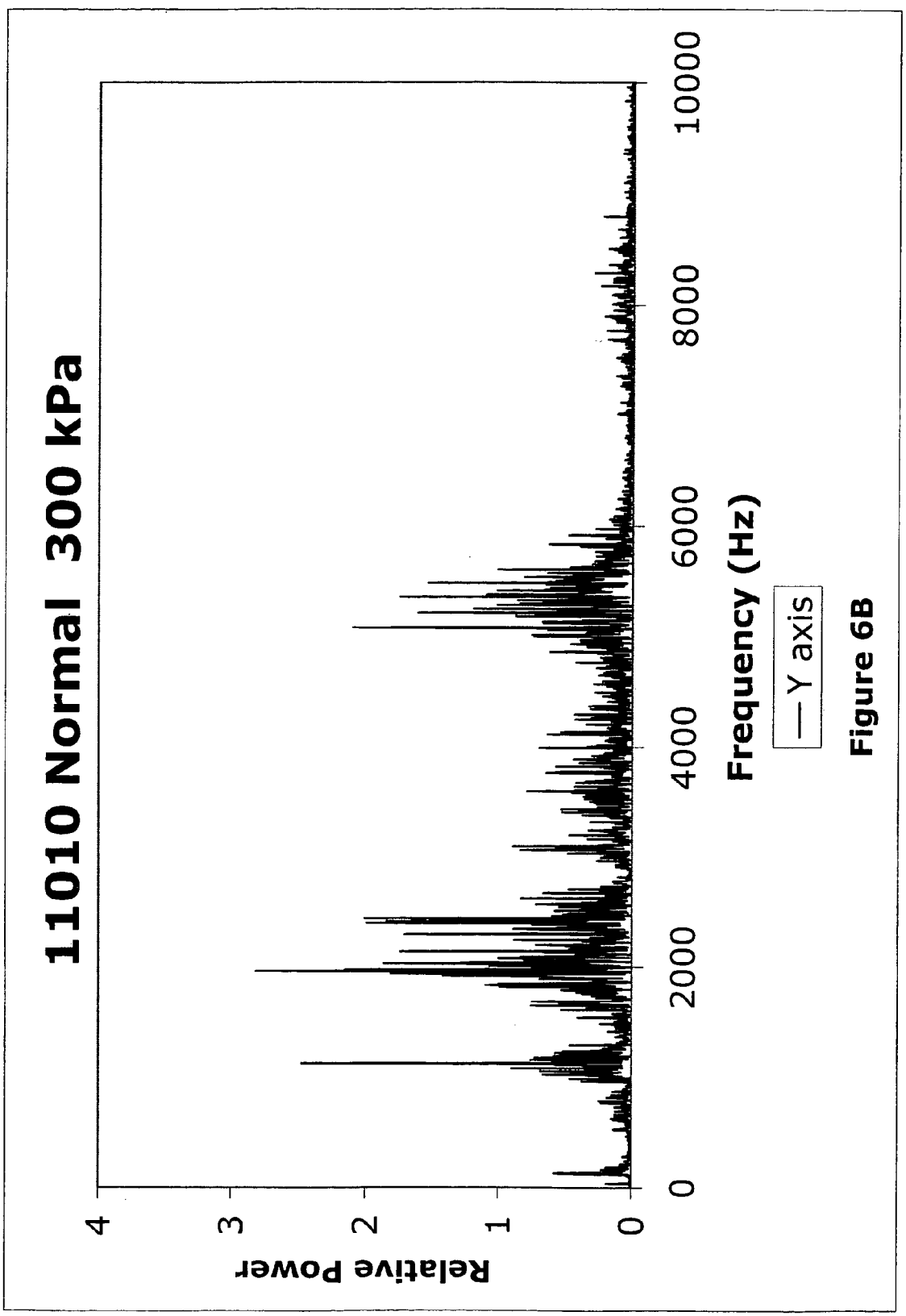

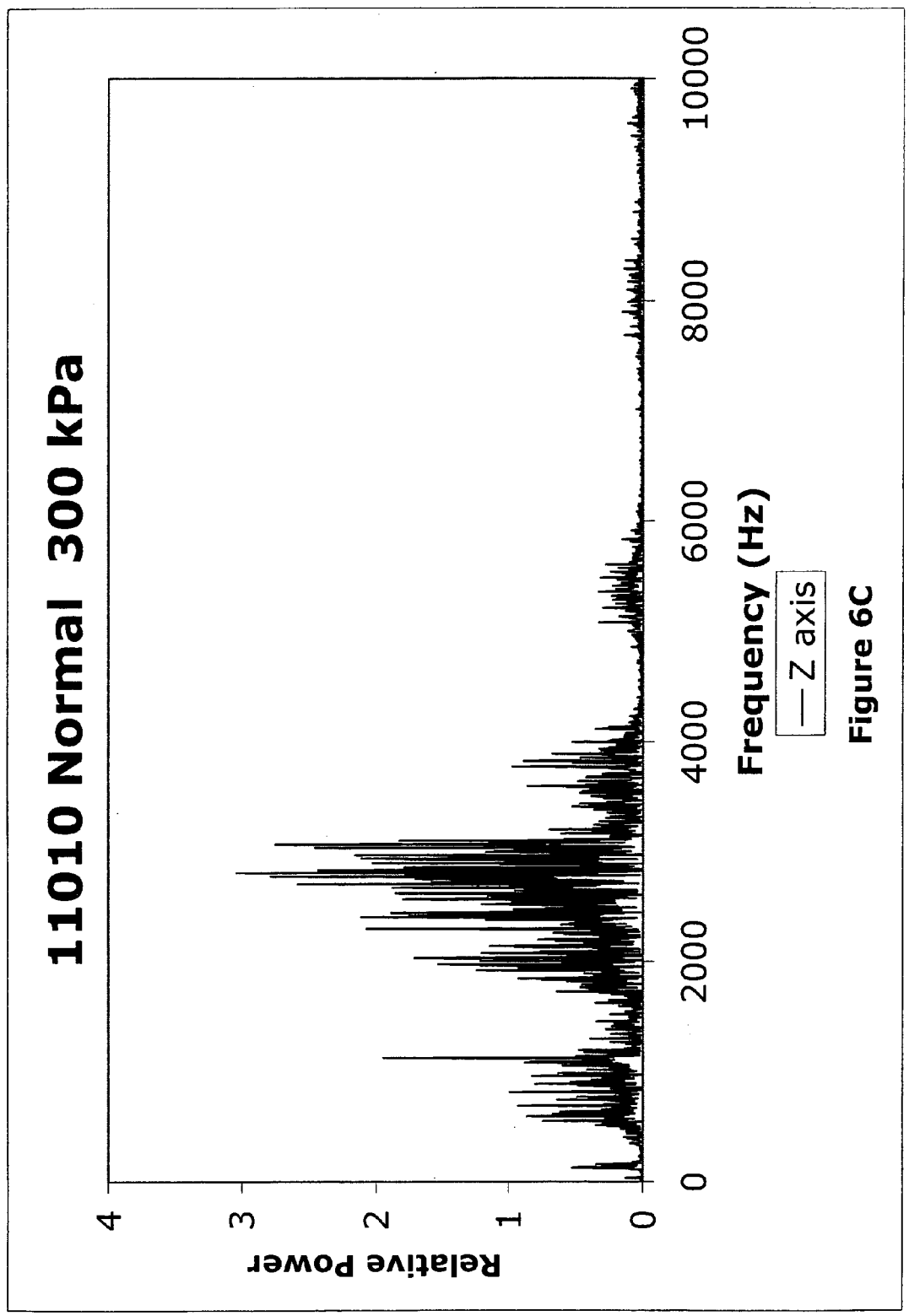

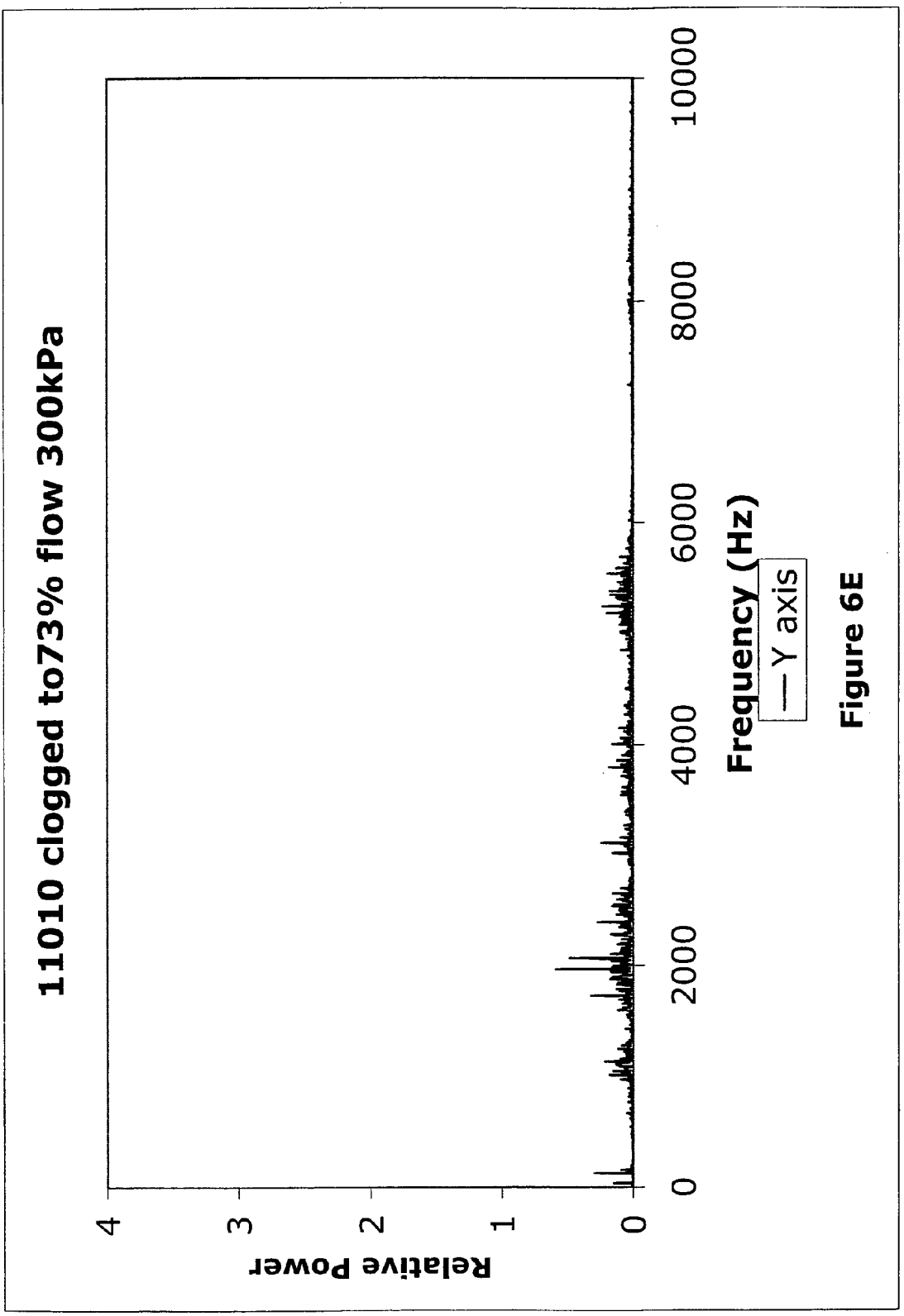

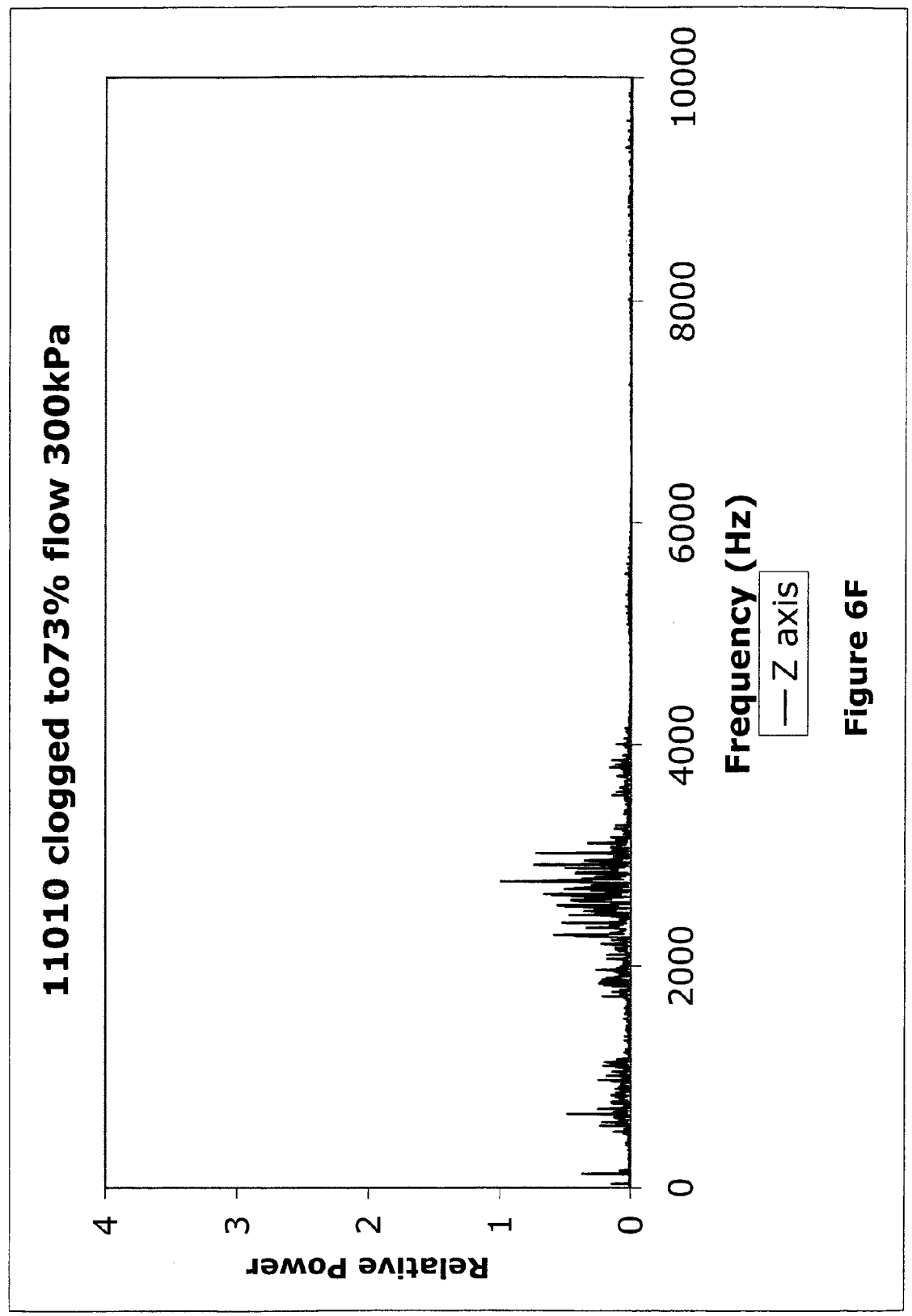

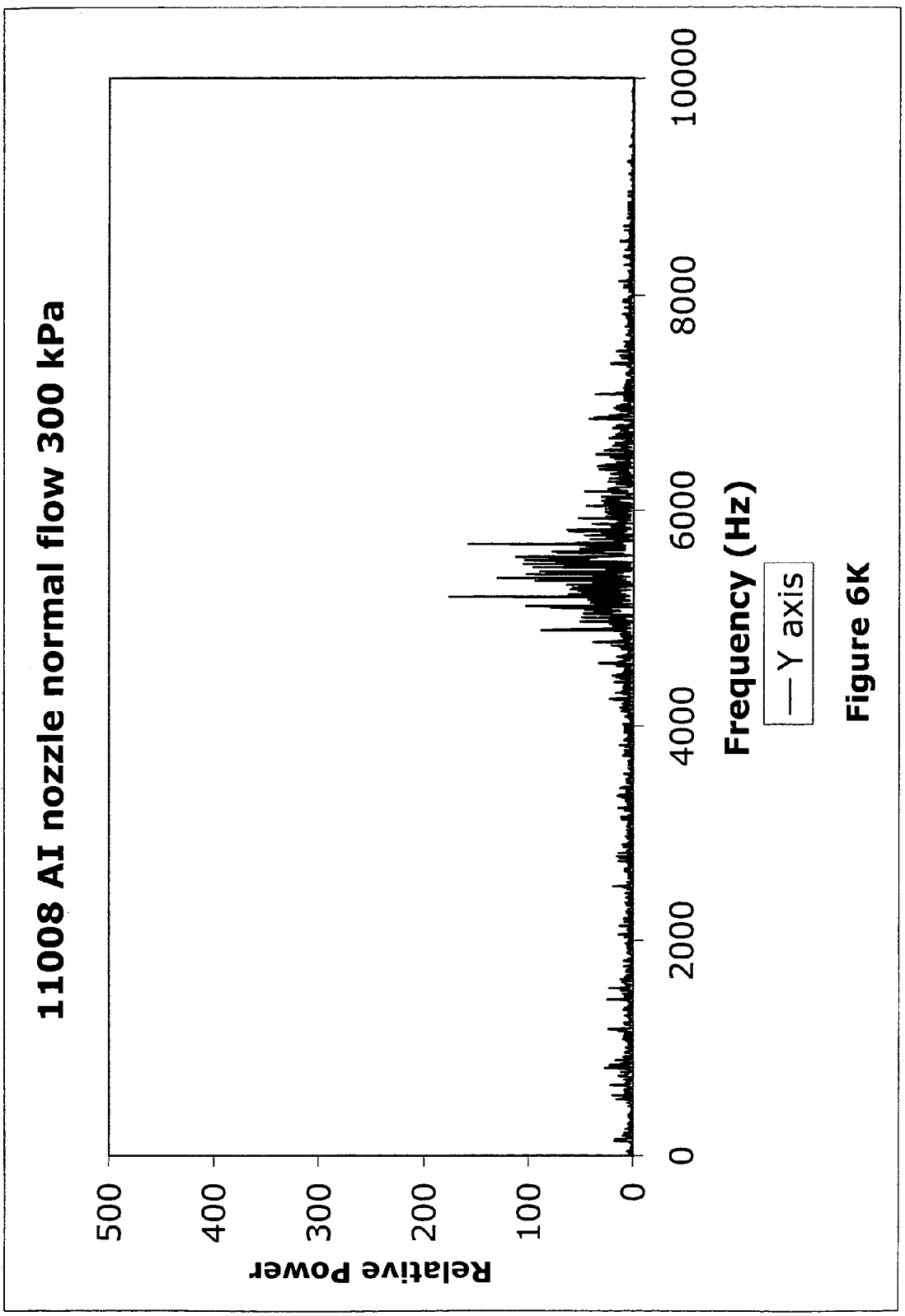

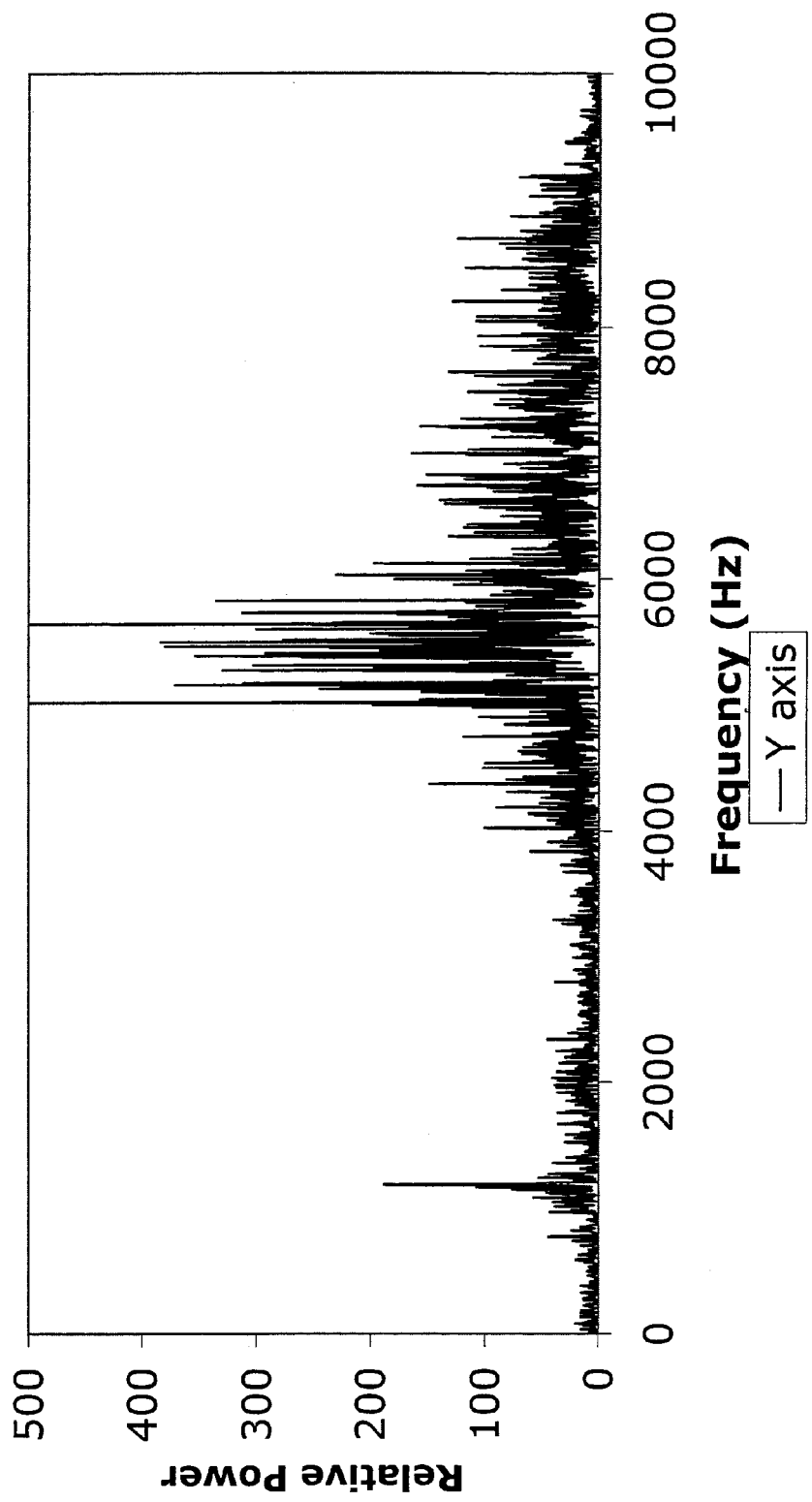

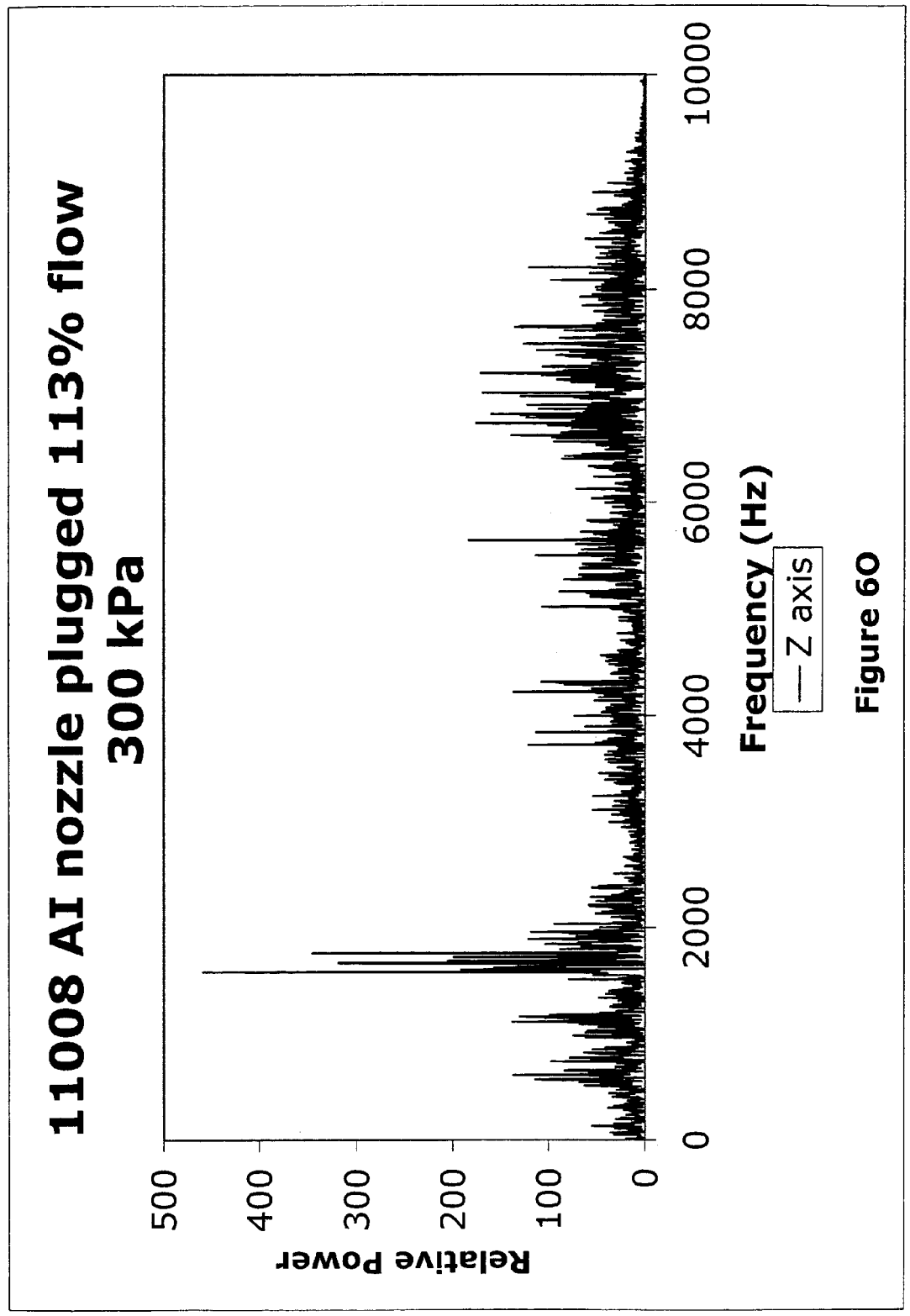

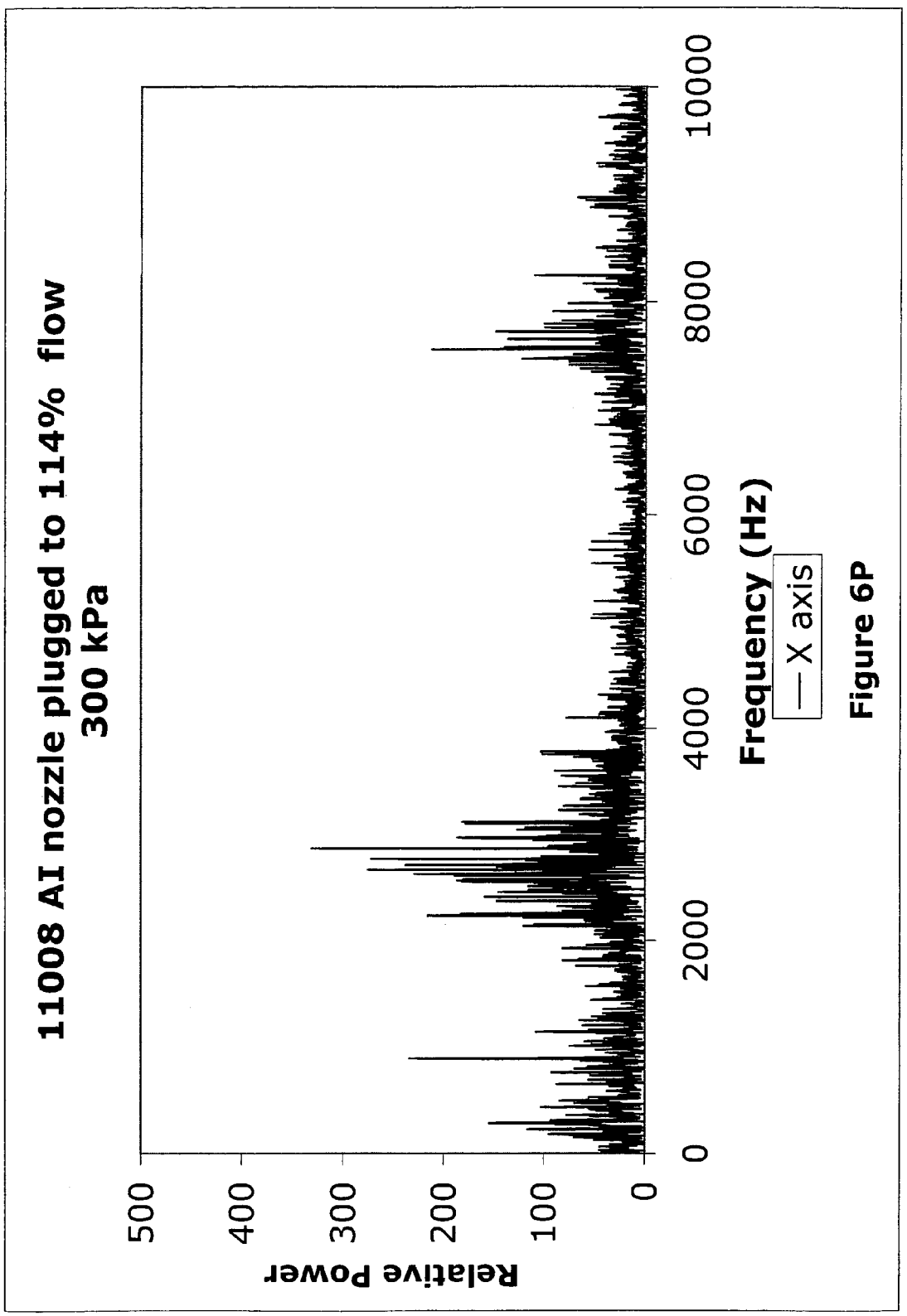

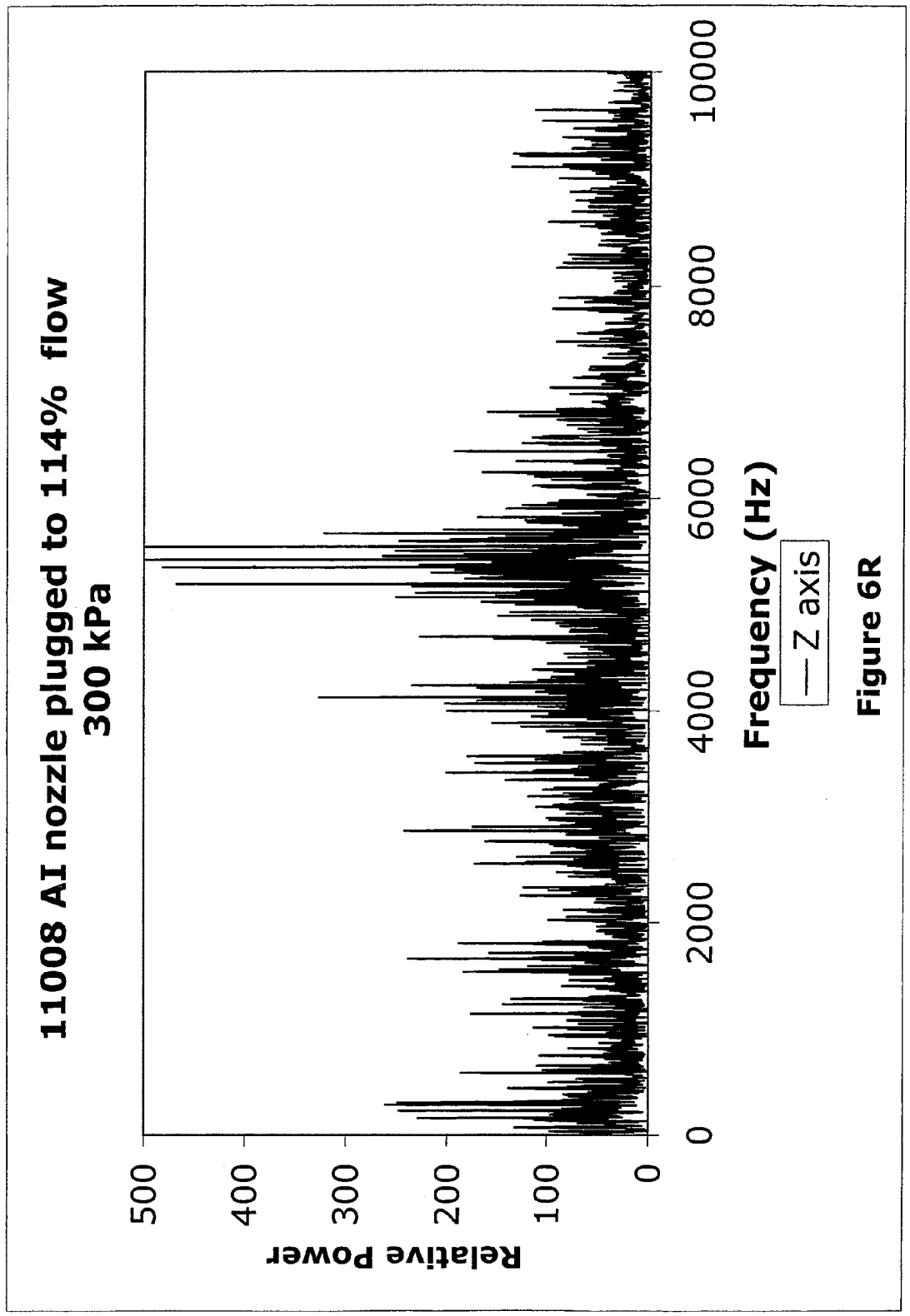

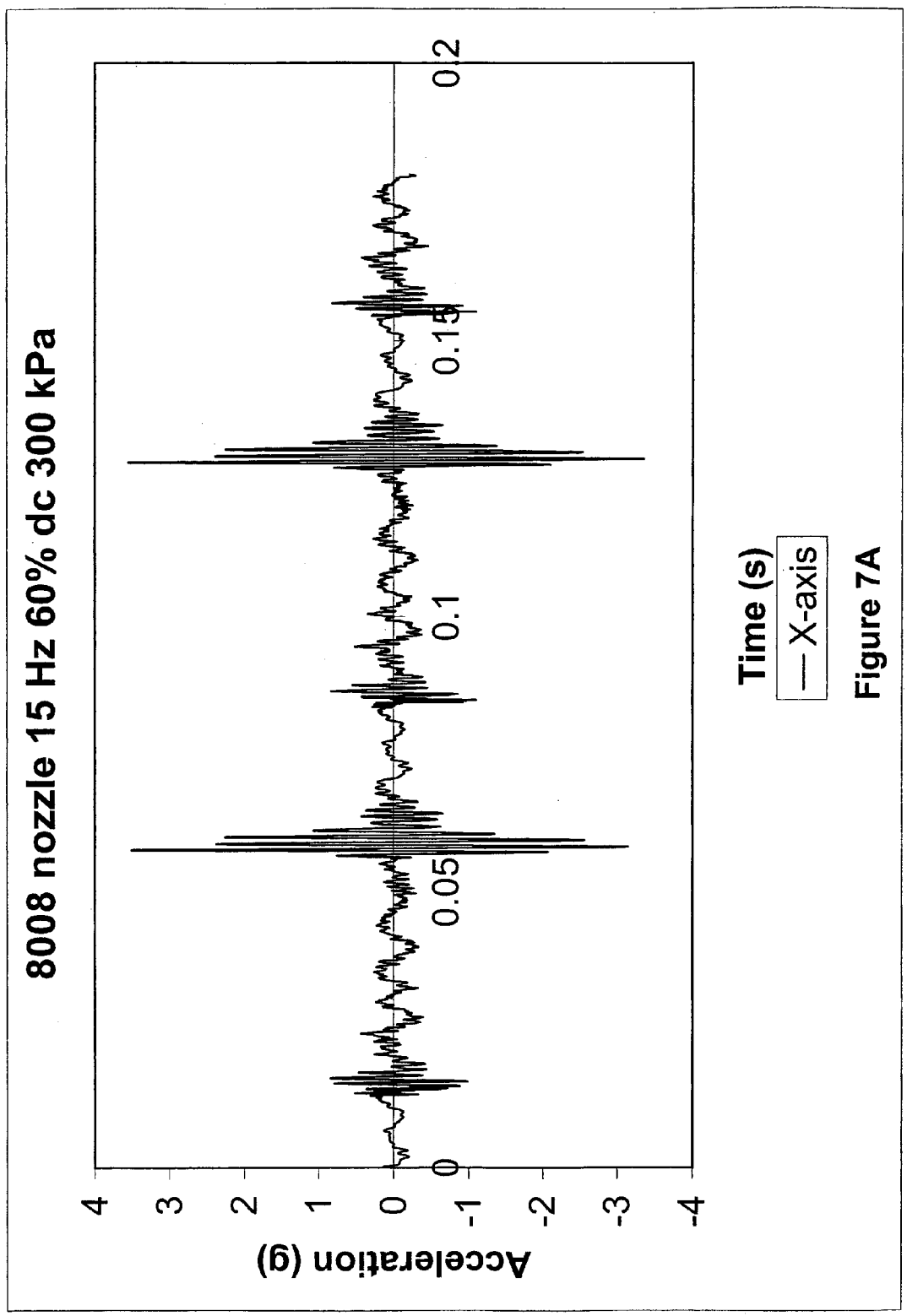

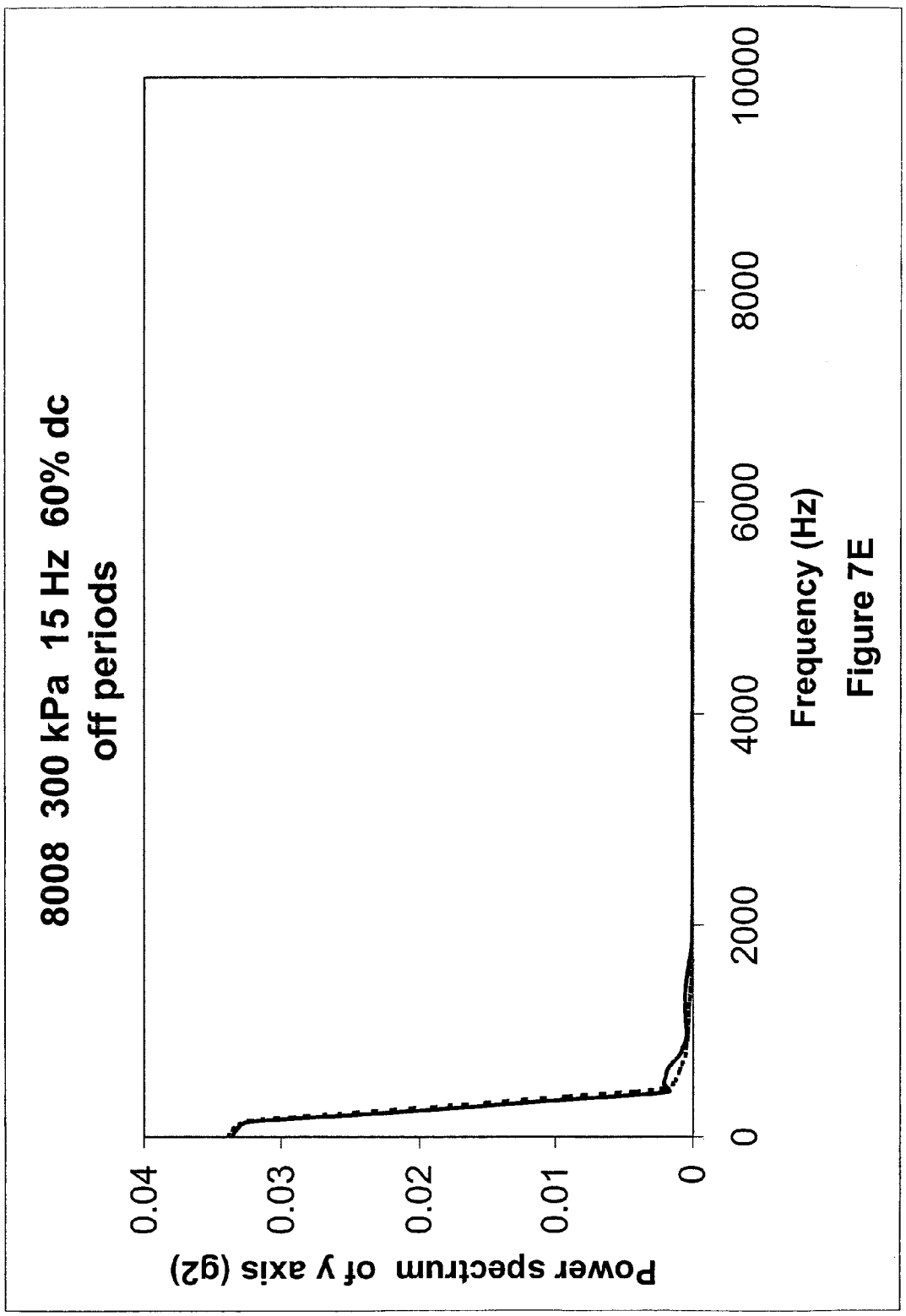

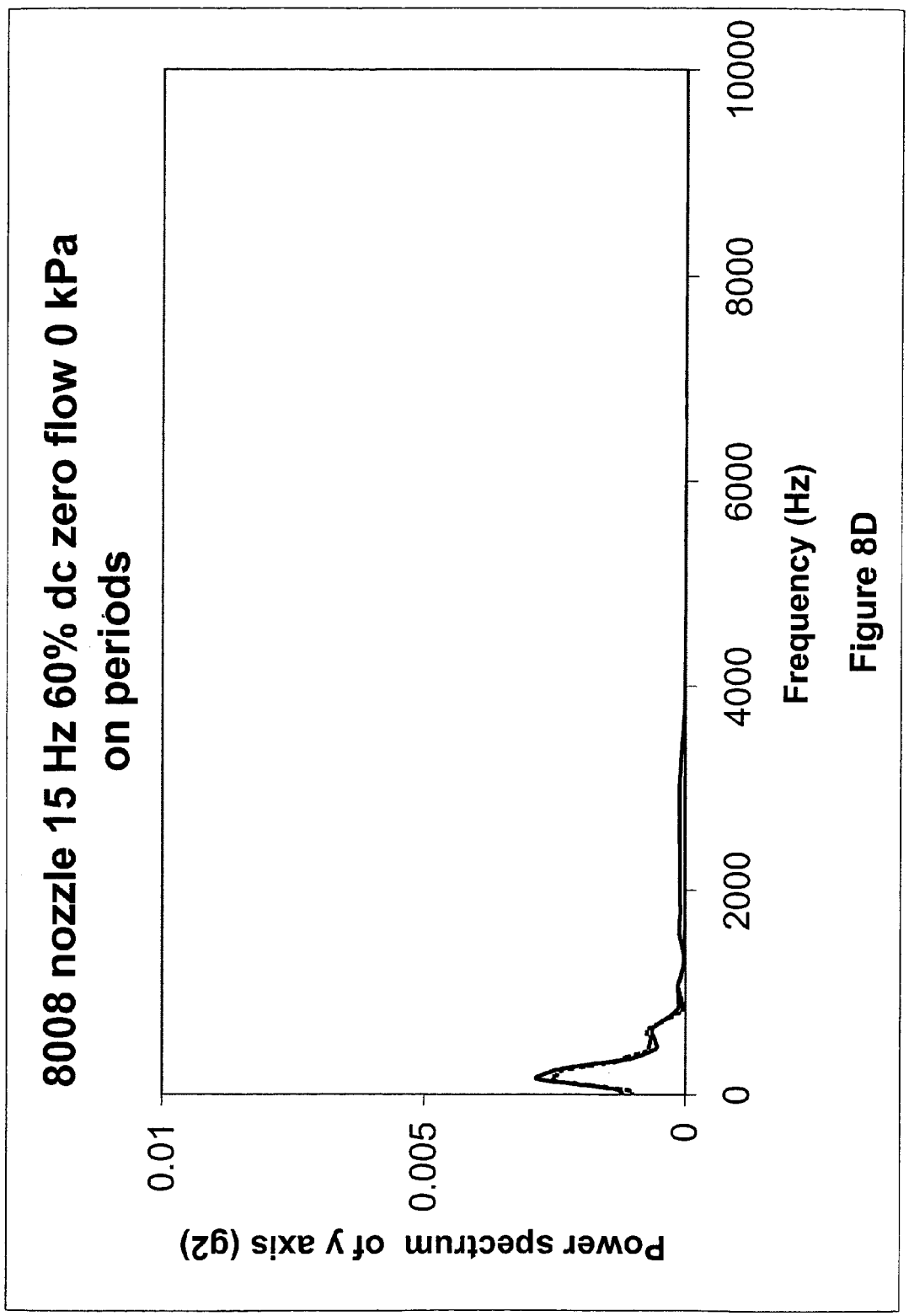

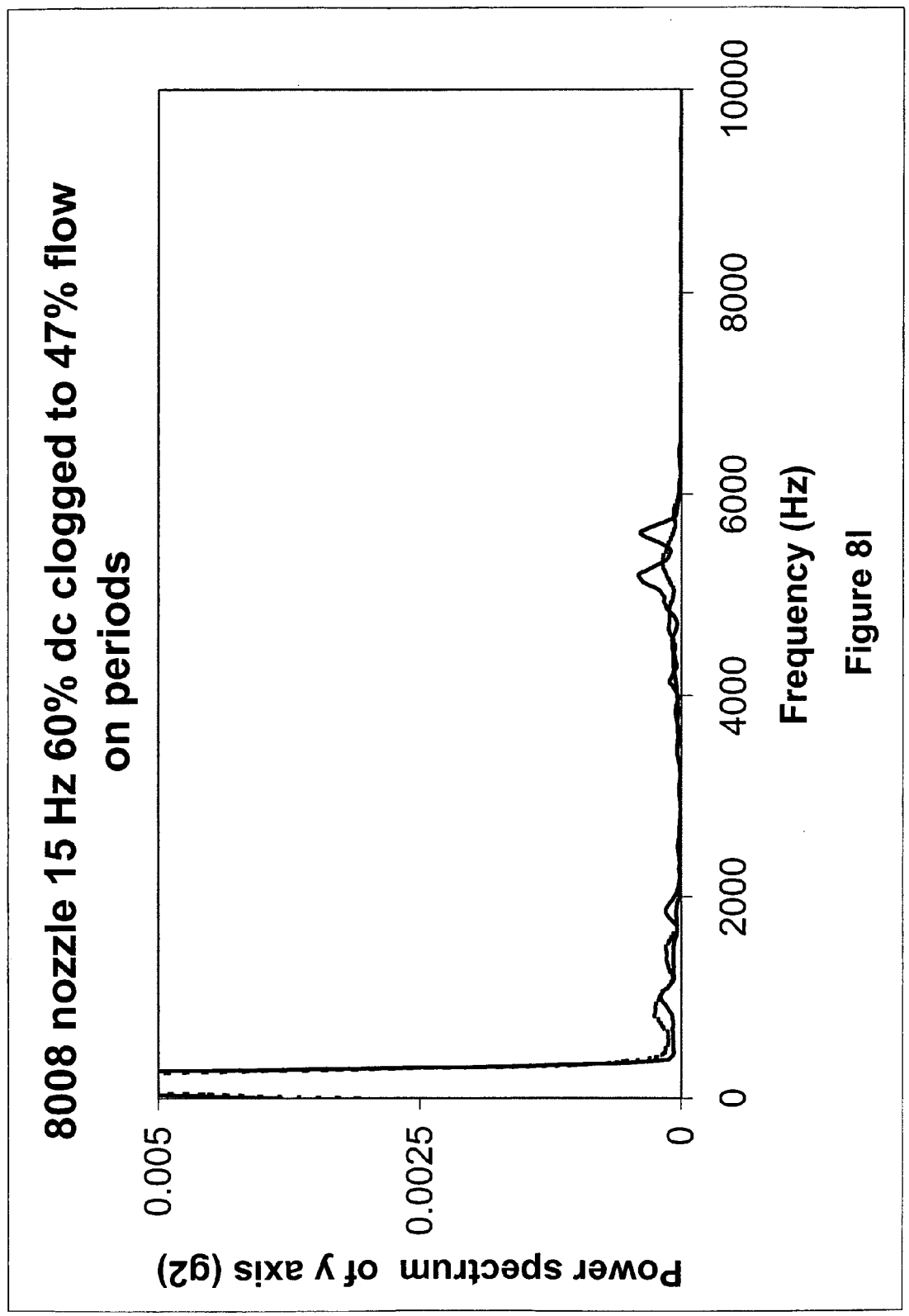

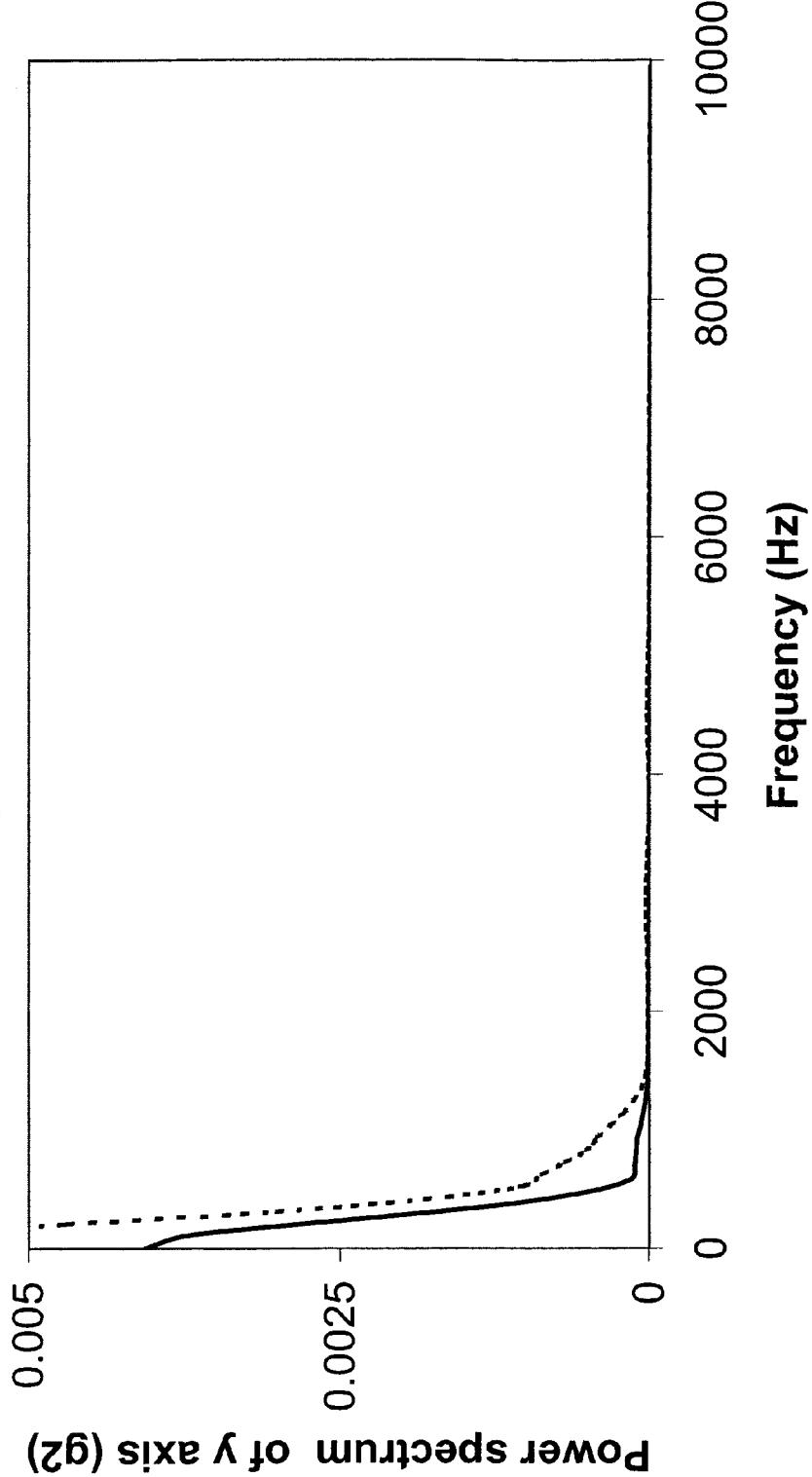

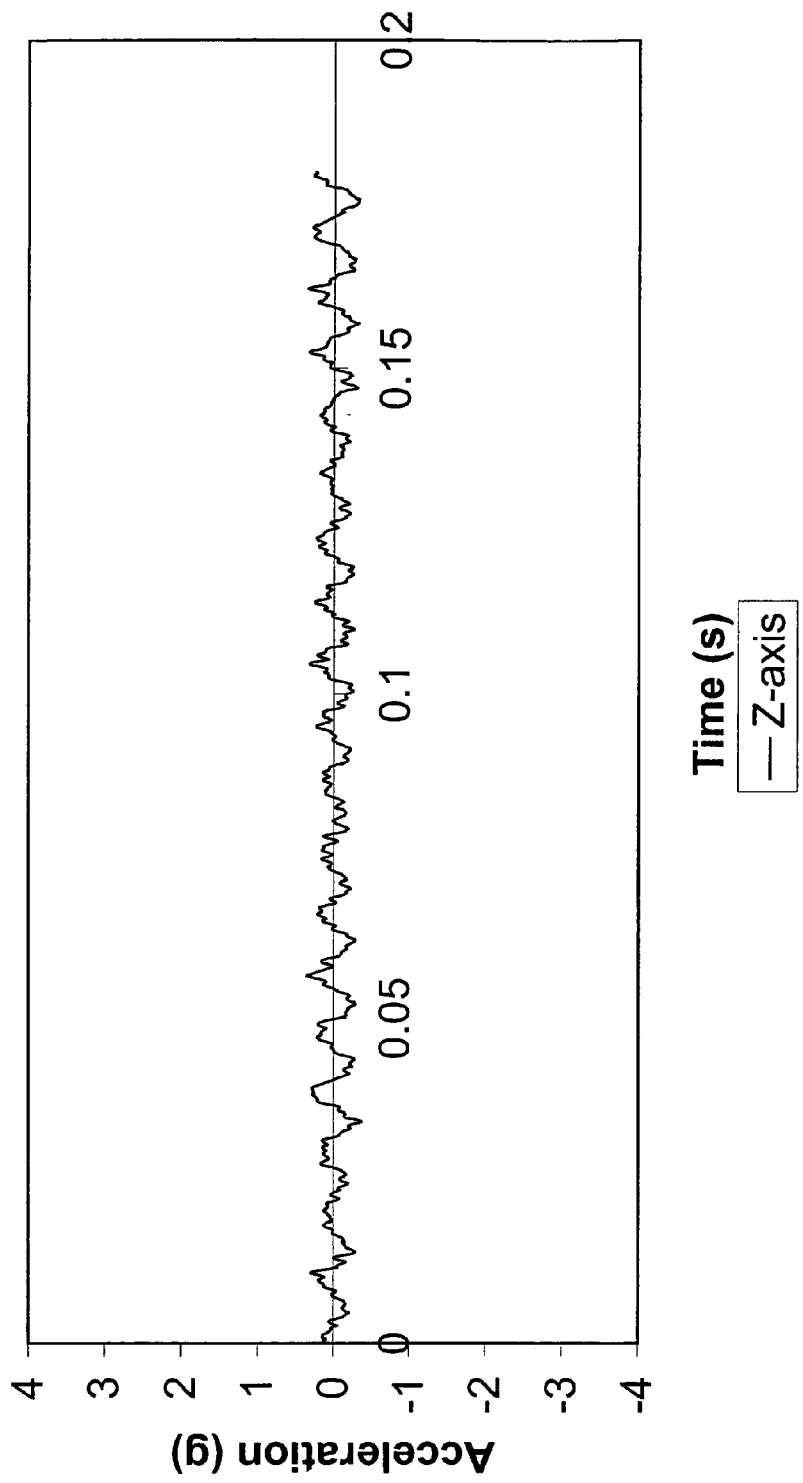

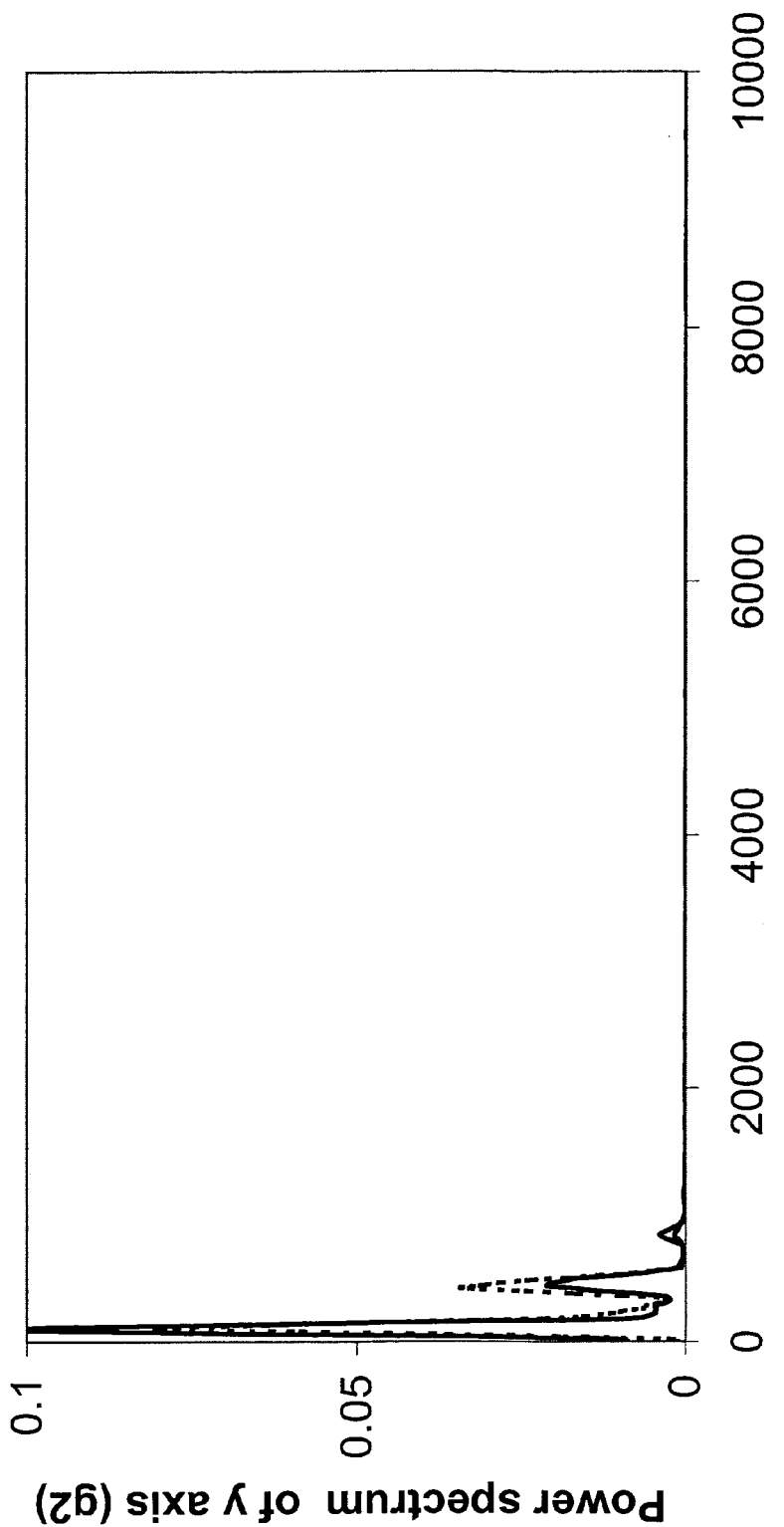

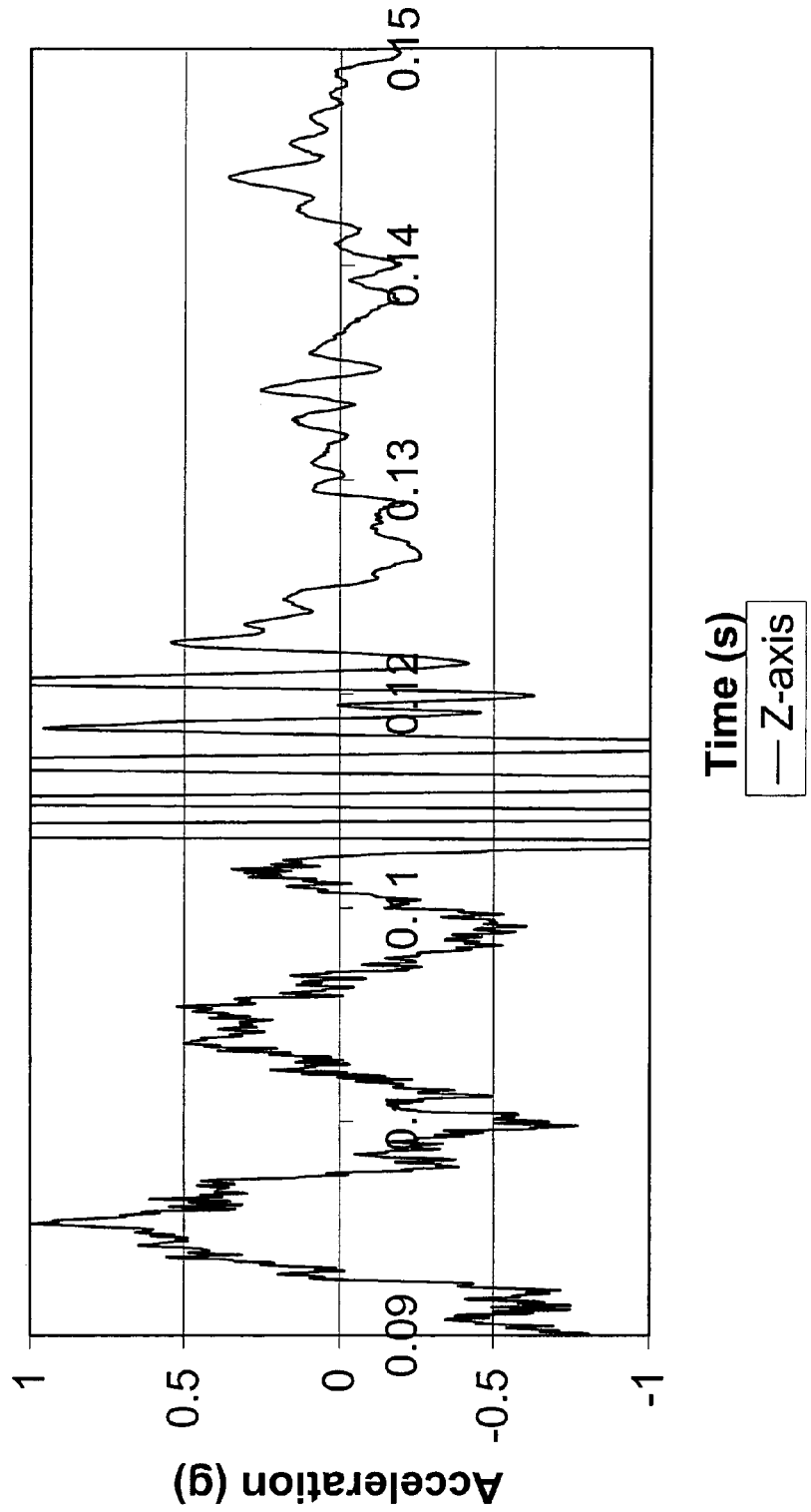

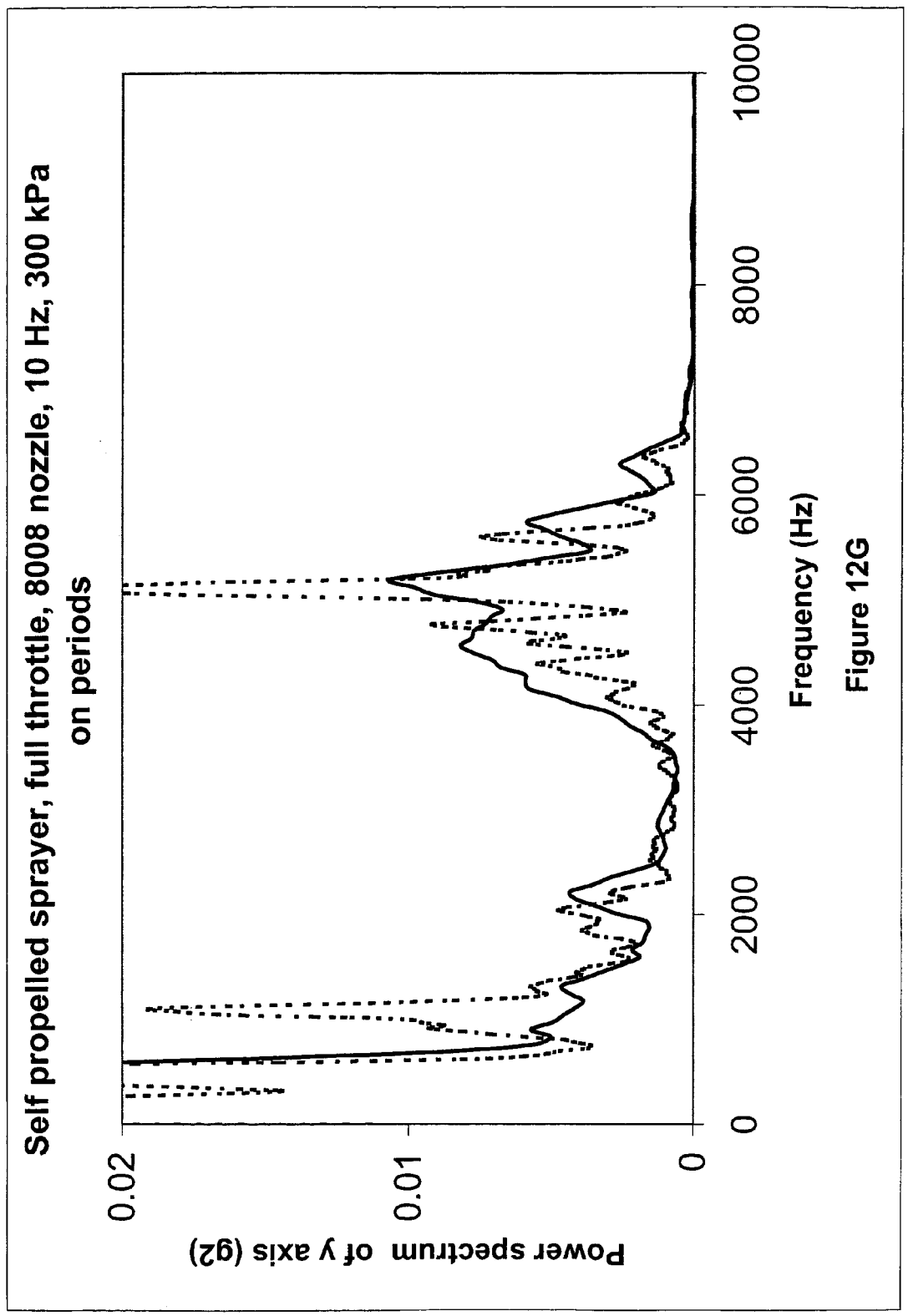

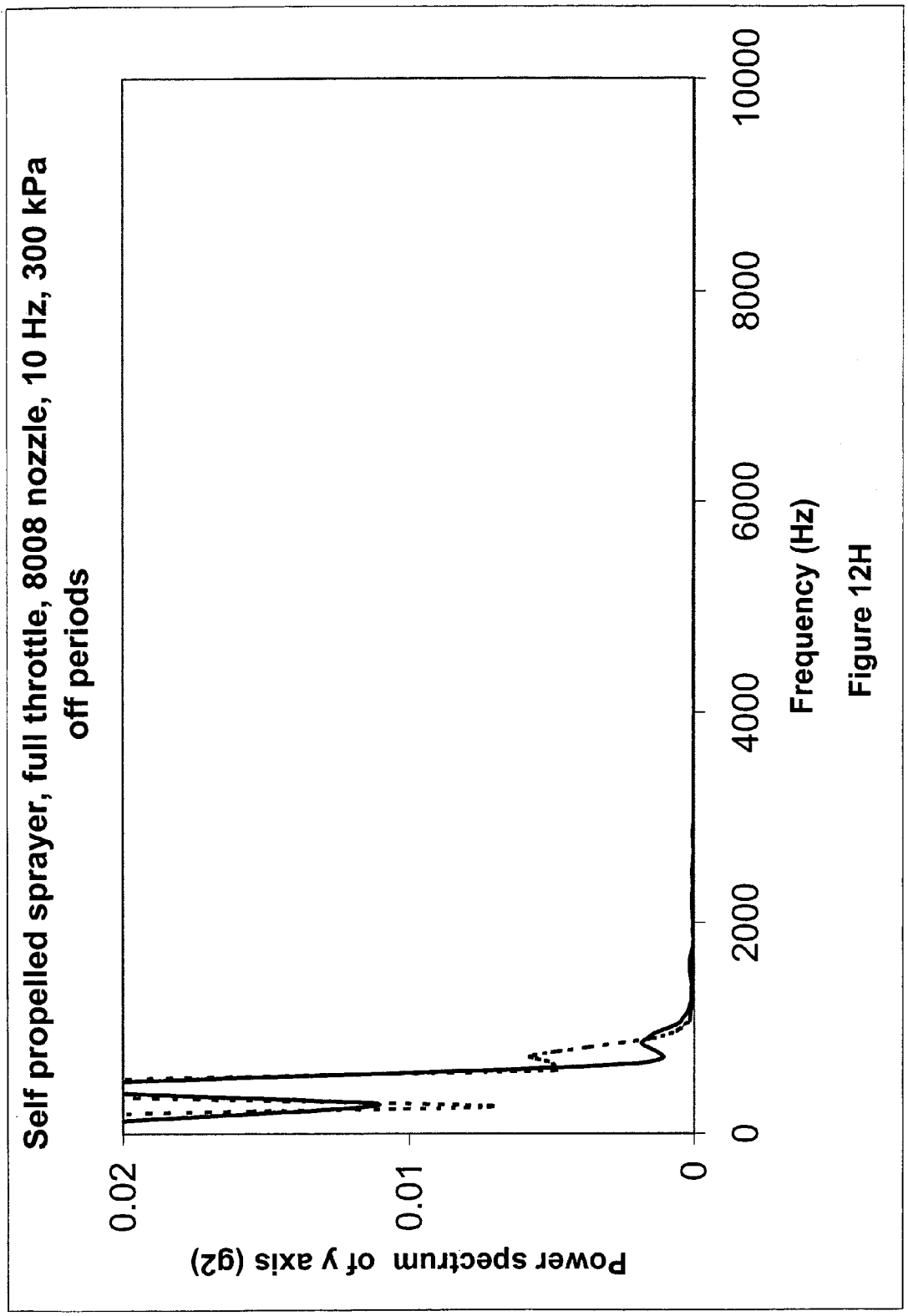

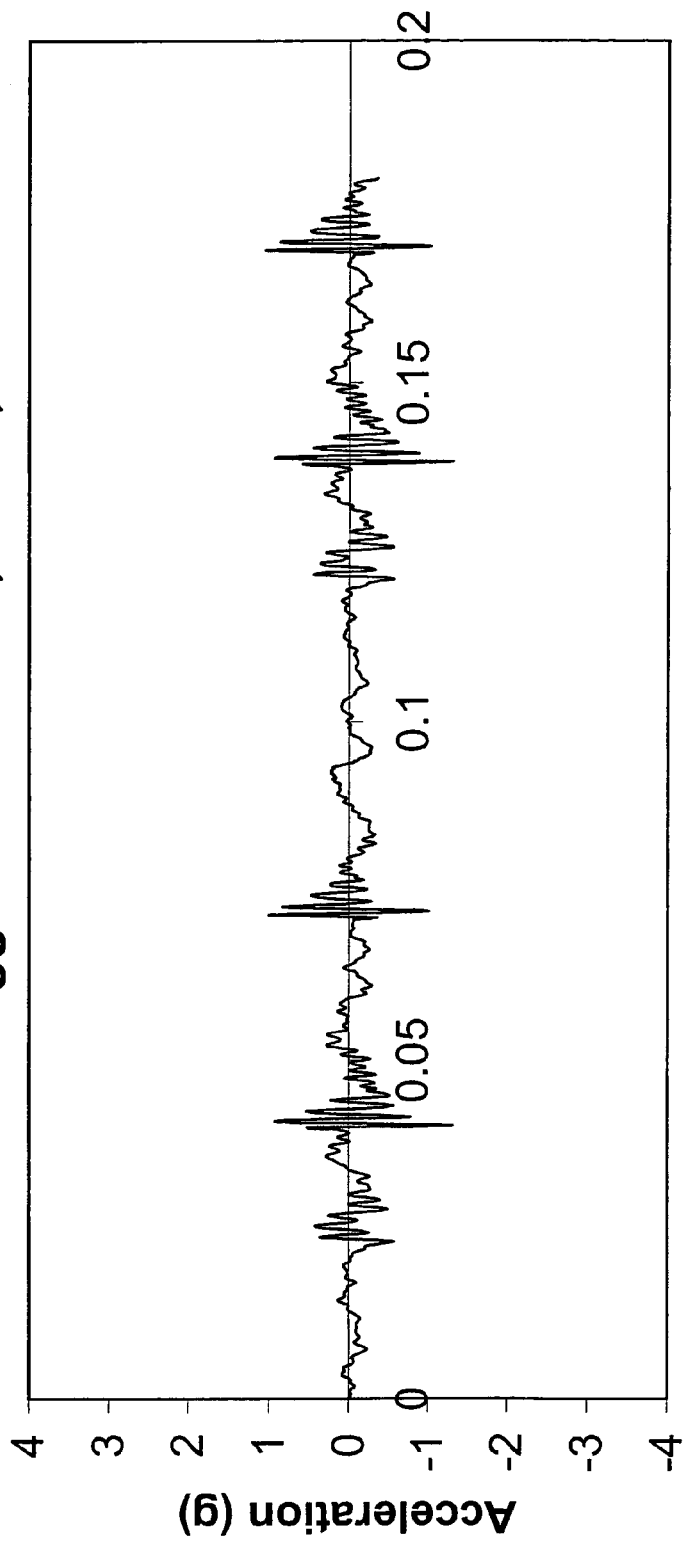

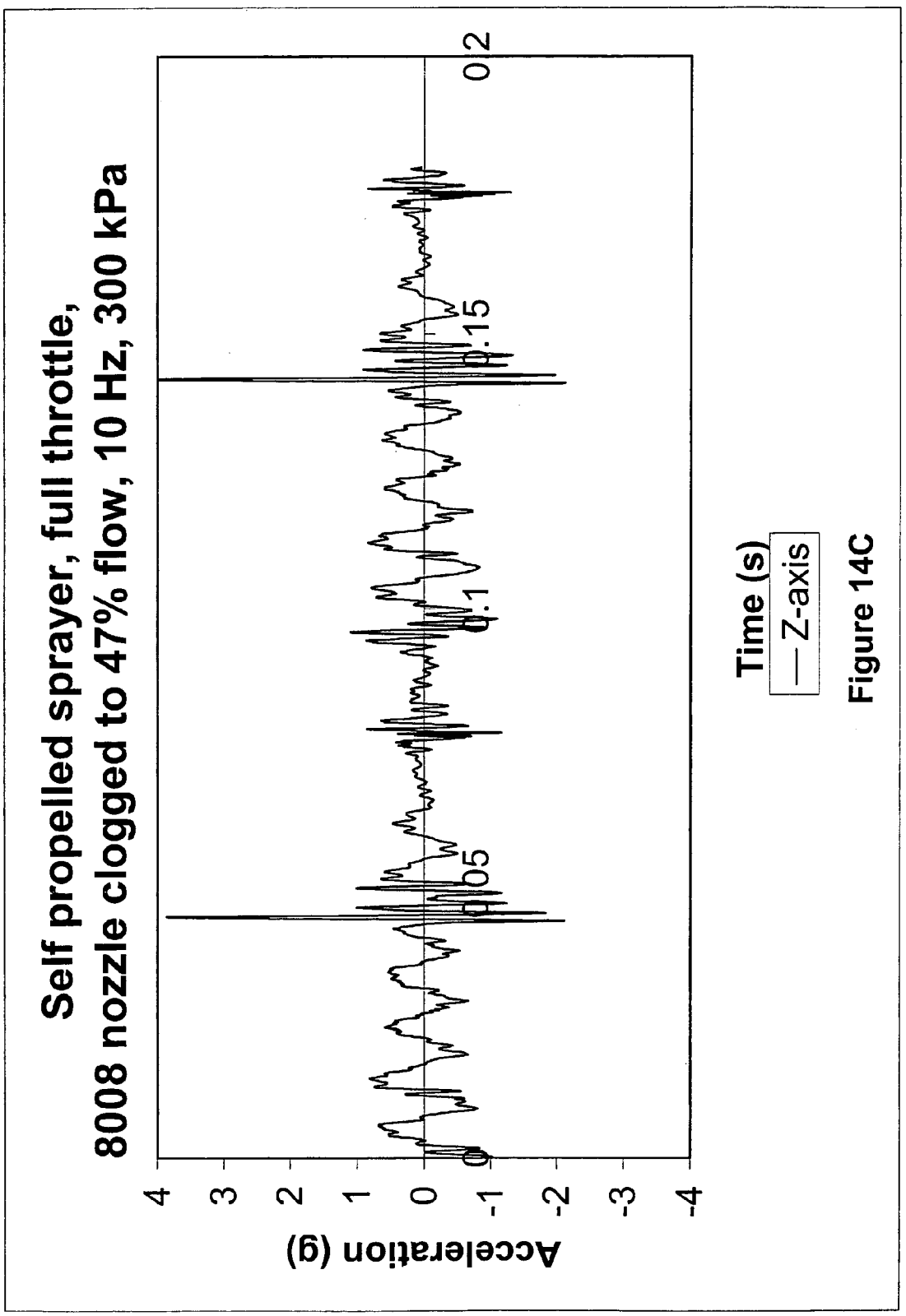

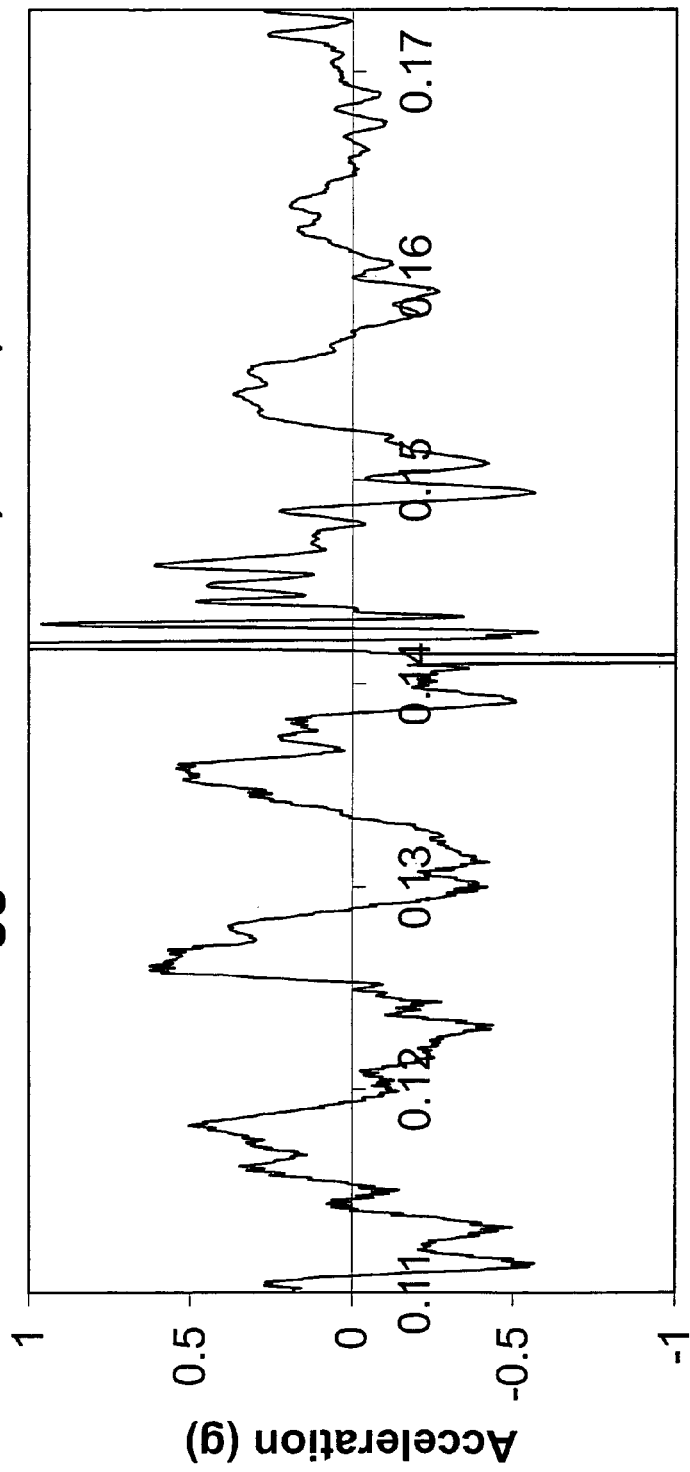

Self propelled sprayer, full throttle, 8008 nozzle clogged to 47% flow, 10 Hz, 300 kPa on periods

Figure 14G

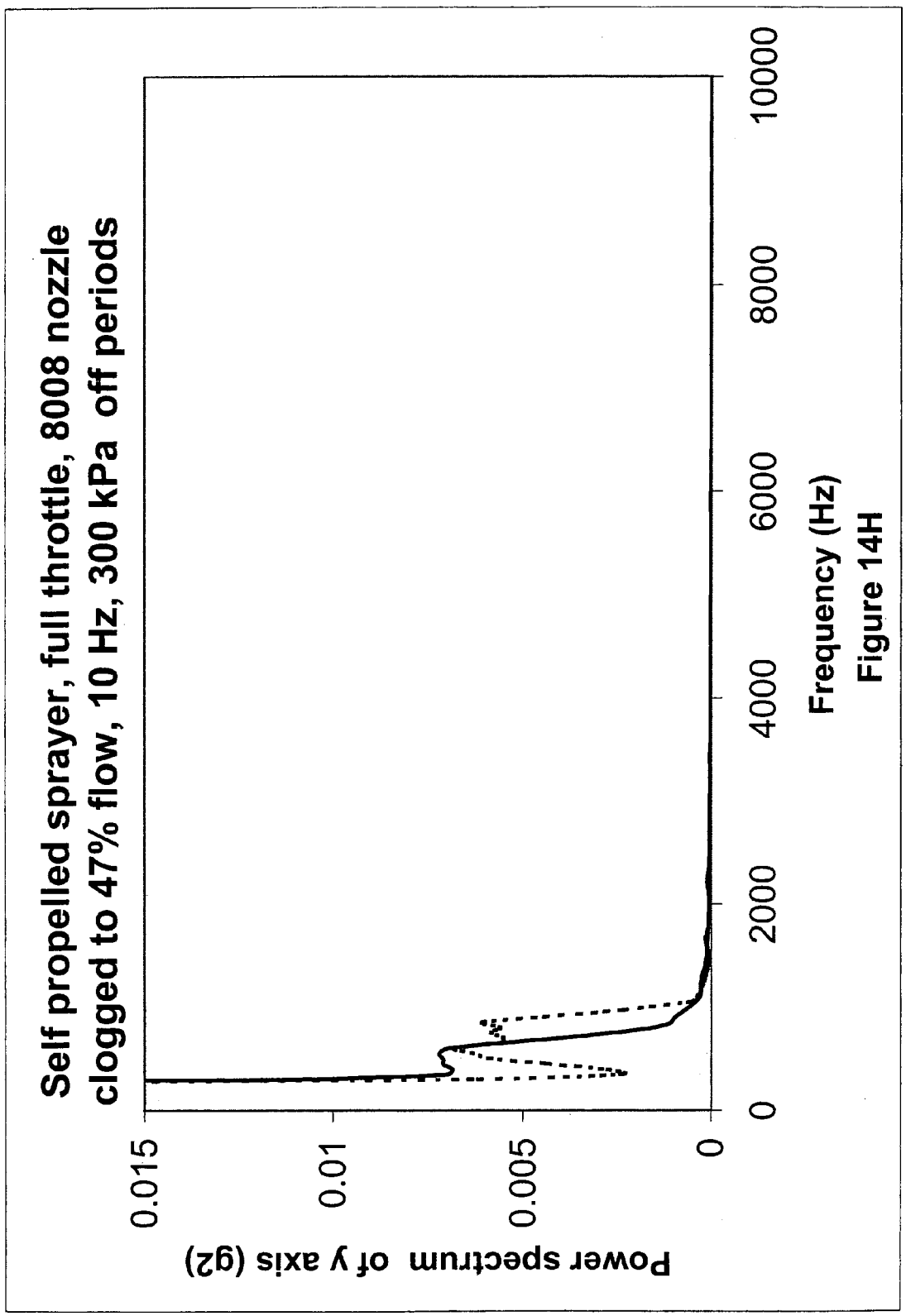

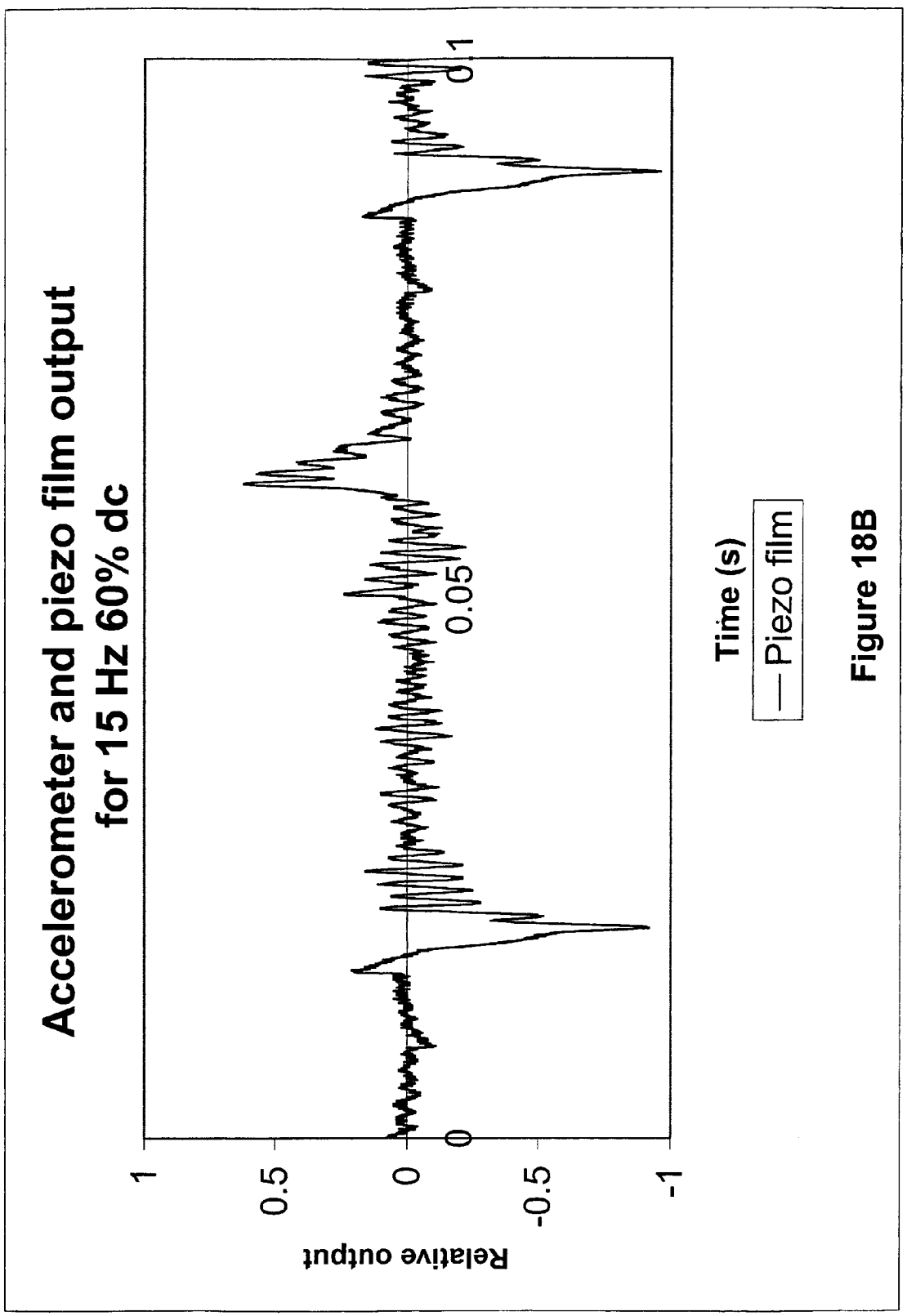

FLOW CONTROL AND OPERATION MONITORING SYSTEM FOR INDIVIDUAL SPRAY NOZZLES

RELATED APPLICATIONS

The present application is based on and claims priority to a provisional application filed on Mar. 10, 2003 and having U.S. Application No. 60/453,388.

BACKGROUND OF THE INVENTION

Most agrochemicals such as crop protection agents and many fertilizers are applied as liquid solutions, suspensions and emulsions that are sprayed onto the target fields. Conventional spray technology is well known and generally understood by farmers, equipment manufacturers and extension agents. Agrochemical manufacturers and regulatory officials are becoming increasingly interested in the spray application process since it affects product efficacy and environmental contamination. Typically, the agrochemical liquid is supplied by powered pumps to simple or complex orifice nozzles that atomize the liquid stream into spray droplets. Nozzles are often selected primarily on the desired range of flow rates needed for the job and secondarily on the range of liquid droplet size spectra and spray distribution patterns they produce. Nozzle technology has been an area of significant development work in recent years. The number of manufacturers of nozzles and the range of nozzle design, e.g., air inclusion nozzles and pre-orifice designs has increased greatly in the past 5-10 years. The general trend has been toward larger droplet sizes as a means of drift reduction.

There are increasing concerns over inefficient agrochemical use, the cost of agrochemicals and inadvertent spray drift or pesticide run-off. Consequently, those skilled in the art have been attempting to improve the quality, precision, accuracy and reliability of application of agrochemicals. This has led to increased use of electronic control systems and GPS-guided operations. Growth in these "precision agriculture" products and strategies has lead to greater demand for "variable rate" technologies and the fluid handling means to alter spray liquid flow rates.

Simultaneously, the agriculture industry and especially the agrochemical application trade, are boosting worker and capital productivity by adopting faster application speeds, wider equipment working widths and greater tank capacities. This combination results in greater efficiencies as measured in "acres per worker-day". While precision agriculture and environmental protection often receive attention in the research and development communities and hold promise for the future, it is the productivity and efficiency aspects of application equipment that often drives immediate sales and adoption of new technology.

New sprayer models may have booms of 30 m (approximately 90 ft) widths and allow application at speeds up to 30 km/hr (20 mph) or higher. Faster ground speeds and wider spray booms can lead to application errors that are significant yet unavoidable with existing spray technology. For example, if the sprayer is traversing the edge of a field while scribing about a 100 m radius (actually, a very gentle turn), the outer nozzles are traveling 35% faster than the inner nozzles. At a 50 m radius, the difference in nozzle ground speeds is 85%. With sharp turns, such as at the end of a pass, the inner nozzles will travel backwards, thereby retracing and overdosing previously sprayed areas, while the outer nozzles will significantly accelerate giving their associated land areas sparse coverage of chemical. Unless the flow rate from each nozzle is individually adjusted to compensate for these differences in travel speeds, application errors may occur.

The current marketplace for application equipment includes GPS-directed rate controllers which adjust agrochemical dose in response to field maps or prescriptions. Currently, the maximum resolution (smallest area that can get a distinct rate) for most products is limited by the width of the spray boom. Rate controllers usually control the entire boom as a unit and do not allow different boom sections, let alone individual nozzles, to discharge different rates. Increased resolution of agrochemical application and wider spray booms will require more and smaller distinct units of discrete flow rate control. Some increase in spatial resolution of variable rate application can be achieved by individual control of distinct boom sections using existing technology but the systems can involve cumbersome plumbing, wiring and operator interfaces.

A commercial system developed by Oklahoma State University and Ntech Industries (Ukiah, Ca.) applies nitrogen fertilizer using individually-controlled nozzle manifold units spaced 60 cm along a spray boom. On each nozzle manifold, three separate spray nozzles (tips) are controlled by three individual valves. When the proper range of nozzle sizes (1X, 2X, 4X) are installed, the combination of open valves determines the flow rate discharged from the nozzle manifold. A 7:1 discrete turndown ratio in flow rate can be achieved with combinations of the three valves. The system requires three primary actuators for each nozzle manifold when electric valves are used or six actuators when pneumatic valves are used since each pneumatic valve requires an electric valve controlling the pilot air flow. A 30 m spray boom with nozzle manifolds at a 60 cm spacing requires 150 individual spray nozzles and 300 actuators. Each nozzle manifold unit can be individually addressed through a CAN bus in communication with a fertility sensing system. The droplet size spectrum and droplet velocity spectrum of the emitted spray varies as the application rate is altered; however, spray droplet size is of less importance in fertilizer application than when pesticides are applied.

Many target-sensing spray control systems, such as the Patchen™ (Beck and Vyse, 1995) spot weed spraying system and similar commercial and research units, allow on/off—but not continuously variable rate—control of individual nozzles. Pulse width modulation such as the Synchro™ (Giles and Comino, 1992) and AIM Command™ (Henderson, et al., 1997) systems provide individual nozzle rate control if the electrical control systems are appropriately configured.

Individual control of spray nozzles or nozzle assemblies is of growing importance in agrochemical application. As individual control increases, the need for individual flow monitoring will increase since feedback is often needed for closed loop control. Even with a linear control strategy, such as the binary control of multiple nozzles or pulse width modulation, confirmation of proper flow is important.

The spray application industry is adopting larger liquid storage tanks on mobile equipment. Larger spray tank capacities result in fewer stops for refilling and greater land areas covered between stops. Assuming a 30 km/hr ground speed, a 30 m boom width and 50 l/ha (apprx. 5 gal/acre) application rate, a 4000 l (apprx. 1000 gal) tank will cover 200 acres in apprx. 1 hour. Since the operator is unlikely to stop the vehicle and leave the cab between refillings, clogged nozzles or other problems on the boom are unlikely to be detected while significant land areas are being treated.

In the previous example, a single nozzle would treat apprx. 3.5 acres per tank load and a single undetected nozzle malfunction would correspond to this 3.5 acre area receiving an incorrect, or perhaps zero, dose of agrochemical. Additionally, the wider boom widths, travel speeds and vehicle sizes increasingly restrict an operator's view of the boom and the opportunities to view the boom while driving. On modern agricultural spray vehicles, 30 to 50% of the spray boom may not be visible to the operator.

On some larger sprayers such as those typically used by custom applicators in the Midwest, Central Canada and the Plains, video cameras are sometimes mounted on the rear of the sprayer so that the operator can monitor, at least in theory, the spray boom out of his or her line of sight. However, at high travel speeds, the operator's attention is fully devoted to driving instead of monitoring the spray boom in the rear, either in the line of direct sight or shown on the video monitor. Due to poor overall visibility from the operator's station and the infrequency of stops and refillings, there is a need for individual nozzle monitoring to confirm that no clogging, pinched hoses, damaged nozzles or other problems may be present or developing on the spray boom.

A similar problem exists on shielded or shrouded sprayers sometimes used in the North American Plains and in urban and landscape applications. In farming areas in extreme southern and northern latitudes and in high value specialty crops, often grown in coastal areas, the agronomic time window for pesticide applications can be critically short and often occurs during windy periods. Shielded sprayers are often used in these conditions. Similarly, sprayers used in golf course, landscape and other urban conditions commonly use shrouds, curtains or shields to deliberately obstruct the nozzles from view. This is partially to reduce spray drift but also as a concession to public relations. Some golf course and landscape sprayers are even disguised as mowers. The shields prevent the operator from visually inspecting the nozzle spray patterns to confirm proper operation. Improperly operating nozzles are not easily detected. Commercial systems for agricultural use often address this problem by routing individual liquid lines to each nozzle through a small rotameter (ball in tube) flow monitor that is mounted in the operator's line of sight. While effective, this requires cumbersome plumbing for each nozzle and that the operator visually monitor the bank of tubes.

It should be noted that relying on visual inspection (either direct line of sight or video) or simple flow measurement (ball in tube) does not assure proper nozzle operation. Nozzles can be partially clogged or have an obstruction in the flow path and appear to be operating correctly even if the flow rate is significantly affected. Conversely, the nozzle pattern and spray droplet size can be severely distorted by an obstruction or damage, yet the flow rate remains close to the original value.

Electronic spray rate control systems and application monitors typically use a single flowmeter and/or pressure transducer for feedback of the flow conditions on the entire spray boom. In systems with many nozzles, such as a 50-60 nozzle boom, failure of 1 or 2 nozzles would be unlikely to raise an alarm since the overall effect is only 2% of the expected flow rate; the system would compensate by maintaining the correct overall flow to the entire boom. So, if one nozzle became completely clogged, the system would simply increase the spray pressure and force an additional 2% flow through the remaining nozzles operating properly. Even with the electronic control or monitor system, the driver would likely remain unaware of the failure.

Additionally, when individual nozzle control is implemented, the need for individual nozzle monitoring increases. Pulse width modulation systems have electrical and mechanical components on each nozzle. Multiple nozzle manifolds have multiple tips and actuators at each boom location. The opportunity for failure is increased over that of a simple nozzle. These systems require not only flow monitoring but also monitoring of the control actuators used for flow or droplet size modulation. Moreover, individual nozzle control implies that individual nozzle feedback is required for closed loop operation.

Future systems may incorporate individual nozzle injection of multiple agrochemicals or adjuvants, individual control of droplet size spectra, droplet velocity or spray distribution. In each case, the need for monitoring and actuation on a single-nozzle or single manifold basis increases.

Thus, a need currently exists for a system and process for monitoring spray nozzle operation. In particular, a need exists for a system that is not only capable of monitoring the flow rate of a fluid through a nozzle, but is also capable of monitoring the flow pattern that is emitted from the nozzle. Such a system and process is well suited for use in the agricultural field. It should be understood, however, that similar needs also exist in other fields. For example, on irrigation systems, there may be many small nozzles, often obscured from view or in areas that are difficult to access. Failure of a nozzle might not be detected until drought damage to a plant had occurred and symptoms were visible. Likewise, in industrial spray driers, malfunction of a nozzle might not be detected until significant amounts of product had been damaged. In a spray humidification or cooling systems, nozzle failures might not be detected until excessive heating or drying had occurred. Specifically, a system that monitors nozzle operation may find wide applicability in any system, whether commercial, industrial or residential, that utilizes spray nozzles.

SUMMARY OF THE INVENTION

In general, the present invention is directed to a system and process for monitoring the operation of a fluid nozzle. The present invention is suitable for use with any of various types of fluid nozzles and in various and many application systems. For example, the system of the present invention can be used in conjunction with agricultural spray systems that are designed to apply liquids to a field. Alternatively, the present invention can be used in irrigation systems to ensure that each nozzle in the system is working properly. In addition to the above, it should be understood that the system of the present invention can be used to monitor nozzles in any industrial process, commercial process, or residential process.

In one embodiment, the system of the present invention for monitoring the operation of a fluid nozzle can include a fluid nozzle configured to emit a fluid according to a predetermined spray pattern and flow rate. A vibration sensor may be positioned in operative association with the fluid nozzle. The vibration sensor senses nozzle vibrations in at least one direction as the fluid nozzle is operating.

An electronic controller is placed in communication with the vibration sensor. The controller is configured to receive information from the vibration sensor and then to indicate whether the fluid nozzle is operating correctly based on the vibrations sensed. For instance, the controller can indicate whether or not the fluid nozzle is emitting a proper spray pattern and/or whether the fluid nozzle is operating at the correct flow rate. For instance, the system of the present invention can determine whether the fluid nozzle is clogged or simply needs adjustment.

In one embodiment, the controller can be configured to compare a reference, standard or ideal vibration output to a vibration output received from the vibration sensor. From the comparison, the controller can indicate an irregularity in the operation of the fluid nozzle.

The vibration output that is compared to the actual vibration output received from the vibration sensor may vary depending upon the particular application. For instance, in one embodiment, the reference vibration output may comprise a vibration output received from a second fluid nozzle. In an alternative embodiment, the reference vibration output may be received from the same fluid nozzle that is being monitored. In this embodiment, the reference vibration output may be taken when it is known that the fluid nozzle is working properly, such as during initial startup. In one embodiment, the system can include a plurality of fluid nozzles that are each being monitored by a corresponding vibration sensor. The vibration output from all of the sensors may be averaged and the average output may be used as a reference for each individual nozzle to determine if the individual nozzle is performing in a manner inconsistent with all other nozzles.

In one embodiment, the controller can comprise a display that visually displays information received from the vibration sensor for determining whether the spray pattern of the nozzle is operating properly. The controller can be, for instance, one or more microprocessors such as any suitable type of programmable logic unit. The vibration sensor, on the other hand, can be an accelerometer. In one particular embodiment, for instance, the vibration sensor may comprise a piezoelectric device. In another embodiment, the vibration sensor can be a sensitive microphone in contact with the liquid supply to the nozzle.

The fluid nozzles monitored in the present invention may have a Z axis that comprises the direction of flow of a fluid through the nozzle. For instance, if the nozzle is pointing downwards, the Z axis comprises a vertical line. The X axis, on the other hand, is perpendicular to the Z axis and extends to the left and right of the nozzle when facing a front of the nozzle. If the nozzles, for instance, are spaced along a spray boom in an agrochemical distribution system, the X axis is parallel to the boom. The remaining axis, the Y axis, is perpendicular to the Z axis and to the X axis. When incorporated into an agrochemical system, for instance, the Y axis is usually parallel to the direction of travel when the nozzles are being conveyed over a crop field by, for instance, a tractor.

In accordance with the present invention, the vibration sensor may sense nozzle vibrations in at least the Z axis direction, the X axis direction, or the Y axis direction. For instance, in one embodiment with a flat fan nozzle, it has been discovered that sensing vibrations in the Z axis provides information regarding the flow rate of a fluid being emitted by the nozzle. Vibrations sensed in the Y axis, on the other hand, may provide information regarding the spray pattern by which the fluid is emitted. When using a fluid nozzle that pulses and emits a fluid according to a duty cycle, vibrations sensed in the X axis may provide information regarding whether the nozzle is pulsating correctly if the orientation of a solenoid valve controlling the pulsation is oriented such that the predominant motion of moving parts of the valve are oriented along the X axis.

In some embodiments, vibrations may be sensed in more than one direction. For instance, in one embodiment, vibrations may be sensed in all three directions using multiple vibration sensors or a single sensor. In other embodiments, vibrations may be sensed in two directions, such as in the Z axis and Y axis directions, in the Y axis and X axis directions, or in the Z axis and X axis directions.

The flow rate of a fluid being emitted by the nozzle may vary depending upon the particular application. When applying agrochemicals to a crop field, for instance, the flow rate may vary from about 0.05 gals/min to about 1.5 gals/min. In other embodiments, however, greater or lesser flow rates may be used.

The frequency at which vibrations are sensed may also vary depending upon various factors including the type of fluid nozzle being operated. In one particular embodiment, for instance, the vibration sensor may be configured to sense vibrations at a frequency of from 0 Hz to about 10,000 Hz, such as from about 500 Hz to about 8,000 Hz. In one particular embodiment, for instance, the vibration sensor may sense vibrations at a frequency of from about 2,000 Hz to about 7,000 Hz. In order to better monitor vibrations, in one embodiment, an amplifying device 36 or signal filtering device 38 may be placed in association with the vibration sensor for amplifying the vibrations or removing signals outside the frequencies of interest that are received by the controller.

As stated above, in one embodiment, the system of the present invention may be incorporated into an agrochemical delivery system that dispenses controlled amounts of a fertilizer or pesticide onto a crop. The agrochemical delivery system may include, for instance, a reservoir for holding the agrochemical. The reservoir may include an outlet that is in communication with a distribution manifold. The distribution manifold may be connected to a plurality of dispensing tubes. A plurality of fluid nozzles may be positioned at the end of each of the dispensing tubes. In accordance with the present invention, a plurality of vibration sensors may be placed in association with selected nozzles. The vibration sensors may be configured to send a vibration output to a controller for monitoring proper operation of the nozzles.

In accordance with the present invention, one embodiment of a process for monitoring the operation of a fluid nozzle includes the steps of first sensing vibrations occurring at a fluid nozzle while the nozzle is emitting a fluid. The process further includes the step of comparing the sensed vibrations to a reference for determining whether the nozzle is operating properly. The process can be used for monitoring the spray pattern of the fluid nozzle and/or monitoring the flow rate of a fluid flowing through the nozzle. In this embodiment, the reference may comprise an ideal nozzle vibration frequency pattern that has been predetermined. Alternatively, the reference can comprise the vibrations sensed from a second fluid nozzle operating in conjunction with the first fluid nozzle or can comprise vibrations sensed from the first fluid nozzle itself or could be an average of typical signals from a plurality of nozzles.

Other features and aspects of the present invention are discussed in greater detail below.

BRIEF DESCRIPTION OF THE DRAWINGS

FIG. 2A and 2B are perspective views of one embodiment of a vibration sensor mounted on a fluid nozzle in accordance with the present invention;

FIGS. 18A and 18B are results obtained in the examples described below.

DETAILED DESCRIPTION

In general, the present invention is directed to a system and process for monitoring the operation of a fluid nozzle. More particularly, in one embodiment, the present invention is directed to using a vibration sensor, such as an accelerometer, to sense and measure the vibrations produced by a spray nozzle. Through the sensed vibrations, the present inventor has discovered that much information regarding the performance of the nozzle can be obtained. For instance, through the present invention, information can be gathered regarding the spray pattern of the nozzle and/or the flow rate of the nozzle. For example, in one embodiment, the vibrations sensed from a fluid nozzle can be compared to the typical vibration signature of a properly operating nozzle for determining whether the fluid nozzle is operating properly. Thus, as will be described in more detail below, the present invention provides a sensitive, low-cost, reliable and rugged sensor and signal conditioning system for inclusion into the body of a fluid nozzle and is directed to a signal analysis system and operator interface for monitoring the fluid nozzle.

Any suitable fluid nozzle may be monitored according to the present invention. For instance, the fluid nozzle may emit a fan-type spray pattern or a conical spray pattern. The present inventor has discovered that different nozzles emit certain frequencies of vibration. These frequencies along with certain vectors of the vibration provide flow rate and droplet size information about the nozzle operation. Further, the present inventor has also discovered that background vibrations that may be caused by other system components, such as vehicles, pumps, motors, and the like generally emit vibrations in frequency bands that are much lower outside than the characteristic frequency bands of nozzles. Consequently, interference from extraneous vibrations, for most systems, may be a minor concern and managed through appropriate signal analysis.

The system and process of the present invention are well suited for monitoring both continuously flowing fluid nozzles and pulsed fluid nozzles. When used in conjunction with pulsed nozzles, the vibration analysis can diagnose not only nozzle operation, but can also monitor pulsed valve operation, such as the operation of a solenoid valve used to create the pulsed spray.

Various different types of vibration sensors may be used in the present invention. For example, in one embodiment, an accelerometer may be used. The vibration sensors may be configured to sense vibrations in a single direction, or in multiple directions, such as triaxial accelerometers.

Figure 17A:
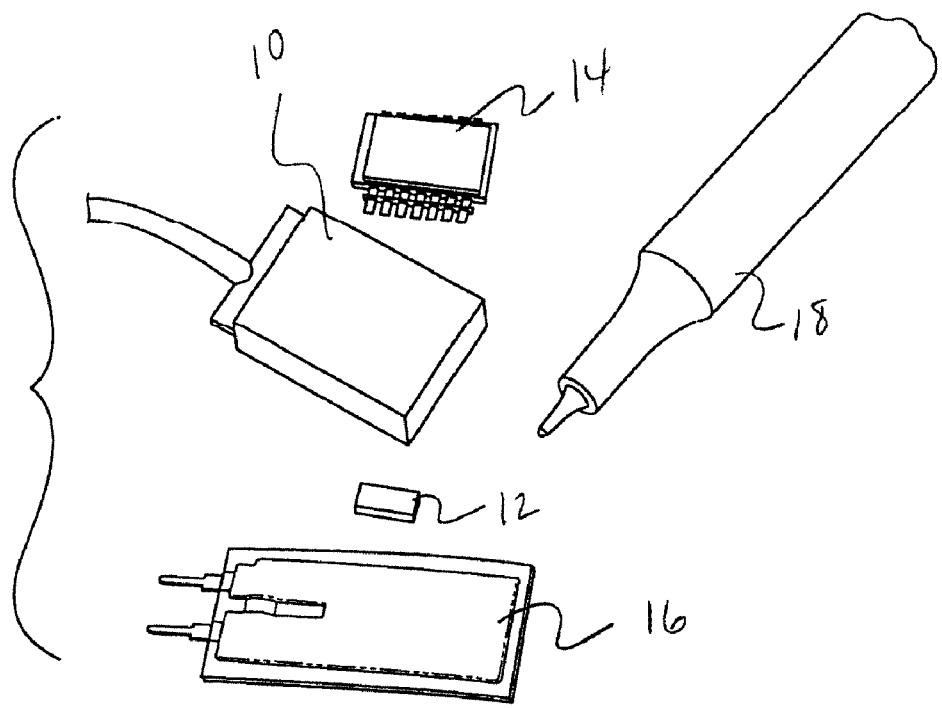
FIGS. 17A and 17B illustrate various vibration sensors that may be used in the system of the present invention.

Some examples of vibration sensors that may be used in the present invention are shown in FIG. 17A. For instance, shown in FIG. 17A are accelerometers and piezoelectric films that may be used in the present invention. In particular, a single axis accelerometer 10, a miniature piezoelectric shock sensor 12, a single chip triaxial accelerometer 14 and a piezoelectric device 16 are shown. For reference purposes, a tip of a typical writing pen 18 is also illustrated as a size reference.

Figure 17B:
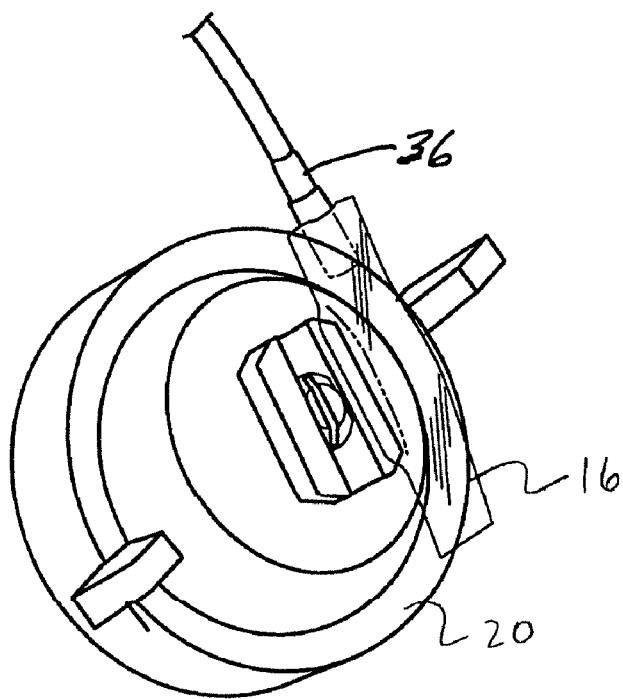

In FIG. 17B, the piezoelectric film device 16 is shown mounted to the top near the exit of a nozzle 20. In one embodiment, various advantages are obtained from a cost standpoint if piezoelectric devices are used. Piezoelectric sensors are particularly well suited for sensing vibrations in a single direction. Low cost microphones or sonophones can be used to determine vibrations transmitted upstream from the nozzle. When vibrations need to be sensed in multiple directions, multiple piezoelectric devices may be used.

The vibration sensor can be placed at any appropriate location on the nozzle for sensing vibrations. For example, the vibration sensor can be placed on the nozzle housing or, alternatively, can be otherwise incorporated into the body of the nozzle. In some applications, it has been found that the vibration sensor can also be placed upstream from the nozzle and still be capable of registering vibration frequencies.

According to the present invention, once the vibration sensor measures vibrations from a fluid nozzle, the signal created by the sensor is then fed into a controller for analysis. During the process, the signal can be manipulated and conditioned. For instance, in one embodiment, the nozzle vibration can be measured and a spectral analysis, such as a Fast Fourier Transform, is conducted to determine a power spectrum. The power spectrum can then be analyzed and compared to other nozzles or to a reference for determining whether or not the nozzle is operating properly.

The controller 2 that is used to receive information from the vibration sensor and relay that information to an operator can range from very simple to very complex. For instance, in one embodiment, the controller 2, which can be a microprocessor or be in communication with a microprocessor 4, can receive information from the vibration sensor and set off a visual and/or audible alarm 8 that indicates when a nozzle is not operating properly. In an alternative embodiment, the controller 2 can comprise a display or annunciator 6 for nozzle monitoring. The display 6 may present to a user the frequencies at which vibrations are occurring and the amplitude of those frequencies which can then be used by an operator for determining whether the nozzles are operating properly.

The nozzle monitoring system of the present invention may be used in any suitable application where fluid nozzle monitoring is desired. For instance, in one embodiment, shown in FIG. 1, the system of the present invention can be incorporated into an agrochemical spray system designed to apply chemicals, such as fertilizers and pesticides, to crops and fields. These types of systems can include dozens of spray nozzles that each can be monitored according to the present invention.

Figure 1:
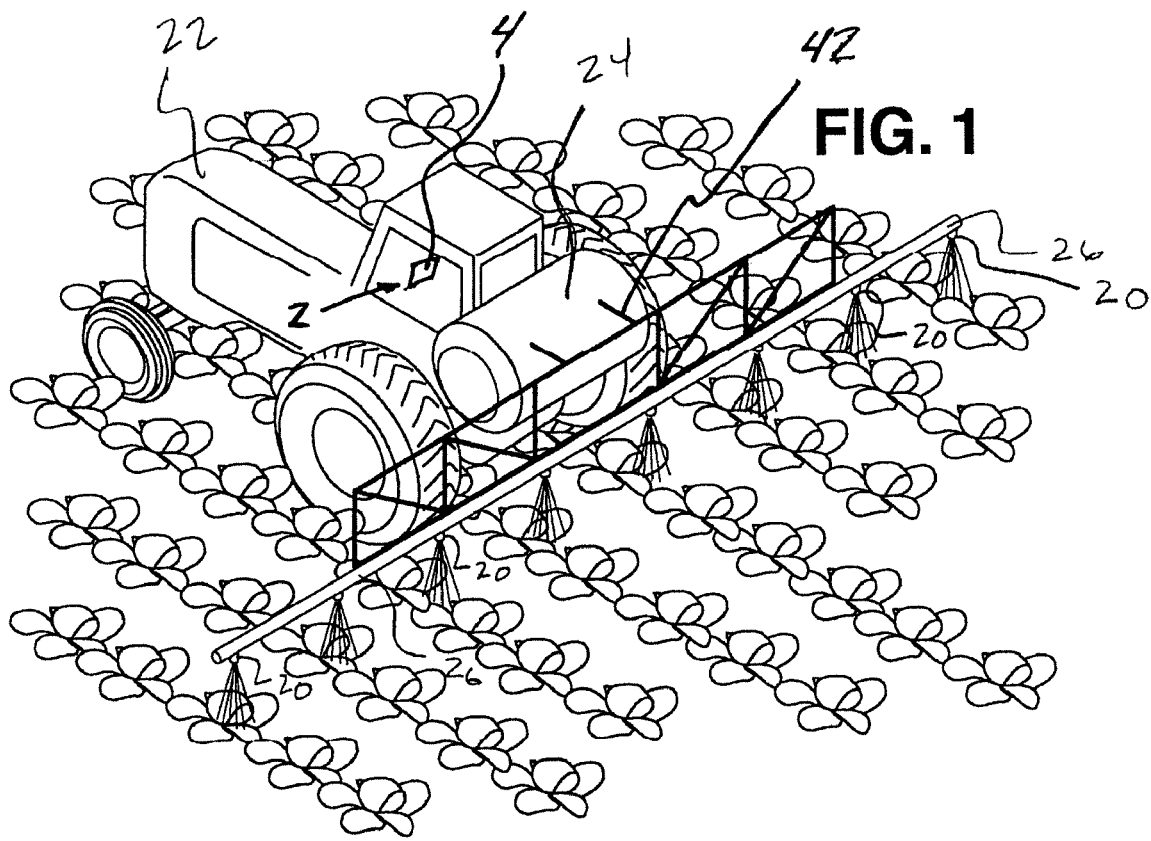
FIG. 1 is a perspective view of one embodiment of an agrochemical dispensing system that may incorporate the teachings of the present invention.

As shown in FIG. 1, the agrochemical dispensing system is illustrated being drawn across a field by a tractor 22. The system includes a liquid reservoir 24 for holding an agrochemical liquid. The reservoir 24 includes an outlet and a pumping means such as a pump 42 that is placed in communication with a distribution manifold 26. The distribution manifold 26 includes a spray boom that includes a plurality of dispensing tubes or lines. At the end of each dispensing tube is a fluid nozzle 20. In accordance with the present invention, a vibration sensor may be placed in association with one or more of the nozzles 20 for monitoring the operation of the nozzle during application of an agrochemical. The vibration sensor may sense vibrations in a nozzle in one or more directions for monitoring any irregularities in fluid flow rate or in the fluid spray pattern. If the nozzles 20 are pulsating nozzles, the vibration sensors may also indicate irregularities in the actuation characteristics of valves that may create the pulsating spray. For example, if the spray is pulse width modulated, changes in the frequency and duty cycle of the spray actuation may be determined.

In another embodiment, the system of the present invention can be incorporated into irrigation sprinklers. Often, sprinklers or irrigation emitters are out of sight or inaccessible. The system of the present invention can monitor for proper nozzle operation in order to ensure that a field is properly irrigated.

As mentioned above, the system of the present invention may be used to monitor fluid nozzle flow rate, relative droplet size spectra and/or the spray pattern being emitted by the nozzle. An important operating parameter of the nozzle unit is the liquid flow rate. Partial or complete flow blockage in the nozzle or upstream plumbing, improper liquid supply pressure and/or improper operation of the individual actuator is likely to be manifested (but not necessarily) in changes of nozzle flow rate. Also, feedback-based control requires flow rate data. Therefore, sensing of the flow rate is an important function of the individual nozzle sensor.

Unlike some industrial applications where process control may require only flow rate sensing, a spray nozzle is designed to produce a specified spray pattern and droplet size spectrum. In addition to flow rate, proper operation is defined as maintaining the desired spray pattern and droplet size spectrum. Nozzle monitoring systems of the present invention may provide confirmation of proper flow, pattern and droplet size.

The present inventor realized that a nozzle orifice provides a significant disruption to liquid flow and in many cases the nozzle produces vibrations that are much stronger and have more distinguishing characteristics than vortex shedding structures that might be added to plumbing. Proper nozzle operation implies not only proper flow rate but also the desired spray pattern and droplet size. Some nozzle malfunctions and clogging actually have very little effect on flow rate but significant effects on pattern and droplet size. A monitoring technique that measured only flow would not be sufficiently sensitive to detect all important nozzle malfunctions that might lead to poor coverage, streaking or excessive spray drift.

The present invention may be better understood with reference to the following examples.

EXAMPLE NO. 1

Characteristic vibration of the spray atomization process was investigated using a single nozzle test stand, a multiple nozzle test stand and a commercial, self-propelled field sprayer (Case 4260, CNH Global). The single nozzle test stand used air pressured canisters for liquid flow; this eliminated any vibration from pumps and bypass flow in the system. The multiple (3) nozzle test stand used an electric vane pump and allowed various configurations of pulsing flow to be generated. Data from the multiple (3) nozzle test stand were compared to the single nozzle stand. Pump and pipe flow vibrations were not found to affect the nozzle vibration measurements.

Figure 2A:
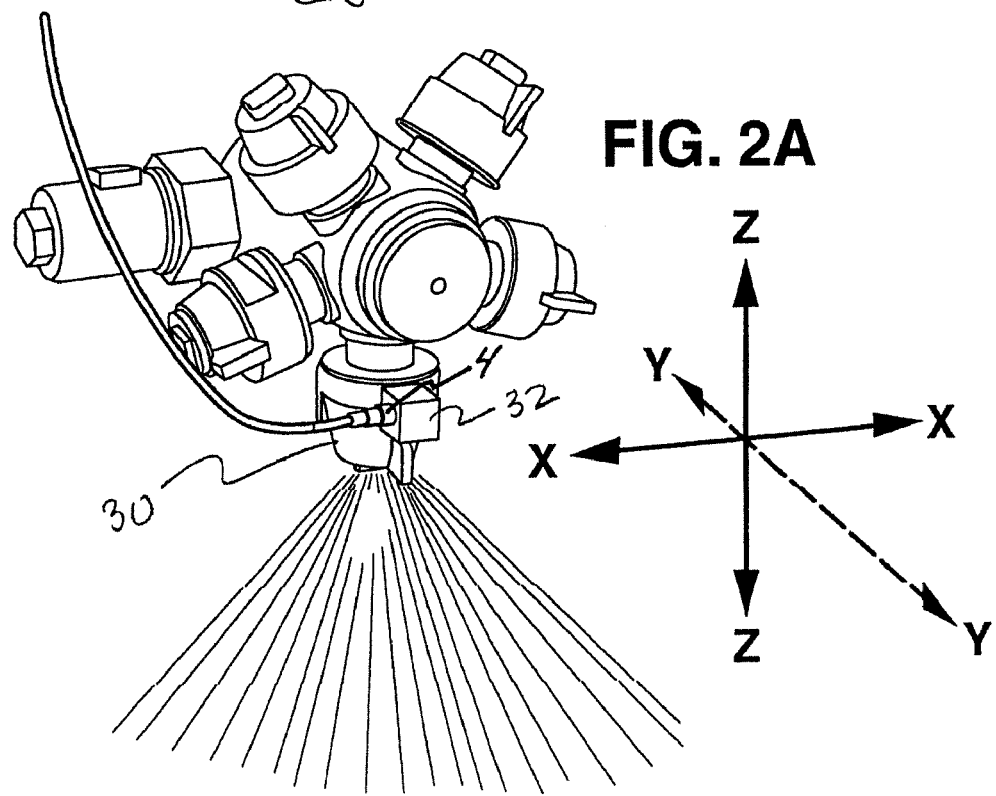

The primary instrument for data collection in these examples was an ICP triaxial accelerometer (PCB Model 356A22) with frequency response of 0.4 Hz to 6 kHz, 0.4 to 10 kHz (sensitive) and nominal output of 100 mV/g. The accelerometer was rigidly coupled to the nozzle cap using a 5-40 machine screw stud. Referring to FIGS. 2A and 2B, a diagram of the nozzle tested is shown. As illustrated, a triaxial accelerometer 32 is shown mounted to a nozzle 30. Nozzle 30 was mounted on a test stand during the experiments. The nozzle emitted a fan-like spray pattern.

In FIGS. 2A and 2B, reference axes as used in this application are shown. In particular, the Z direction as used herein is the direction of flow through the nozzle. In the most common field spraying applications, this Z axis is vertically downward. The X direction, on the other hand, is horizontal provided that the Z direction is vertical. In other words, the X direction is perpendicular to the Z direction and extends left to right when facing a front of the nozzle. The Y axis is the remaining axis and is perpendicular to the plane in which the spray pattern is contained. When the nozzle is traversed over a field as shown in FIG. 1, the Y axis is parallel to the direction of travel.

The accelerometer was coupled to a 4-channel ICP charge amplifier/signal conditioner (PCB Model 482A22). Data were collected from the amplifier using a multi-channel A/D card (National Instruments DAQ Series) installed in a laptop computer. For some experiments (using other accelerometers), additional signal conditioning was done with commercial modules (Analog Devices 55B series and National Instruments SCC series modules). National Instruments LabView® software was used for data collection and some spectral analysis. Custom software, using standard FFT (Fast Fourier Transform) methods was written for additional spectral analysis. After initial pilot studies to find the range of frequencies of interest, the sampling rate was set at 20 kHz and allowed spectral analysis up to 10 kHz under the Nyquist criteria. A typical sampling period was 200 ms; this yielded 4000 data points per channel, a spectral resolution of 5 Hz and in the case of 15 Hz pulsing flow, included 2 complete valve cycles and spray pulsation. A number of single axes "teardrop" accelerometers (PCB Model 39941) with calibrated frequency response to 10 kHz were used to confirm triaxial accelerometer data beyond the 6 kHz range.

A series of tests with nozzles of various flow capacities (0.1 to 1.0 gal/min nominal), angles (80 and 110 deg) and various operating pressures (150-500 kPa or approximately 20-80 psi) was conducted. During all continuous non-pulsating flow tests, a standard diaphragm check valve was installed on the turret-type nozzle body (FIG. 2). Example test data are shown in FIG. 4 for 8001, 8004 and 8008 nozzles operating at 300 kPa. Throughout the examples, the nozzle designations indicate the flow angle and flow rate. For example, in each of the above nozzles, the "80" indicates that the nozzles had an 80 degree flow angle. Specifically, each of the nozzles tested emitted a fan-shaped spray pattern. 80 degrees refers to the extent of the fan-like shape within the X-Z axes plane.

The "01", "04", and "08", on the other hand, indicate the flow rate of each nozzle. Specifically, "01" indicates the nozzle had a 0.1 gallon/minute flow rate. "04" indicates a 0.4 gallon/minute flow rate, while "08" indicates a 0.8 gallon/minute flow rate. This nomenclature is standard in the industry and assumes a 40 psi (276 kPa) liquid supply pressure. Throughout the remainder of the examples, similar designations are provided for each of the nozzles.

Figure 4B:
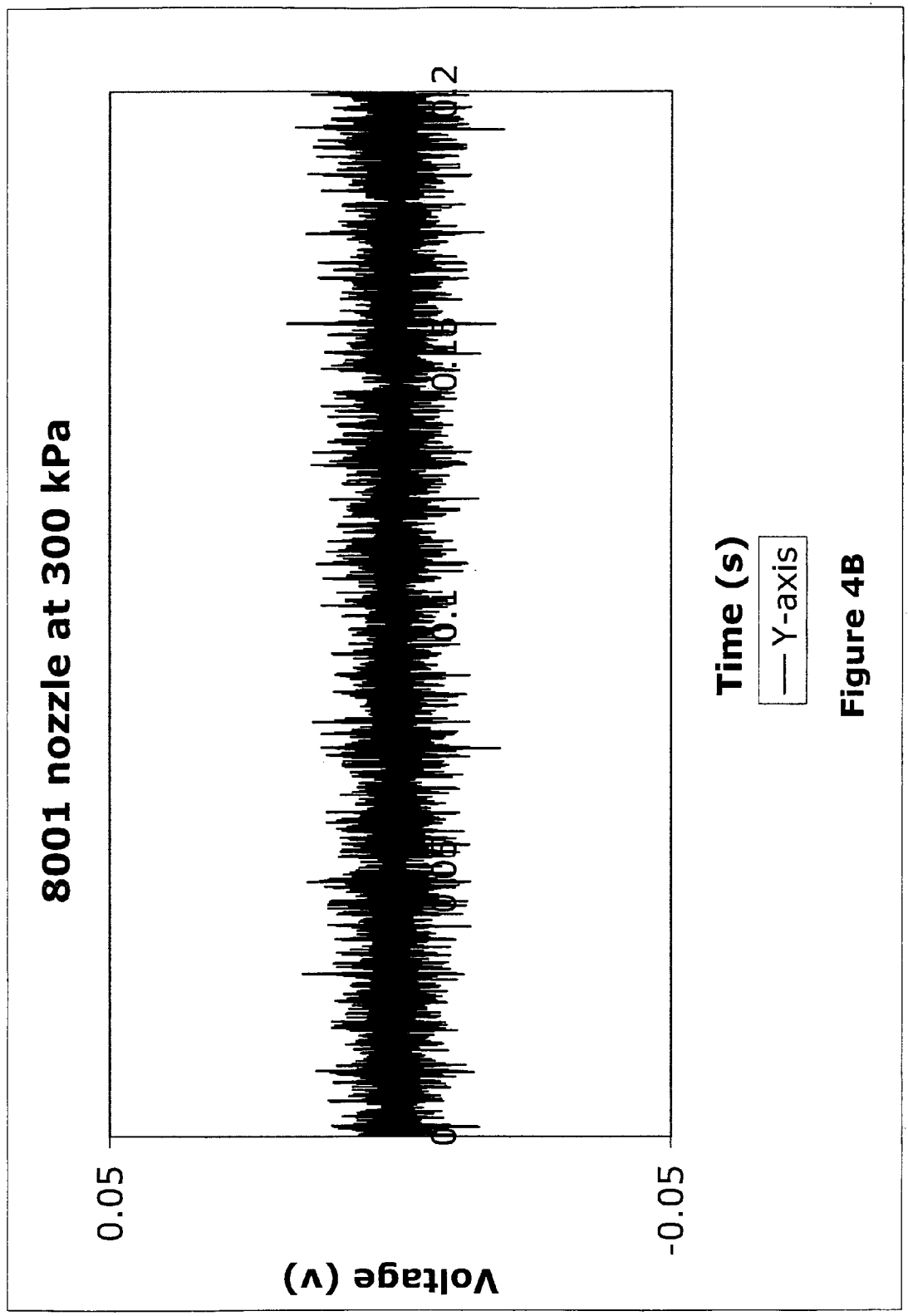
FIGS. 4 through 8 are results obtained in the examples described below.
Figure 4D:
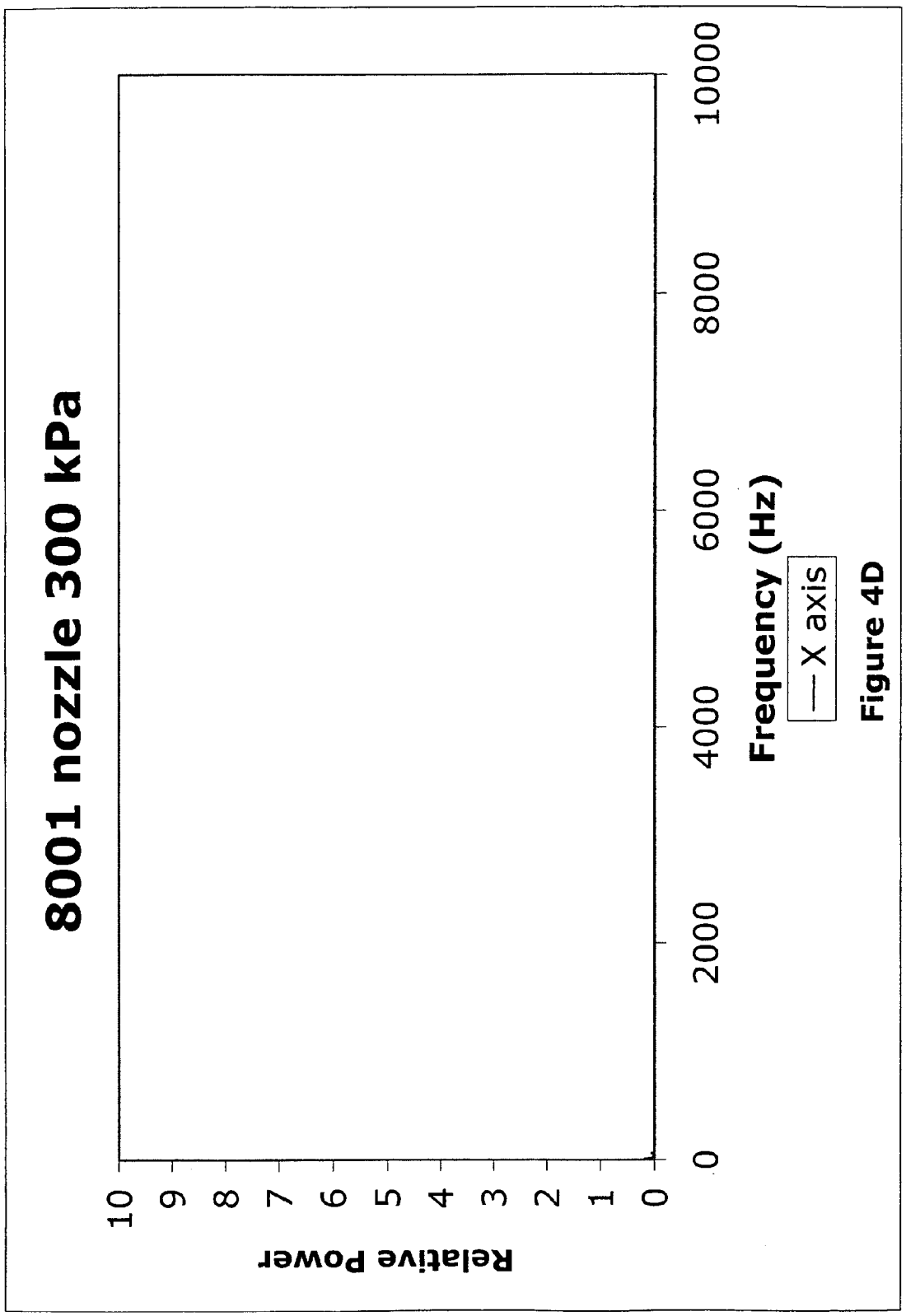
Figure 4G:
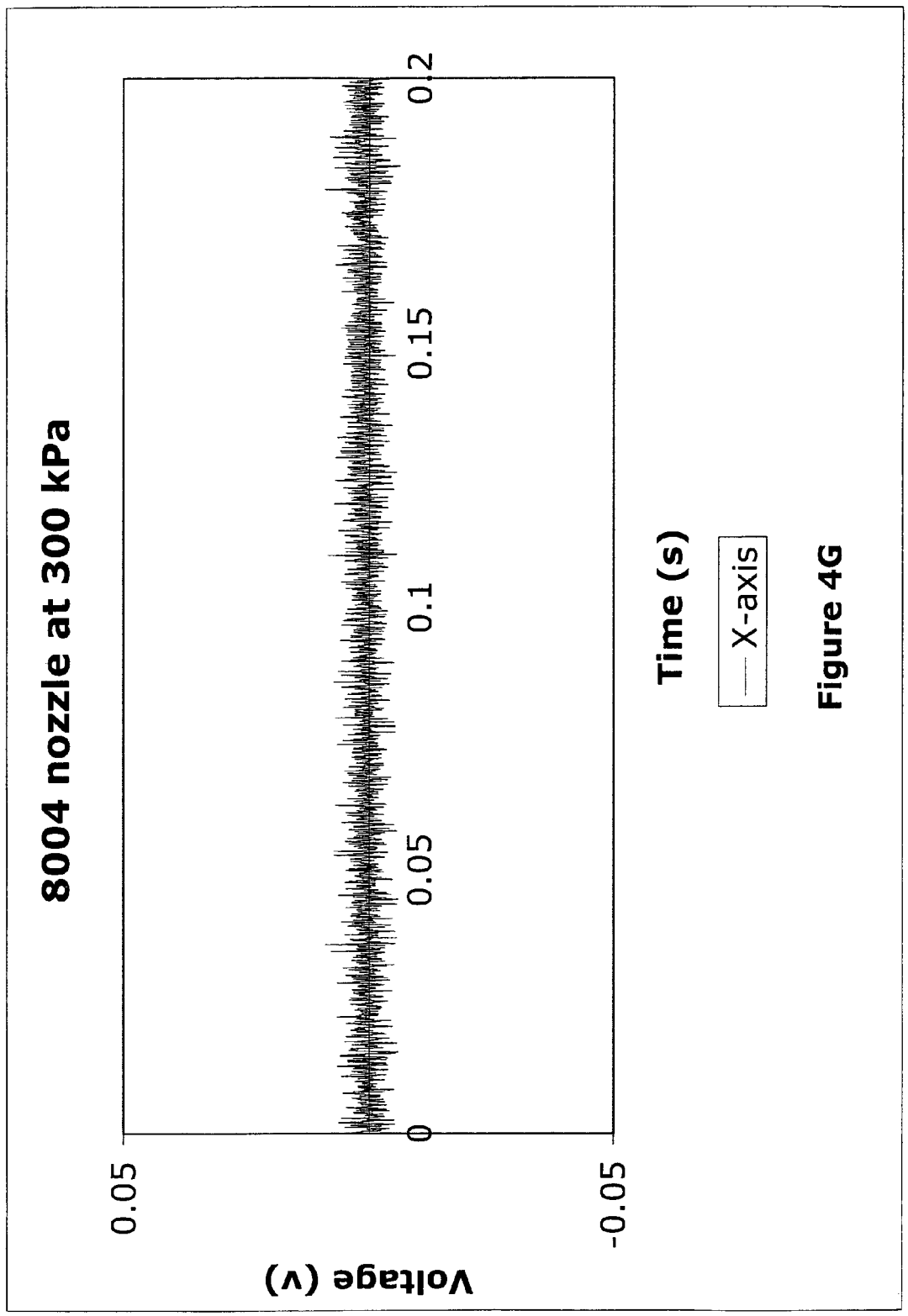
Figure 4H:
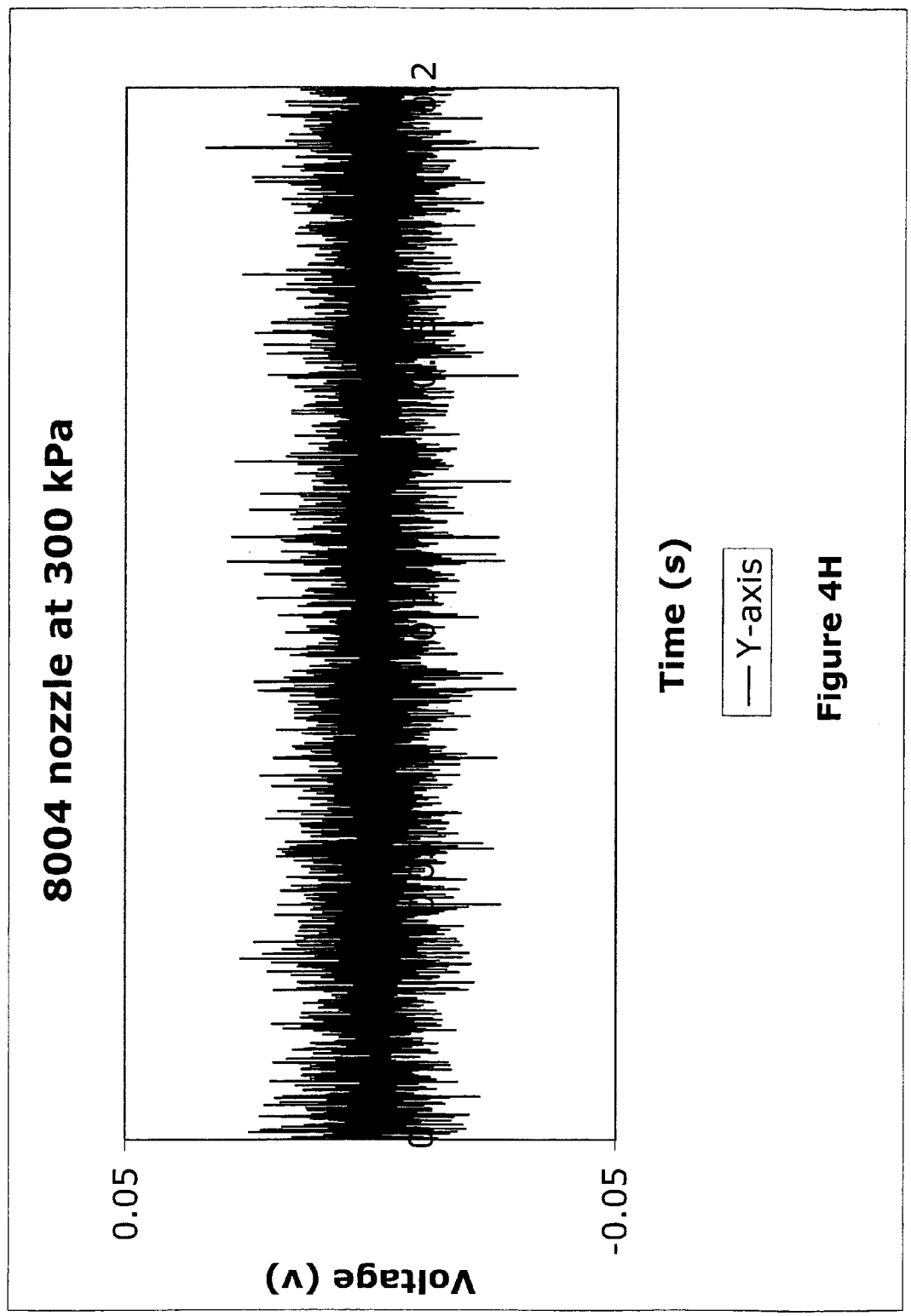
Figure 4I:
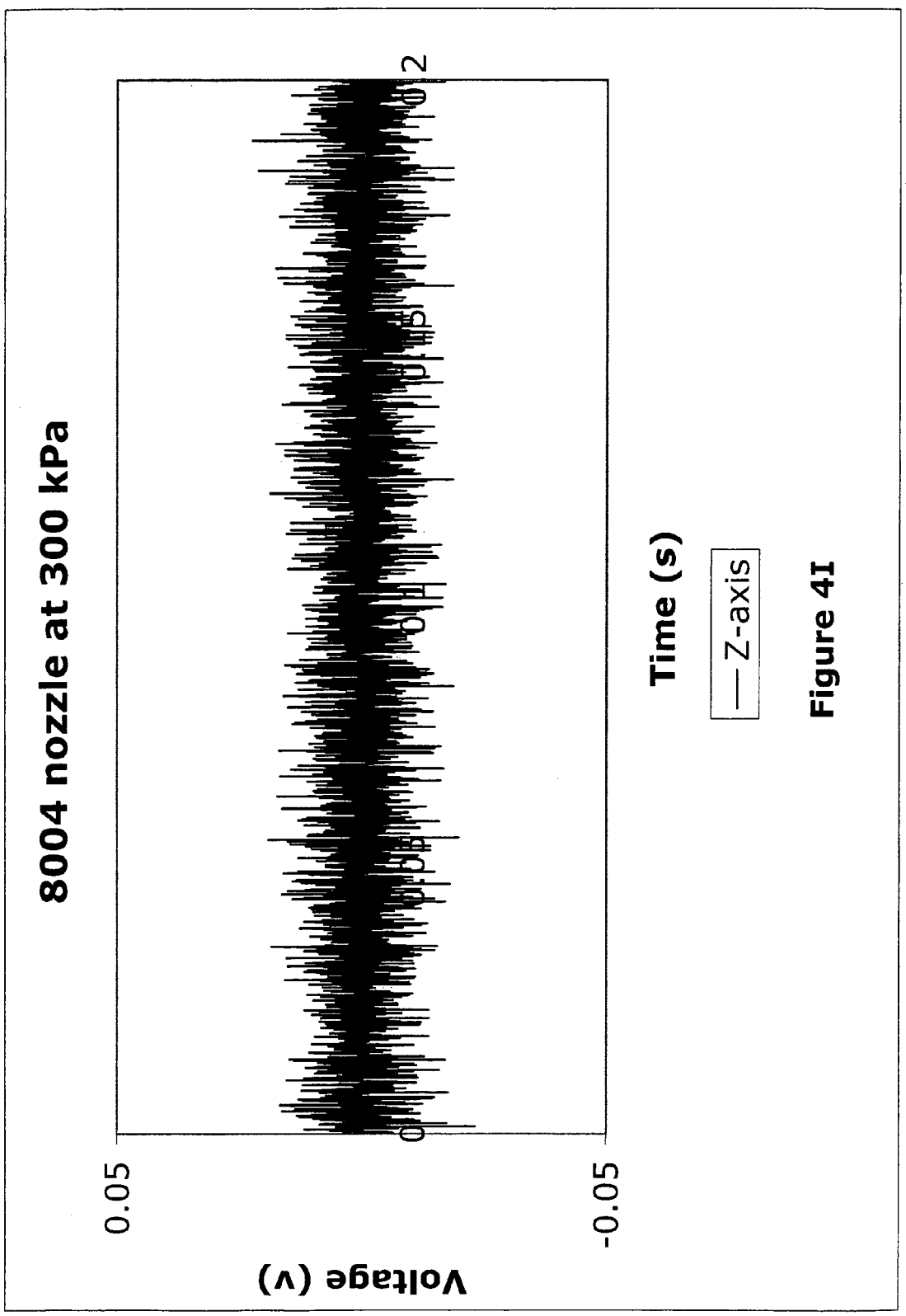
Figure 4M:
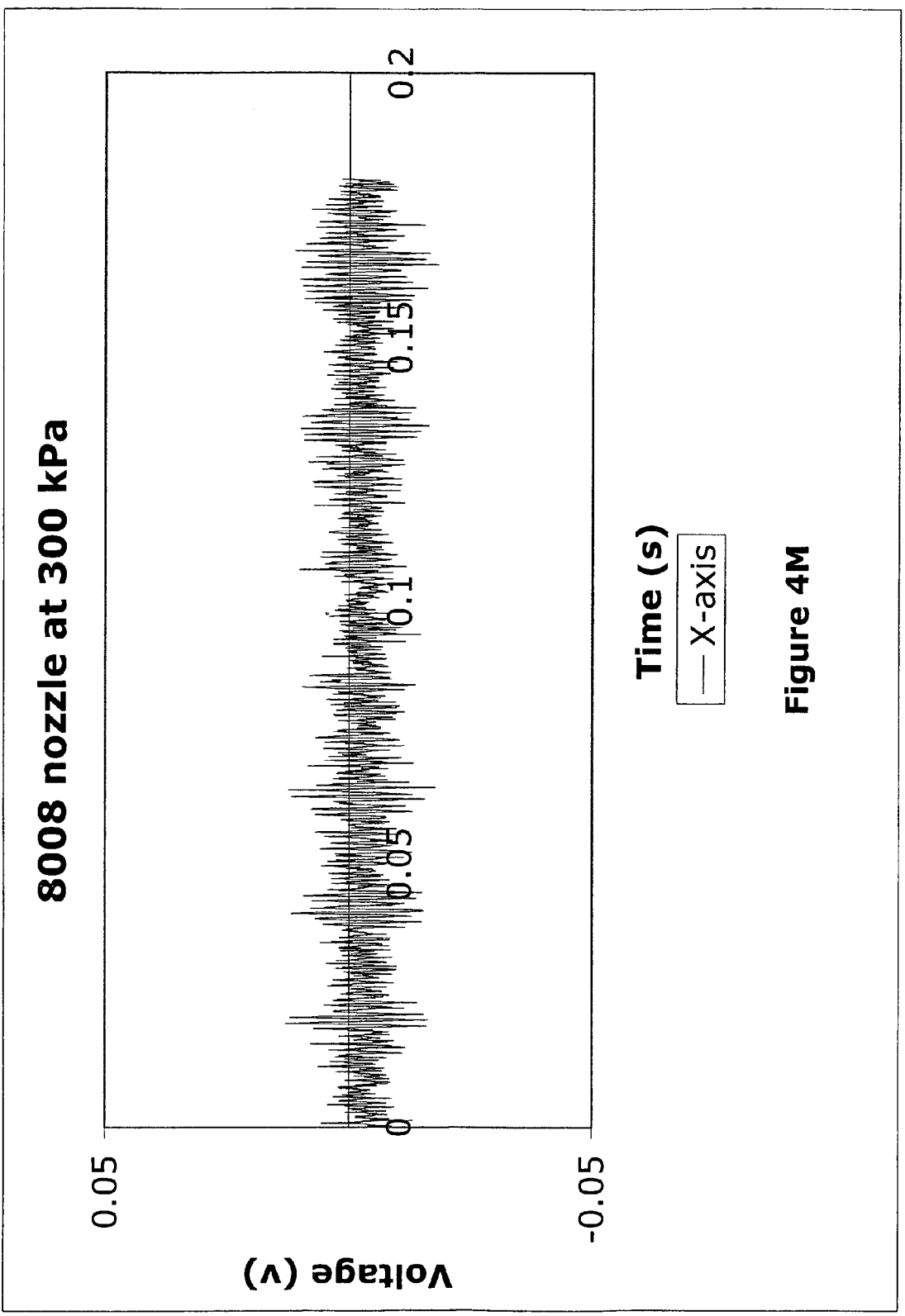
Figure 4N:
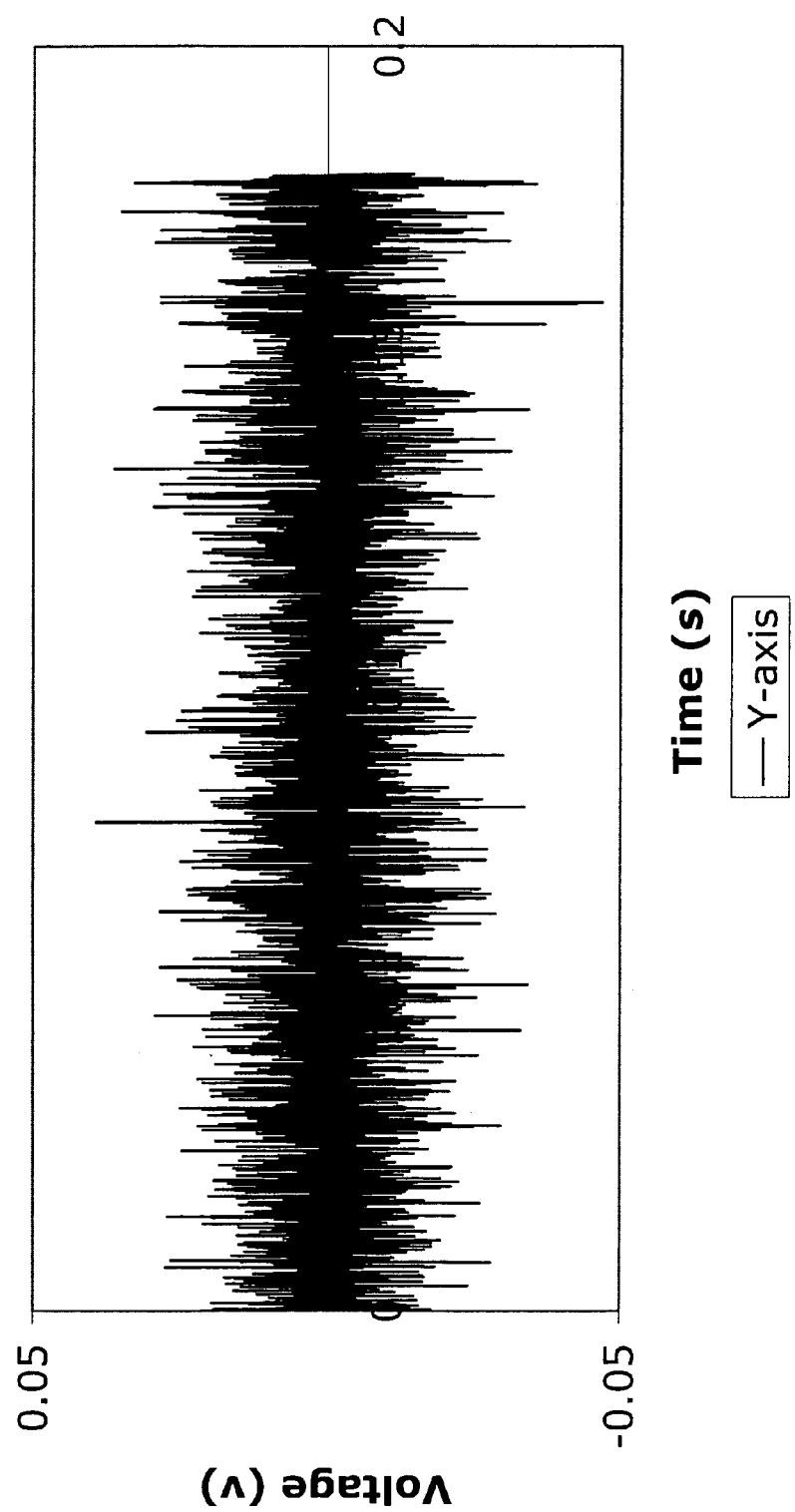
Figure 4P:
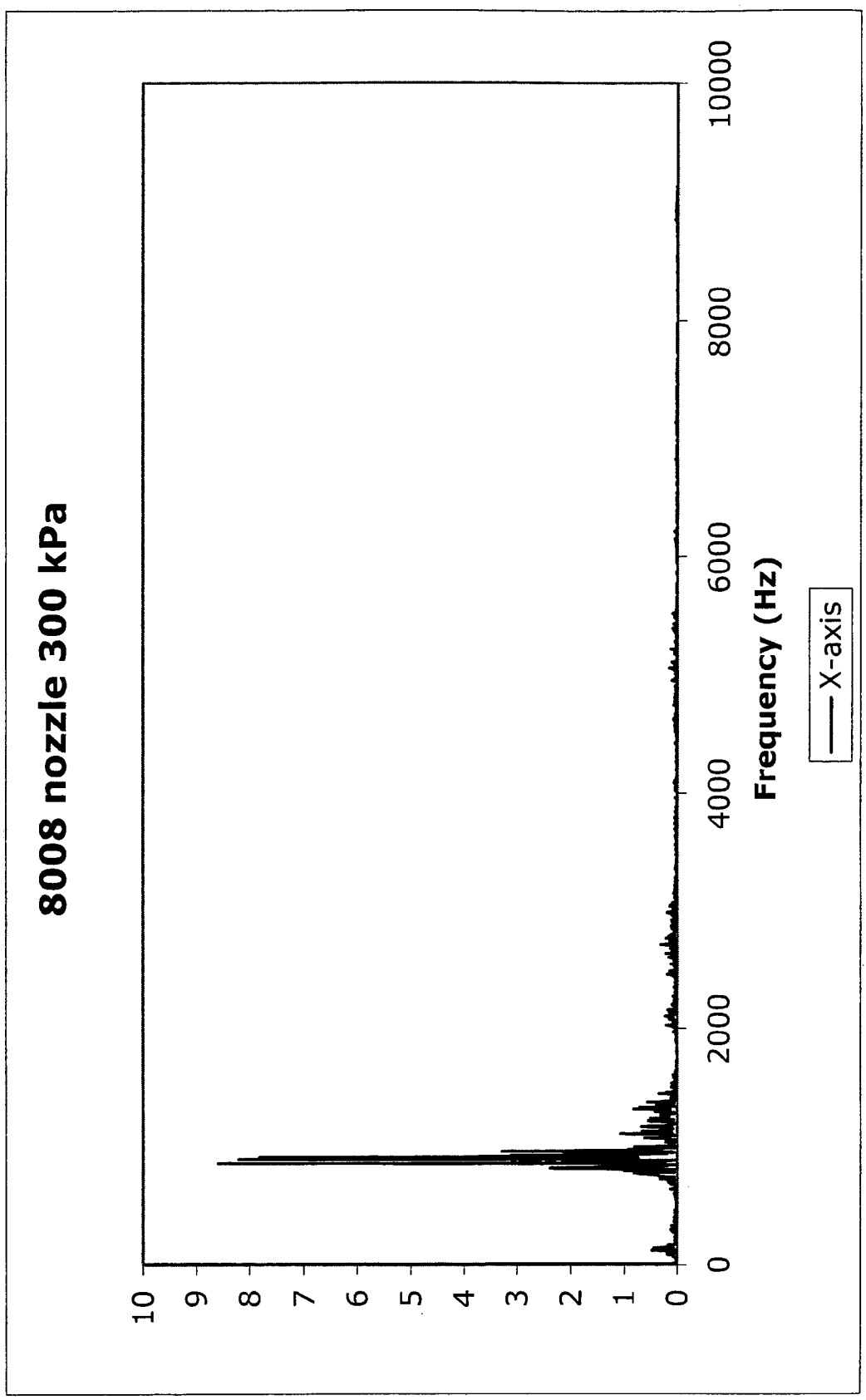
Figure 4Q:
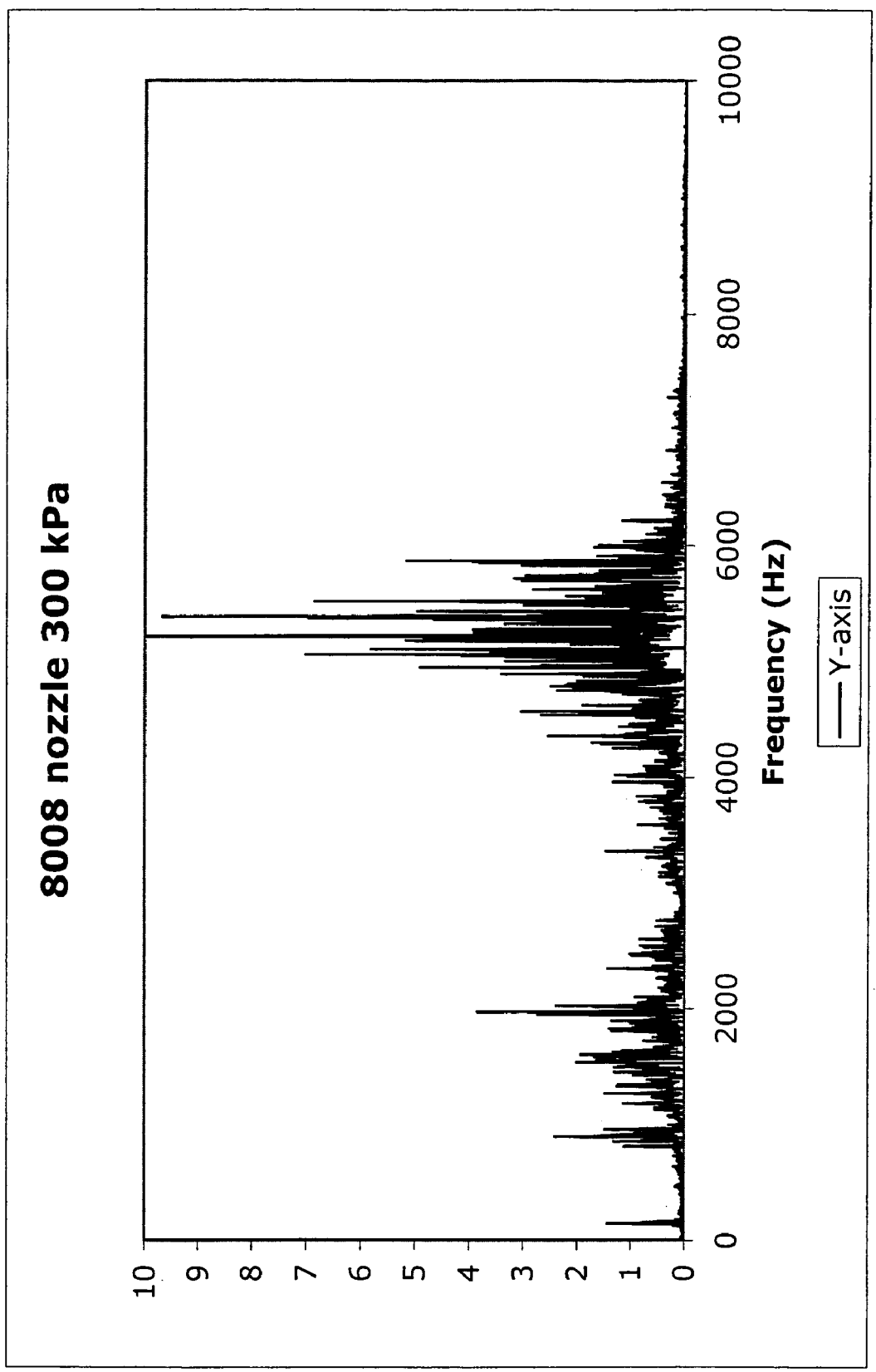
Figure 4R:
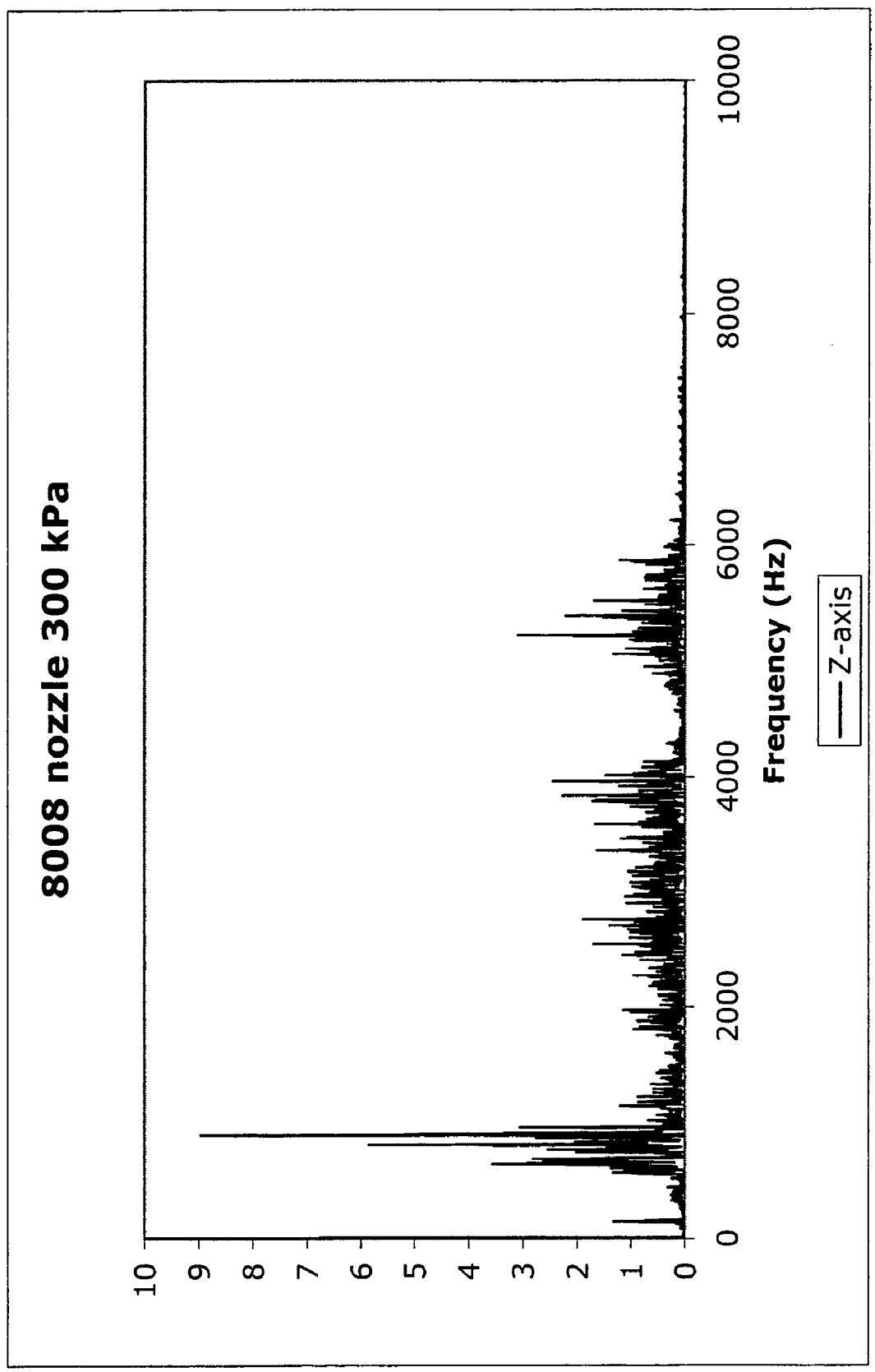
Figure 5A:
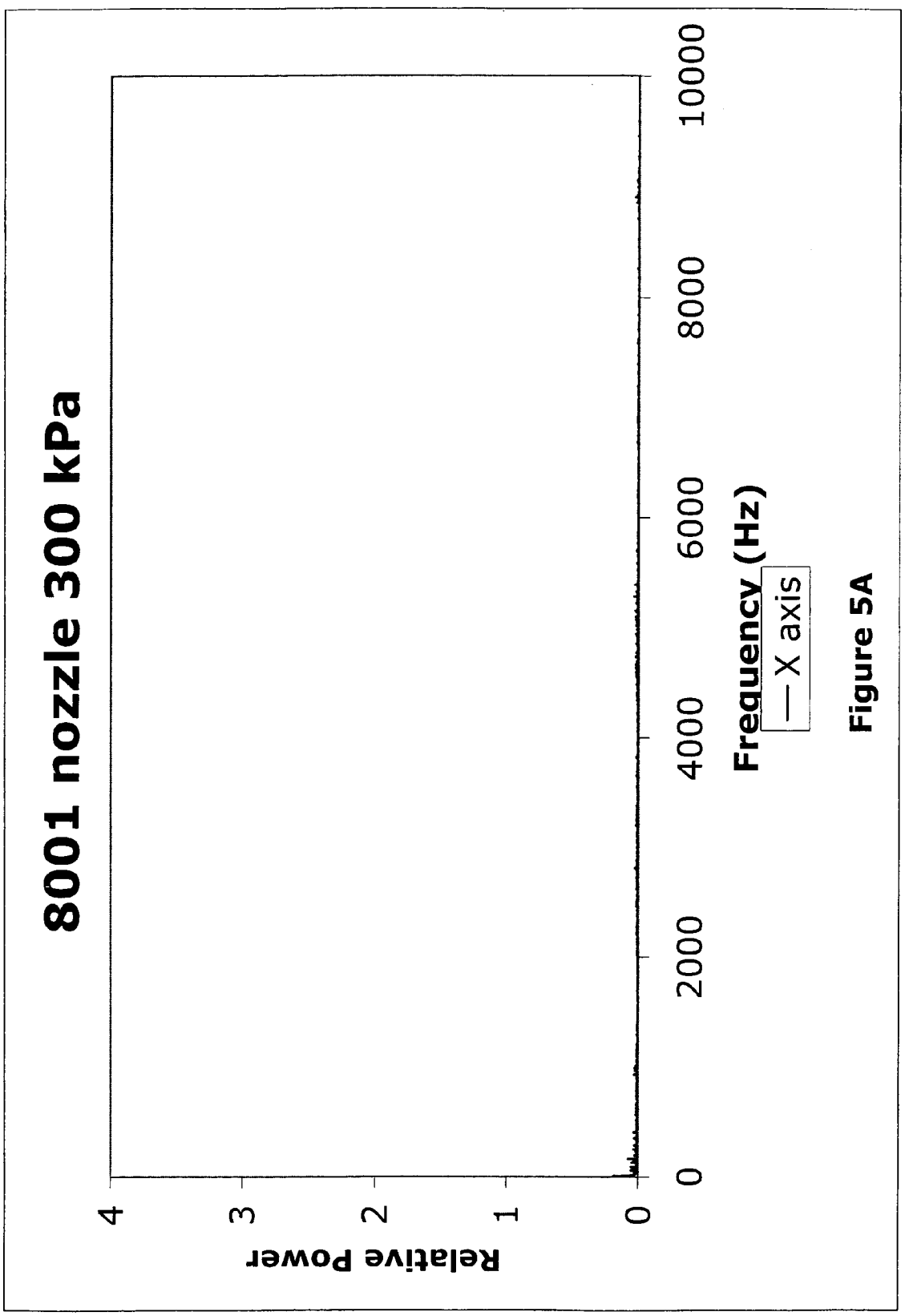
Figure 5D:
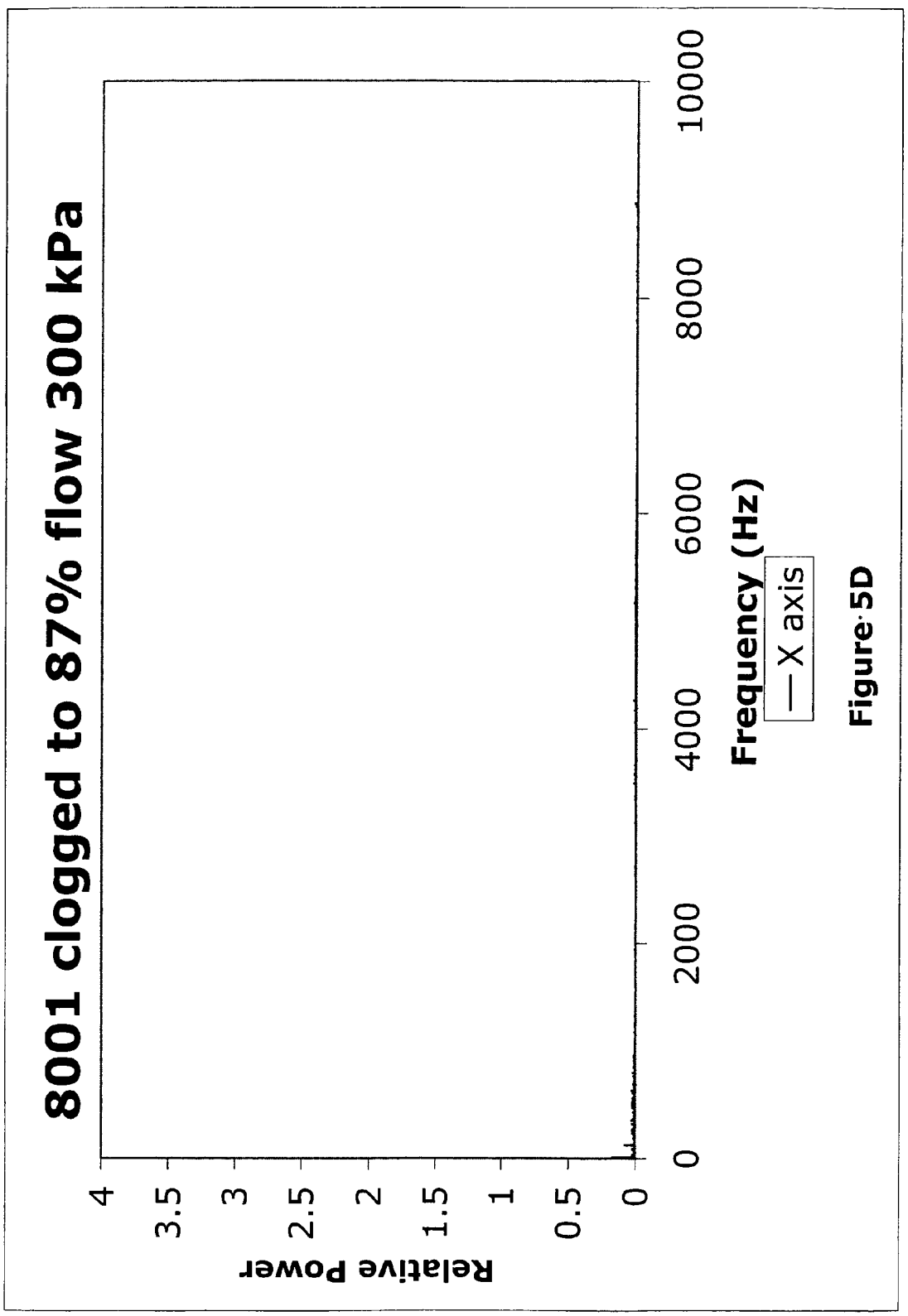
Figure 5E:
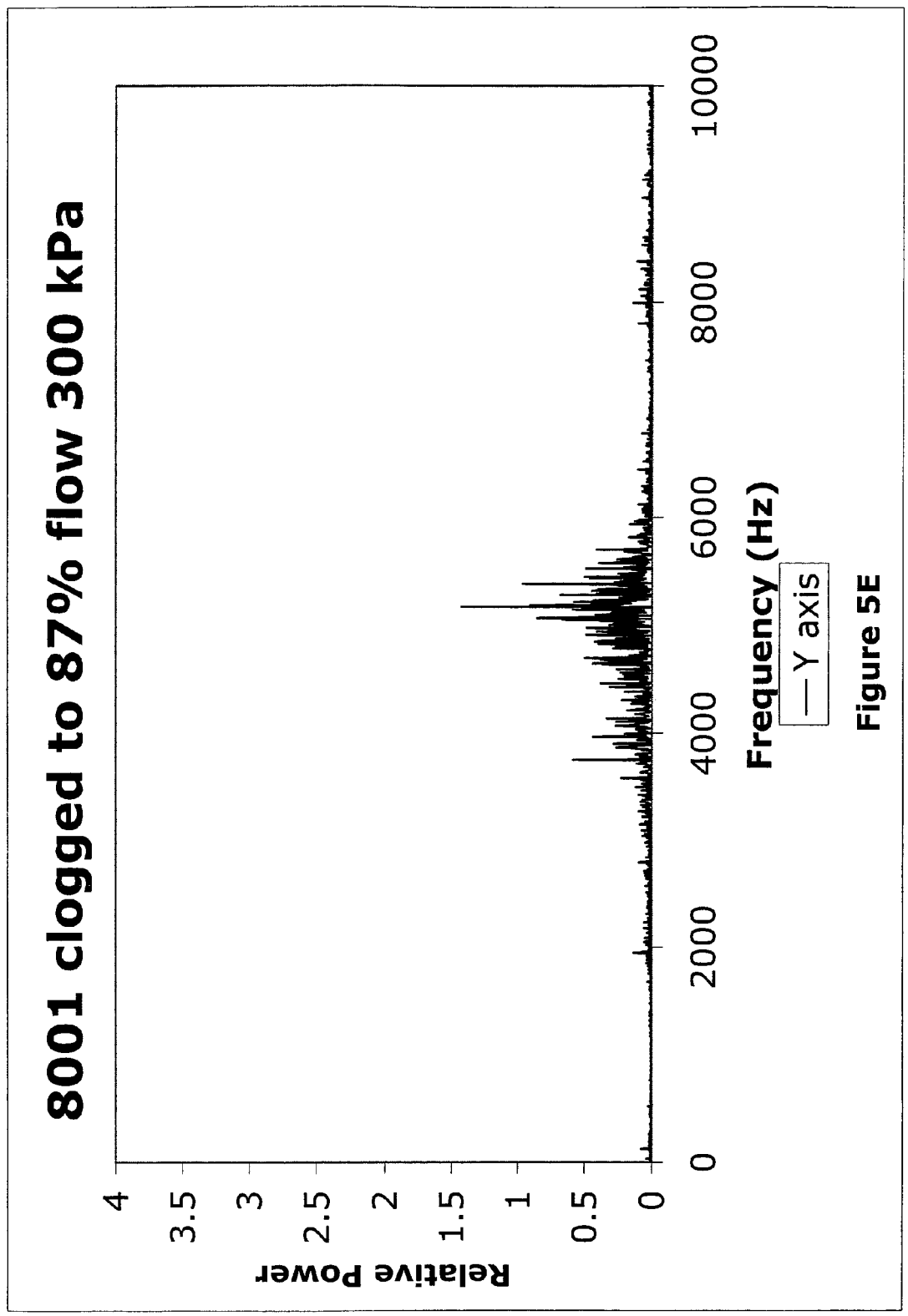
Figure 5I:
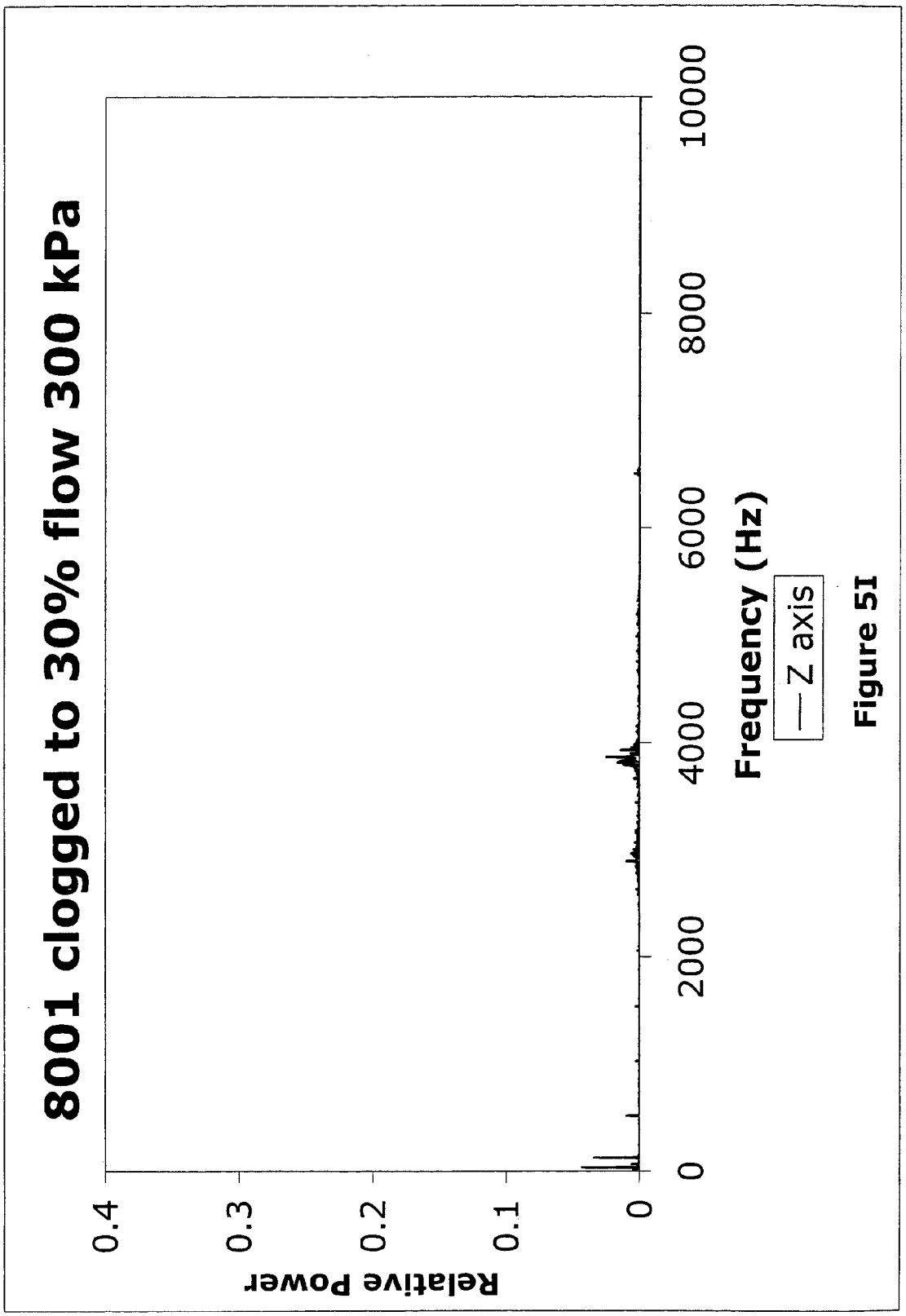
Figure 5K:
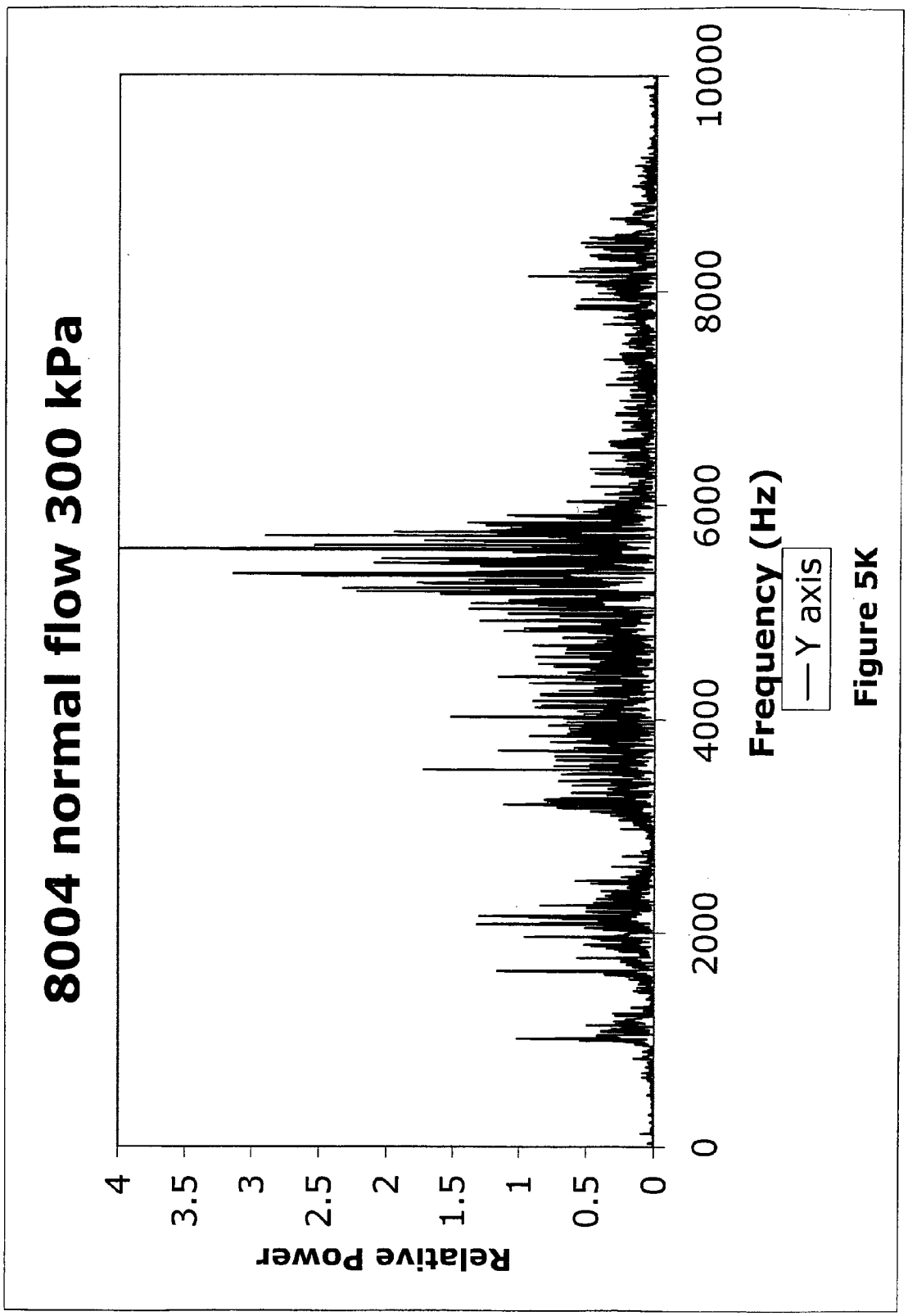
Figure 5L:
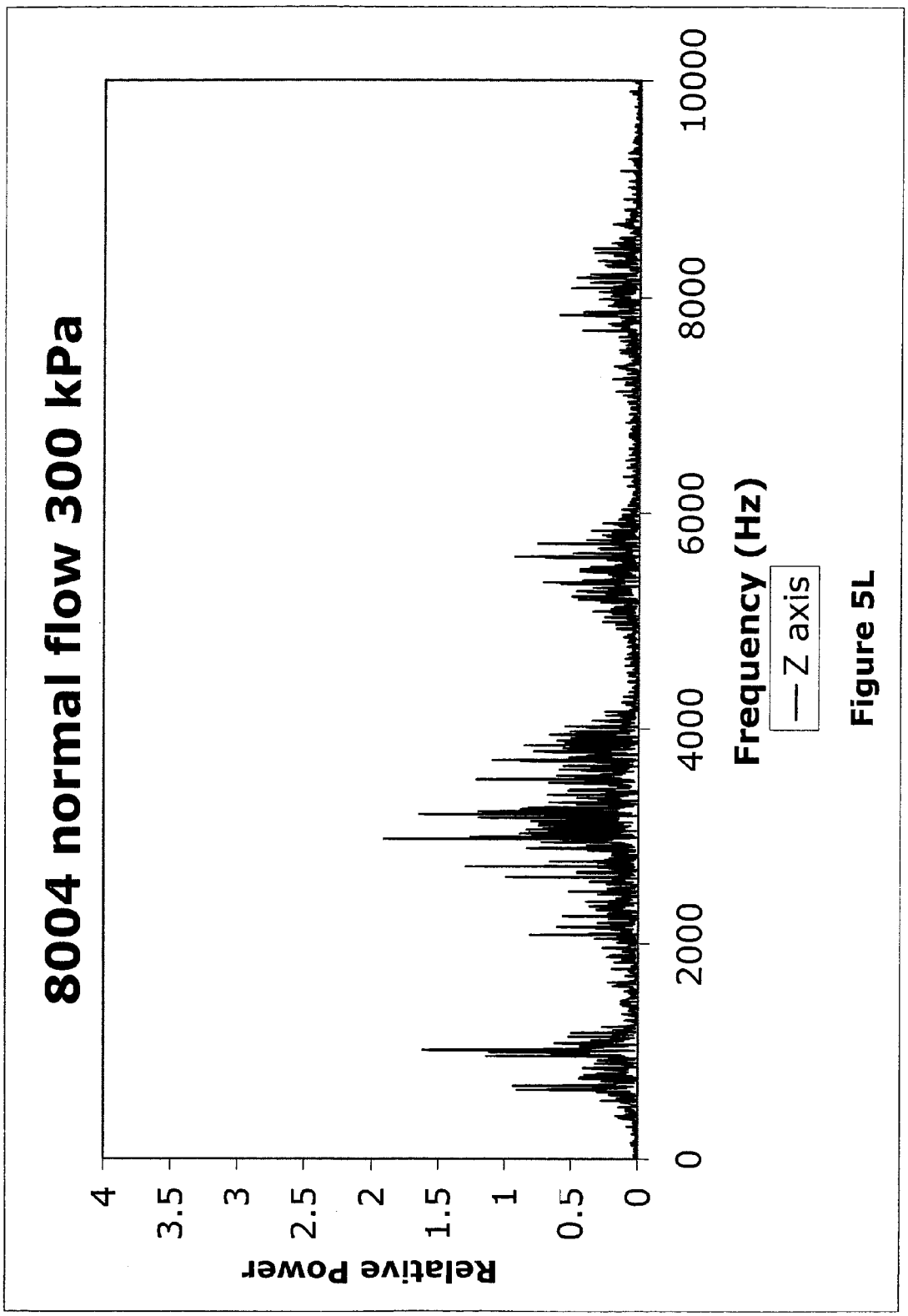
Figure 5M:
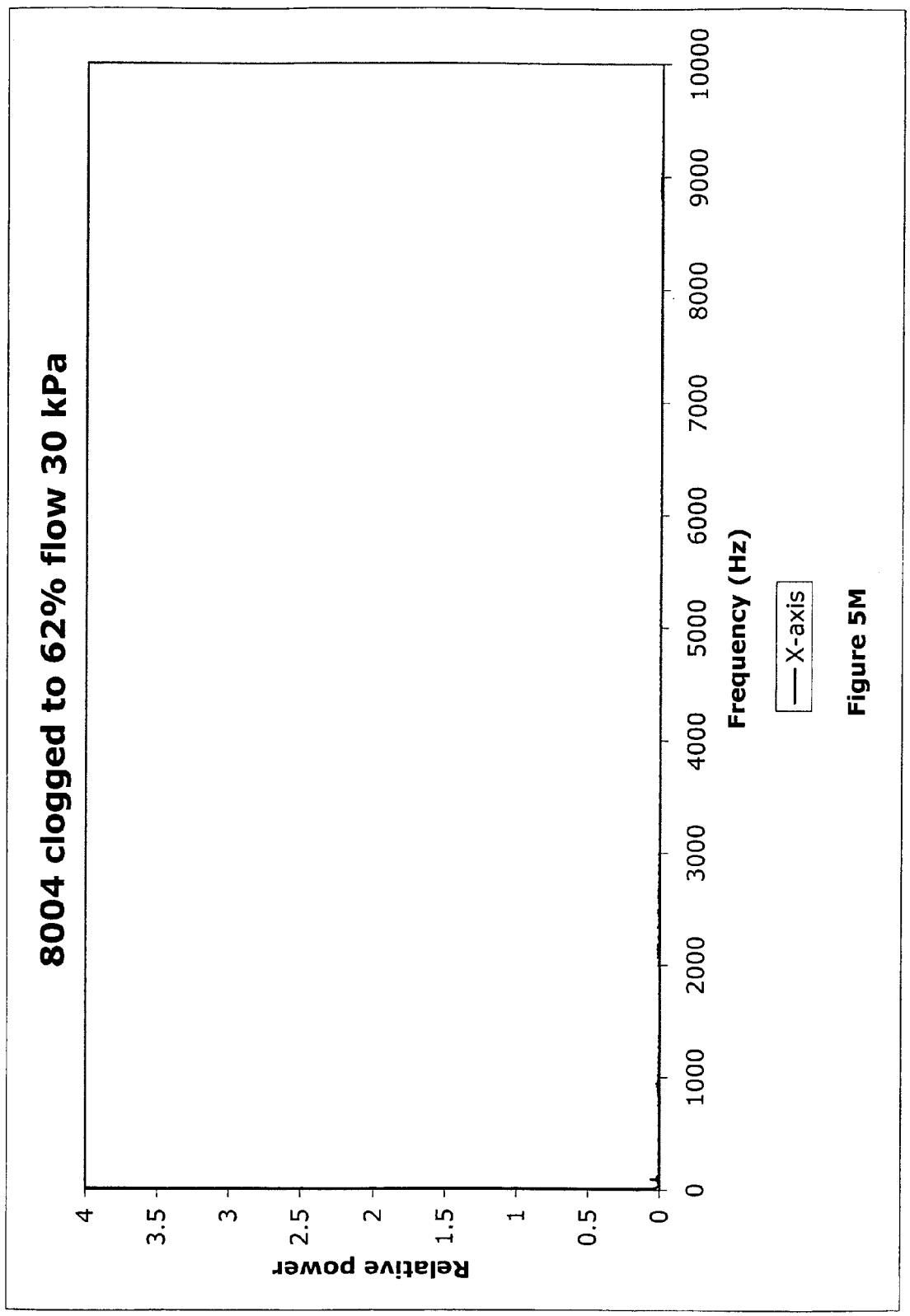
Figure 50:
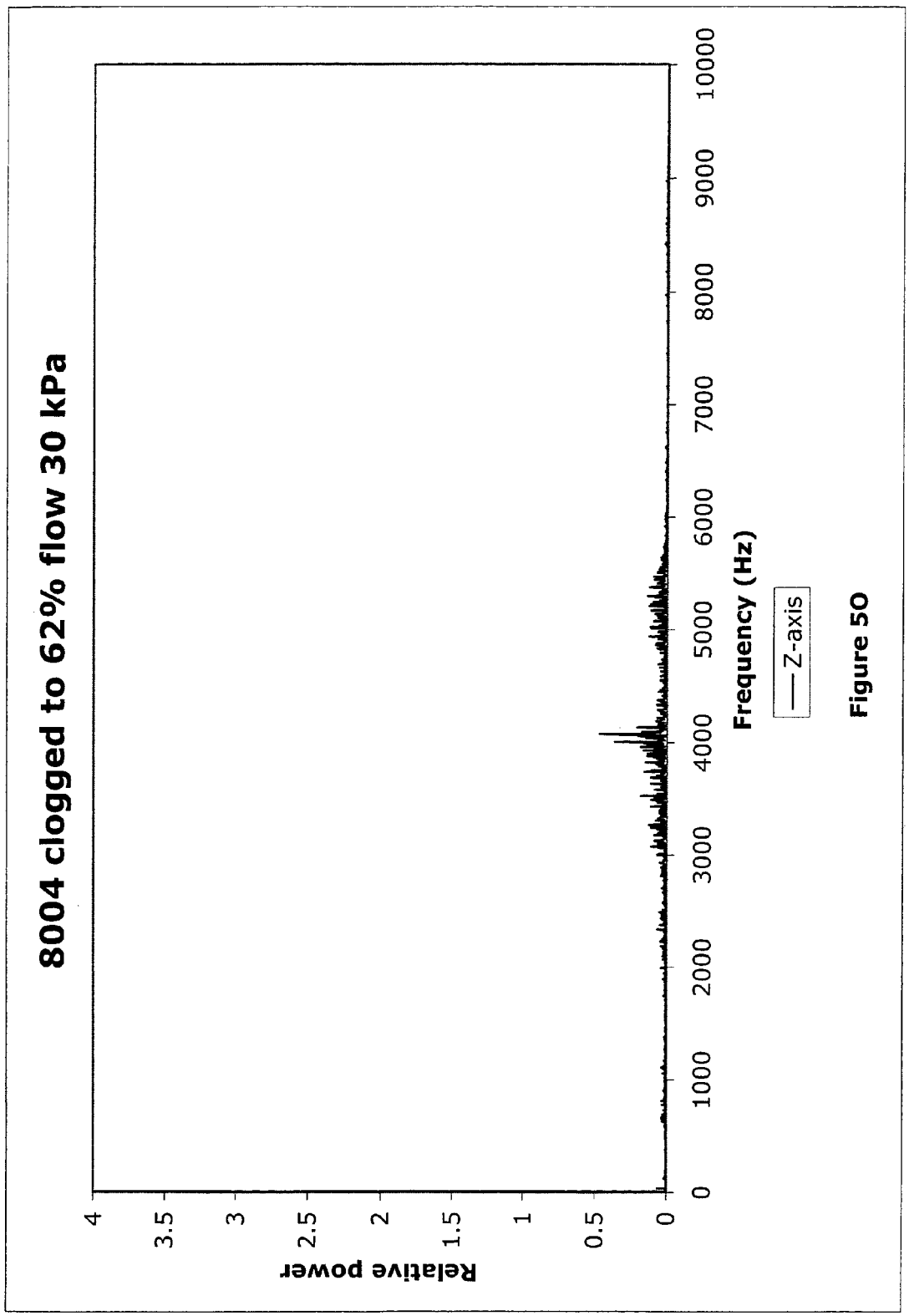
Figure 5Q:
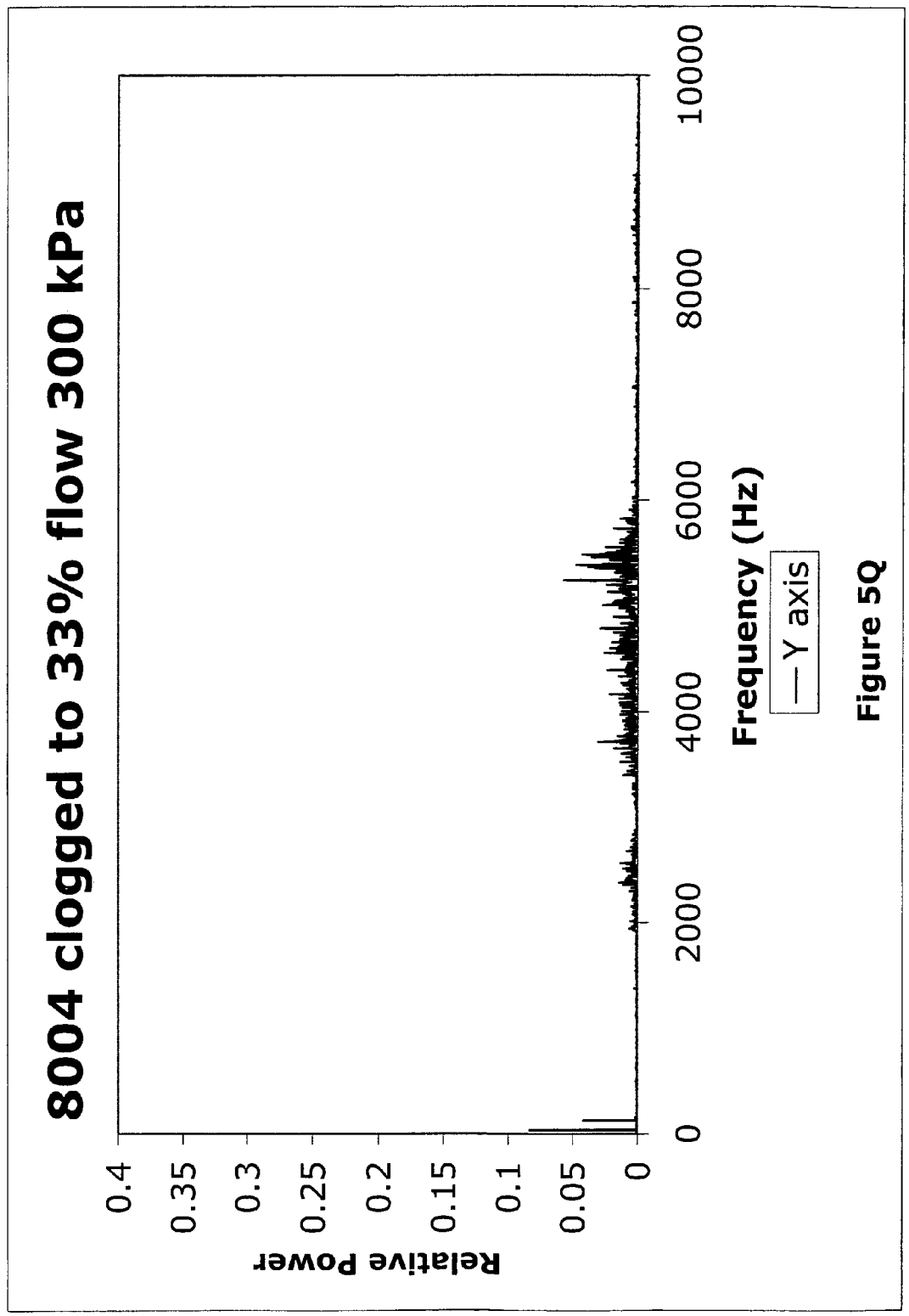
Figure 5R:
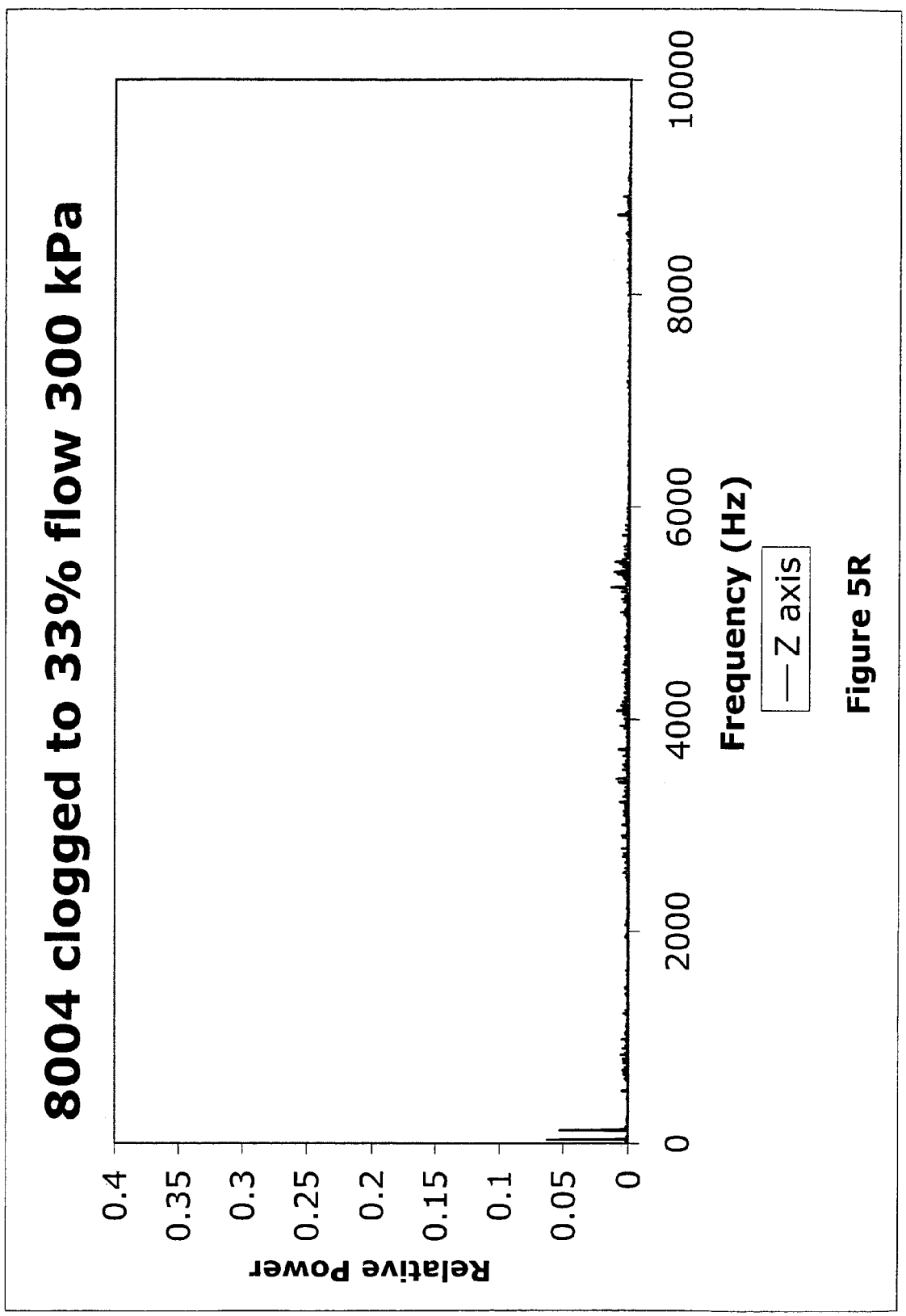

The time base data are shown in FIGS. 4A through 4C (nozzle 8001), 4G through 4I (nozzle 8004), and 4M through 4O (nozzle 8008), while the power spectra for the entire runs (0.2 s) are shown in FIGS. 4D through 4F (nozzle 8001), 4J through 4L (nozzle 8004), and 4P through 4R (nozzle 8008). In this example, vibrations were monitored in the X direction (FIGS. 4A, 4G and 4M), the Y direction (FIGS. 4B, 4H and 4N), and the Z direction (FIGS. 4C, 4I and 4O).

The results in FIG. 4 were very typical of data observed in all experiments. The trends and conclusions are:
- Vibration profiles were stable and very repeatable.
- X-axis vibration was minimal
- Y-axis vibration was the most significant and centered in the 5.2 to 5.4 kHz bands.
- Z-axis vibration was substantial and was more widely dispersed across bands than Y-axis.
- Amplitude of vibration was correlated with and significantly increased with flow rate.
- Differences between nozzles were easily distinguished both in time and frequency domains.

Upon inspection of the spectral results for all test runs, the consistency of Y-axis vibration (FIGS. 4B, 4H and 4N) centered in the 5.3 kHz range led to a concern that the source of the vibration could possibly have been the liquid pump or perhaps bypass flow in the system. Test runs on the single nozzle test stand (with no pump, bypass flow or other mechanical components) and with the 10 kHz teardrop accelerometer confirmed that trends in Y-axis vibration were not from extraneous sources of motion. Similarly, potential sources of electrical noise were also eliminated. The conclusion was that the 5 kHz vibration is characteristic of the flat fan type of nozzle. A further hypothesis is that the frequency may be characteristic of the sheet breakup during spray formation. The Y-axis may be affected by vibration of the liquid sheet across the thin layer. This is also the motion that leads to sheet breakup and droplet formation. Liquid sheet velocities for flat fan nozzles are in the 15-20 m/s range. Strobe inspection of sheet breakup revealed wavelengths on the order of 3-4 mm. A 4 mm wavelength in a 20 m/s sheet would have a characteristic frequency of 5 kHz; therefore, it is possible that the 5 kHz energy is from the sheet break up.

To further investigate the characteristic vibration, a series of "clogged" nozzles were created by placing small beads of epoxy adhesive in the nozzle orifices. Once cured, the epoxy clogs served as a repeatable source of malfunction for a nozzle. The spray patterns and relative flow rates for a number of the test nozzles are shown in FIG. 3. The resulting power spectra for representative example test conditions are shown in FIGS. 5 and 6.

Figure 3C:
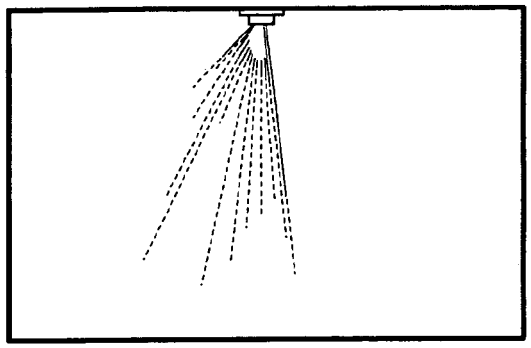
FIGS. 3A through 3P are nozzle configurations used in the examples.
Figure 3D:
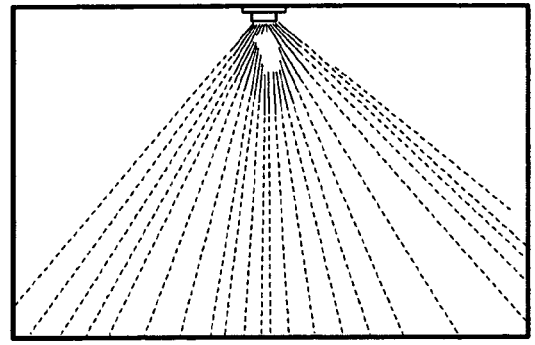

Referring to FIGS. 3A through 3P, various spray patterns are shown. Specifically, FIGS. 3A through 3J illustrate nozzles having a flow angle of 80%. The nozzles shown in 3K through 3P, on the other hand, have a flow angle of 110%. FIGS. 3A through 3C illustrate a nozzle having a normal flow rate of 0.1 gal/min. In FIGS. 3D through 3H, the standard flow rate is 0.4 gals/min, while in FIGS. 3I through 3M, the flow rate of the nozzle under standard working conditions is 0.8 gals/min. The flow rate of the nozzles shown in FIGS. 3N through 3P when operating properly is 1.0 gals/min.

Figure 3E:
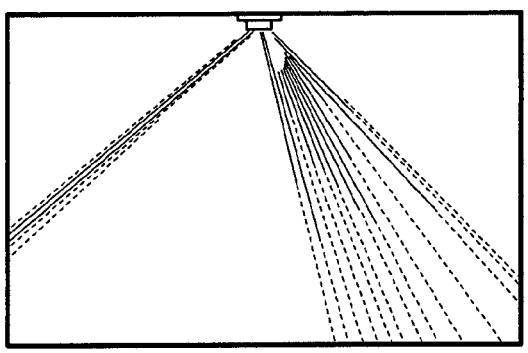
Figure 3F:
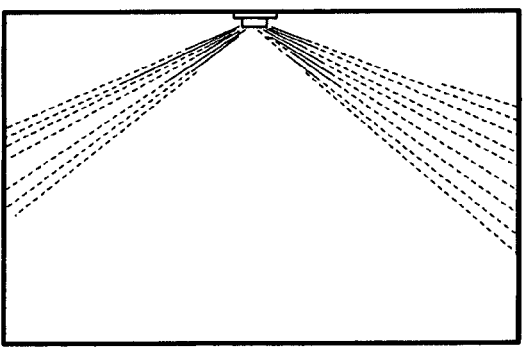
Figure 3G:
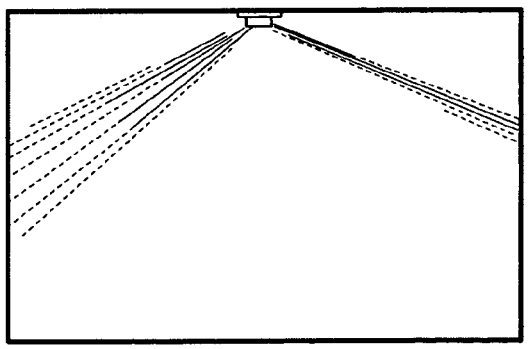
Figure 3H:
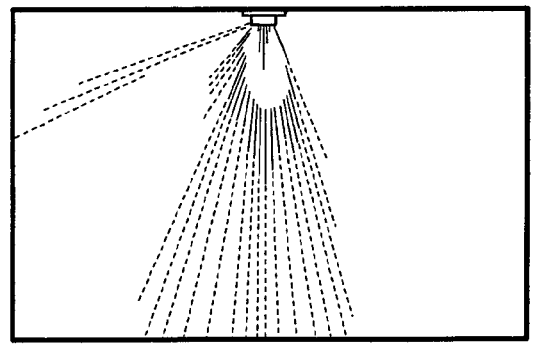
Figure 3I:
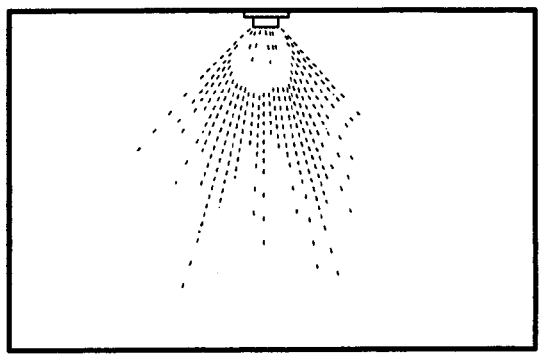
Figure 3J:
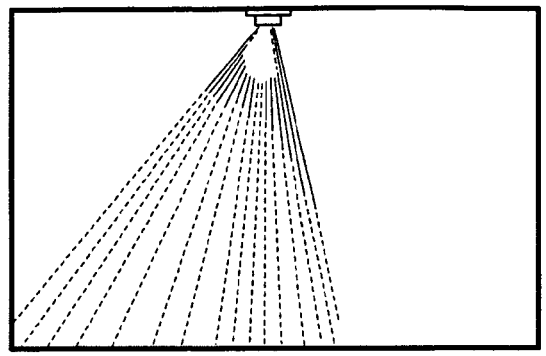
Figure 3K:
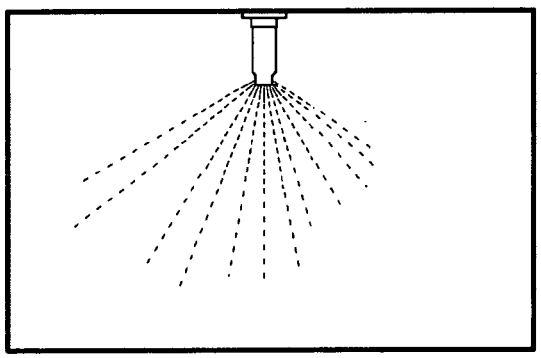
Figure 3L:
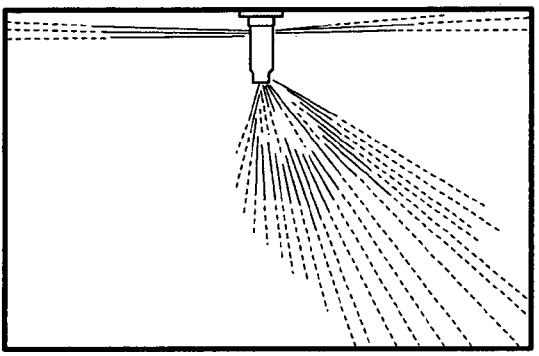
Figure 3M:
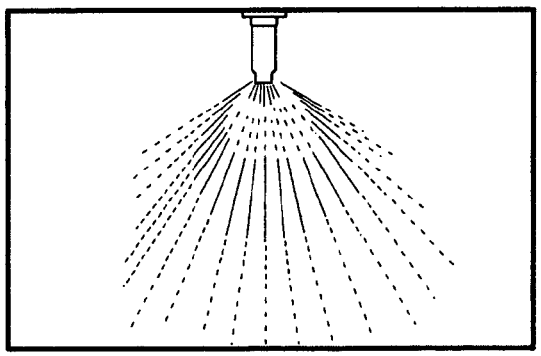
Figure 3N:
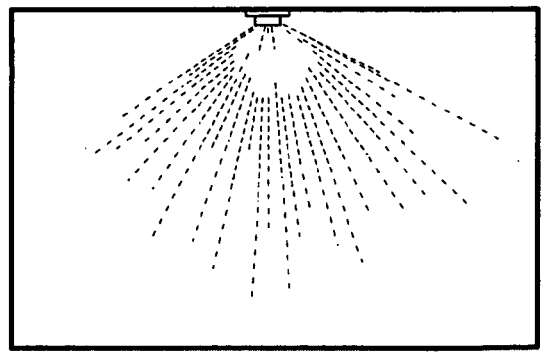

The nozzles illustrated in FIGS. 3A, 3D, 3I, 3K and 3N are intended to show nozzles operating properly. The remaining nozzles, however, have been clogged in order to change the spray pattern and/or the flow rate. For instance, the nozzle illustrated in FIG. 3B is at 30% flow while the nozzle illustrated in FIG. 3C is at 87% flow. The nozzle illustrated in FIG. 3E is at 64% flow, the nozzle illustrated in FIG. 3F is at 52% flow, the nozzle illustrated in FIG. 3G is at 34% flow and the nozzle illustrated in FIG. 3H is at 96% flow. The nozzle illustrated in FIG. 3J is at 47% flow. The nozzle illustrated in FIG. 3L is at 113% flow and the nozzle illustrated in FIG. 3M is at 114% flow. Finally, the nozzle illustrated in FIG. 3O is at 77% flow, while the nozzle illustrated in FIG. 3P is at 48% flow.

Vibration outputs received from the vibration sensors are shown in FIGS. 5 and 6. In particular, the graphs shown in FIG. 5 relate to the nozzles having a 80% flow angle, while the graphs shown in FIG. 6 relate to the nozzles having a flow angle of 110%.

The vibration data, expressed as domain information, for clogged nozzles shown in FIGS. 5D through 5I(8001), 5M through 5R (8004), 6D through 6I (11010), and 6M through 6R (11008) revealed that the amplitude and distribution of vibration is very sensitive to changes in nozzle geometry and partial clogging. Some clogs produced a relatively small change in flow rate but a significant change in spray pattern and quality (droplet size). These changes were clearly reflected in the spectral data for the nozzle operation. Y-axis vibration was very sensitive to spray changes (FIGS. 5B, 5E, 5H, 5K, 5N, and 5Q); however, the X-axis amplitude and frequency distribution were affected less by spray changes (FIGS. 5A, 5D, 5G, 5J, 5M, and 5P). Fifty to 60% changes in flow rate resulted in an order of magnitude change in vibration power. Additionally, it was observed that Z-axis (FIGS. 5C, 5F, 5I, 5L, 5O, and 5R) vibration appeared to be related to flow rate while Y-axis data were more related to spray atomization. Thus, it appears that Z-axis vibration is caused by the nozzle reaction to the force of emitted spray while the origin of Y-axis vibration is the instability of the liquid sheet.

Figure 6A:
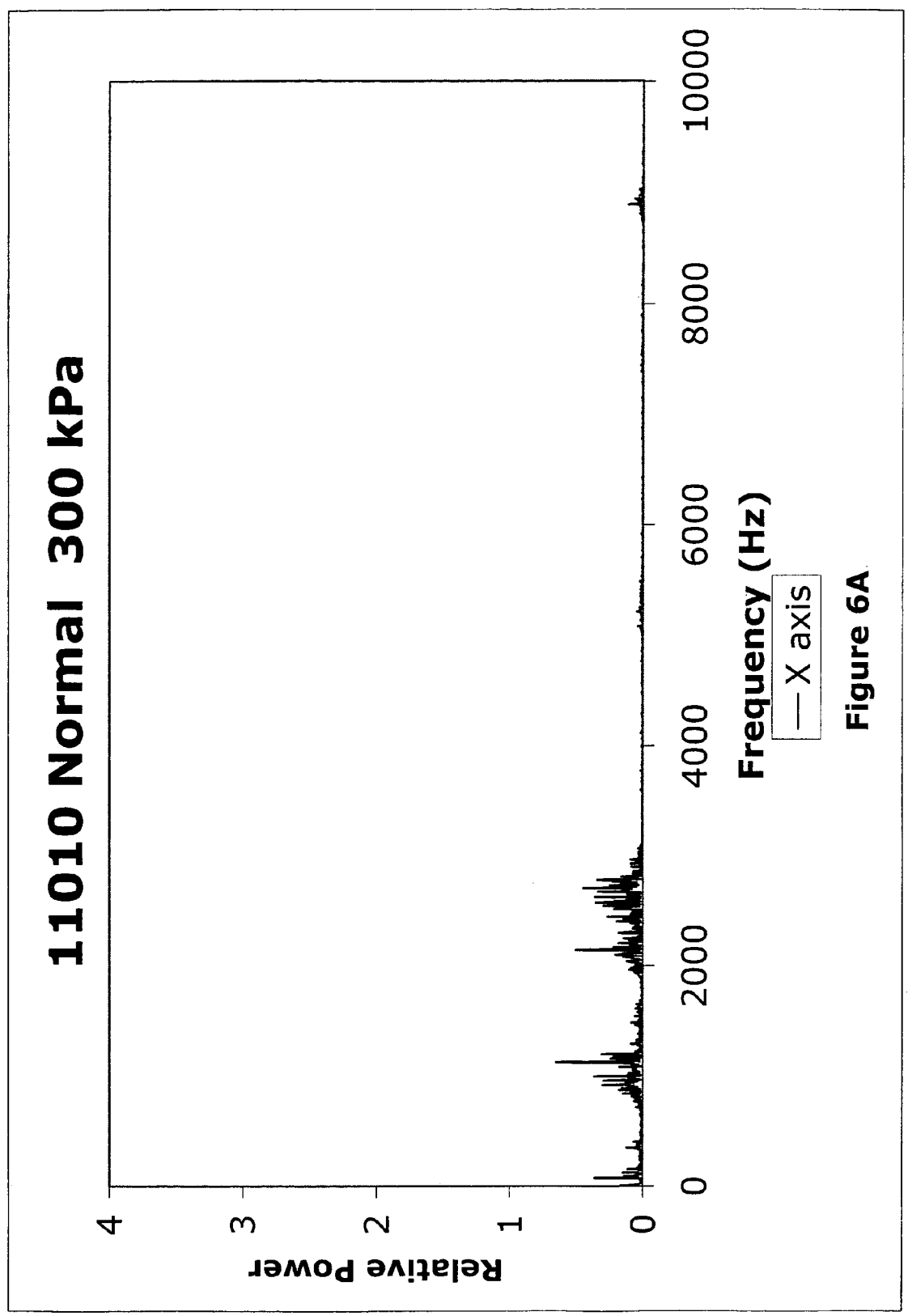
Figure 6D:
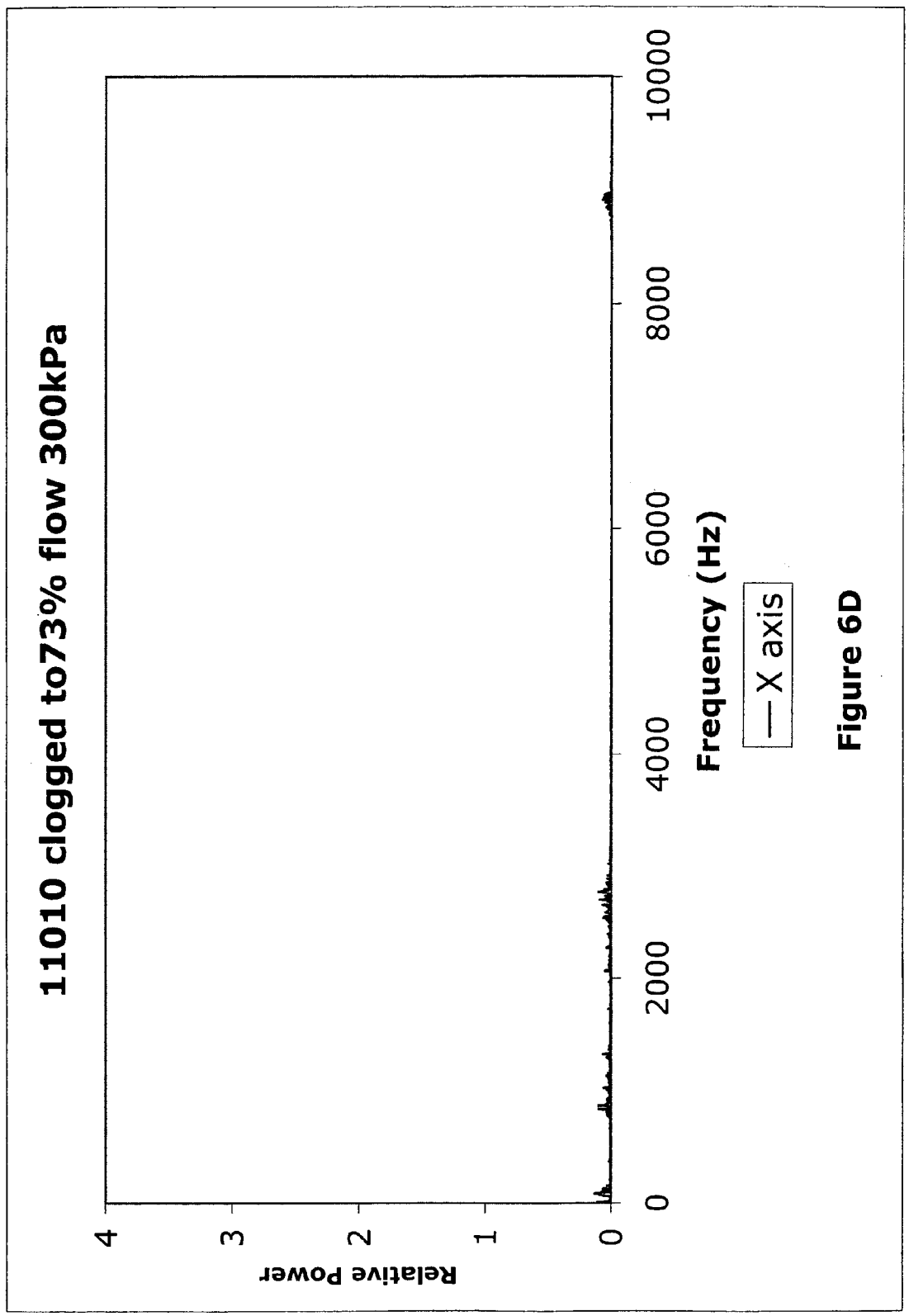
Figure 6G:
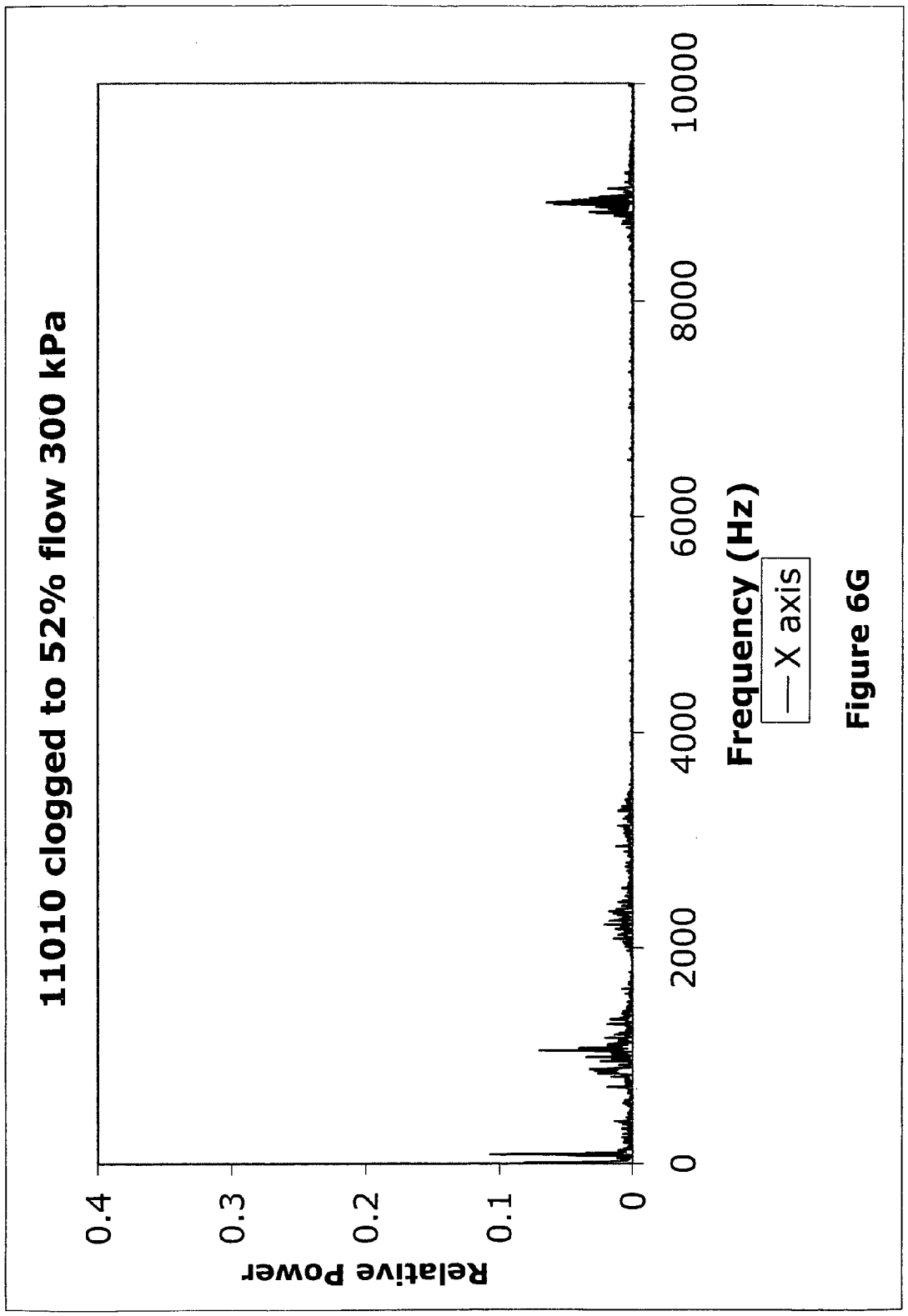
Figure 6H:
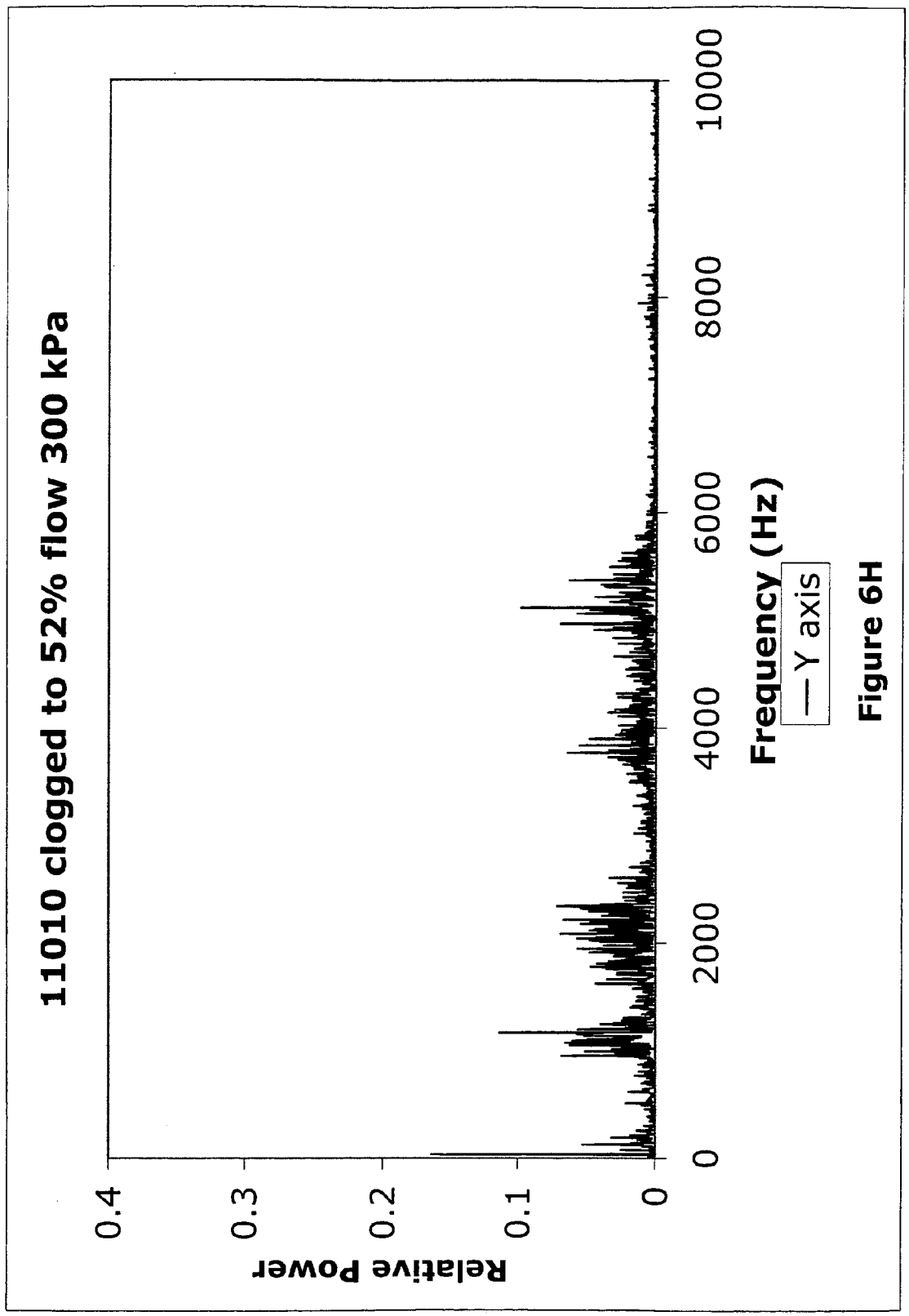
Figure 6I:
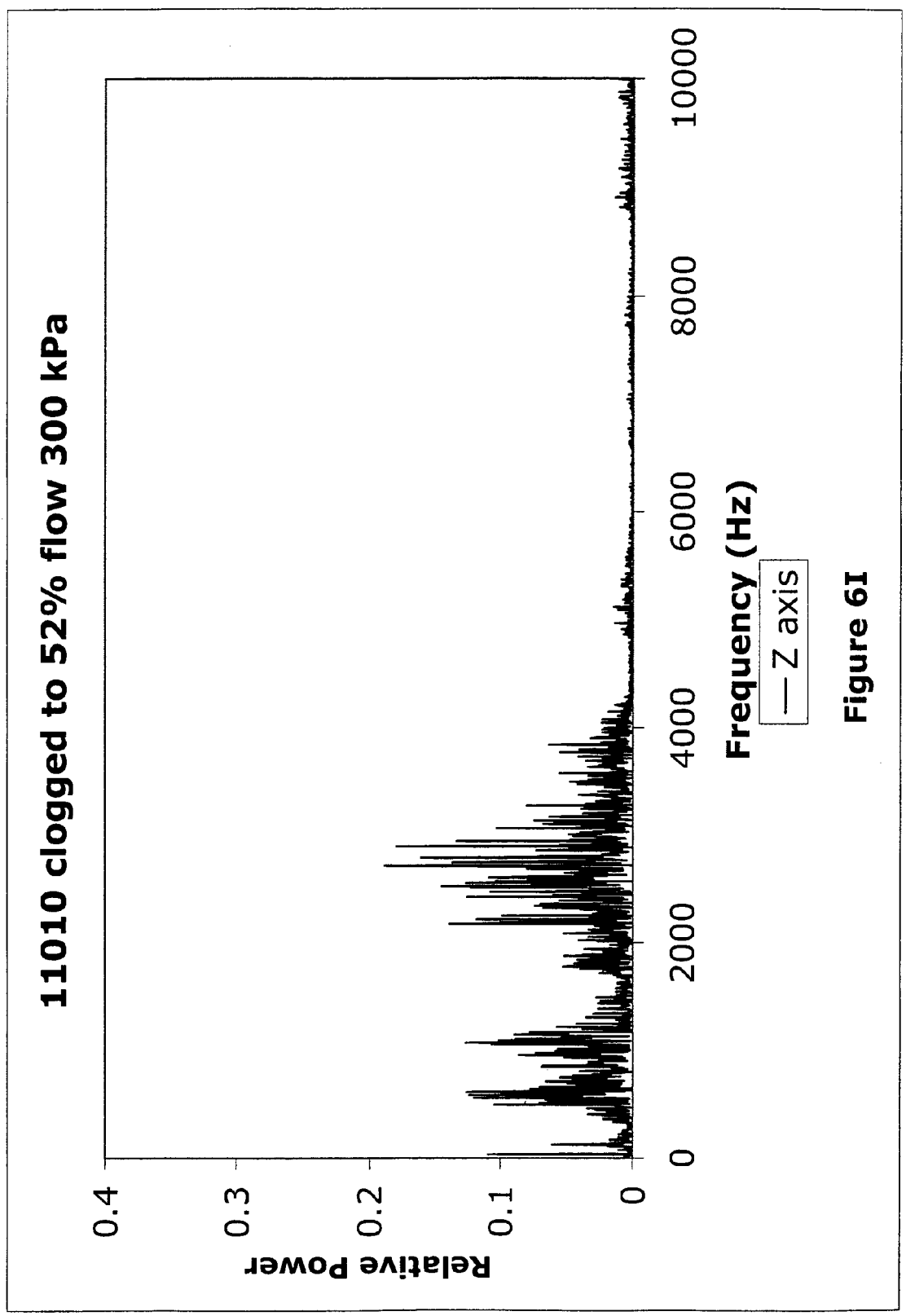
Figure 6J:
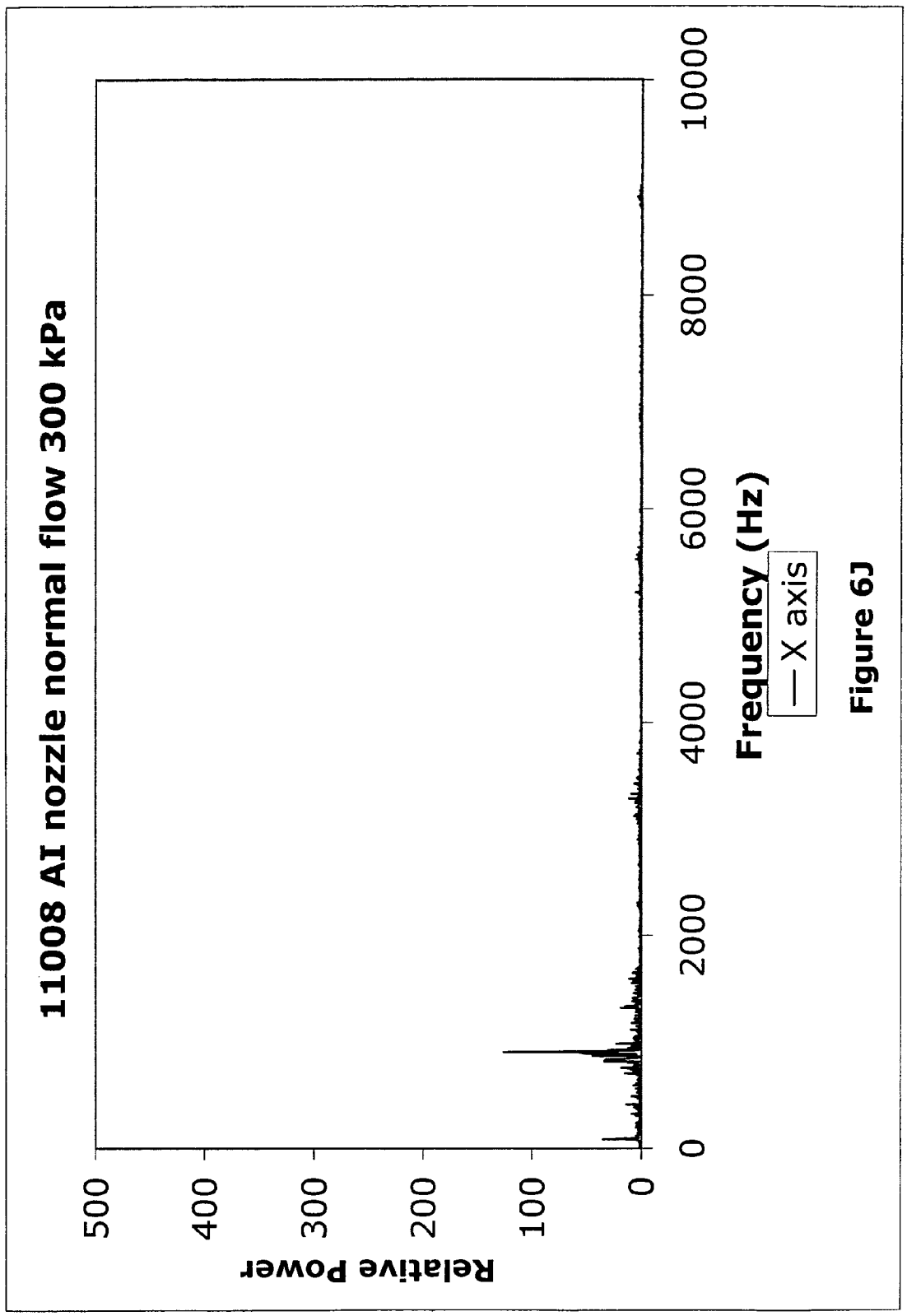
Figure 6L:
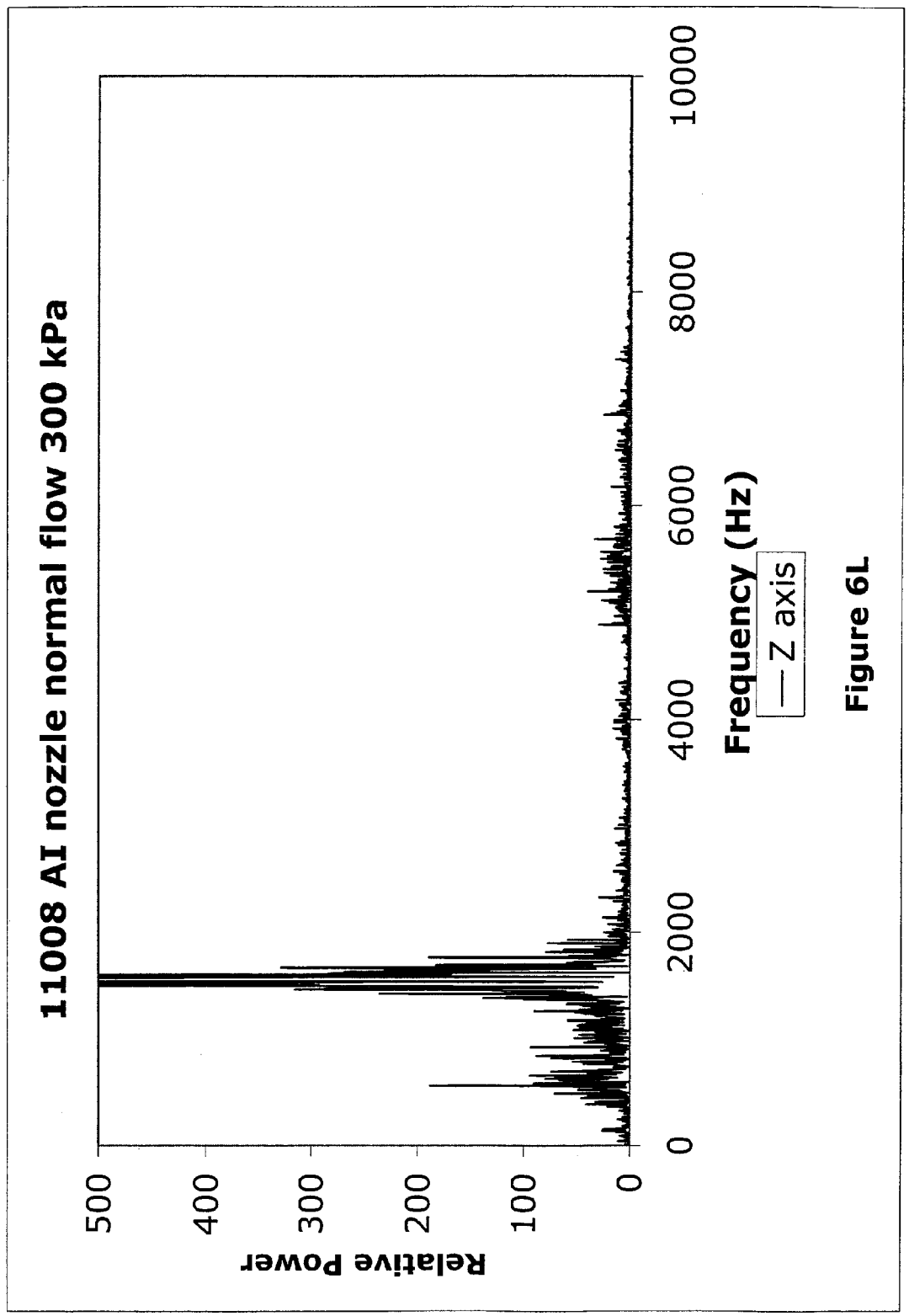
Figure 6M:
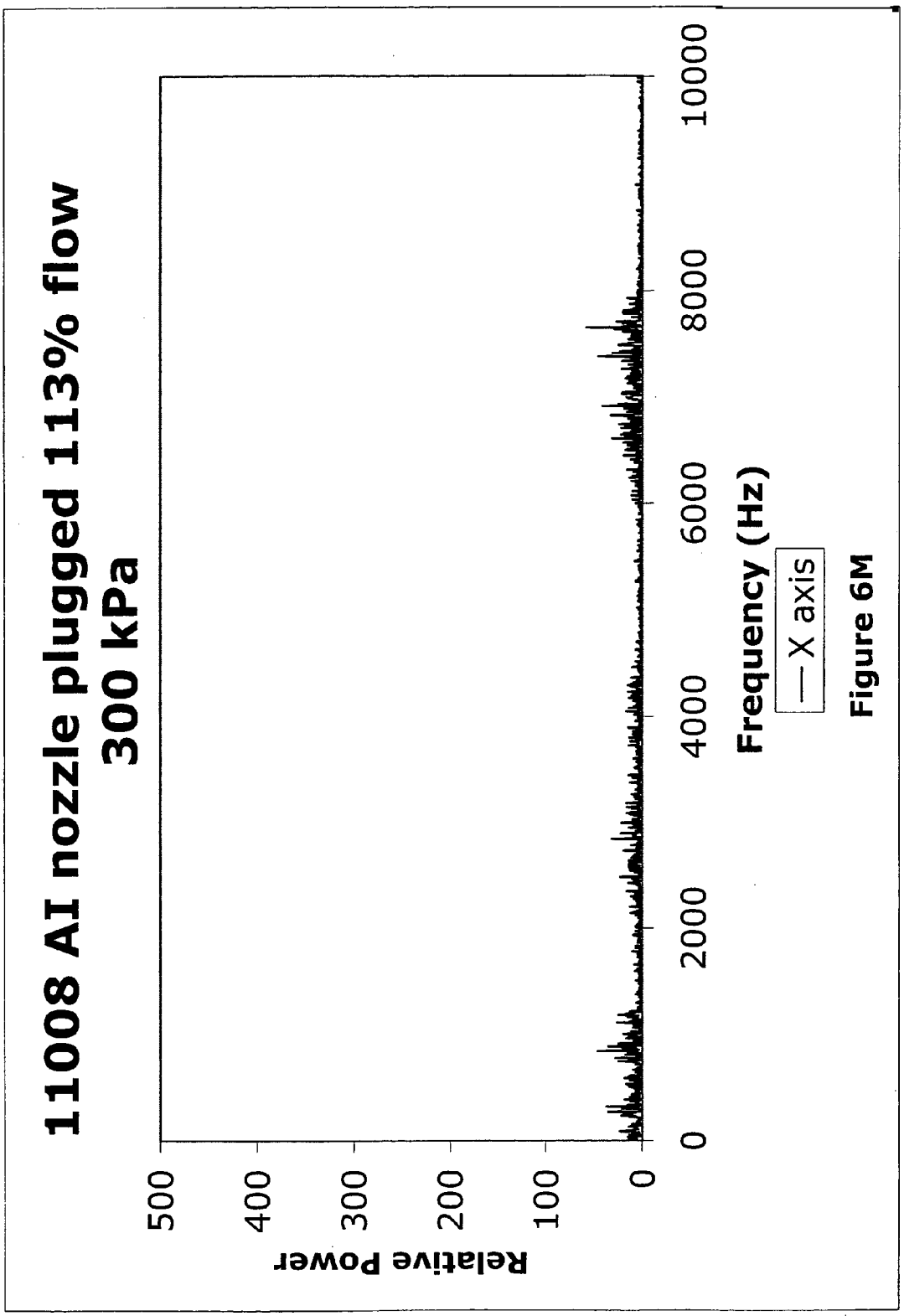
Figure 6Q:
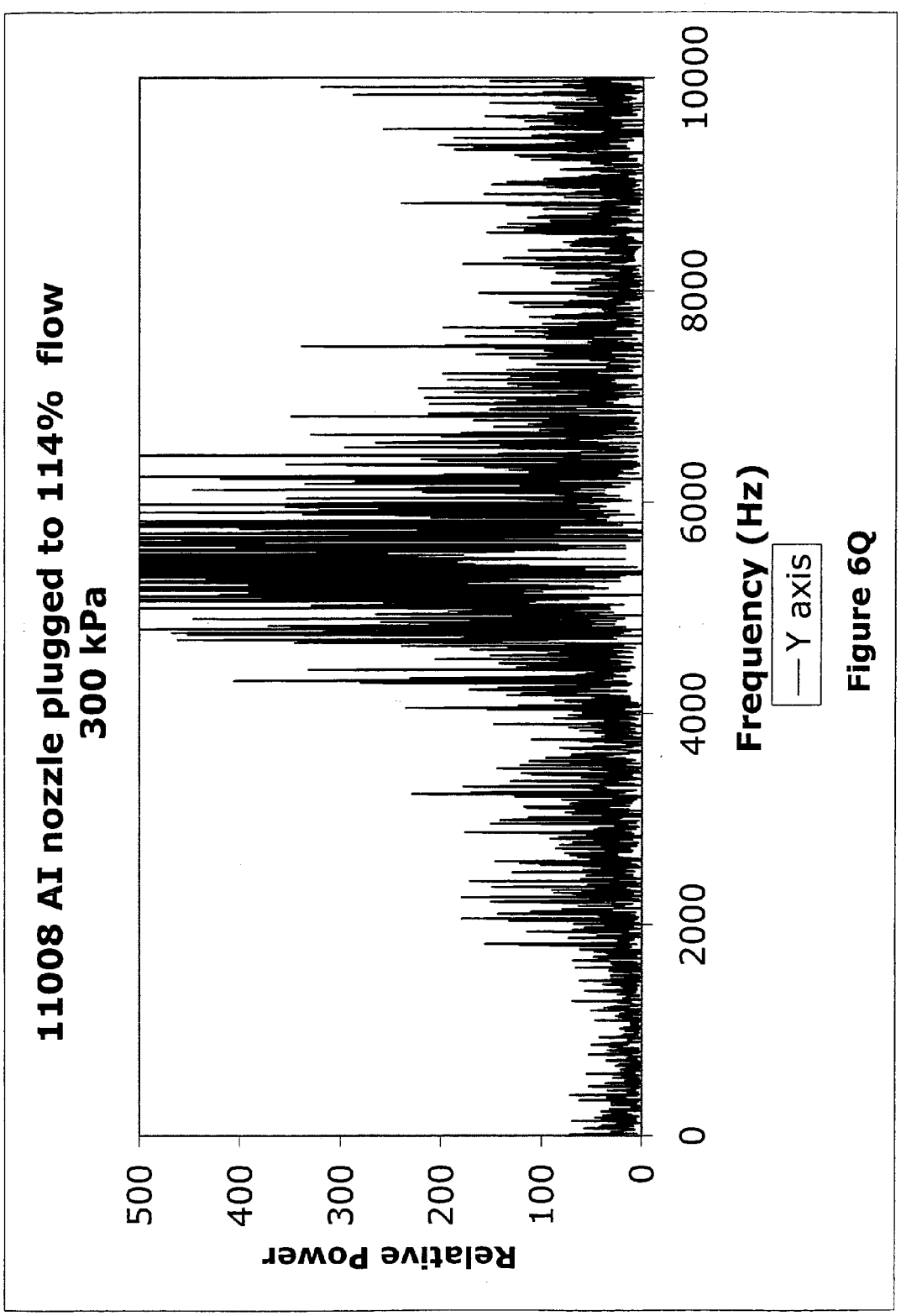

During this experiment, air induction nozzles were also tested. In particular, the air induction nozzles are illustrated in FIGS. 3K through 3M. The vibration frequency outputs for these nozzles are illustrated in FIGS. 6J through 6R. The AI (air induction) nozzles produced vibration of significant magnitude and the vibration increased with plugged nozzles. This is in contrast to the opposite effect observed in conventional (e.g., non air induction) nozzles. The nozzle illustrated in FIG. 3L was partially plugged at the orifice outlet. This disrupted the venturi action that inducts air and liquid flow was discharged through the air inlets, increasing liquid flow rate (FIGS. 6M, 6N, and 6O). The nozzle illustrated in FIG. 3M was created by clogging the air inlets. This also increased flow (FIGS. 6P, 6Q, and 6R). In both cases of malfunctioning air induction nozzles, the resulting vibration signatures were distinctly different from the properly operating nozzle (FIGS. 6J, 6K, and 6L). In addition, the results for a similar non air induction nozzle 11010 are shown in FIGS. 6A through 6I.

The results from the normal and clogged nozzle studies establish that nozzle operation may be monitored through measurement of nozzle vibration. Moreover, the results suggest that signal analysis may be straightforward and potentially no more complicated than amplitude measurement or, a Fourier transform.

EXAMPLE NO. 2

The normal and clogged nozzle tests described above addressed study of continuous spray flow. The next set of experiments addressed the measurement of pulsing flow sprays. The configuration shown in FIG. 2 was used for testing. A standard Capstan Agricultural Systems, Inc. Synchro® 12 Vdc, 7 W, direct-acting electrical solenoid valve was installed in place of the standard diaphragm check valve on the nozzle body assembly. The valve was actuated at with a square wave electrical signal at 15 Hz and a 60% duty cycle using a commercial Capstan Sharpshooter® electronic system. The asymmetry of the 60% duty cycle allowed the on and off times to be easily distinguished in data plots. During all testing, the valves on the nozzles adjacent to the test nozzle were actuated at the same frequency and duty cycle but 180° out of phase; this is identical to how the Capstan blended pulse liquid spray products are configured on field machines. Adjacent nozzle bodies were installed with the same nozzle as the nozzle being tested. This created potential interfering vibration much like what would be present on a commercial field sprayer.

Figure 7B:
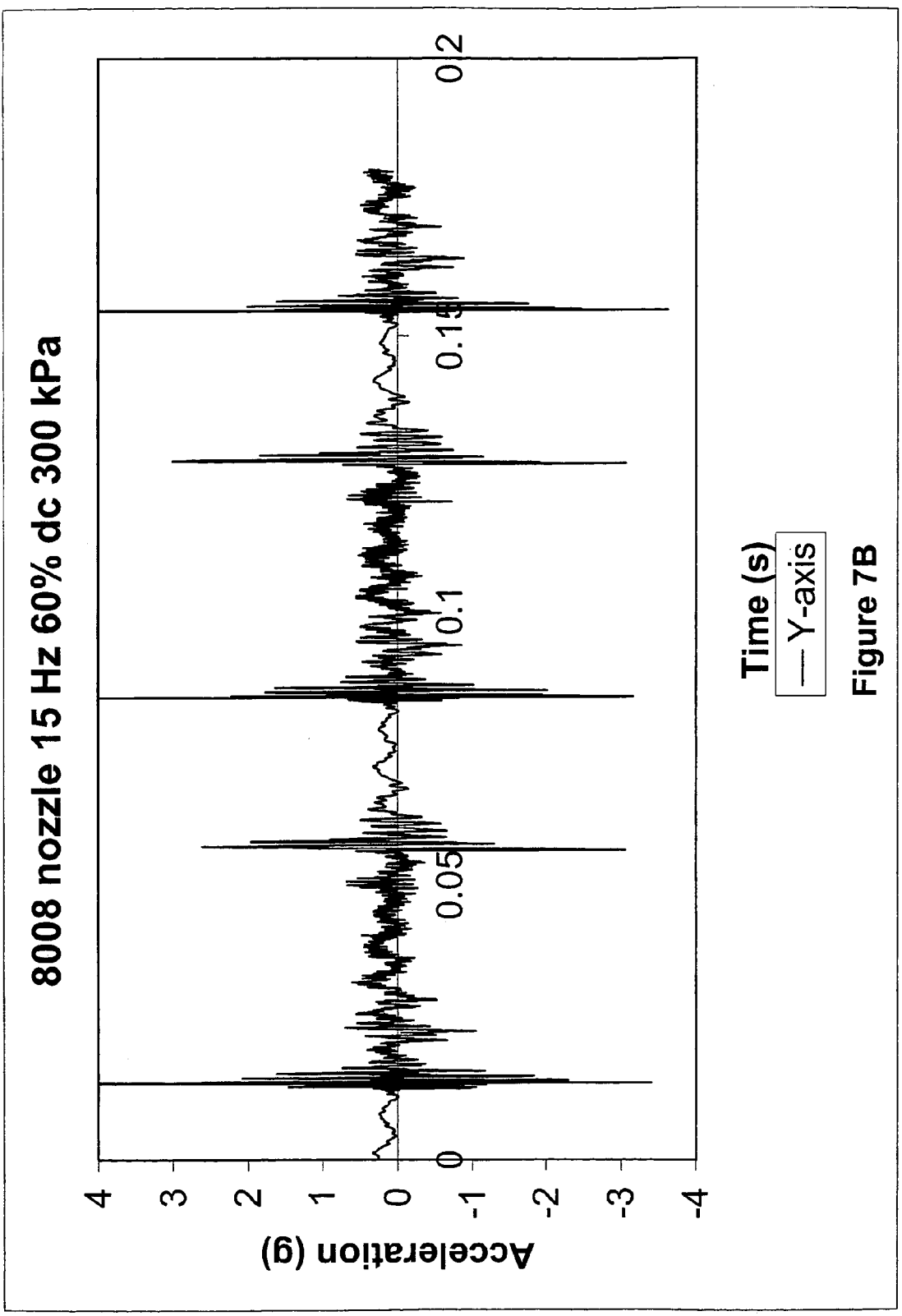
Figure 7C:
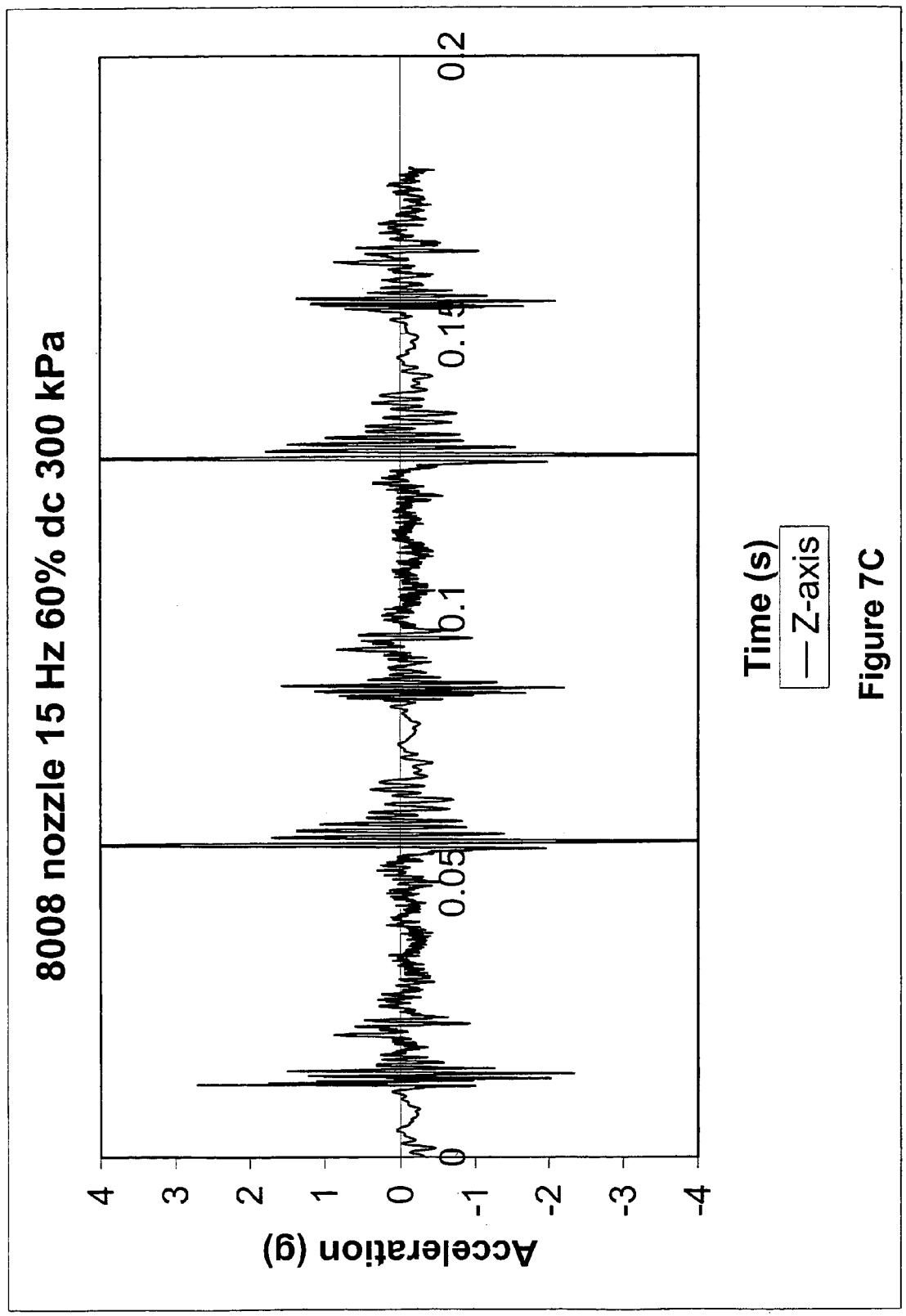

A typical vibration signature of the three axes during pulsed flow with an 8008 (80° flow angle at 0.8 gal/min) nozzle is shown in FIG. 7A, 7B, and 7C. The event at t=0.01 s is the opening of the valve indicated by significant vibration in all axes. Previous experiments had determined that the valve appears to have a natural frequency in the range of 800 Hz; after valve opening and closing, the valve resonates at this frequency. The event at 0.06 s is the valve closing and is characterized by significant vibration in all axes, especially the X-axis. Unlike steady state nozzle flow where very little vibration was observed in the X-axis, pulsed flow was characterized by substantial vibration in the X-axis during valve opening and closing. This is very likely due to the plunger and spring motion of the valve because the reciprocating plunger travel is parallel with the X-axis.

Figure 7D:
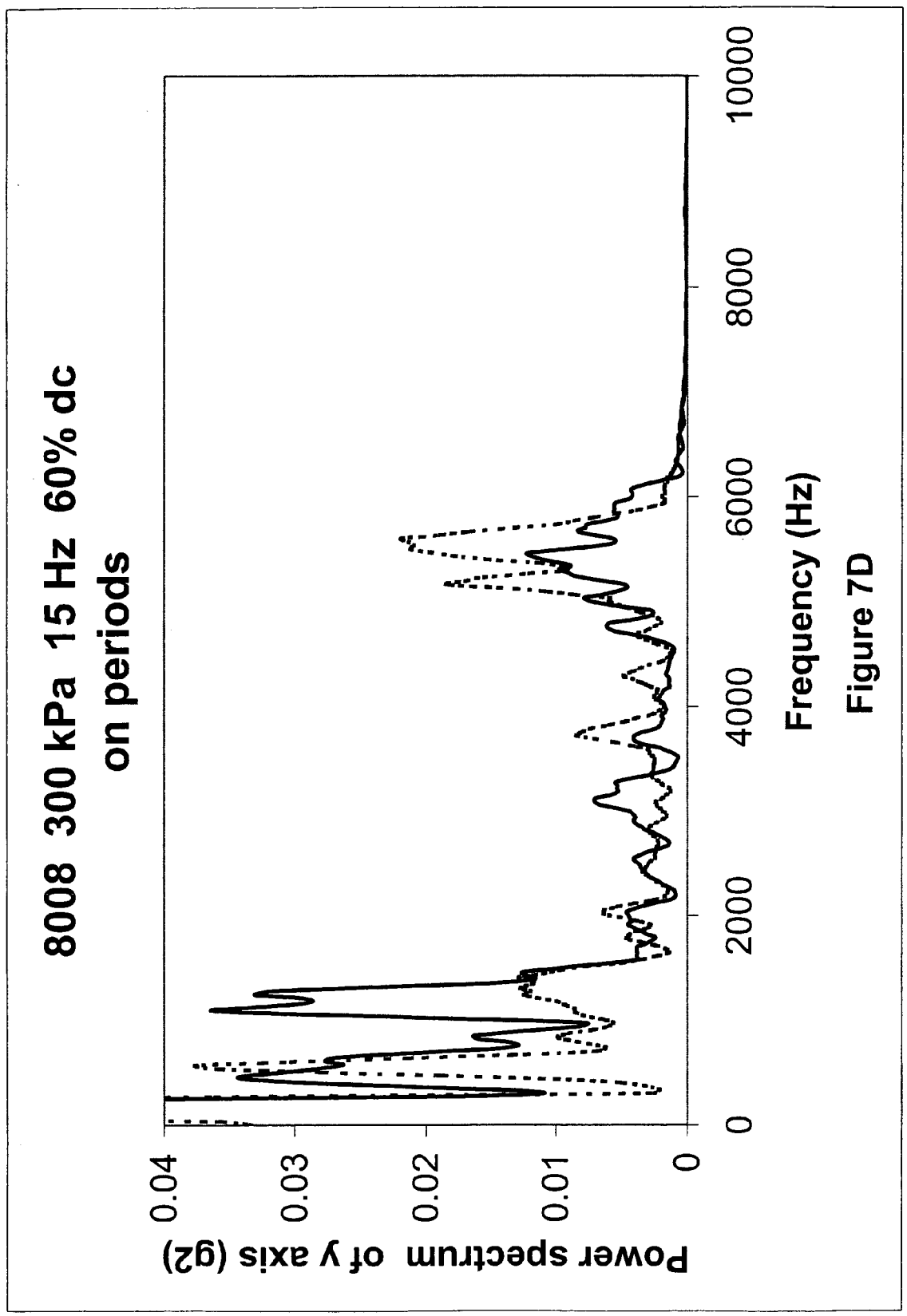
Figure 7F:
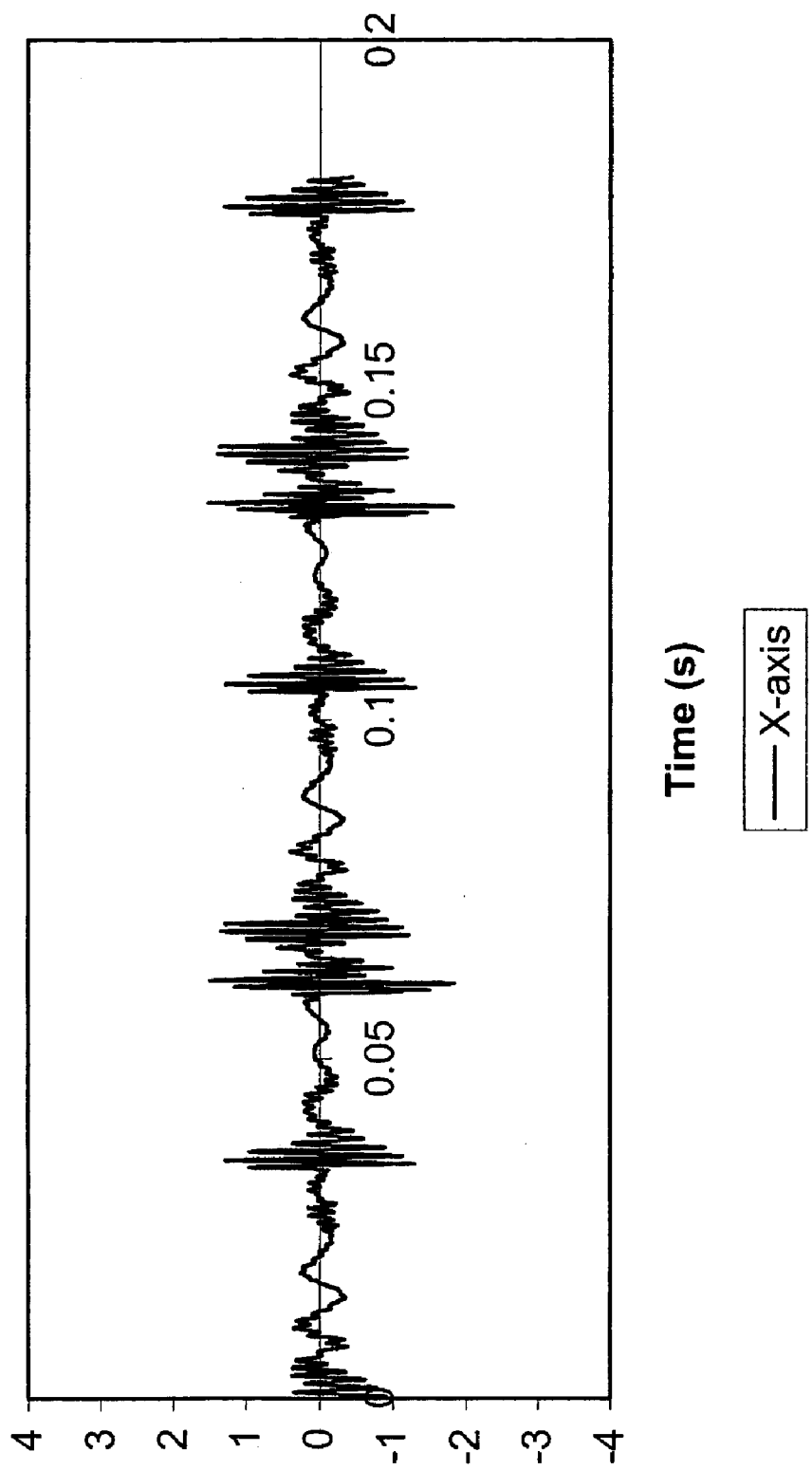
Figure 7G:
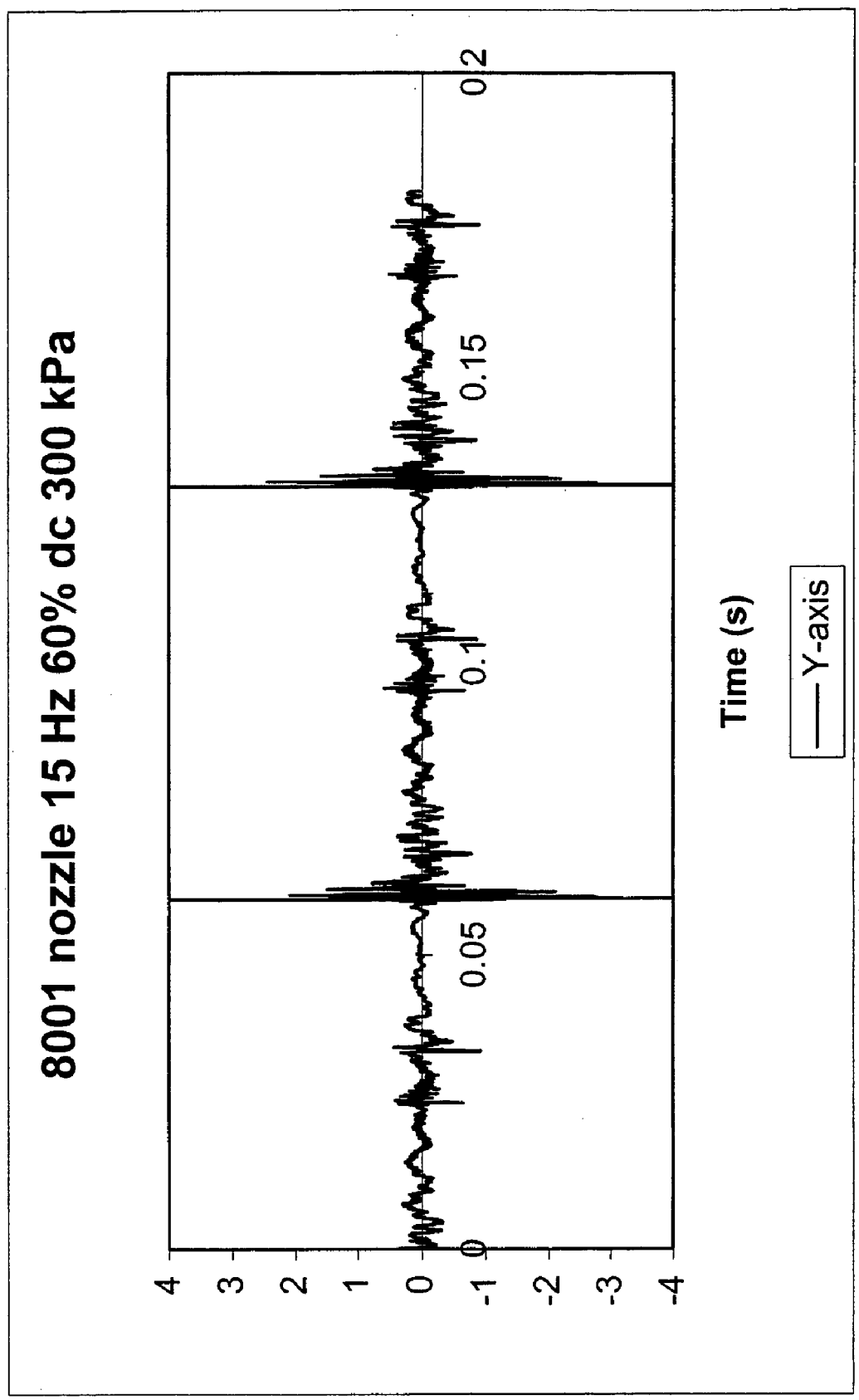
Figure 7H:
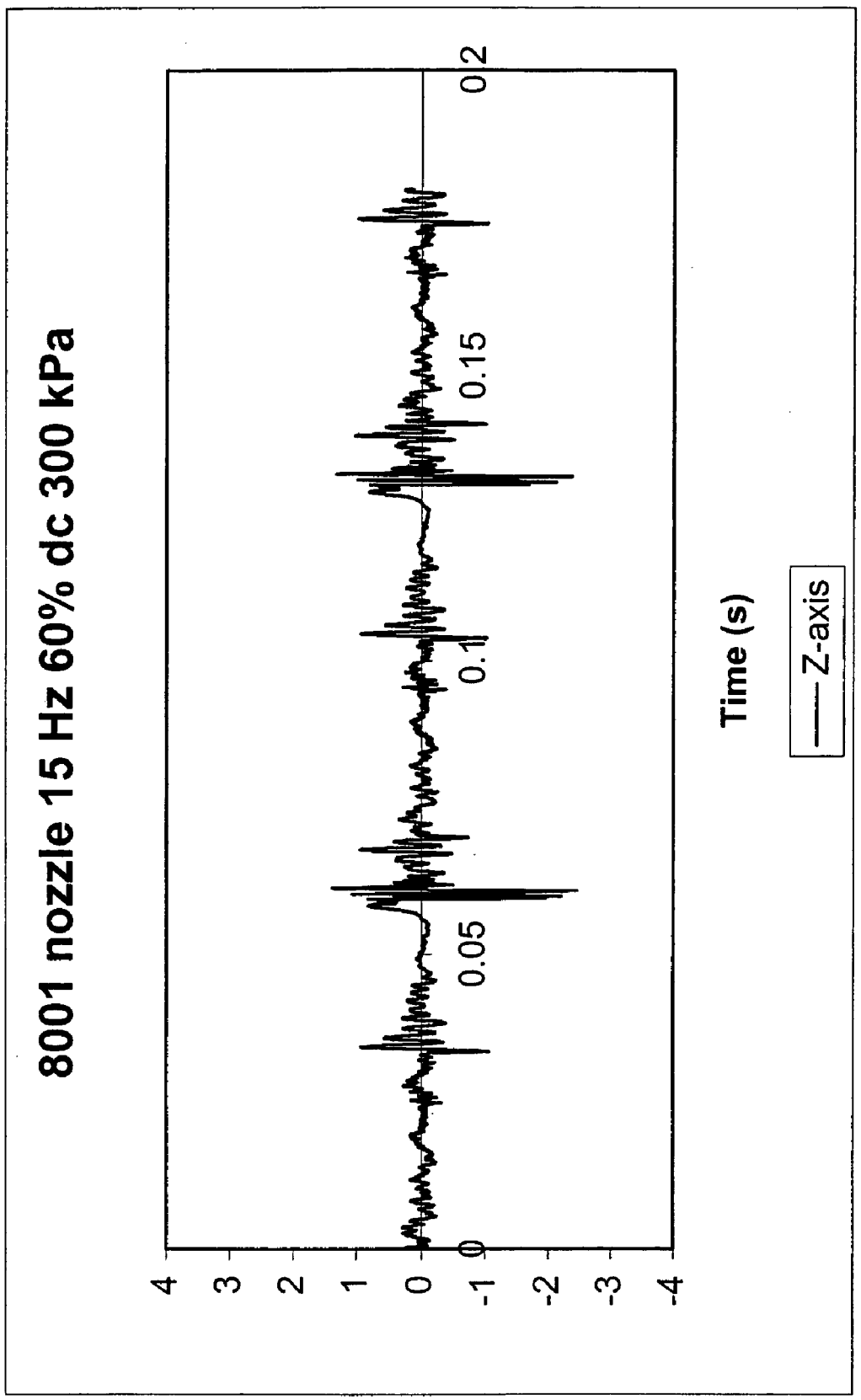
Figure 7I:
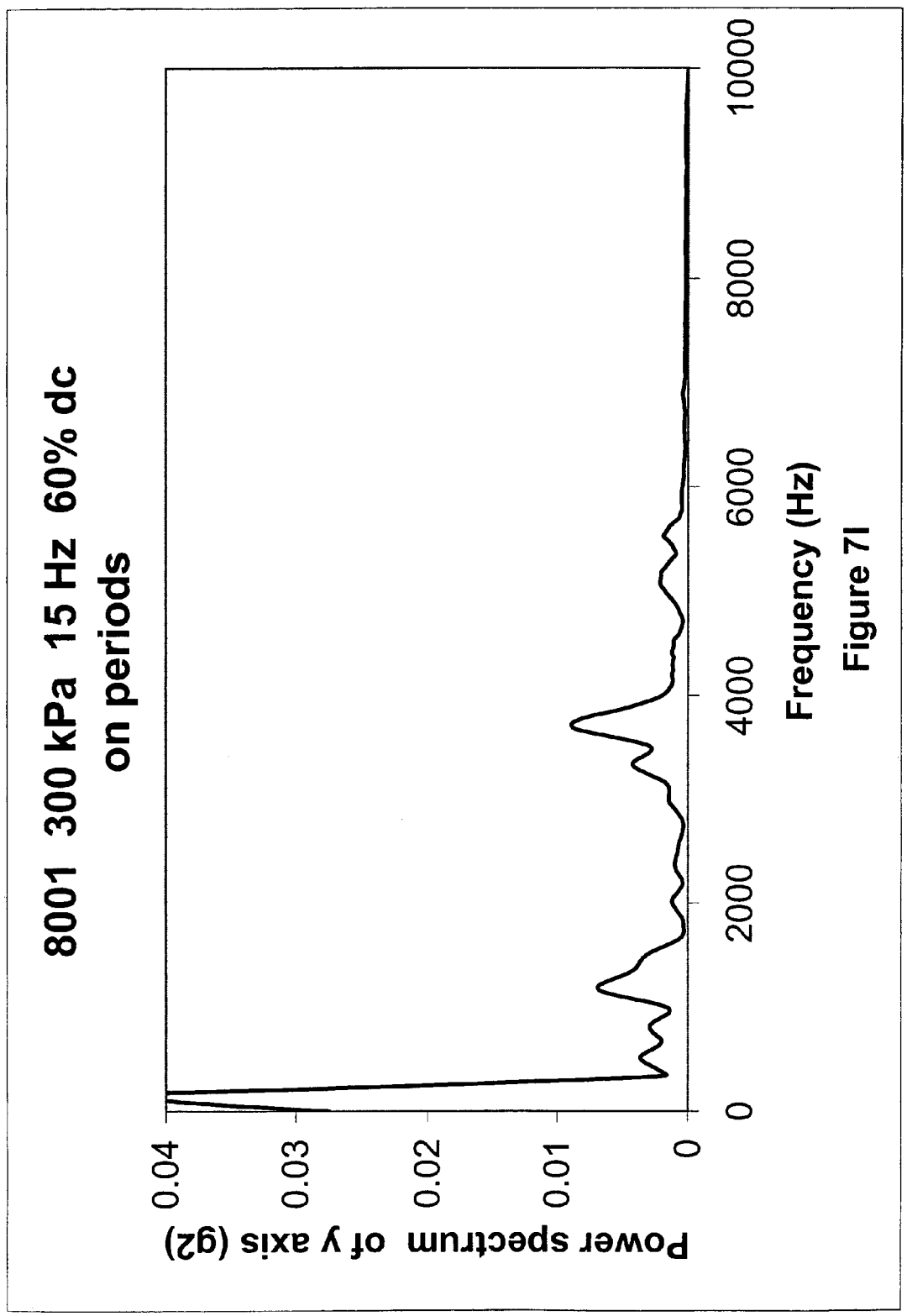
Figure 7J:
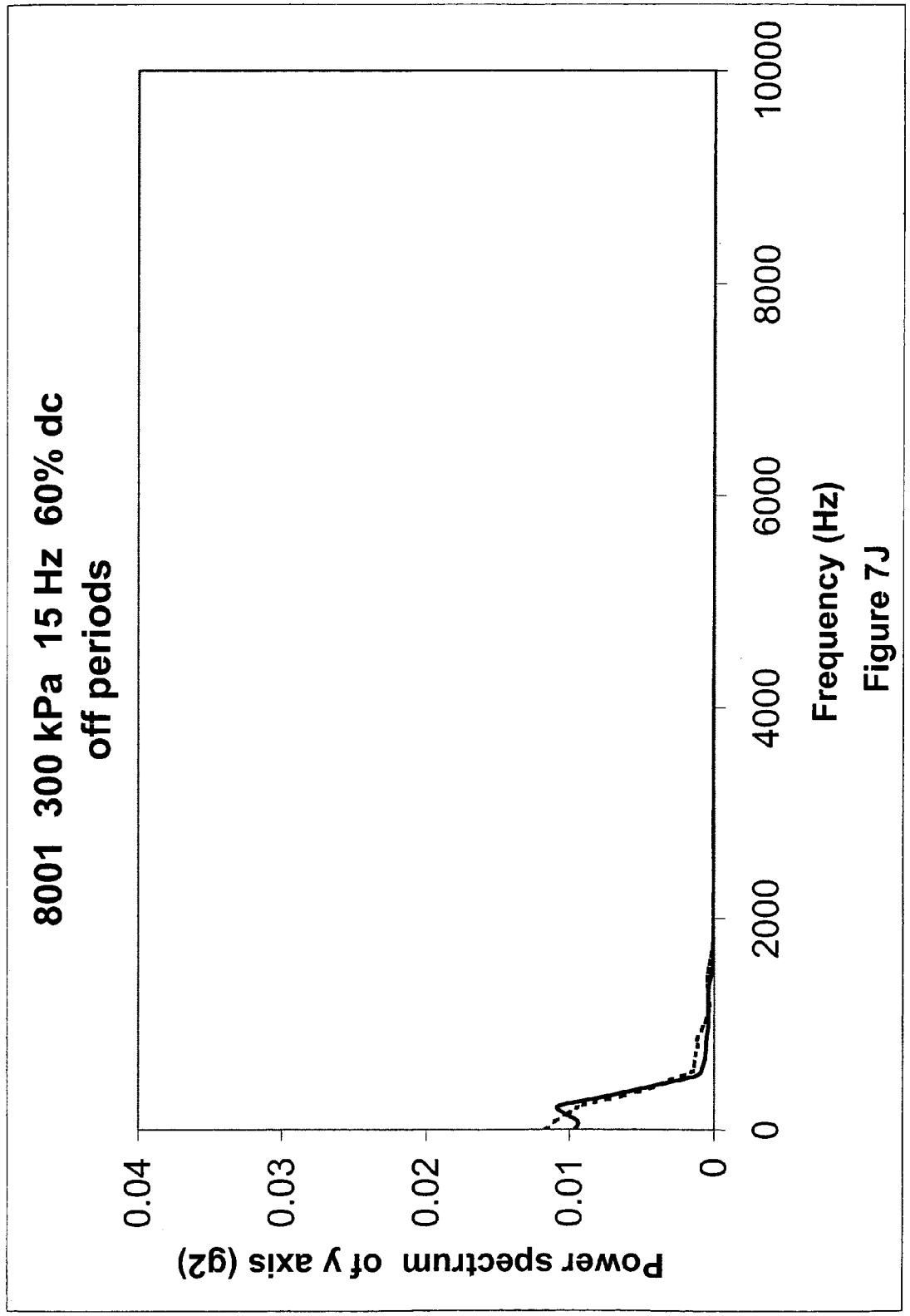
Figure 8A:
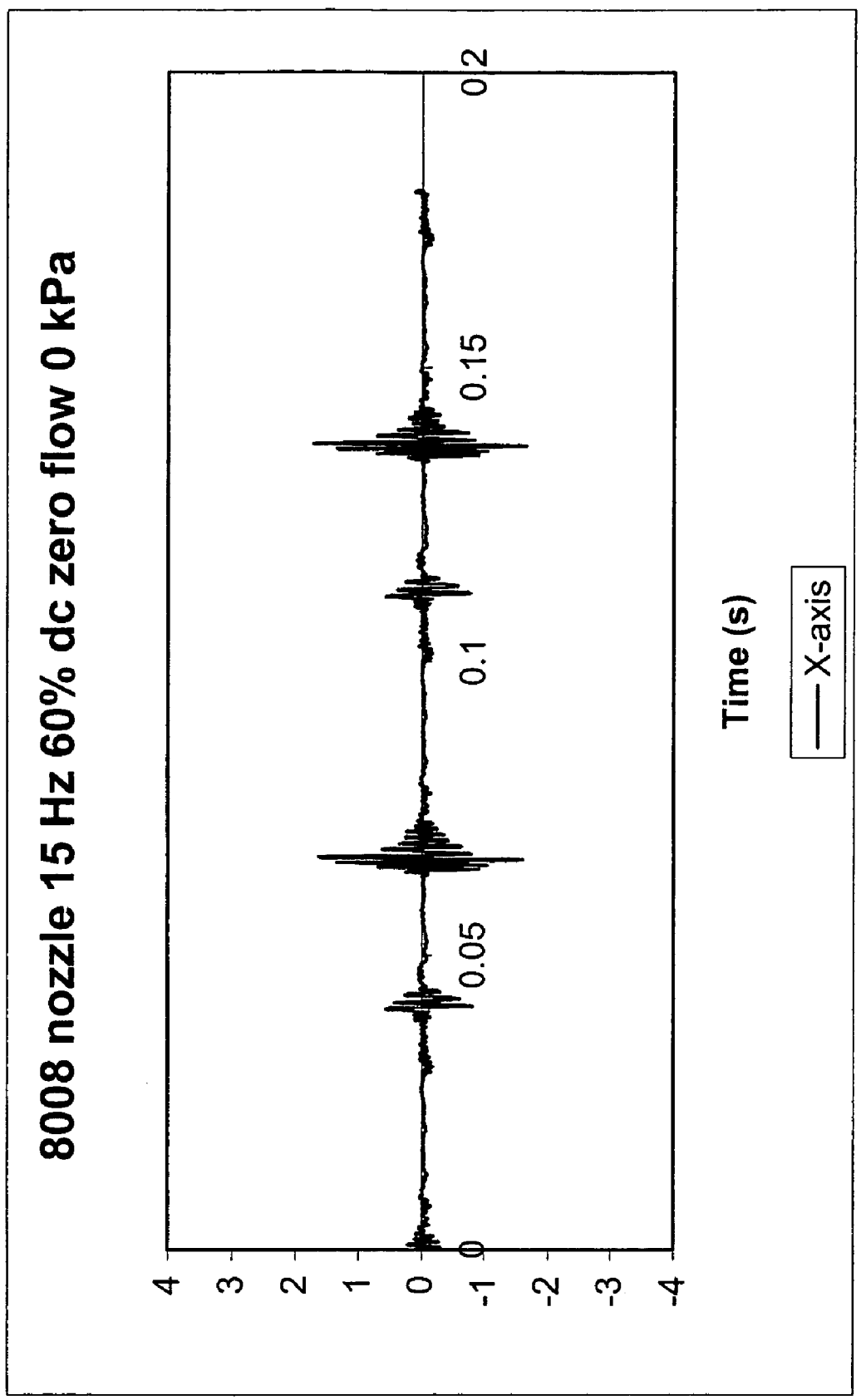
Figure 8B:
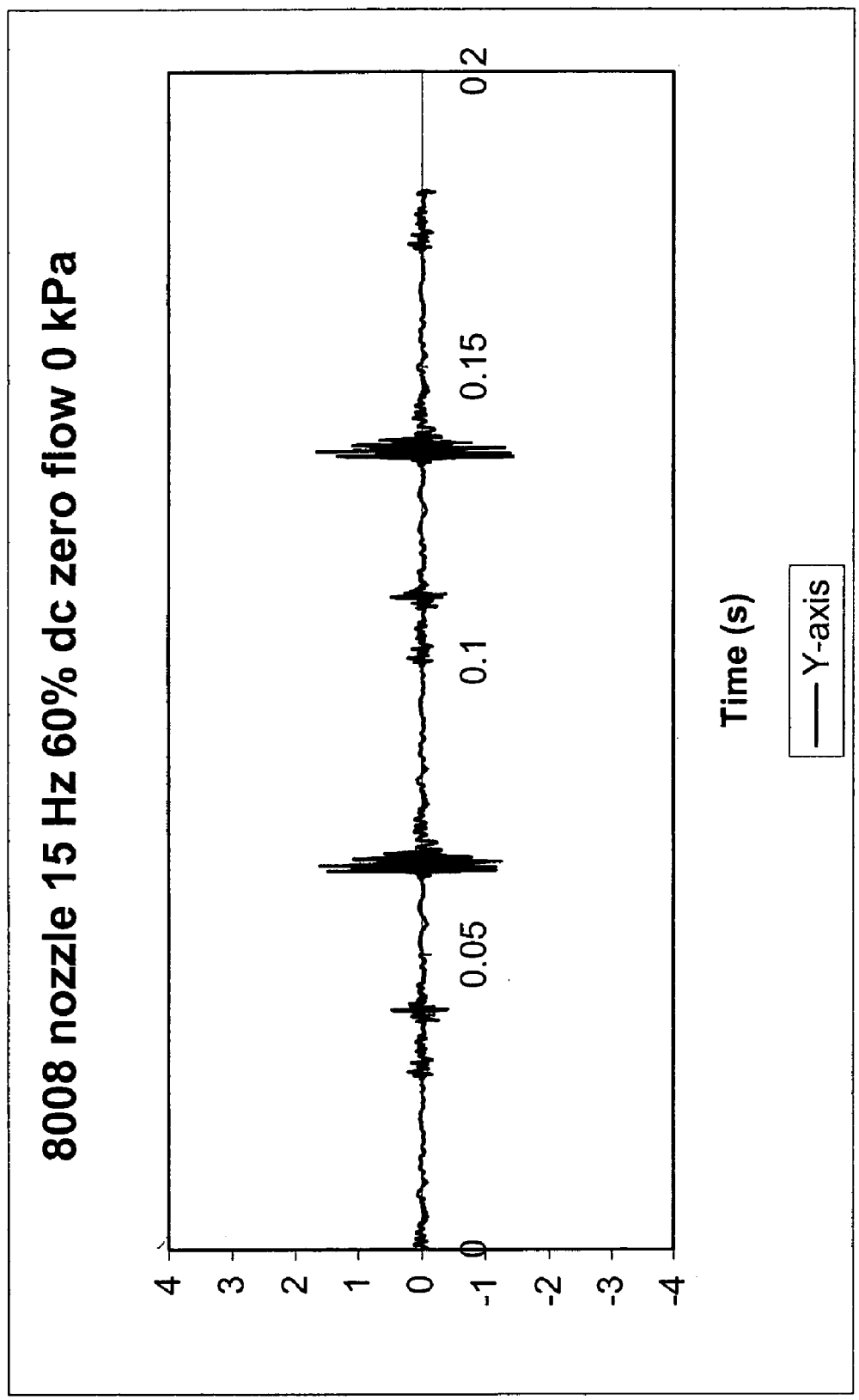
Figure 8C:
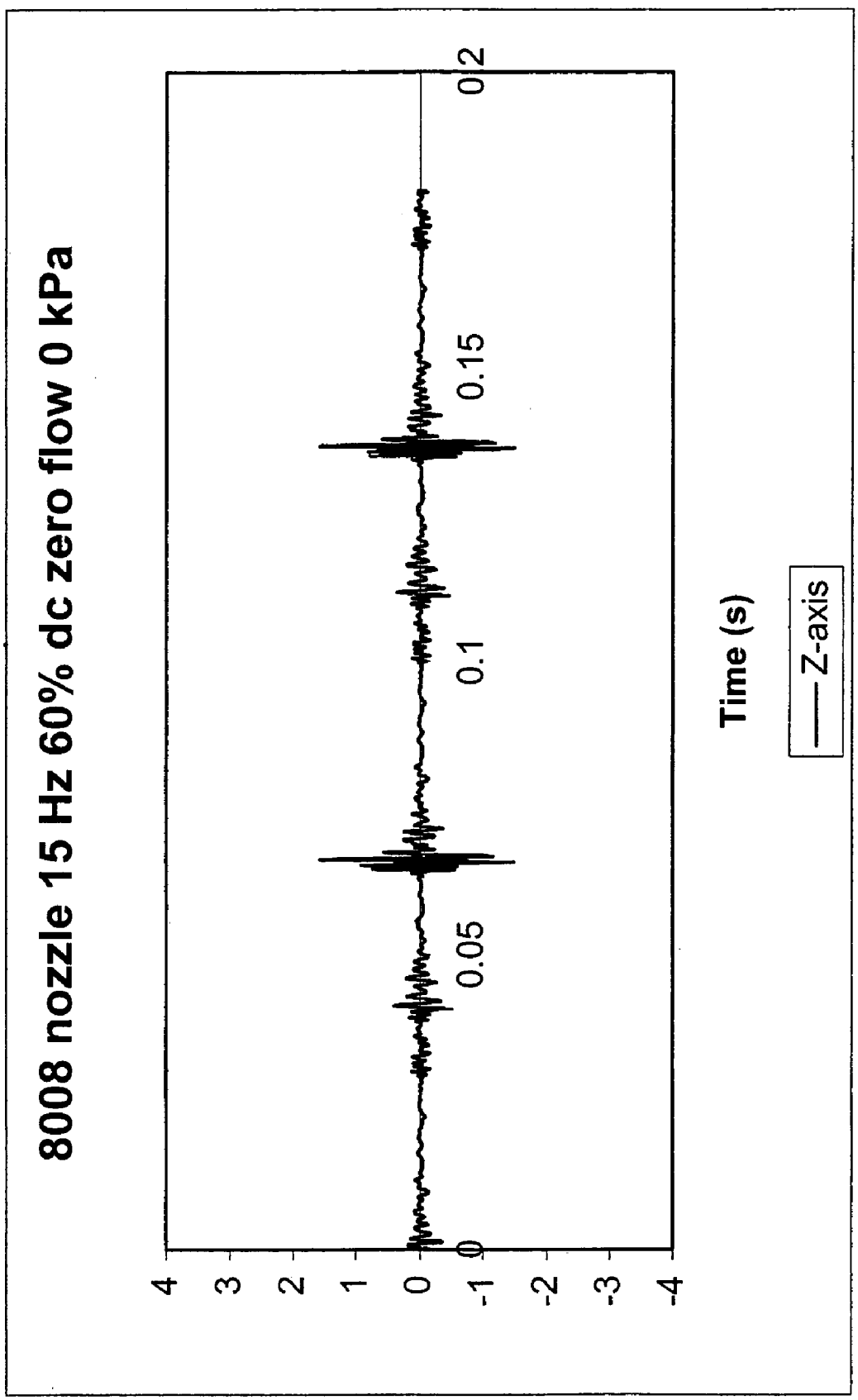
Figure 8E:
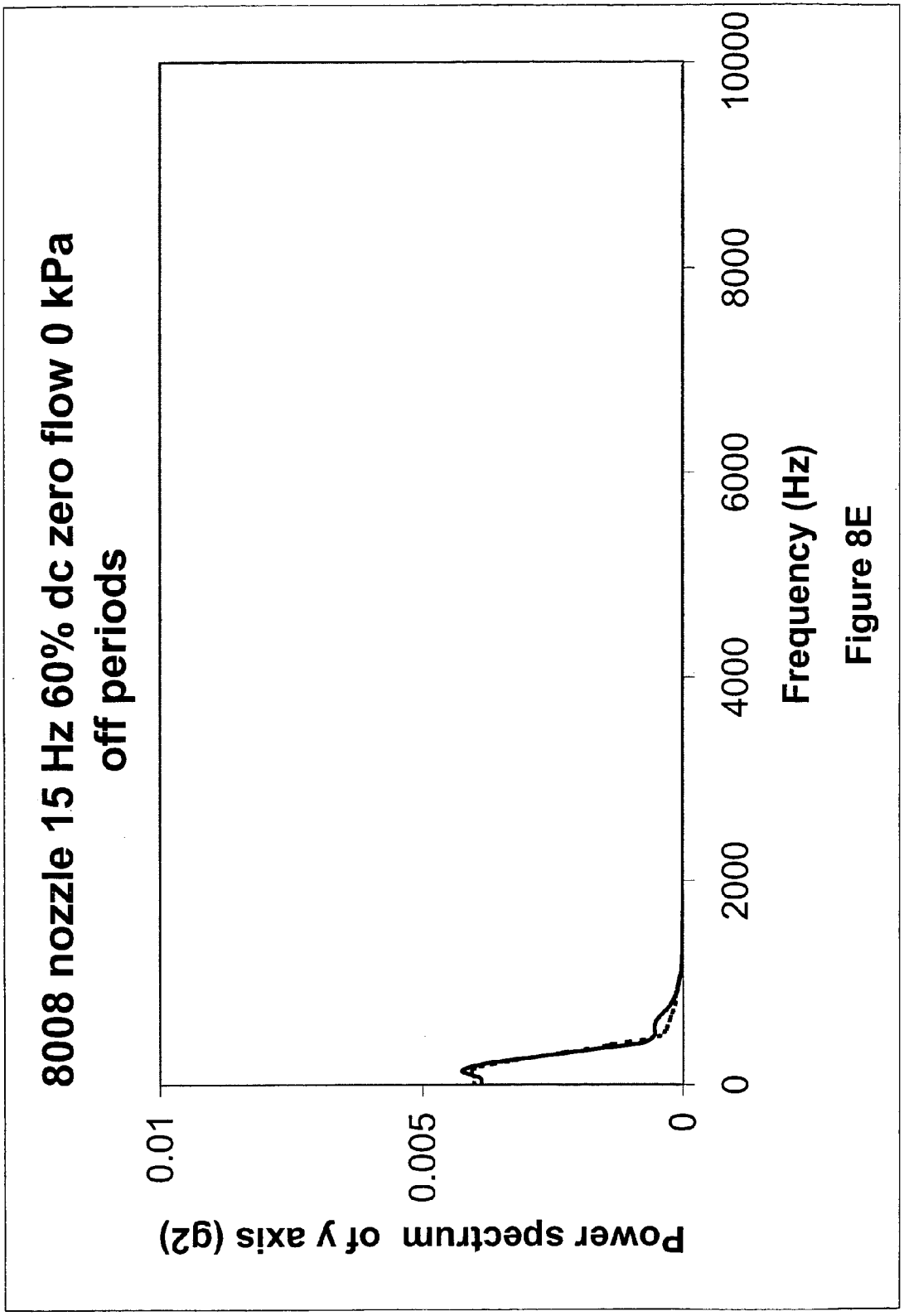
Figure 8F:
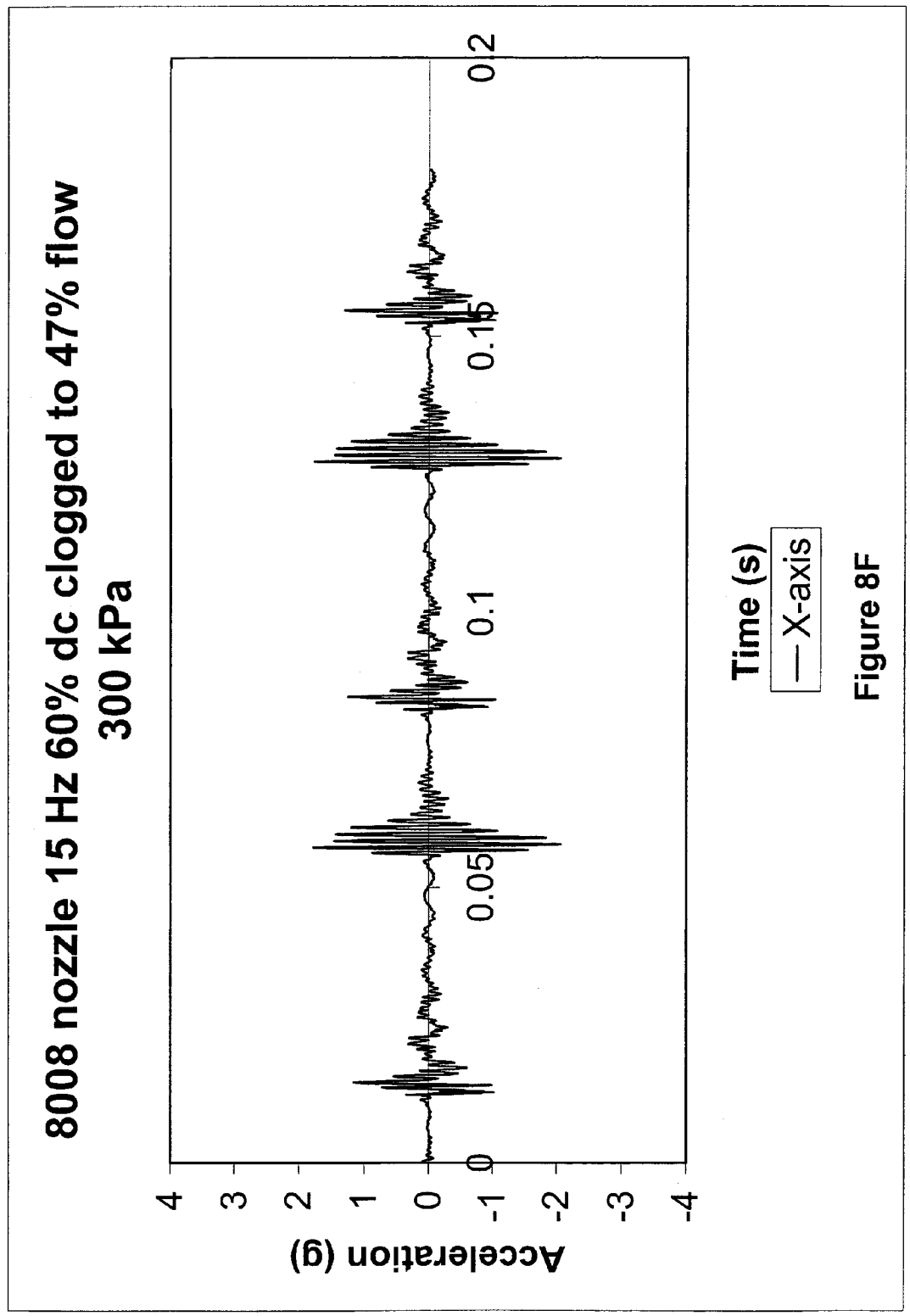
Figure 8G:
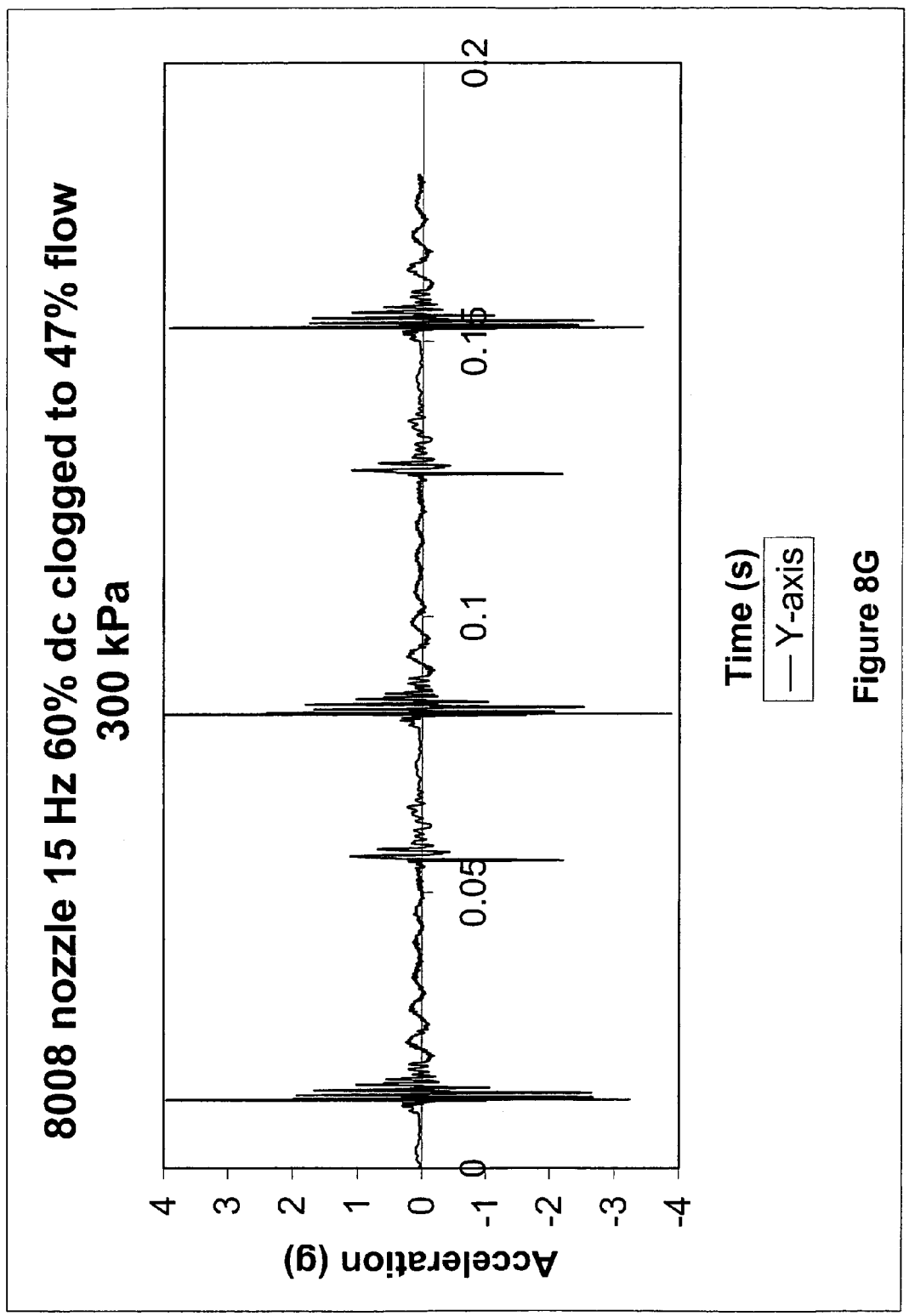
Figure 8H:
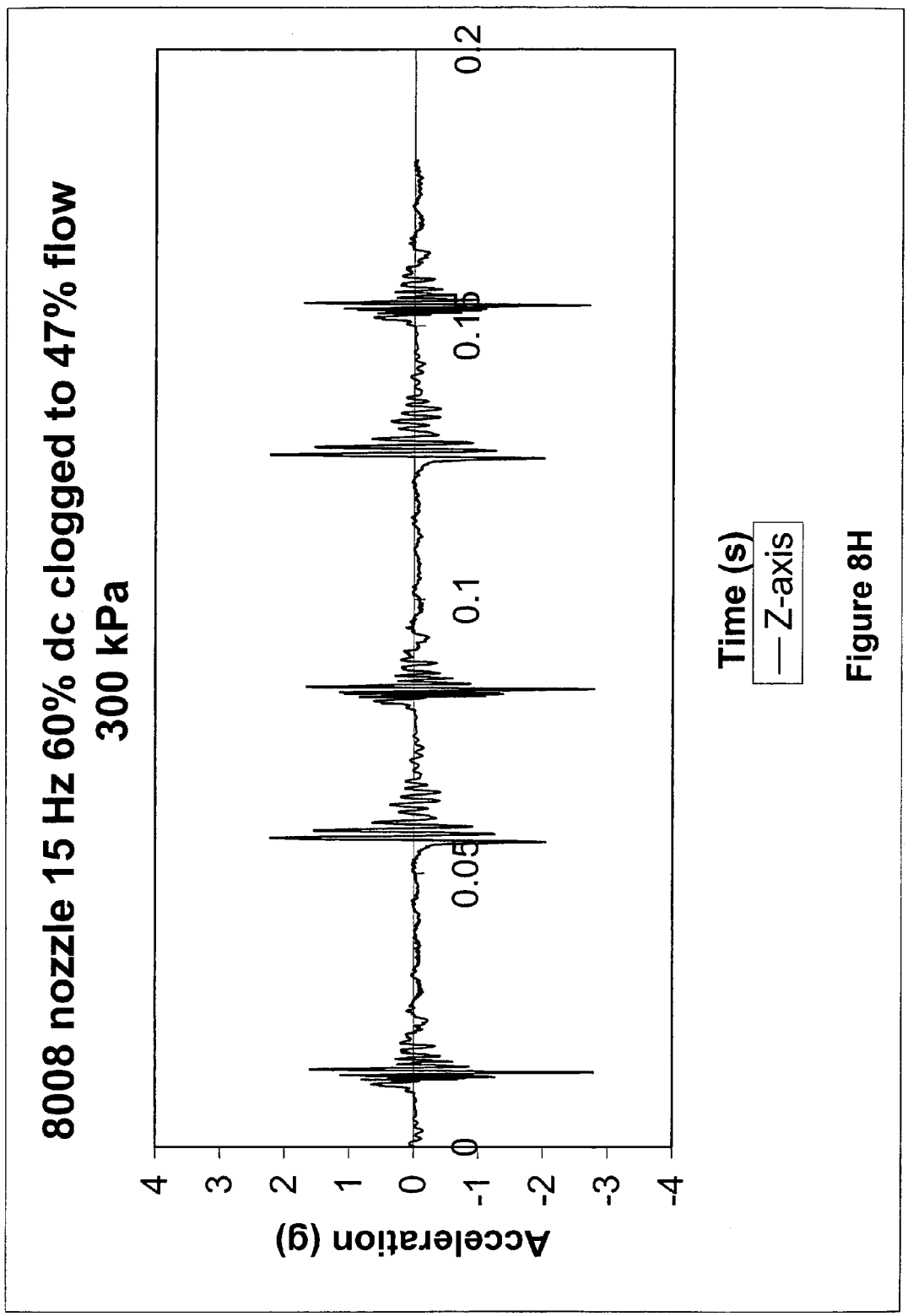

Continuing with the description of the 8008 signature, the time periods between 0.020 to 0.055 s and 0.093 to 0.125 s represent periods of steady state flow through the nozzle while the time periods between 0.069 to 0.083 s and 0.138 to 0.152 s represent periods of zero flow through the nozzle (FIGS. 7A, 7B, and 7C). These time demarcations were determined from visual analysis of the vibration data plot. Differences in y-axis and z-axis vibration for the on versus off times were clearly distinguishable. Data for the y-axis vibration were extracted for the on (FIG. 7D) and off (FIG. 7E) periods and the spectral density calculated. Nozzle flow can be easily detected and differences in the power spectra for on versus off flow conditions were significant.

FIG. 7F through 7J illustrates similar results for a much smaller nozzle (80° flow angle at 0.1 gal/min) with ⅛th the flow. The general trend was confirmed and the lower flow resulted in less vibration. On (FIG. 7I) versus off (FIG. 7J) was easily distinguished. Additionally, it was noted that the characteristic signatures of the valve opening and closing events were affected by the nozzle flow rate and the operating pressure. For example, this is shown when comparing the results in FIGS. 7A through 7E to FIGS. 8A through 8E where the liquid pressure and flow rate were zero. The amplitude and duration of valve vibration decreased with liquid flow rate. This was especially noted with the valve closing event. An important comparison is between the results in FIGS. 7A through 7E and the results in FIGS. 8F through 8J. In this case, pulsed flow of two nozzles can be compared; one nozzle is an 8008 (80° spray angle at 0.8 gal/min) operating normally while the other nozzle is an 8008 clogged to 47% flow. The vibration signatures are easily distinguished and the spectral densities of the "on" flow periods are significantly different.

EXAMPLE NO. 3

Figure 9:
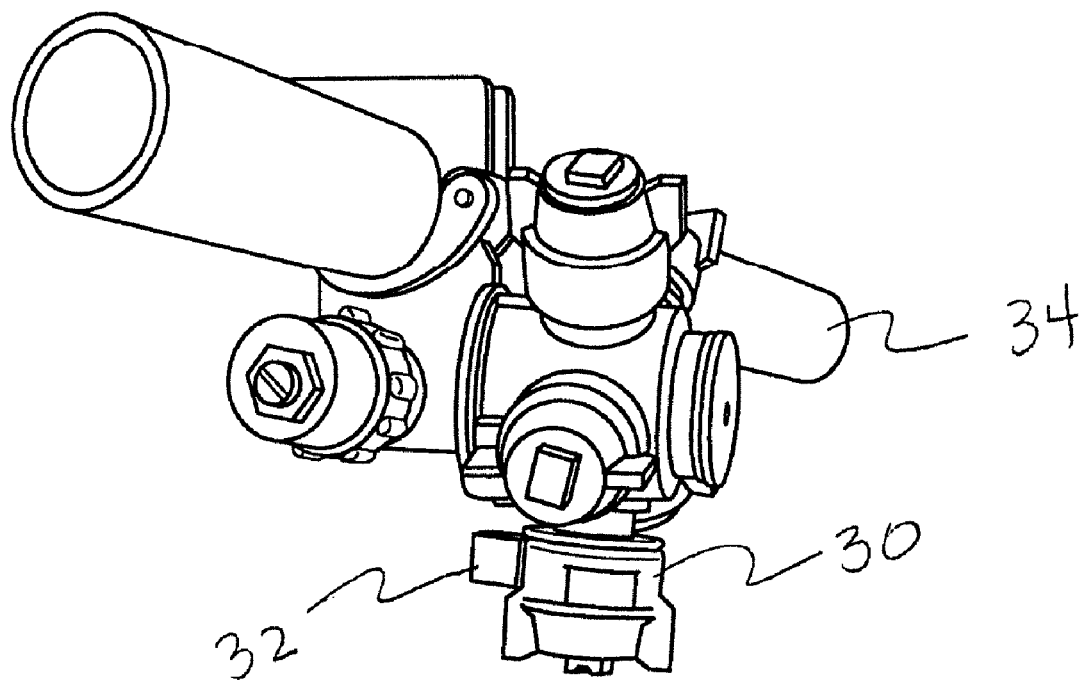
FIGS. 9 and 10 are perspective views showing vibration sensors mounted on fluid nozzles in accordance with the present invention.

To demonstrate the feasibility of the present invention on an actual field sprayer, the triaxial accelerometer described above was mounted on a nozzle body on the boom of a Case 4260 self propelled sprayer with a 25 m, 54 nozzle boom and an AIM Command® pulsed flow control system. For instance, referring to FIGS. 9 and 10, the nozzle 30 is shown mounted on a spray boom 34. As also illustrated, the vibration sensor 32 is mounted onto the nozzle 30.

The system was operated at full engine throttle (2300 rpm), full pump flow for spray and agitation and with all valves (except the test location with the various nozzles installed) pulsing with 11010 nozzles (110° spray angle at 1.0 gal/min). As is done in the commercial product, alternate valves were pulsed ½ period (180°) out of phase. The field test represented a situation very close to actual spraying conditions.

Figure 11A:
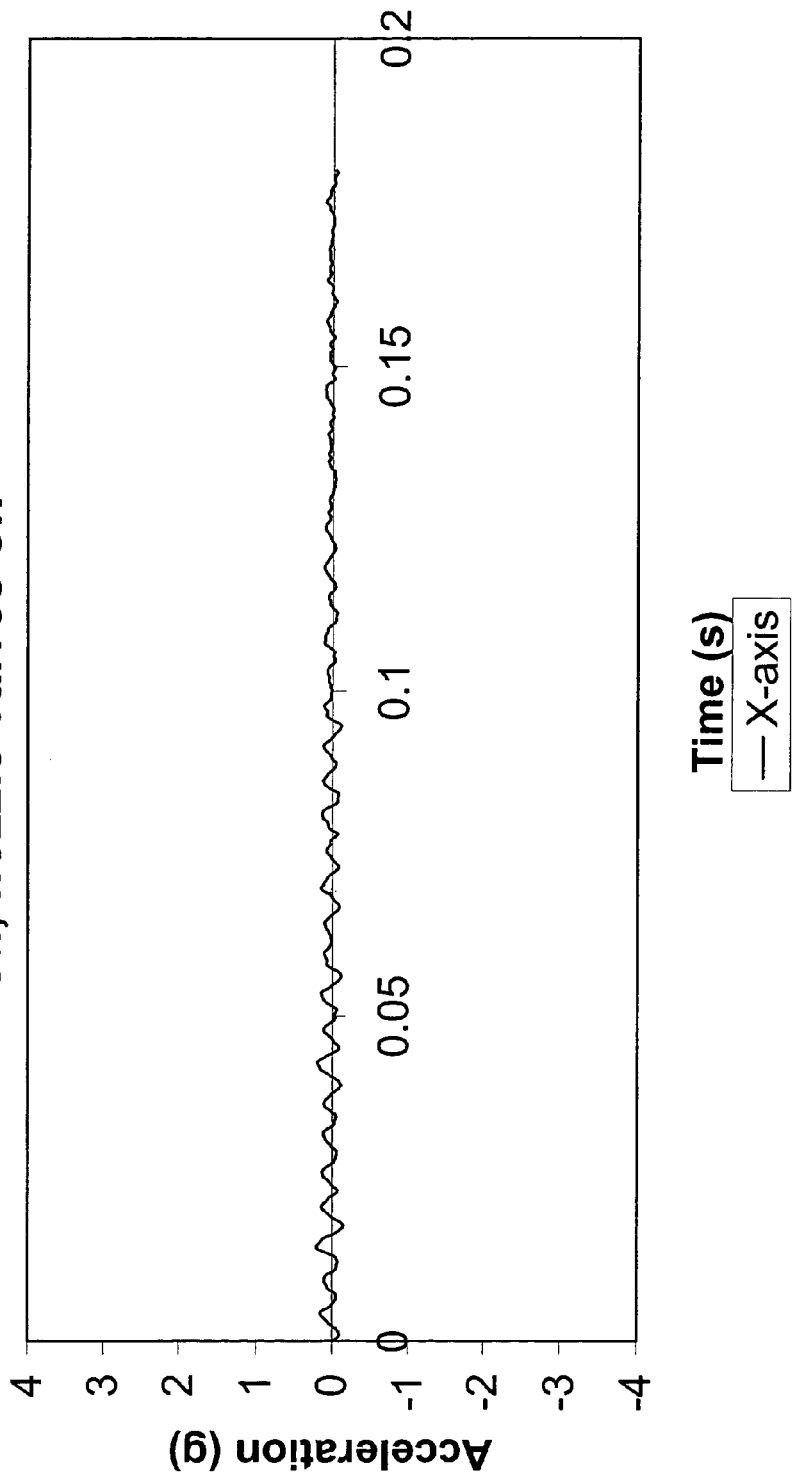
FIGS. 11 through 16 are results obtained in the examples described below.
Figure 11B:
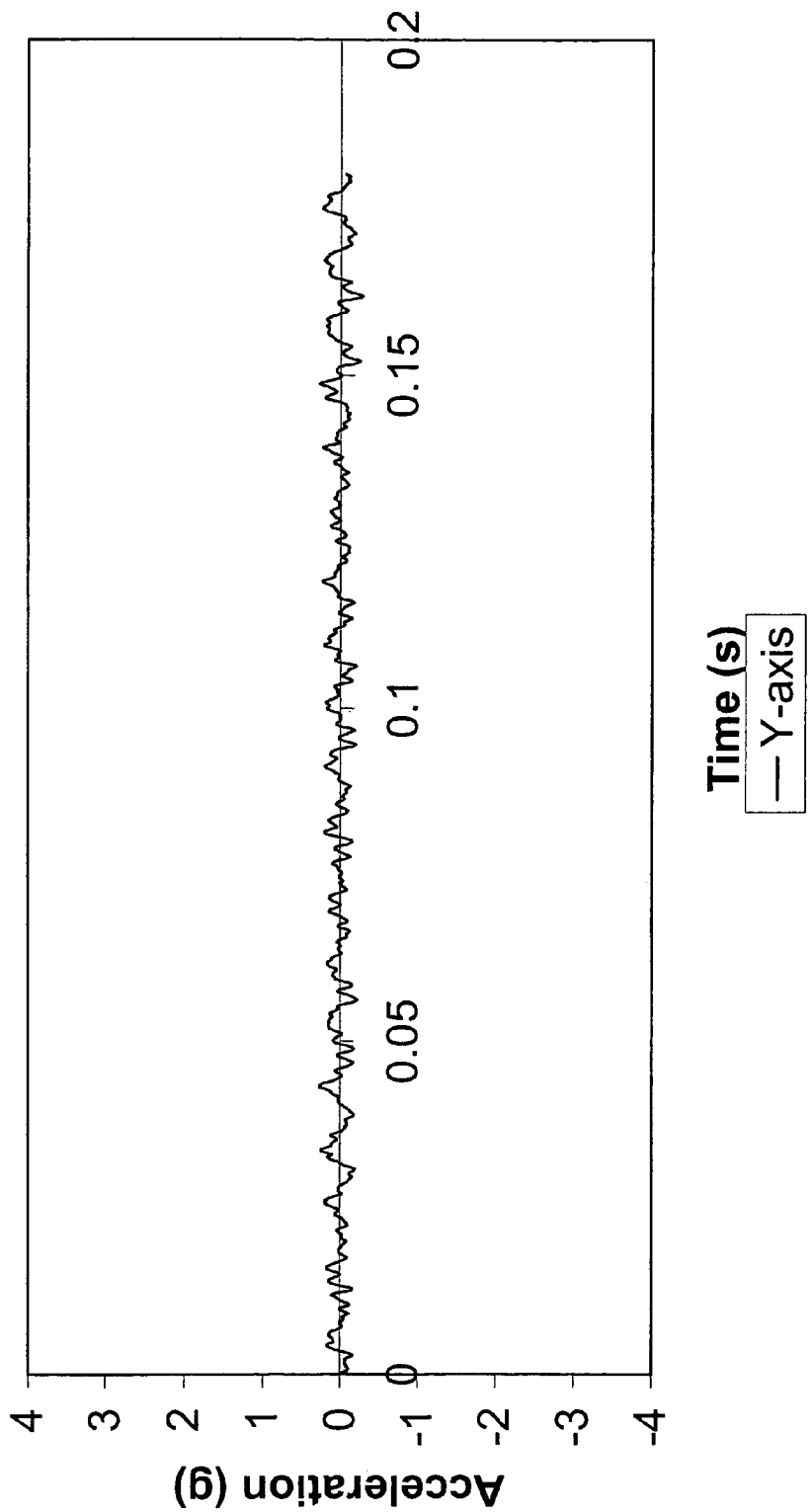

Time data is shown for the X—, Y—, and Z-axis in FIGS. 11A through 11C for the system with the engine and pump operating. Initial testing established the background vibration of the machine as shown in FIG. 11D. Characteristic background vibrations were in the low frequency bands and of very low magnitude in comparison to valve and nozzle measurements from the lab testing. Additionally, it was determined that, when in motion, boom vibrations are in very low frequencies (<10 Hz) and that rolling tires behave as a low-pass filter. Since nozzle and valve vibrations are in the 800 to 5000 Hz range, these results show that interference from background machine motion may not be an issue in field use of the invention.

Figure 12A:
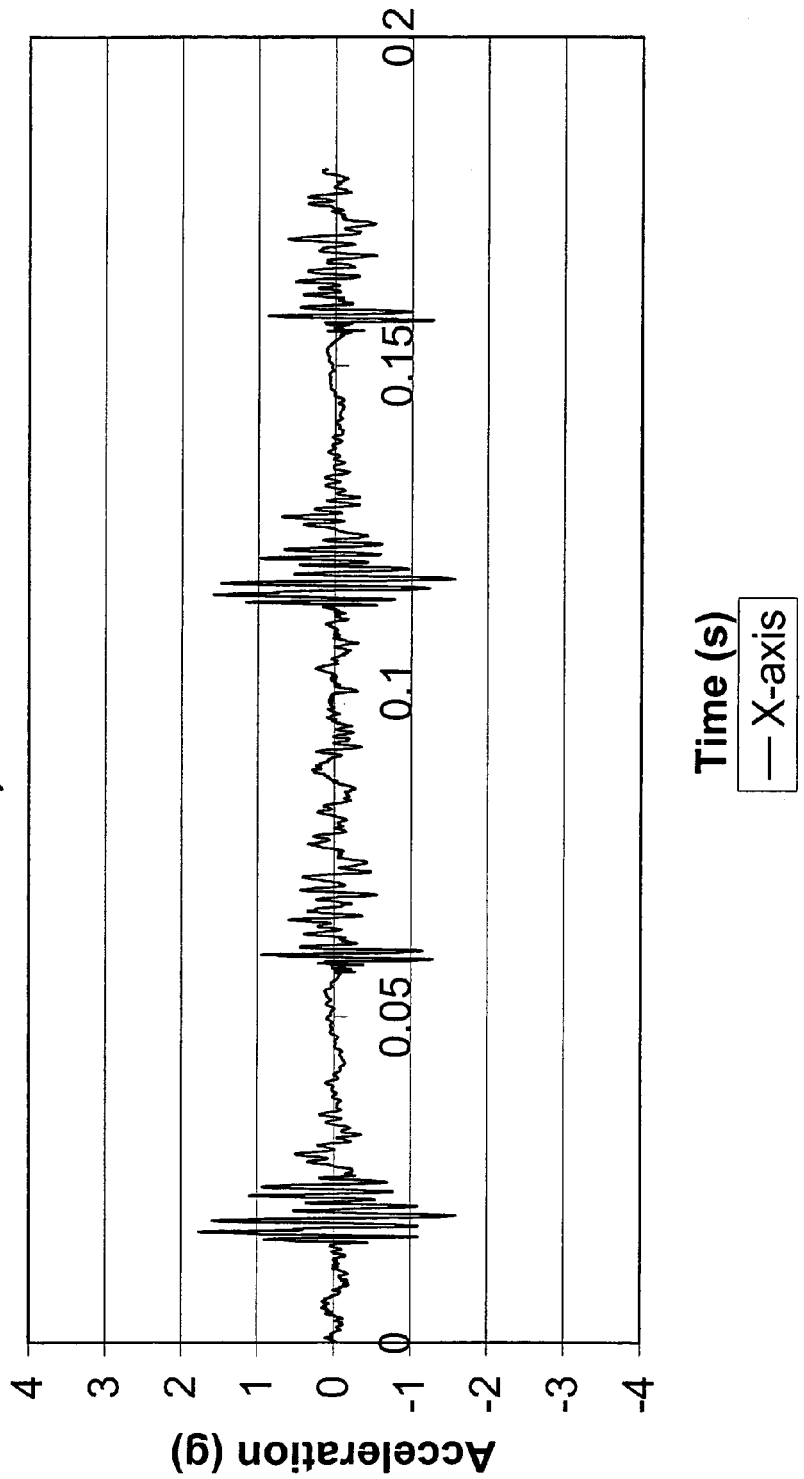
Figure 12B:
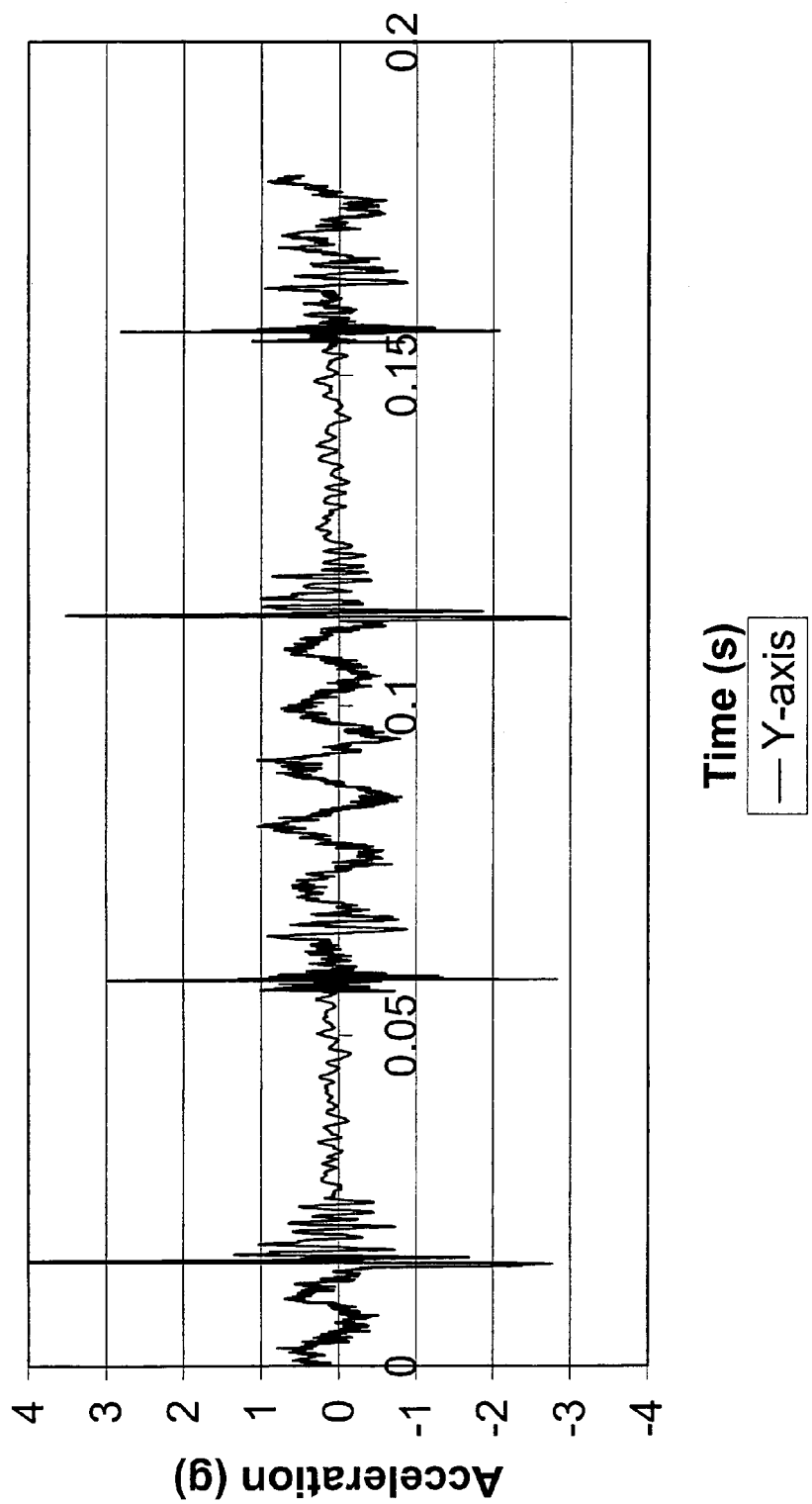
Figure 12C:
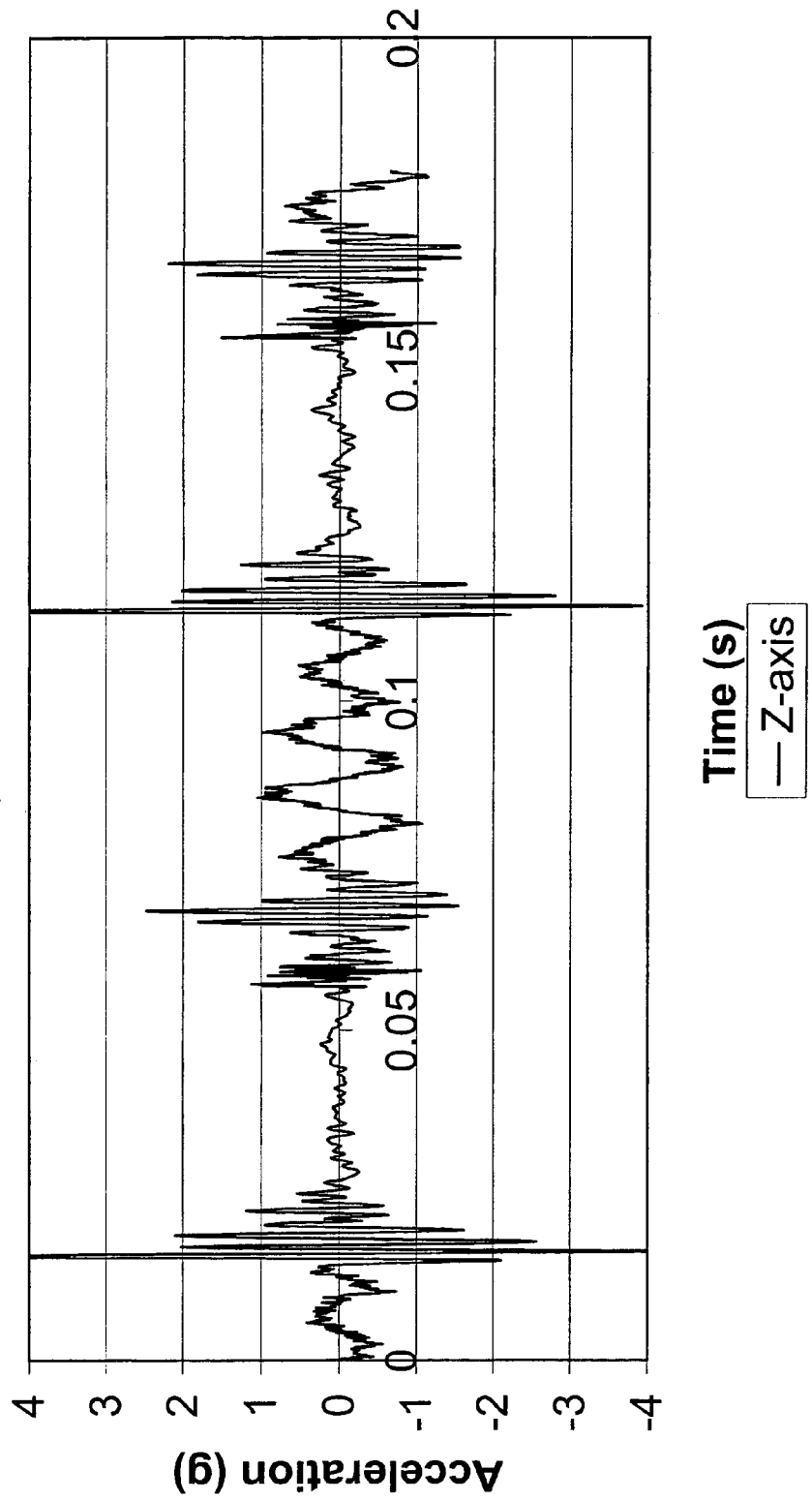
Figure 12D:
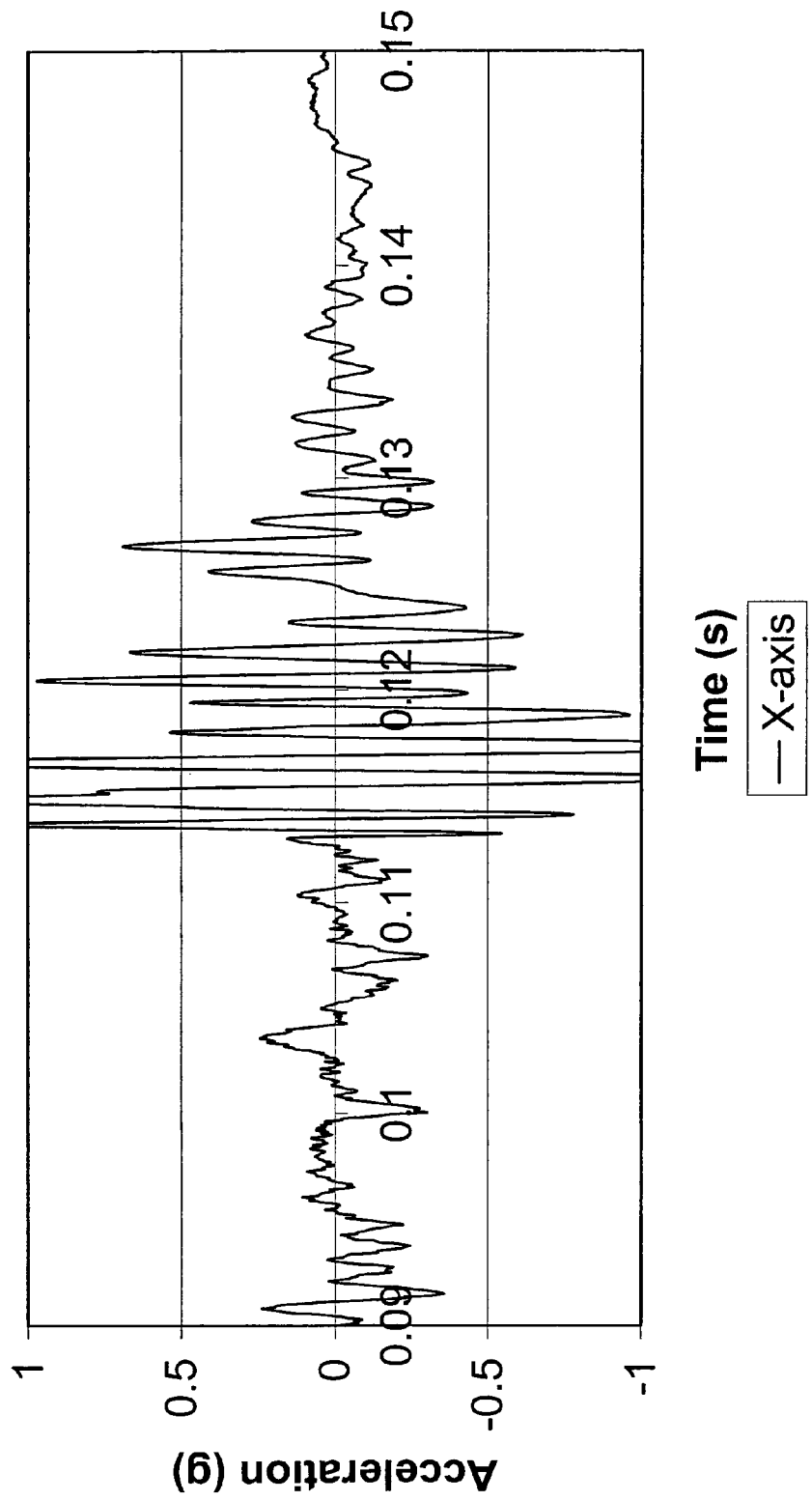
Figure 12E:
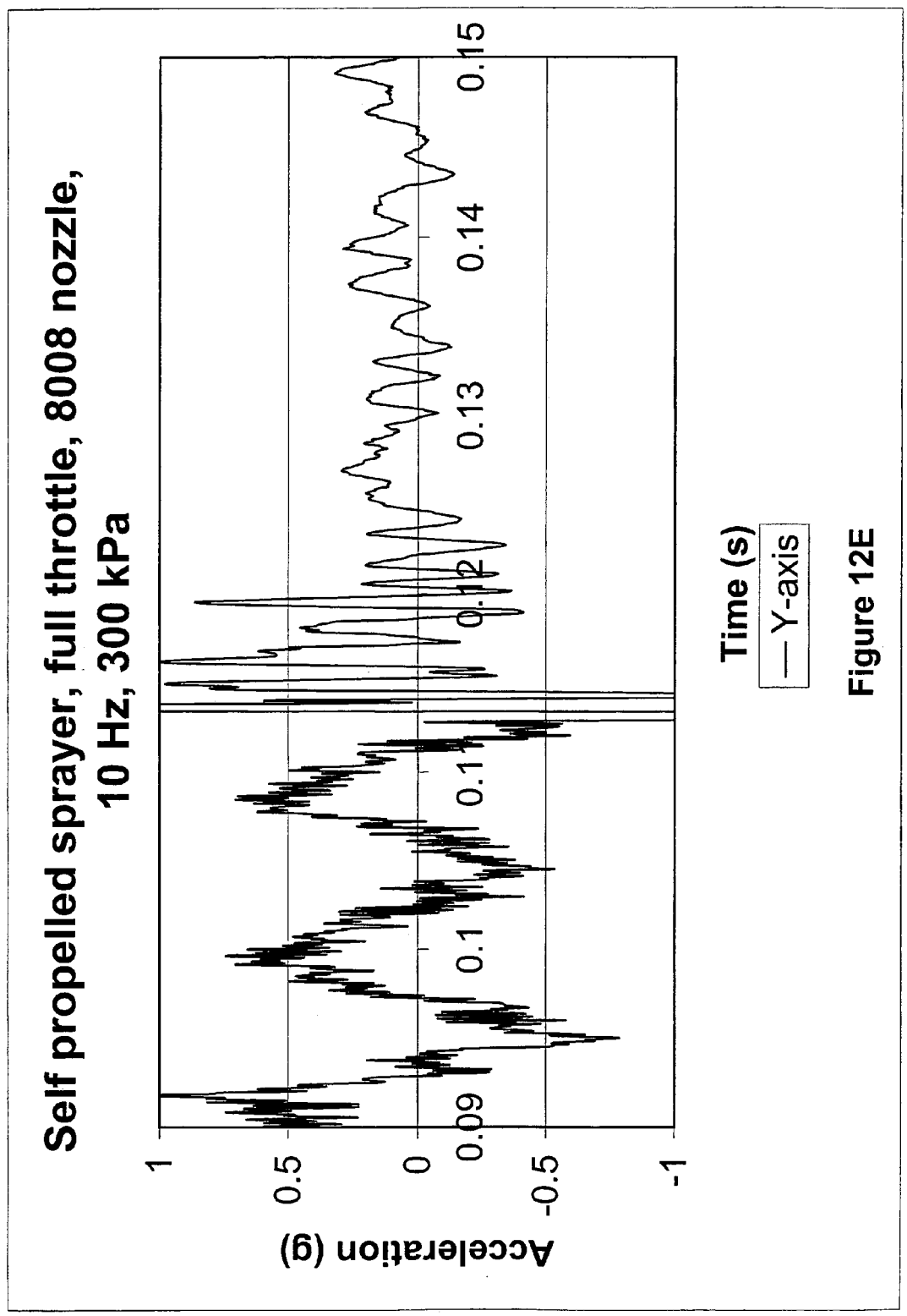
Figure 13B:
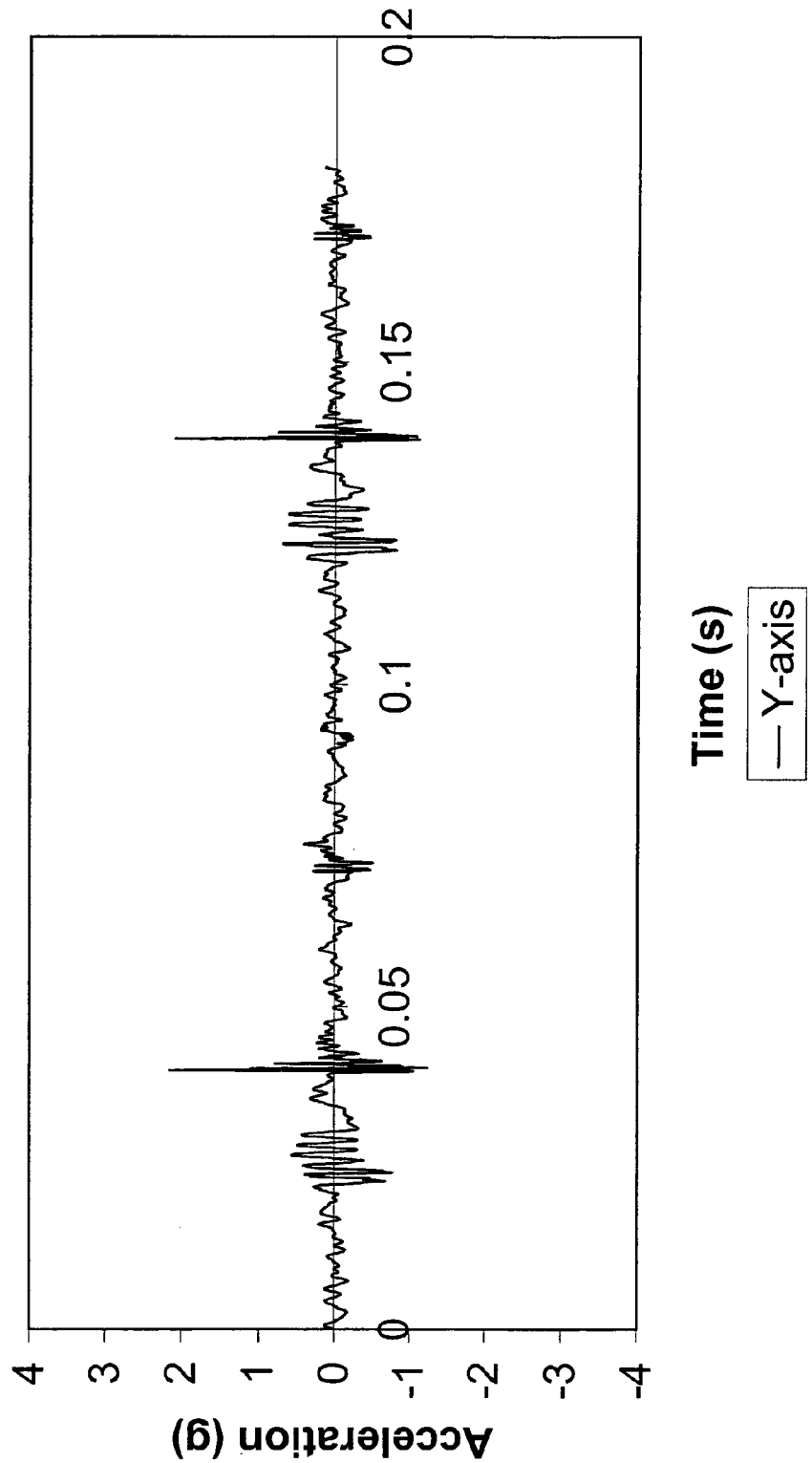
Figure 13C:
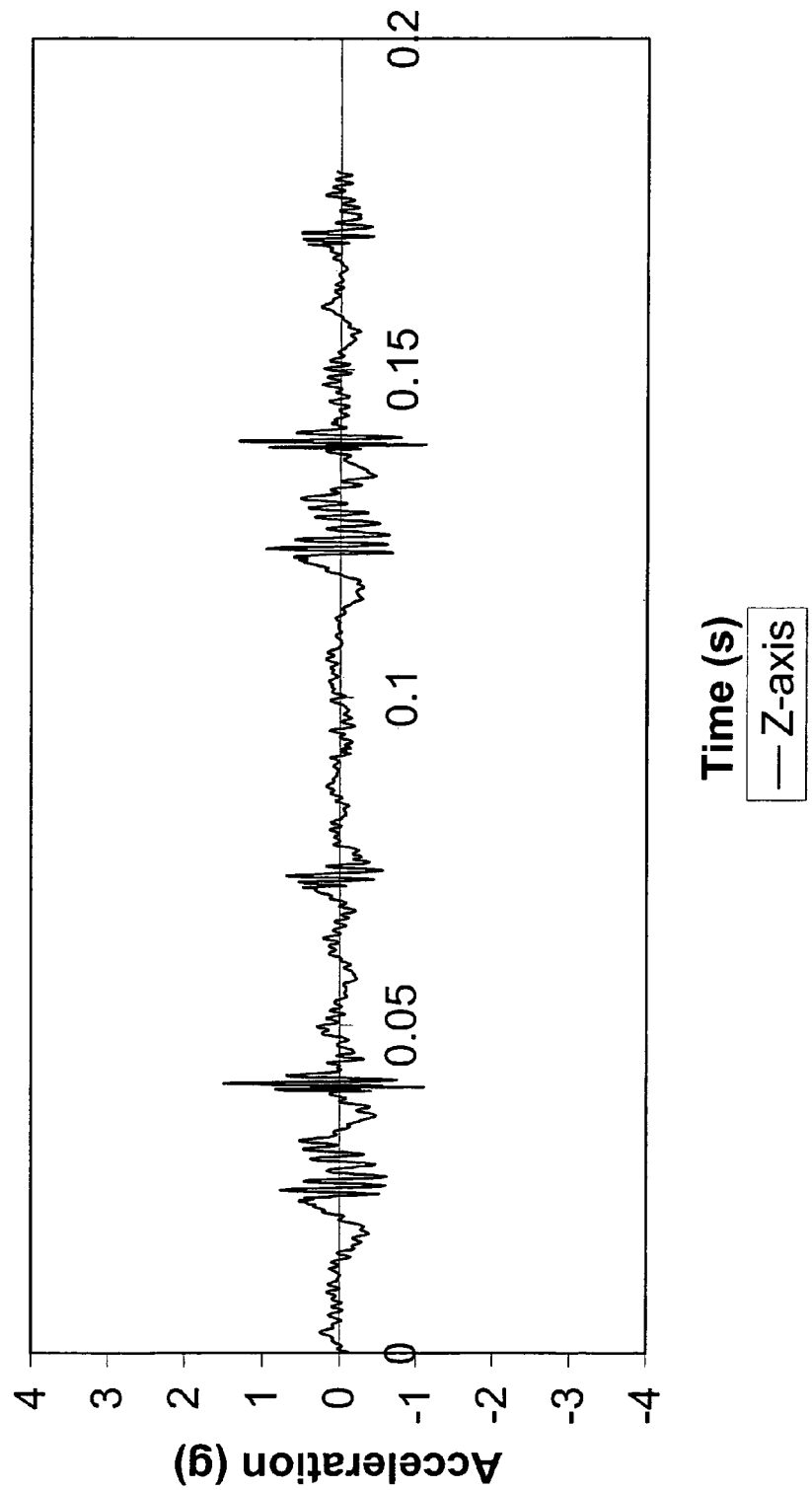
Figure 13D:
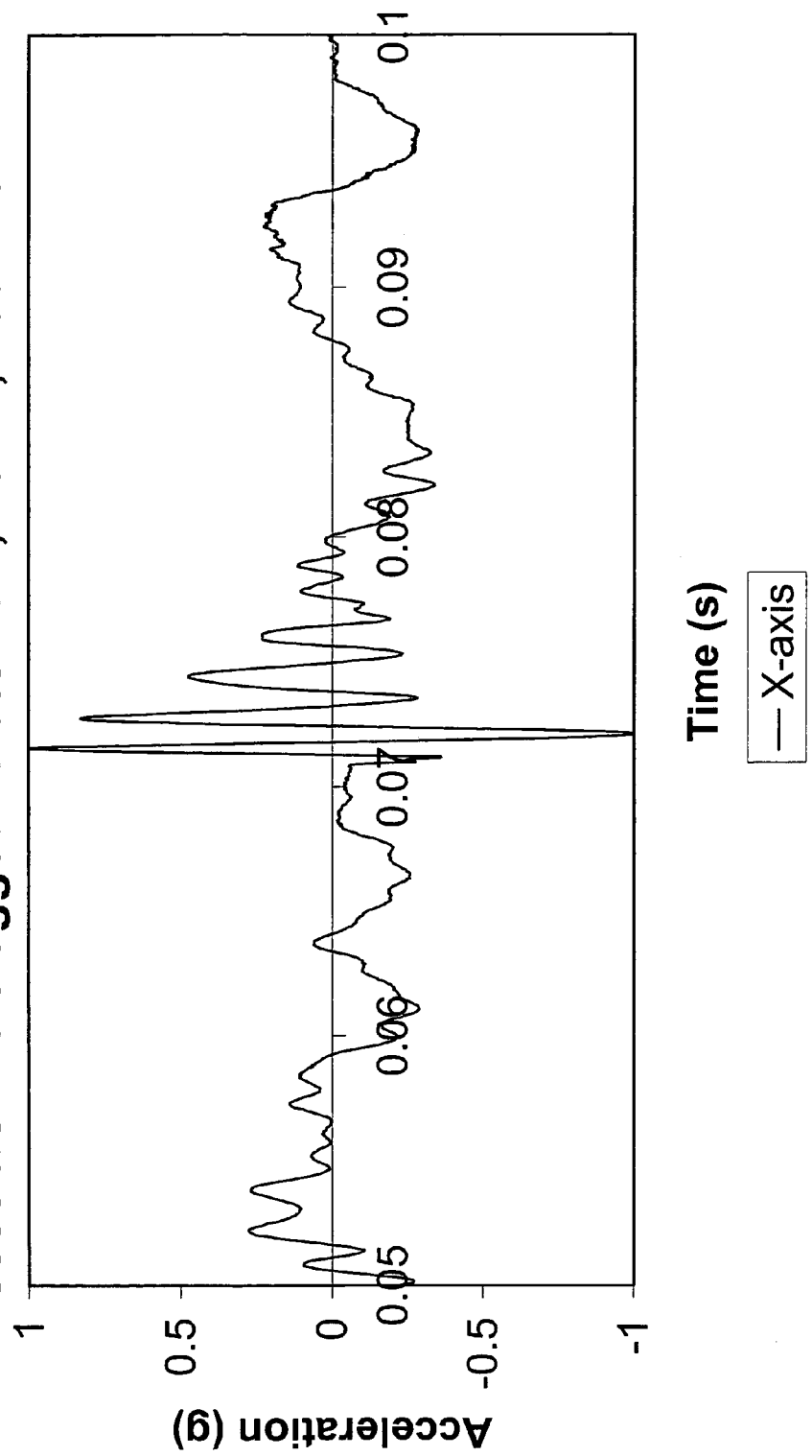
Figure 13E:
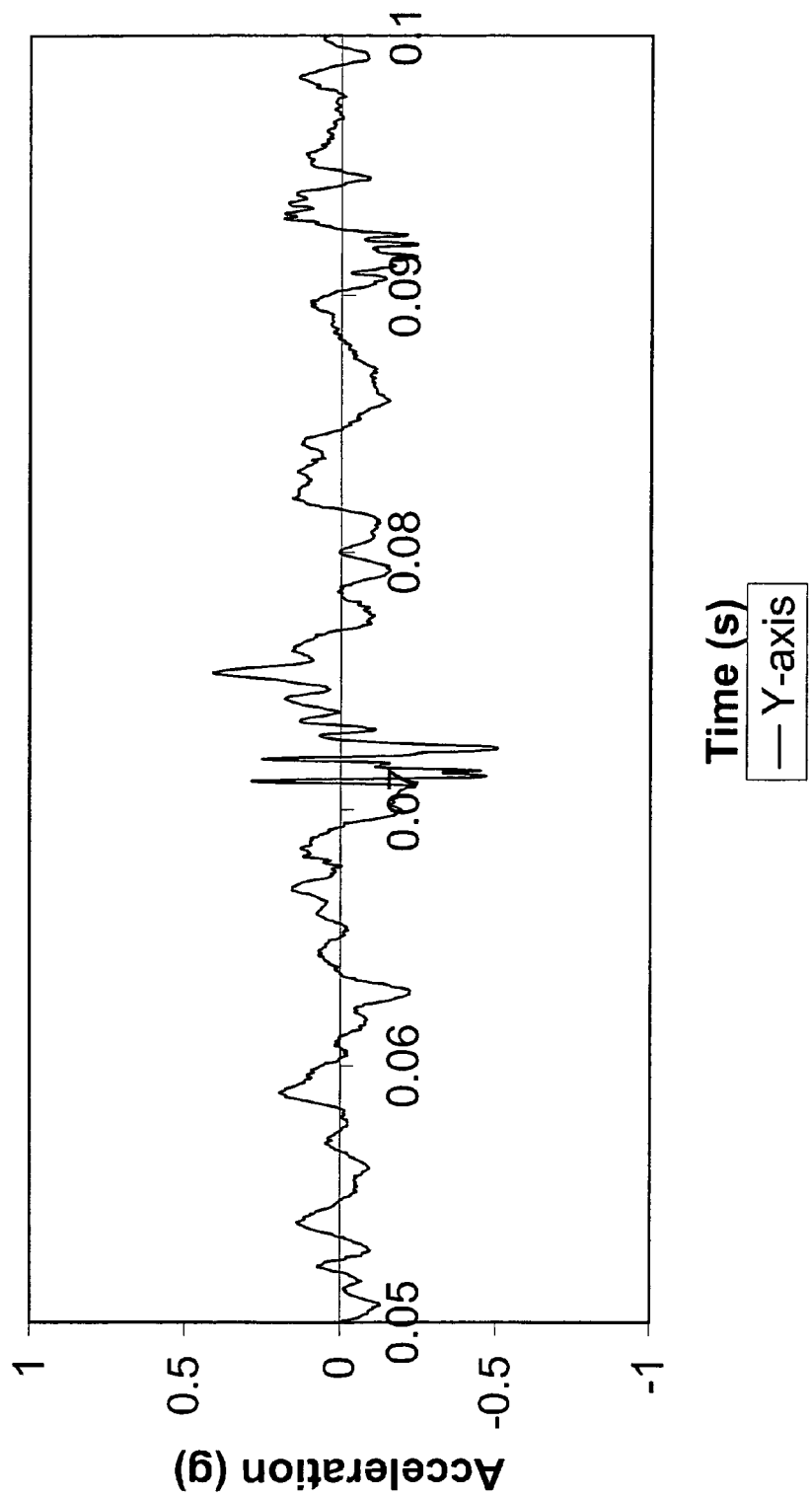
Figure 13F:
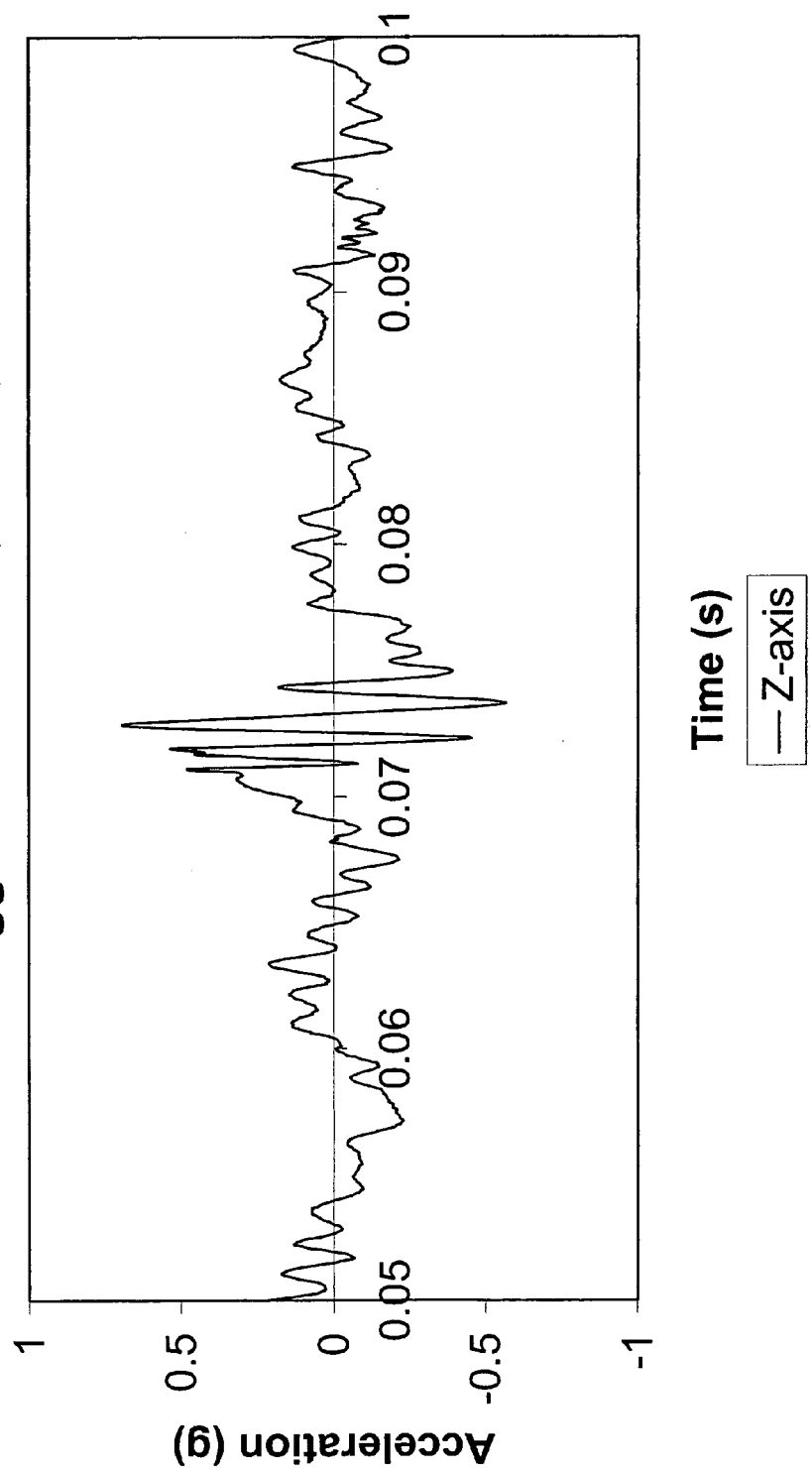
Figure 14A:
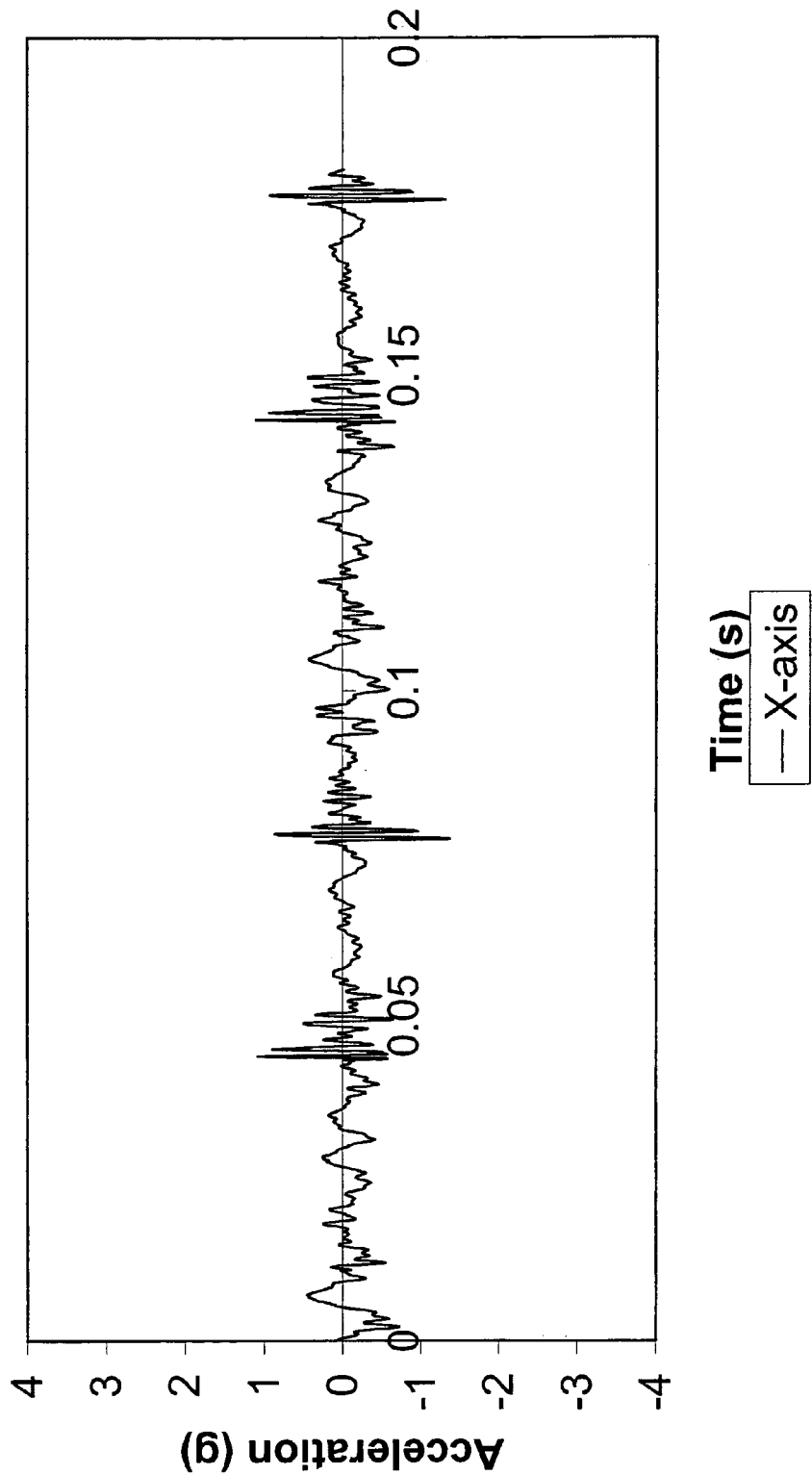
Figure 14B:
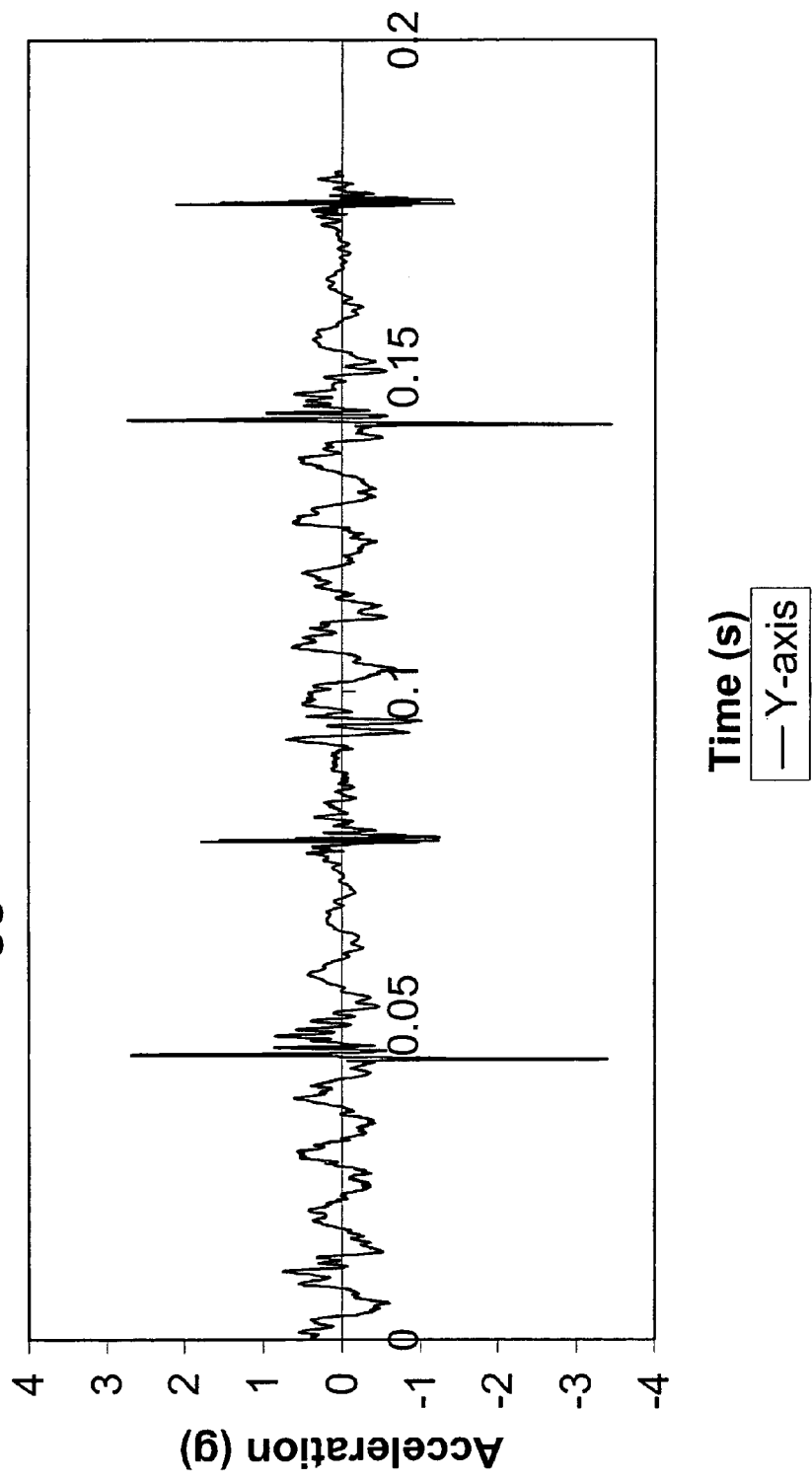
Figure 14D:
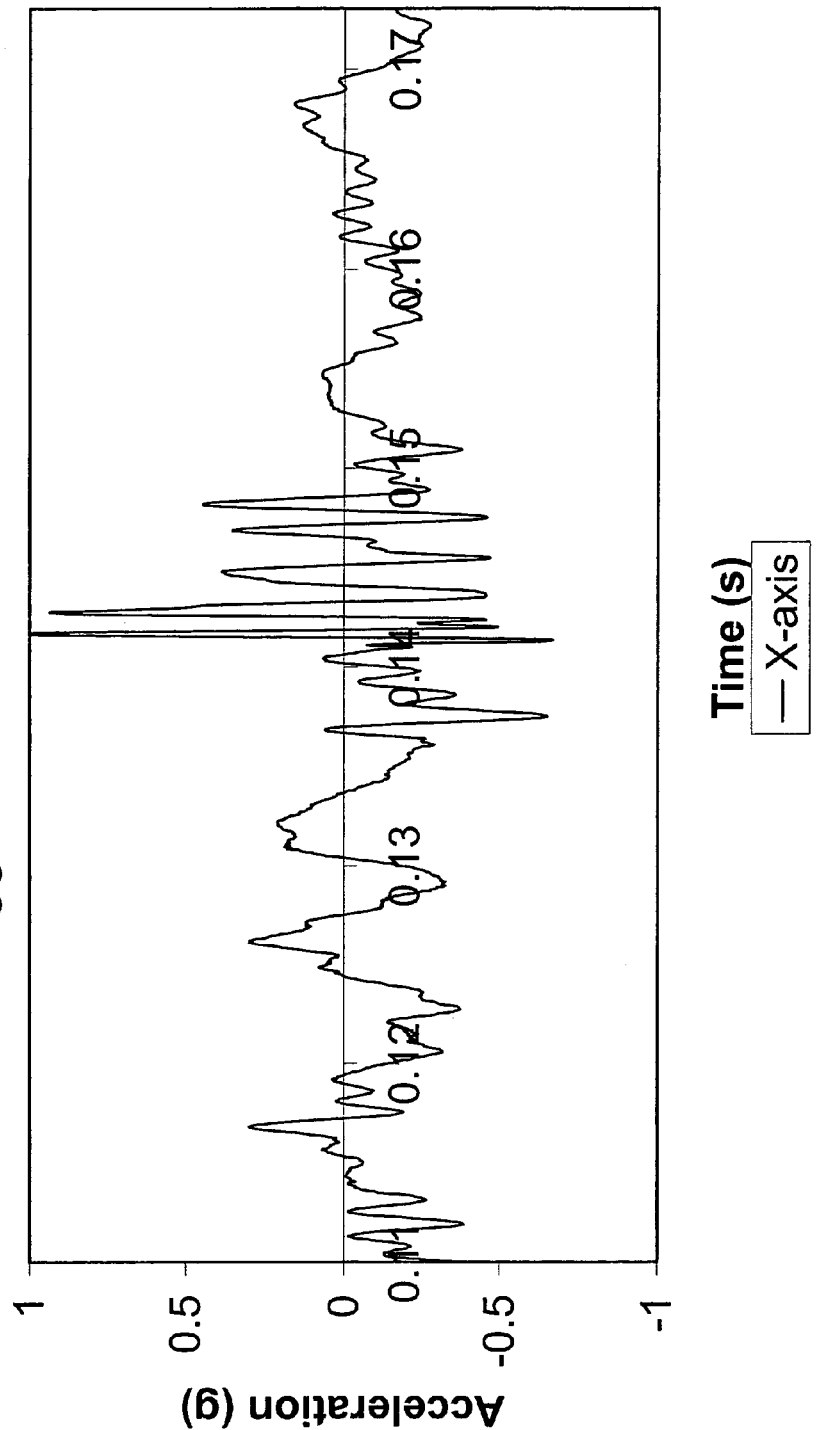
Figure 14F:
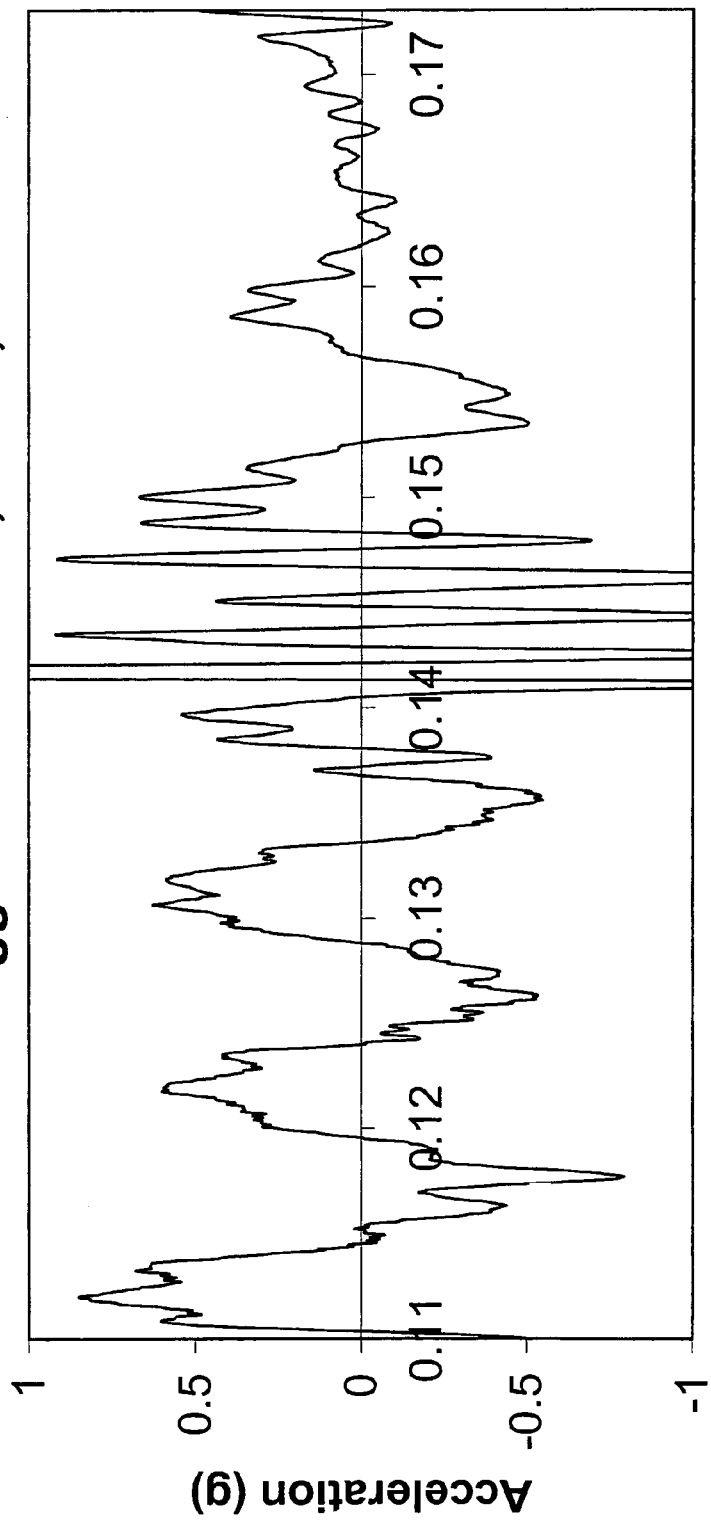

Example results from a typical test run are shown in FIG. 12. An 8008 (80° flow angle at 0.8 gal/min) nozzle was installed on the test nozzle body and operated at apprx. 60% duty cycle and 10 Hz. FIGS. 12A through 12C illustrate a characteristic cycle of the valve with an opening event at 0.055 s and a closing event at 0.12 s. Periods of flow (preceding valve closing) and no flow (following valve closing) are easily distinguished, especially when the acceleration and time scales are expanded in FIGS. 12D through 12F. Power spectra for the Y-axis calculated from the on (FIG. 12G) and off (FIG. 12H) periods are significantly different, especially in the 5 kHz band where nozzle vibration was noted in earlier experiments. Example results from a test where the test nozzle was completely blocked (with a plug) are shown in FIGS. 13A through 13C. Valve vibration was significantly damped by the immobile fluid and nozzle vibration profiles differ very little whether the valve is open or closed (FIGS. 13D through 13F).

To compare with FIG. 12 results for a properly operating nozzle, a partially clogged 8008 nozzle was installed in the test nozzle body. The results are shown in FIGS. 14A through 14F and indicate substantial damping of valve vibration and flow vibration during on periods. Spectra of the Y-axis vibration (FIGS. 14G and 14H) are very different from those observed in FIG. 12 for the unclogged nozzle.

The results from the field testing show that detection of proper continuous and pulsing flow is feasible from vibration measurements on the nozzle body. The lab and field studies found no potential problems with electrical or vibration interference. Regarding fluid properties, since this technique is fundamentally based on the motion and atomization of the liquid sheet from the nozzle, as long as the fluid properties do not significantly affect atomization, the vibration measurement technique should be reliable for most application situations.

The results show that sensing of the nozzle vibration can be used to diagnose both nozzle and valve operation for pulsing flows. Results presented in FIGS. 7-8 and 12-14 indicate that operation of the pulse valve is an easily detected event due to the strong magnitude of the shock from plunger movement, the resonance of the valve assembly and the reaction of the fluid flowing through the valve, nozzle body and the nozzle. Failure of the valve is easily detected. Since partial failure of the valve or plugging of the valve orifice would affect the nozzle flow, those conditions may be detected in a manner similar to detecting a partially clogged nozzle. The results suggest sensing nozzle vibration could be a simple means to detect proper or improper operation of all components on the nozzle body.

EXAMPLE NO. 4

Figure 15A:
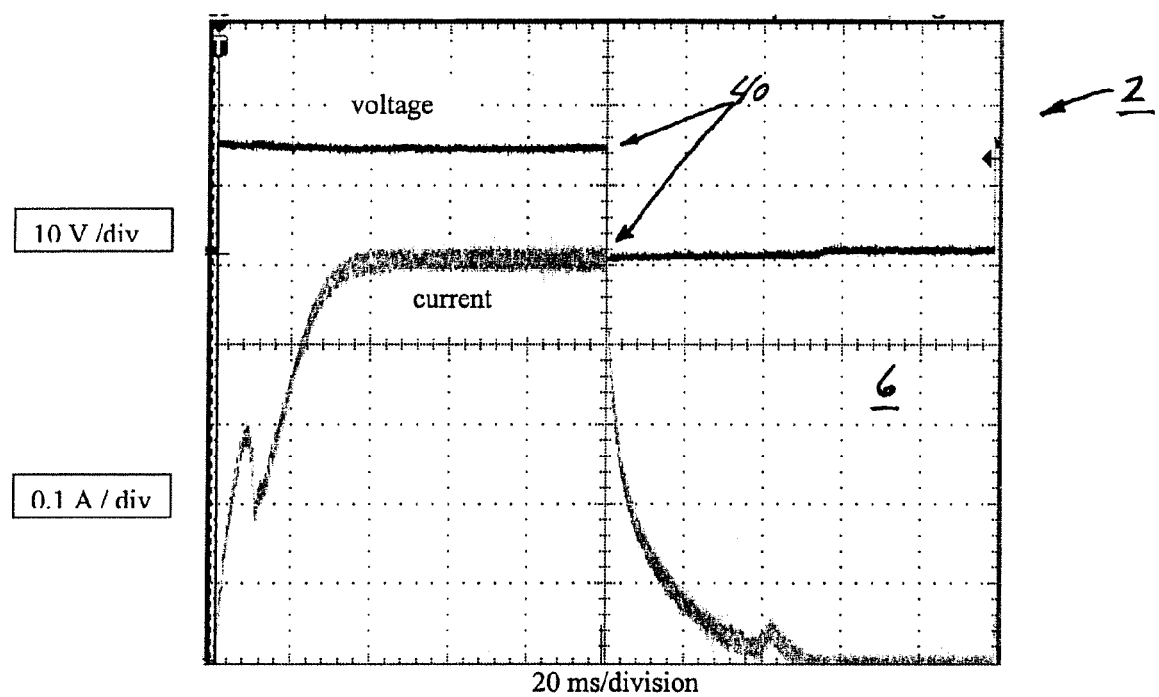
Figure 15B:
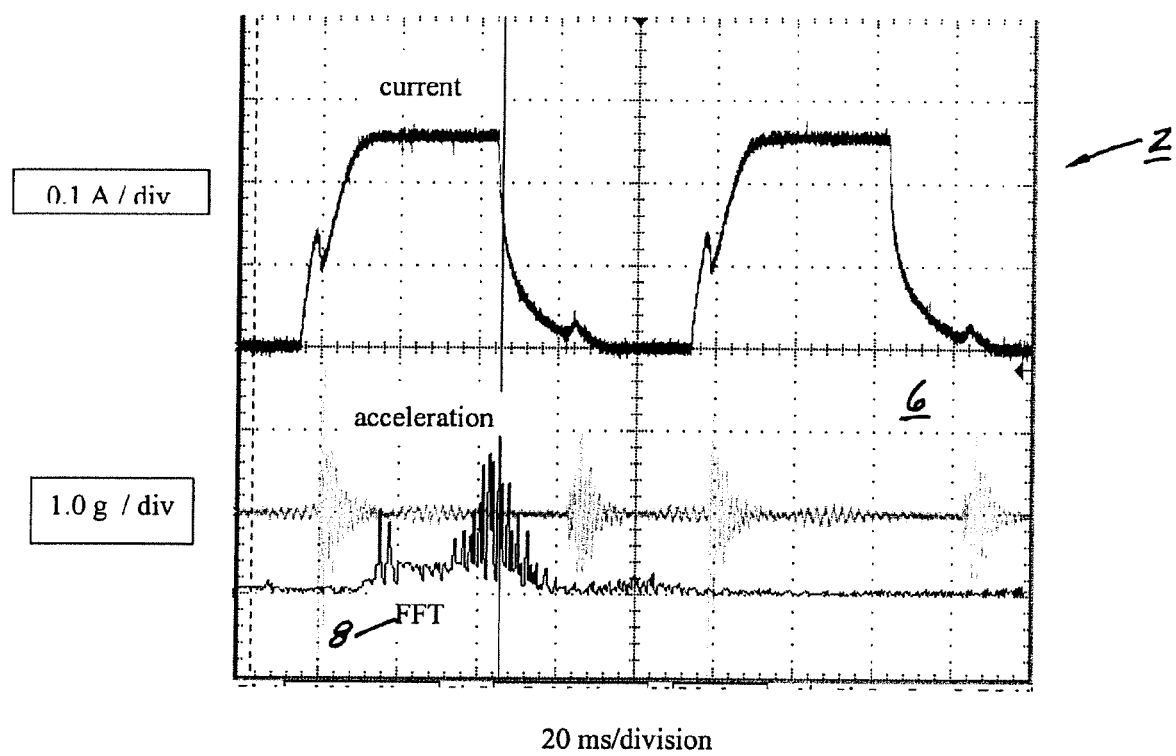

In addition to investigating nozzle vibration, a series of tests investigated sensing of electrical characteristics as a means to diagnose pulse valve operation independently or in combination with vibration sensing. Since the valve is actuated by a square wave, the rising and falling edges of the actuation signal can provide triggering and timing references for signal detection and analysis. For typical valve failures (stuck open, stuck closed, missing plunger), the current flow into the valve was measured. Each failure was observed to have a characteristic current signature. Additionally, the relation between the current flow and valve vibration was measured (FIGS. 15 and 16). These results suggest that sensing of valve electrical characteristics can be used alone or in combination with valve and nozzle vibration to sense operation of a pulsed flow control system. In these examples, valve coil current was measured as a voltage drop across a small resistance in series with the coil. Further experiments used semiconductor current sensors. A number of low-cost magnetic flux sensors may be used in this application. FIG. 15A shows that the controller 2 can include a current and voltage relational device 40 that selectively shows the voltage and current relationship for a pulsation valve operating properly. Approximately 10 ms after the valve actuation voltage is raised from 0 to 12 Vdc, the inrush current increases and indicates a characteristic "bump". FIG. 15B shows the time relationship 40 between the inrush current and the vibration (indicated as the acceleration) of the valve body. Likewise, after the voltage is returned to zero, the current drops to zero and another vibration signature—the closing of the valve—is observed.

Figure 16A:
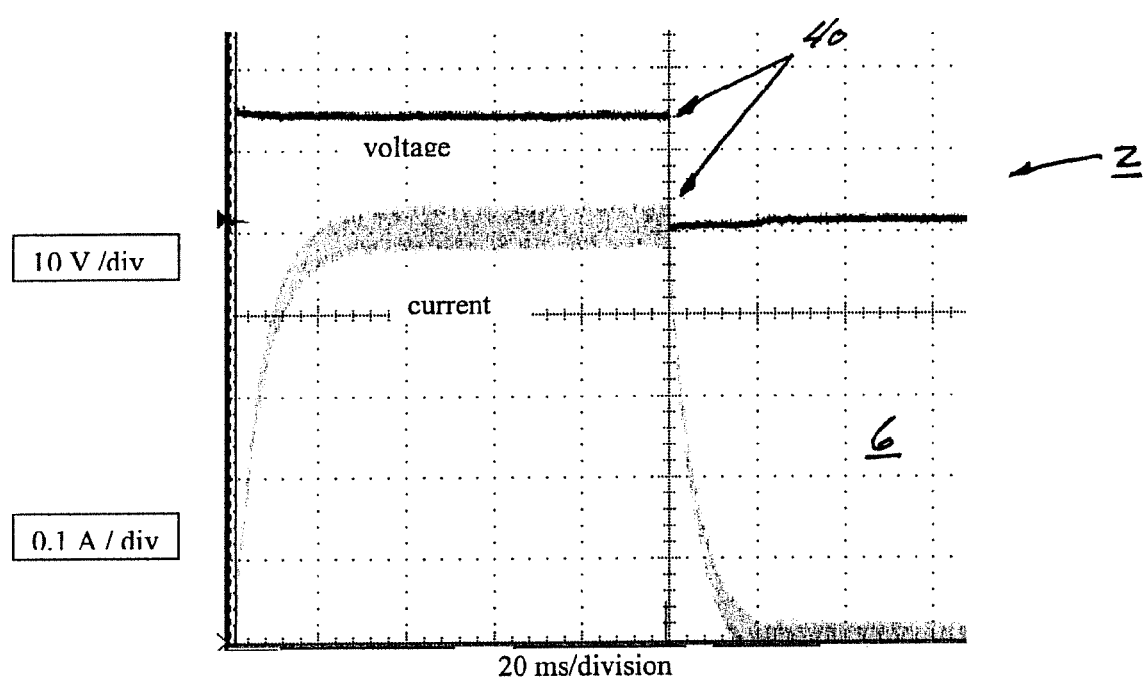
Figure 16B:
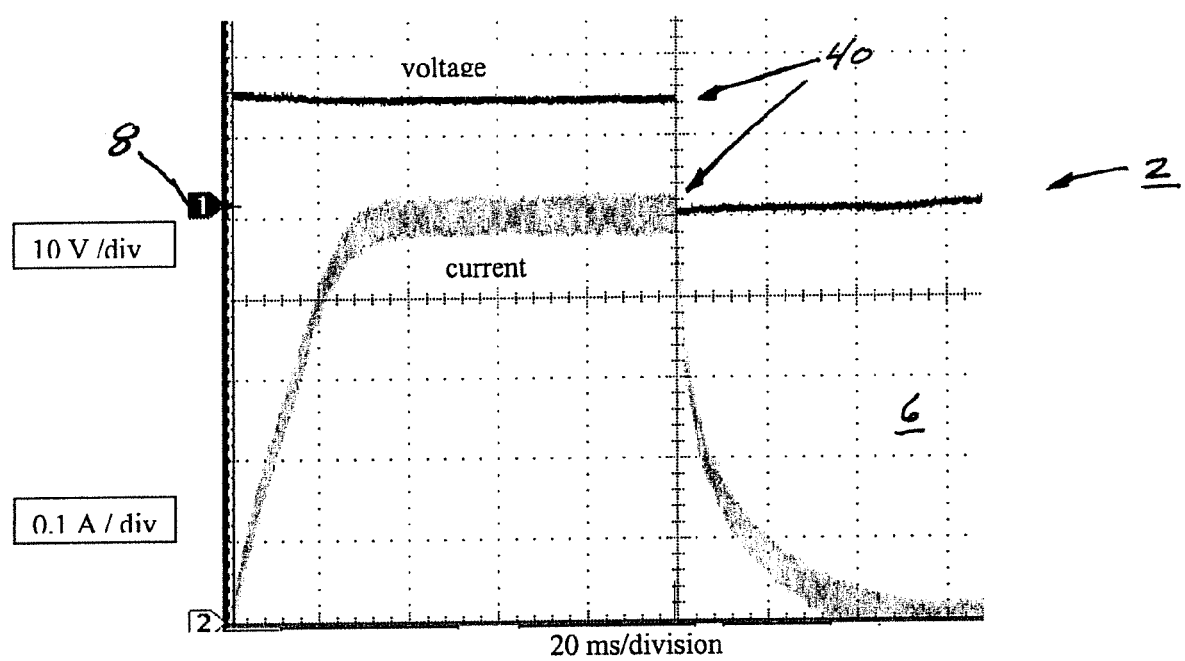

FIG. 16A shows a malfunctioning valve where the plunger was wedged open. The inrush current clearly shows a more rapid increase and decrease and the lack of the characteristic "bump". FIG. 16B shows a malfunctioning valve where the plunger was wedged closed. The inrush current clearly shows a slower increase and decrease in the rate of change and a lack of the characteristic "bump" during opening.

The relationships between pulsation valve actuation signal (the voltage) and the resulting current and valve vibration provided a means to detect and diagnose actuation valve failures.

EXAMPLE NO. 5

Figure 18A:
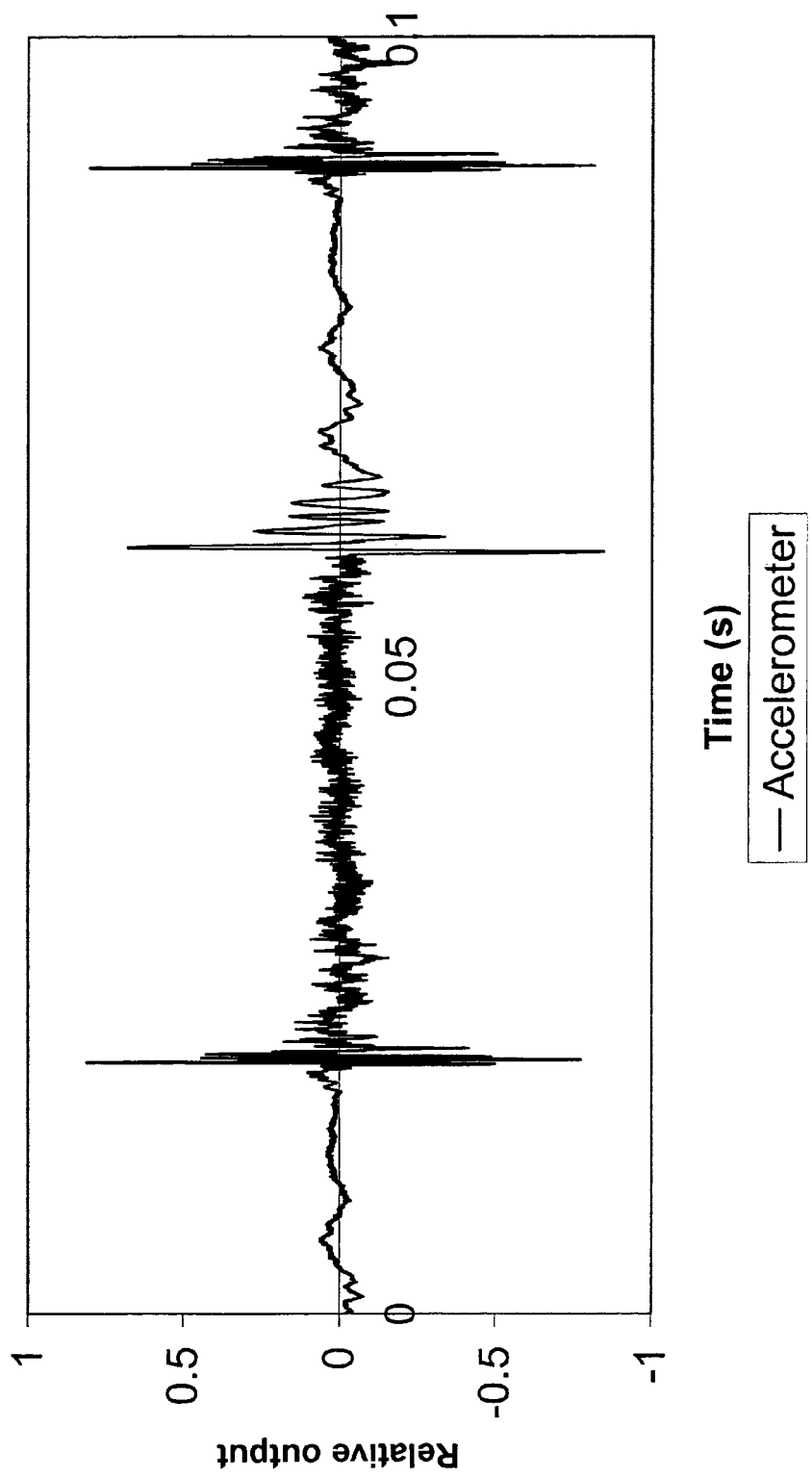

A pilot experiment was conducted with a simple, low-cost piezo film bonded to a nozzle cap with an 8004 nozzle (80° flow angle at 0.4 gal/min). The nozzle was operated at 15 Hz and 60% duty cycle for 300 kPa liquid pressure. The film output voltage was compared to the Y-axis acceleration from the triaxial accelerometer (used in Example No. 1) on an adjacent nozzle operating in phase with the test nozzle. The results are shown in FIGS. 18A and 18B. FIG. 18A is the vibration output received from the accelerometer while the graph shown in FIG. 18B represents the vibration output received from the piezoelectric film. The results suggest that lower cost sensors can be used in product development.

Figure 10:
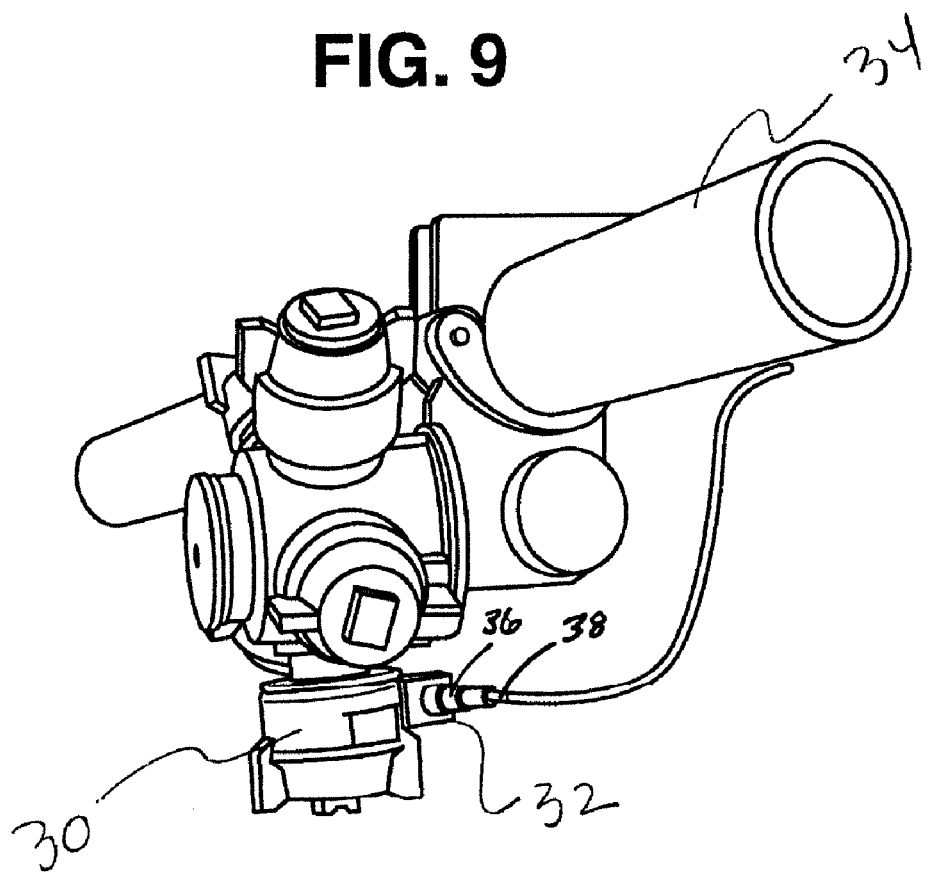

In the above examples, the triaxial accelerometer was mounted on the nozzle cap. For simple spray systems, mounting the sensor on the nozzle cap is acceptable; however, many commercial ag spray systems use 3-5 outlet turret nozzle bodies as shown in FIGS. 2 and 10. These units are manufactured by a number of vendors and differ slightly in design. In one desired embodiment, the sensor is embedded in the central nozzle body. Such a design relieves an operator of having to reposition the sensor each time a new nozzle is rotated into position.

The above examples established that useful information was contained in vibration in all three axes. The X-axis information generally related to pulse valve operation; Y-axis information related to atomization and spray quality; Z-axis information related to flow rate.

The foundation of the instrumentation system for the examples described was a laptop computer with a high-speed, multichannel data collection system and LabView control and data analysis software. This system allowed fast sampling and analysis of sensor signals from the test transducers. In particular, spectral analysis (frequency domain), cross correlation of multiple signals and conventional oscilloscope (time domain) inspection of signals was used.

From the above examples, it is shown that Y—and Z-axis vibrations are approximately 180° out of phase (at least the lower frequency, ca. 800 Hz, signal related to valve resonance appeared to be so). Understanding the relative motion in each axis leads to optimally positioning a single-axis accelerometer to be most sensitive to the resulting acceleration.

The signal conditioning circuitry required for the nozzle body sensor depends on the type of sensor selected for use. Most piezoelectric components produce weak signals that are high in voltage but low in current and may require buffering and amplification. If commercial accelerometers are used, the circuit designs, may use, for instance, high impedance op amps.

Manufacturers such as Measurement Specialties Inc., Endevco and Panasonic produce components that may be used in the present invention. If low-cost piezo sensors are used, a charge amplifier 36 may be desired and the frequency response of the circuit may have to be considered.

Because each nozzle on a large sprayer may potentially have a dedicated sensor and there are many sources of electrical noise on a sprayer (especially from pulsed-flow system with an individual electric actuator on each nozzle), the signal conditioning may occur at the nozzle sensor so that amplified signals are sent to a central processor or a control panel. Alternatively, both the signal conditioning and signal analysis may be accomplished by a microcontroller at the nozzle. In the latter case, communication with the nozzle sensor system will be through digital signals instead of analog signals.

In one embodiment, a commercial op amp board such as the TERN OPS™ (TERN, Inc., Davis Ca.) may be used. The board provides up to 4 instrumentation grade op amps on a single board that can be piggybacked on a microcontroller. The op amp board can be coupled to a 16 bit, 20 MHz microcontroller such as a TERN V-104 or similar microcontroller. Each microcontroller may handle a number of nozzle sensors.

If simple piezo films are to be used as the sensor, the films are coupled to the nozzle body in such a way as to provide sensitivity and proper frequency response over the range of nozzle vibration.

The above examples determined that amplitude of the Y— and Z-axis vibration changed significantly as nozzle flow rate, spray pressure and nozzle clogging changed. Additionally, a conventional Fast Fourier Transform of the signal into a power spectrum provided significant insight into the nozzle operation, especially if the inspection was concentrated to certain frequency bands.

When incorporated into a commercial system, the above information can be analyzed automatically using signal processing algorithms for indicating when nozzle malfunction occurs. In one embodiment, for instance, a controller may be used for detecting departures from an established "normal" operation. In such as case, the algorithm may be as simple as follows:

1. Upon start up of the sprayer, prompt the operator to turn on all nozzles and confirm that all the nozzles are operating properly.
2. Sample the signal from a number of nozzles and determine the amplitudes and predominant frequencies of the vibration. If results are not stationary, increase sampling time until data are stable.
3. Determine if any nozzles differ from the mean nozzle response by exceeding a predetermined band of acceptable variation.
4. Alert the operator to any nozzle that is outside the acceptable band.
5. During operation, continuously sample all nozzles and alert the operator if any nozzle departs from the initial conditions or if the nozzles collectively begin to depart from the initial conditions.

One characteristic of the nozzle vibration method is the luxury of time. Sampling periods can be in the range of 0.2 to 0.5 s and processing of $2^n$ sample points can be rapid. Therefore, many data samples can be taken and analyzed per second. Averaging and windowing of results can remove transient effects and prevent false alarms. Therefore, many samples can be analyzed in the periods between operator updates.

The algorithm for analyzing data according to the present invention may, in one embodiment, require a number of decisions based on experimental data and may include the sample period for data collection, the criteria for a malfunctioning nozzle and the acceptable departure from a "normal" condition.

For pulsing flow, the algorithm may be more complex but more robust. The system confirms not only proper nozzle flow but also proper valve operation. Fortunately, the valve opening and closing events produce significant vibrations. With pulsed flow, the data sampling can be triggered with the valve actuation signal as described with respect to FIGS. 15 and 12A through 12C. FIG. 15 illustrates the relationship between the actuation signal (a 0 to 12 Vdc square wave), the current flow into the valve and the valve vibration (from laboratory data). FIGS. 12A through 12C illustrates the relationship between valve vibration and liquid flow (taken from field data on the self-propelled sprayer). An algorithm may, for example, proceed as follows:

1. Upon positive edge of the actuation signal, begin sampling and timing.
2. If a valve opening event (defined as vibration above a specified amplitude) does not occur within a defined period of time (e.g., 10 ms), then indicate a valve opening fault.
3. After valve is confirmed to be opening, wait for approximately 5 ms and then sample the nozzle vibration until actuation signal goes low.
4. Repeat process for valve closing (actuation signal goes low and impact occurs within 5-10 ms). Indicate a fault if the valve closing vibration signature shows any anomalies.
5. Sample nozzle vibration during closed cycle.
6. Compare vibration during open and closed periods and determine if nozzle vibration is significantly different for the flow versus no flow conditions.
7. Compare nozzle vibration characteristics during on time to other nozzles and the standard determined at system start up.
8. Indicate faults to operator.

Since commercial pulse flow systems use alternating phases of pulses for adjacent valves (to provide overlap and balance transient flow and electrical current demands), potential interference between adjacent nozzles may be avoided by masking the data sampling during the valve opening and closing periods of adjacent nozzles. Since the actuation signals are available to the microcontroller, such timing of the data sampling is simple.

In some embodiments, it is possible that certain vibrations on the mobile spray vehicle or on individual booms might interfere with the nozzle sensors. In these situations, a centrally located accelerometer or an accelerometer on each spray boom may be added as a background reference. If such a sensor is used, the algorithms may be designed to incorporate the ambient data. It may be as simple as masking the data sampling when significant machine vibrations events are occurring. This may prevent excessive false alarms to the operator.

As described above, the system of the present invention for monitoring nozzle operation may be incorporated into various spray systems that may contain dozens of nozzles. In these types of systems, nozzle sensors, signal processors, and operator interface, collective nozzle comparisons, and any additional components may be integrated together. Such a system may include two different scales of operation. The first scale is the individual nozzle where the signals from the nozzle sensor are conditioned and used to determine characteristics of the valve and nozzle operation. The second scale is the overall system where the individual nozzles are compared to each other, to predefined criteria for proper operation, and the result presented to the operator.

In one embodiment, each nozzle will have an individual microcontroller that may not only sense operation but also control a pulsing valve or other actuators to achieve a desired flow rate setpoint supplied by a central controller. With the pulsed flow control technique, the sensing and prediction of relative flow is very simple; the relative duration of the "on" period for each cycle may be easily measured from the vibration data and the actual duty cycle of flow determined. Inspection of the nozzle vibration during the on period is used, in combination with the system supply pressure, to determine absolute flow during the on periods. Combination of the absolute and relative flow data may be used to calculate total flow from the nozzle.

The distribution of the computational and signal processing tasks in the overall system may vary depending on the particular application. One option is to have a completely centralized system where all signal analyses are performed within the control panel in the operator cab. In this design, the signals from the nozzle sensor are conditioned and amplified at the nozzle and sent as the analog vibration signal to a dedicated or multiplexed analog-to-digital converter at the processor. The circuitry at the nozzle may include, for instance, the power conditioning, charge amplifier and filters. This design requires individual wiring for each nozzle since there is no digital multiplexing out on the boom. This type of design may be most appropriate for small systems like shielded golf course and landscape sprayers where there are few nozzles and short distances to run cable. A relatively small and inexpensive microcontroller in the cab panel could be sufficient for processing data from the limited number of nozzles. An additional advantage of the centralized design is that there is no need for communication from the central processor back to the individual nozzles. Downloading of parameter values (for the processing algorithm), timing delays and other information is required when processing is done at the nozzle.

Conversely, another embodiment of the present invention is to embed all the signal processing and analysis functions at the nozzle location and retain only the supervision functions in the central processor. In this design, a CAN bus or other communication protocol may service a network of individual nozzle monitors. Parameter values for signal analysis would be sent to the individual nozzles and the condition of the nozzle operation would be sent back to the controller for collective analysis and display to the operator.

In other embodiments, the test systems may be a hybrid, or compromise, between the above two described systems. For instance, the analog components for power conditioning and charge amplification may be placed at the nozzle. Simple microcontrollers may also be located at each nozzle. The microcontroller may implement the analysis algorithms. On-board counter/timers may be triggered by valve actuation signals (for the pulsed flows) or by an internal clock (for continuous flows). The counter timers and onboard clock may drive the analog to digital converters to collect the sample vibration signal. After collection, the signal analysis, including the FFT may be done and the microcontroller indicates the results both as a signal (good/bad) and data on why the determination was made. The microcontroller may have sufficient memory to retain information on trends.

In one embodiment, a centralized system may be included where the conditioned signals from the individual nozzle sensors are routed to a central processor such as a TERN 586-Engine that can support a number of analog to digital converters and floating-point math. This centralized system allows more complex data analysis and computation of longer term trends in nozzle characteristics. The controller can also interface to an LCD screen for data presentation.

For example, a CAN bus design may be used for the monitoring system communication.

In other embodiments, the system of the present invention will include a simple panel that, for instance, may include a series of audible and/or visible alarms that indicate when a nozzle is malfunctioning. In this embodiment, data analysis, processing, initializing and other system functions remain transparent as possible to the operator.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A system for monitoring the operation of a fluid nozzle comprising:
   a fluid nozzle configured to emit a fluid according to a predetermined spray pattern and flow rate;
   a vibration sensor positioned in operative association with the fluid nozzle, the vibration sensor sensing nozzle vibration in at least one direction; and
   a controller in communication with the vibration sensor, the controller, based on vibrations sensed by the vibration sensor, being configured to convey information to an operator regarding the flow rate or the spray pattern of a fluid being emitted by the nozzle.

2. A system as defined in claim 1, wherein the controller is configured to compare a predetermined standard vibration output to the vibration output received from the vibration sensor, the controller being configured to indicate an irregularity in the operation of the fluid nozzle from the comparison.

3. A system as defined in claim 1, wherein the controller comprises a display that visually displays information received from the vibration sensor for determining whether there are any irregularities in the spray pattern or flow rate of a fluid being emitted by the nozzle.

4. A system as defined in claim 1, wherein the controller comprises a microprocessor.

5. A system as defined in claim 1, wherein the controller is configured to compare the spray pattern vibration output received from the vibration sensor to a spray pattern vibration output received by the controller from a second vibration sensor placed in operative association with a second fluid nozzle, the controller being configured to indicate an irregularity in the operation of either of the fluid nozzles from the comparison.

6. A system as defined in claim 1, wherein the vibration sensor comprises an accelerometer.

7. A system as defined in claim 1, wherein the fluid nozzle comprises a pulsating nozzle.

8. A system as defined in claim 7, wherein the controller is further configured to indicate whether the fluid nozzle is pulsating at a predetermined frequency, duty cycle, or waveform.

9. A system as defined in claim 1, wherein the fluid nozzle includes a Z axis that comprises the direction of flow of a fluid through the nozzle, an X axis that is perpendicular to the Z axis and extends to the left and right of the nozzle when facing a front of the nozzle, and a Y axis that is perpendicular to the Z axis and the X axis, the vibration sensor sensing vibrations in at least one of the Z axis direction, the X axis direction, or the Y axis direction.

10. A system as defined in claim 9, wherein the vibration sensor senses vibrations in the Z axis direction for conveying information to an operator regarding the flow rate of a fluid being emitted by the nozzle.

11. A system as defined in claim 9, wherein the vibration sensor senses vibrations in the Y axis direction for conveying information to an operator regarding the spray pattern of a fluid being emitted by the nozzle.

12. A system as defined in claim 1, wherein the vibration sensor comprises a piezoelectric device.

13. A system as defined in claim 1, wherein the controller includes a visual or audible alarm that is activated when the vibration output received from the vibration sensor is outside of preset limits.

14. An agrochemical spray system incorporating the system defined in claim 1.

15. A system as defined in claim 1, wherein the vibration sensor is configured to sense vibrations at a frequency of from about 500 Hz to about 10,000 Hz.

16. A system as defined in claim 1, wherein the vibration sensor is configured to sense vibrations at a frequency of from about 1,000 Hz to about 8,000 Hz.

17. A system as defined in claim 1, wherein the vibration sensor is configured to sense vibrations at a frequency of from about 2,000 Hz to about 7,000 Hz.

18. A system as defined in claim 1, further comprising an amplifying device for amplifying the vibration output generated by the vibration sensor and communicated to the controller.

19. A system as defined in claim 1, further comprising a current and voltage device for measuring the electrical characteristics of a pulsating valve.

20. A system as defined in claim 1, further comprising a filtering device for filtering the vibration output generated by the vibration sensor and communicated to the controller.

21. A process for monitoring the operation of a fluid nozzle comprising:
positioning a vibration sensor in operative association with a fluid nozzle, the fluid nozzle being configured to emit a fluid according to a predetermined spray pattern and flow rate;
sensing vibrations occurring at the fluid nozzle while the nozzle is emitting a fluid using the vibration sensor, the vibration sensor sensing nozzle vibration in at least one direction; and
comparing the sensed vibrations to a reference using a controller, the controller being in communication with the vibration sensor for receiving the sensed vibrations from the vibration sensor, the controller thereafter conveying information to an operator regarding the flow rate or the spray pattern of a fluid being emitted by the nozzle.

22. A process as defined in claim 21, wherein the reference comprises an ideal nozzle vibration frequency pattern.

23. A process as defined in claim 21, wherein the reference comprises vibrations sensed from a second fluid nozzle.

24. A process as defined in claim 21, wherein the sensed vibrations indicate any irregularities in a spray pattern being emitted by the nozzle.

25. A process as defined in claim 21, wherein the sensed vibrations indicate whether any flow rate irregularities are occurring through the nozzle.

26. A process as defined in claim 21, wherein the vibrations are sensed by an accelerometer.

27. A process as defined in claim 21, wherein the fluid nozzle emits the fluid in pulses.

28. A process as defined in claim 21, wherein the reference comprises an initial vibration frequency pattern created by the fluid nozzle.

29. A process as defined in claim 21, wherein the fluid nozzle includes a Z axis that comprises the direction of flow of a fluid through the nozzle, an X axis that is perpendicular to the Z axis and extends to the left and right of the nozzle when facing a front of the nozzle, and a Y axis that is perpendicular to the Z axis and the X axis, and wherein vibrations are sensed in at least one of the Z axis direction, the X axis direction, or the Y axis direction.

30. A process as defined in claim 29, wherein vibrations are sensed in the Z axis direction for monitoring flow rate variations as the fluid is emitted from the nozzle.

31. A process as defined in claim 29, wherein the vibrations are sensed in the Y axis direction for monitoring any variations in a spray pattern or droplet size spectrum being emitted by the nozzle.

32. A process as defined in claim 29, wherein vibrations are sensed in at least two directions.

33. A process as defined in claim 29, wherein vibrations are sensed in the Z axis direction, the X axis direction, and the Y axis direction, the fluid nozzle emitting the fluid in pulses according to a preset duty cycle, and wherein the sensed vibrations indicate any irregularities in the duty cycle.

34. A process as defined in claim 21, wherein the vibrations are sensed by a piezoelectric device.

35. A process as defined in claim 21, wherein the fluid is emitted by the nozzle at a flow rate of from about 0.05 gals/min to about 1.5 gals/min.

36. A process as defined in claim 21, wherein vibrations are sensed at a frequency of from about 500 Hz to about 10,000 Hz.

37. A process as defined in claim 21, wherein vibrations are sensed at a frequency of from about 1,000 about 8,000 Hz.

38. A process as defined in claim 21, wherein vibrations are sensed at a frequency of from about 2,000 Hz to about 7,000 Hz.

39. A process as defined in claim 21, wherein the fluid nozzle emits the fluid in a fan-shaped pattern.

40. A process as defined in claim 21, wherein the fluid nozzle emits the fluid in a cone-shaped pattern.

41. An agrochemical delivery system for dispensing controlled amounts of a fertilizer or pesticide onto a crop comprising:
a reservoir for holding an agrochemical, said reservoir including an outlet for dispensing said agrochemical;
a pumping means for moving the agrochemical;
a distribution manifold in communication with the outlet of the reservoir, the distribution manifold being connected to a plurality of dispensing tubes;
a plurality of fluid nozzles, each nozzle being placed on the end of a corresponding dispensing tube for dispensing an agrochemical onto a crop, each nozzle including a Z axis that comprises the direction of flow of an agrochemical through the nozzle, a Y axis that is perpendicular to the Z axis and parallel to a direction of travel of the agrochemical delivery system when the system is dispensing an agrochemical, and an X axis that is perpendicular to the Z axis and perpendicular to the Y axis;
a plurality of vibration sensors positioned in operative association with selected fluid nozzles, the vibration sensors sensing nozzle vibration in at least one direction, the at least one direction comprising the Z axis direction, the Y axis direction, or the X axis direction; and
a controller in communication with each of the vibration sensors for receiving a vibration output from each of the sensors, the controller being configured to compare the vibration outputs to a reference for determining whether the corresponding nozzles are operating properly.

42. A system as defined in claim 41, wherein the controller comprises a microprocessor.

43. A system as defined in claim 41, wherein the controller comprises a plurality of microprocessors.

44. A system as defined in claim 41, wherein the controller comprises a display that visually displays information received from the vibration sensors for determining whether there are any irregularities in the spray pattern or flow rate of an agrochemical being emitted by one of the nozzles.

45. A system as defined in claim 41, further comprising an alarm that is activated when the information received from the vibration sensors is outside of preset limits.

46. A system as defined in claim 41, wherein the reference comprises an ideal nozzle vibration frequency pattern.

47. A system as defined in claim 41, wherein the reference comprises an average of the vibration outputs received from the vibration sensors.

48. A system as defined in claim 41, wherein the reference comprises an initial vibration frequency pattern created by averaging the vibration outputs initially received from each of the vibration sensors.

49. A system as defined in claim 41, wherein the vibration sensors comprise accelerometers.

50. A system as defined in claim 41, wherein the vibration sensors comprise piezoelectric devices.

51. A system as defined in claim 41, wherein the fluid nozzles comprise pulsating nozzles.

52. A system as defined in claim 41, wherein the controller is configured to indicate irregularities in a flow rate or a spray pattern being emitted by the nozzles.

53. A system as defined in claim 41, wherein the vibration sensors sense vibrations in the Z direction.

54. A system as defined in claim 41, wherein the vibration sensors sense vibrations in the Y direction.

55. A system as defined in claim 41, wherein the vibration sensors sense vibrations in the Z direction and in the Y direction.

* * * * *